(12) United States Patent  
Kanstoroom et al.

(10) Patent No.: US 12,180,926 B2  
(45) Date of Patent: Dec. 31, 2024

(54) TURBINE BLADE WITH AUXILIARY DEFLECTOR

(71) Applicant: SJK Energy Solutions, LLC, Ashton, MD (US)

(72) Inventors: Steven J. Kanstoroom, Ashton, MD (US); Maximilian de Arriz, Chestertown, MD (US); Joseph M. Galliera, III, Stamford, VT (US)

(73) Assignee: SJK Energy Solutions, LLC, Ashton, MD (US)

( * ) Notice: Subject to any disclaimer, the term of this patent is extended or adjusted under 35 U.S.C. 154(b) by 0 days.

(21) Appl. No.: 18/372,613

(22) Filed: Sep. 25, 2023

(65) Prior Publication Data

US 2024/0102444 A1  Mar. 28, 2024

Related U.S. Application Data

(60) Provisional application No. 63/409,479, filed on Sep. 23, 2022.

(51) Int. Cl.
  *F03D 1/06* (2006.01)

(52) U.S. Cl.
  CPC ...... *F03D 1/0677* (2023.08); *F05B 2240/302* (2013.01); *F05B 2240/303* (2020.08); *F05B 2240/304* (2020.08)

(58) Field of Classification Search
  CPC ...... F03D 1/0675; F03D 1/0677; F03D 1/069; F05B 2240/302–304
  See application file for complete search history.

(56) References Cited

U.S. PATENT DOCUMENTS

| 2,135,887 A | 11/1938 | Fairey |
| 4,687,416 A | 8/1987 | Spranger |

(Continued)

FOREIGN PATENT DOCUMENTS

| CA | 2 425 447 A1 | 10/2004 |
| CN | 113 090 442 A | 7/2021 |

(Continued)

OTHER PUBLICATIONS

M Palanivendhan et al., "Design and Development of Multi Element Wing for Automobile Application", IOP Publishing, IOP Conf. Series: Materials Science and Engineering 993 (2020) 012130, doi:10.1088/1757-899X/993/1/012130 (9 pages).

(Continued)

*Primary Examiner* — Sang K Kim
(74) *Attorney, Agent, or Firm* — ROTHWELL, FIGG, ERNST & MANBECK, P.C.

(57) ABSTRACT

A fluid flow turbine blade assembly for a turbine rotor includes a blade and a deflector extending spanwise along at least a portion of the blade. At least a portion of an upstream surface of the deflector, along at least a portion of a span of the deflector, has a concave shape in a chordwise direction such that at least a portion of a chord line between leading and trailing edges of the deflector is disposed outside a profile defined between the upstream surface and a downstream surface of the deflector. The deflector has a substantially uniform thickness or a chord-wise varying thickness between the upstream surface and the downstream surface. The deflector alters fluid flow over the blade so as to increase the blade's contribution to global torque generated by the assembly so that, with the deflector's torque contribution, the global torque of the assembly is greater than the global torque that would be generated by the blade alone without the benefit of the deflector.

103 Claims, 59 Drawing Sheets

(56) References Cited

U.S. PATENT DOCUMENTS

| | | | |
|---|---|---|---|
| 5,484,257 | A | 1/1996 | Osborn |
| 7,585,157 | B2 | 9/2009 | Quell et al. |
| 7,828,523 | B2* | 11/2010 | Bonnet .................. F03D 1/0633 416/37 |
| 8,011,887 | B2 | 9/2011 | Fisher et al. |
| 8,777,580 | B2 | 7/2014 | Eisenberg |
| 8,834,127 | B2* | 9/2014 | Giguere ................ F03D 1/0633 416/62 |
| 9,945,357 | B2* | 4/2018 | Enevoldsen .......... F03D 7/0204 |
| 10,830,203 | B2* | 11/2020 | Whitehouse .......... F03D 1/0641 |
| 2009/0180889 | A1 | 7/2009 | Stiesdal |
| 2009/0232656 | A1 | 9/2009 | Grabau |
| 2010/0047070 | A1* | 2/2010 | Slot ........................ F03D 1/065 416/223 R |
| 2010/0209258 | A1 | 8/2010 | Fuglsang et al. |
| 2011/0020128 | A1 | 1/2011 | Fuglsang et al. |
| 2011/0135477 | A1* | 6/2011 | Mohammed .......... F03D 7/0236 29/889.71 |
| 2011/0142676 | A1 | 6/2011 | Mohammed et al. |
| 2011/0142681 | A1 | 6/2011 | Fisher et al. |
| 2011/0206509 | A1 | 8/2011 | Benito Santiago et al. |
| 2015/0118058 | A1* | 4/2015 | Vedula .................. F03D 1/0658 416/236 R |
| 2015/0316025 | A1* | 11/2015 | Enevoldsen .......... F03D 1/0675 416/237 |
| 2018/0171975 | A1* | 6/2018 | Röhm ....................... B64C 3/46 |
| 2021/0079886 | A1* | 3/2021 | Kneissl ................. F03D 1/0641 |
| 2022/0307465 | A1* | 9/2022 | Mukherjee .......... B29D 99/0028 |
| 2023/0235722 | A1* | 7/2023 | Stüttchen .............. F03D 7/0296 416/241 R |

FOREIGN PATENT DOCUMENTS

| | | |
|---|---|---|
| EP | 2 589 797 A2 | 5/2013 |
| EP | 2 757 258 A1 | 7/2014 |
| EP | 2 589 797 A3 | 1/2015 |
| JP | S61-167175 A | 7/1986 |
| WO | 2009/146810 A2 | 12/2009 |
| WO | 2010/133649 A2 | 11/2010 |

OTHER PUBLICATIONS

International Search Report and Written Opinion with Transmittal dated Dec. 20, 2023 in International Application No. PCT/US2023/033640 (13 pages).

* cited by examiner

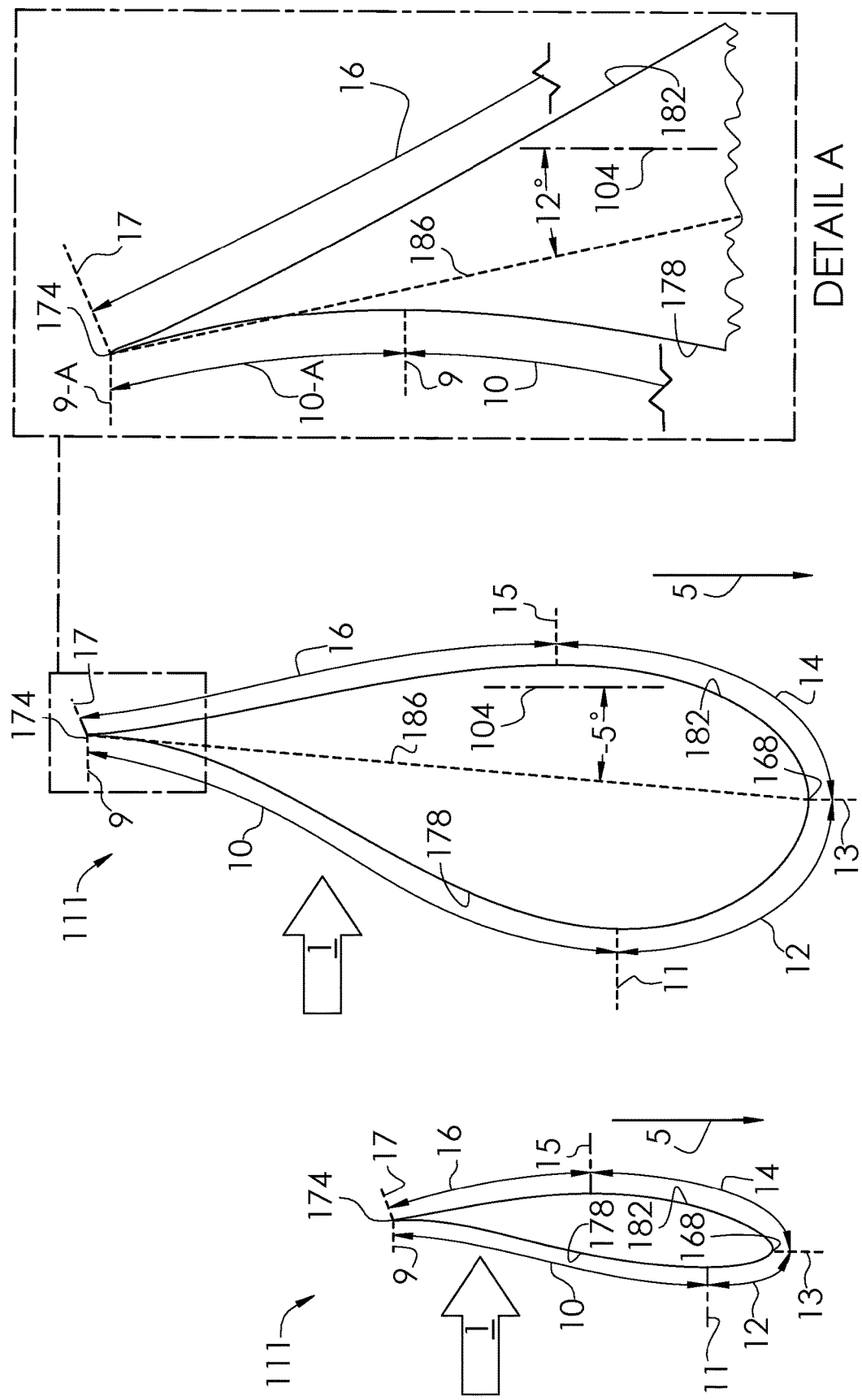

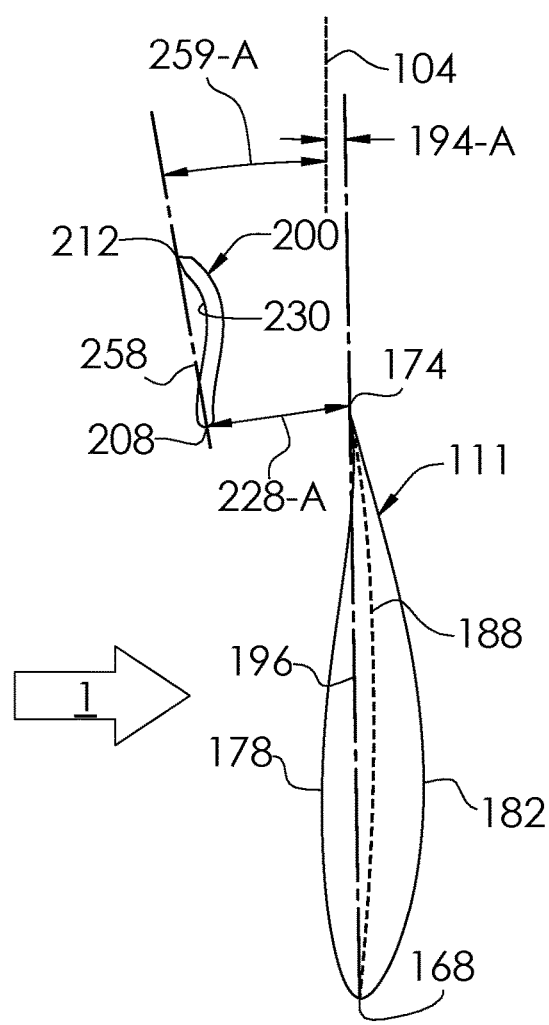
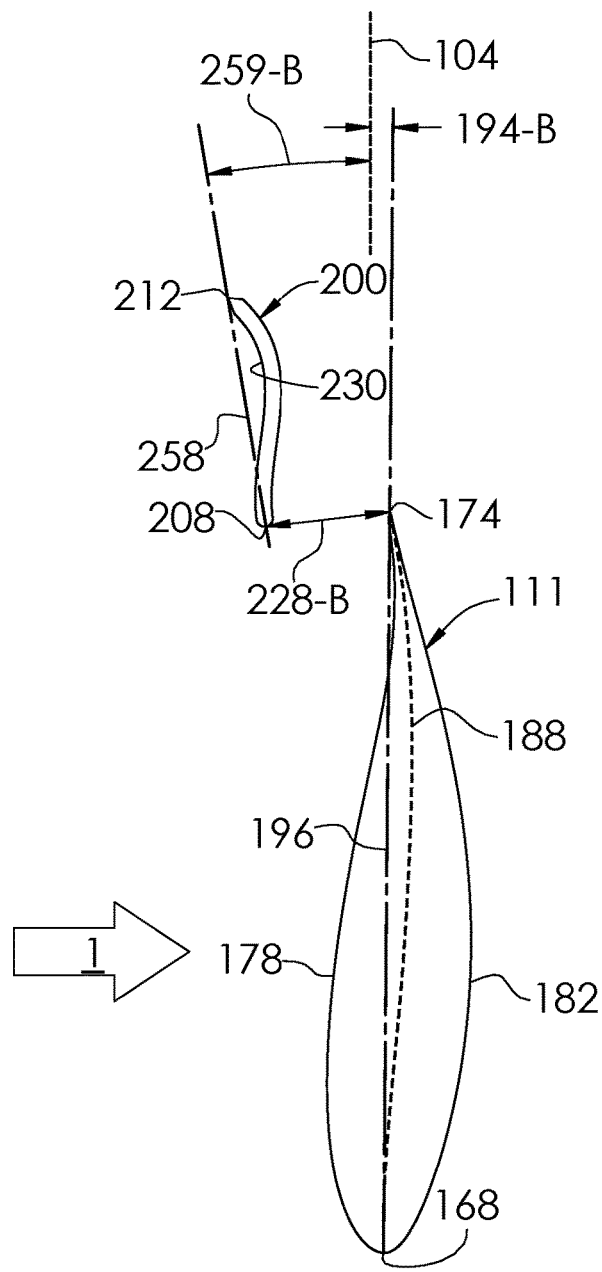
FIG. 9F
FIG. 9G

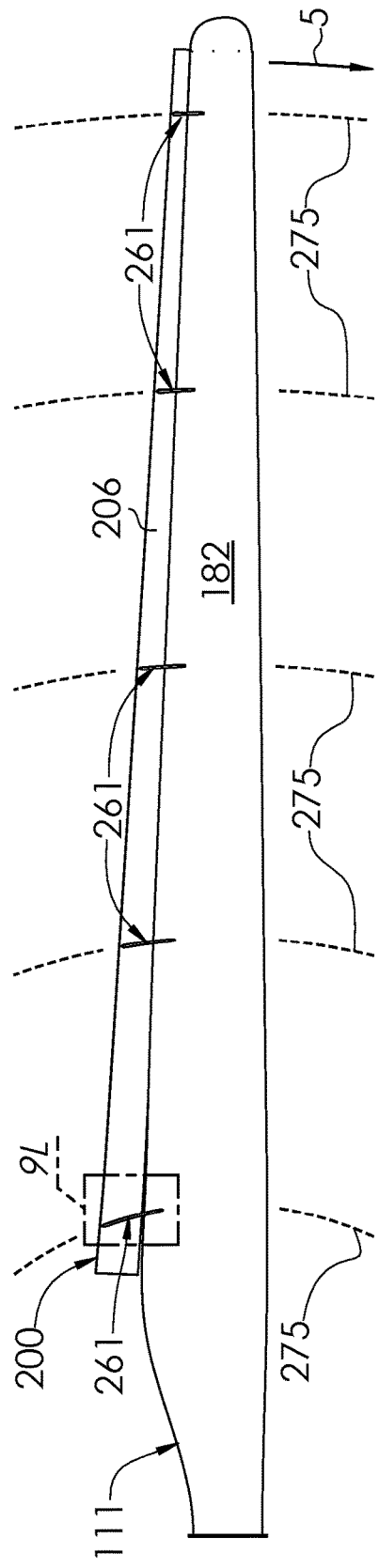
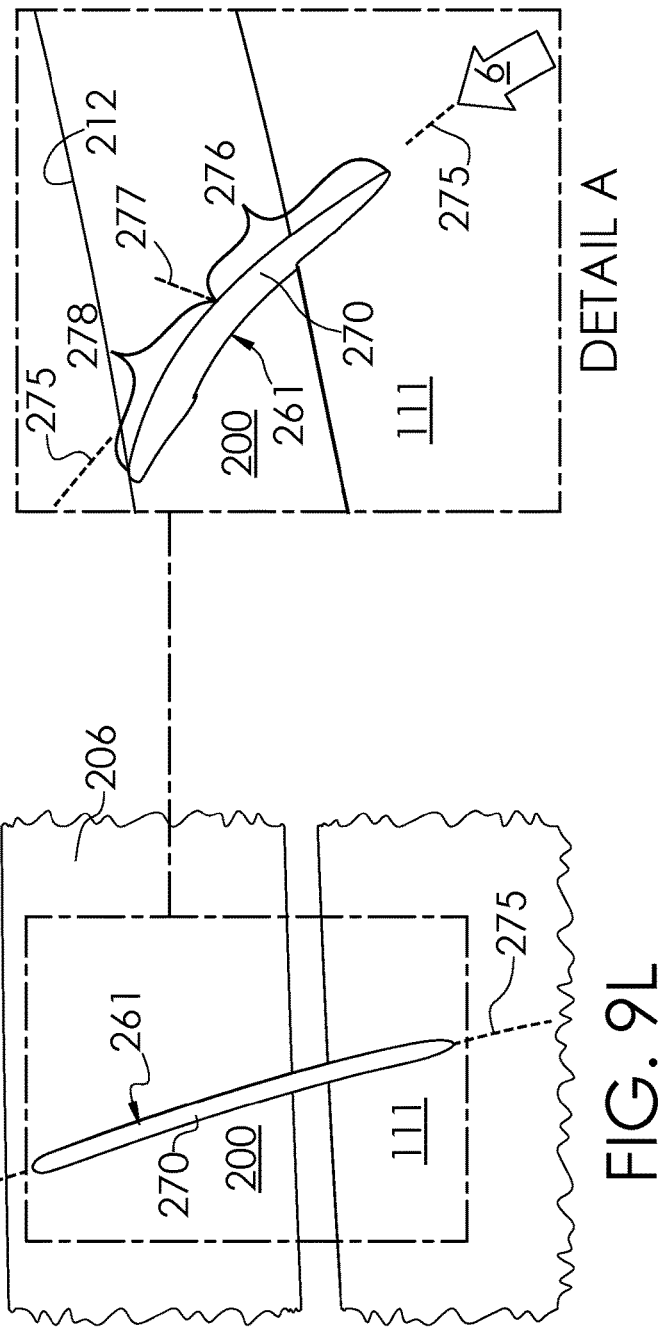
FIG. 9K
FIG. 9L
DETAIL A

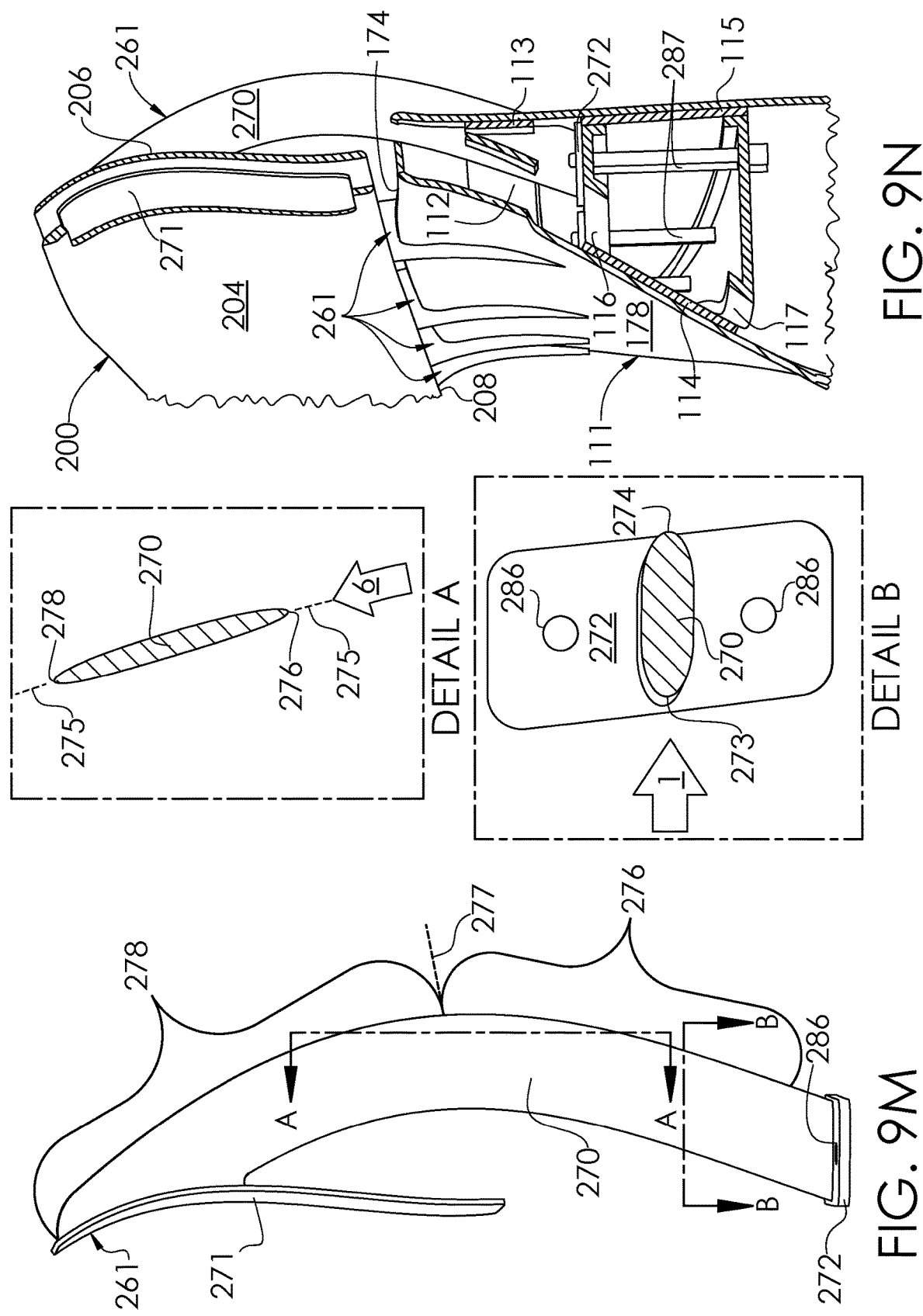

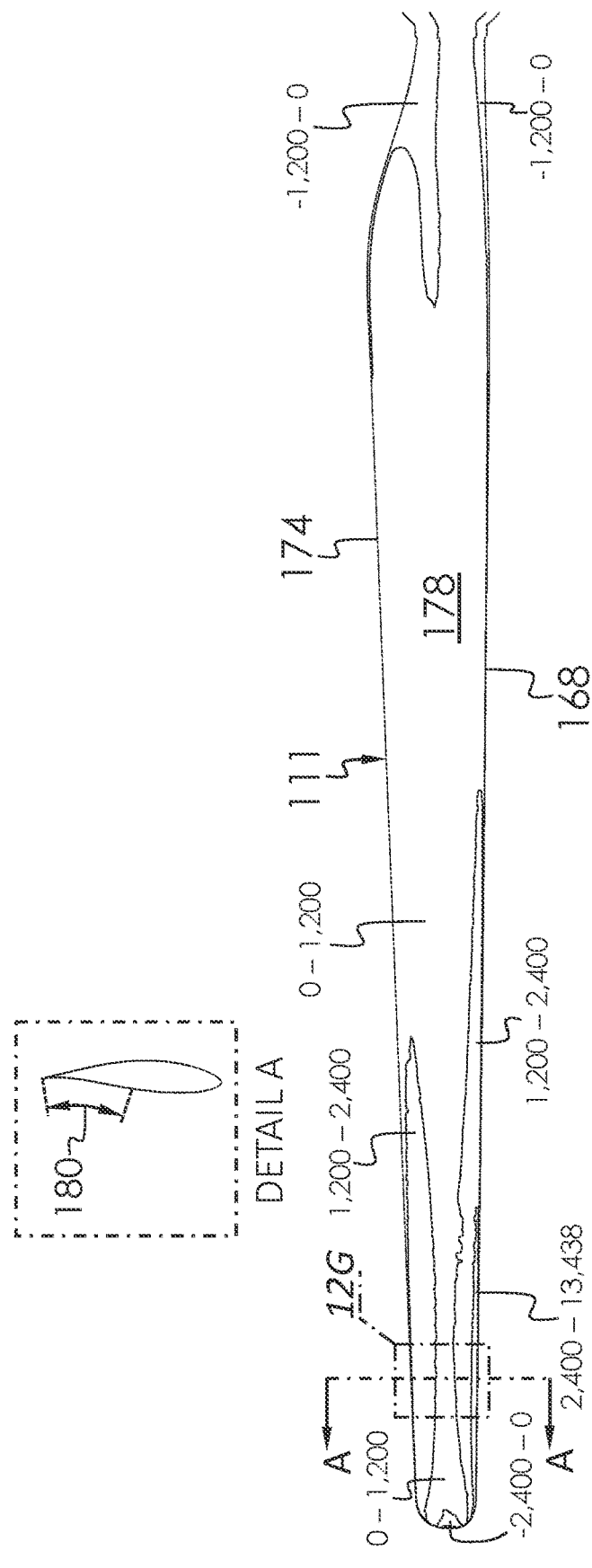
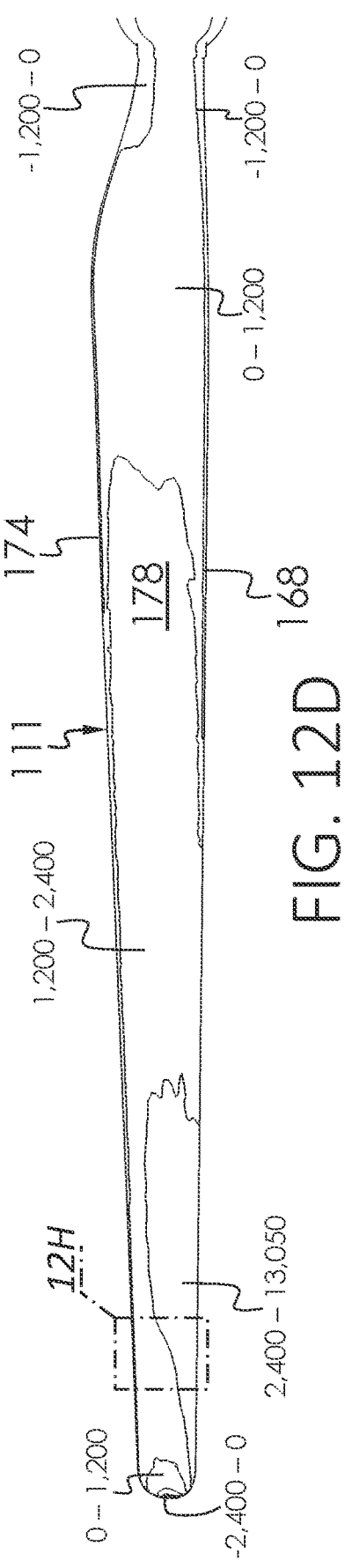
FIG. 12C (Prior Art)
FIG. 12D

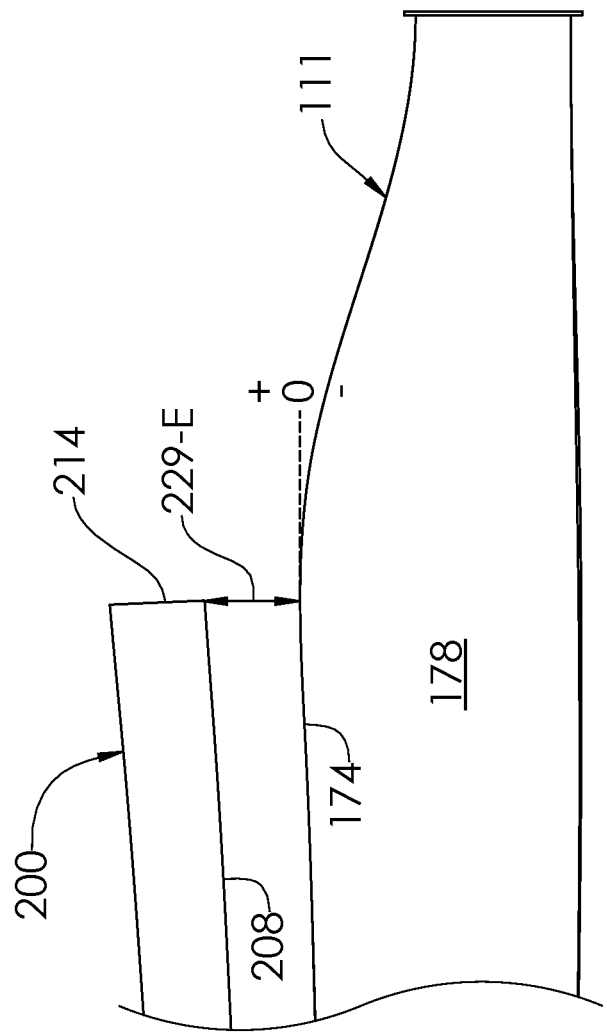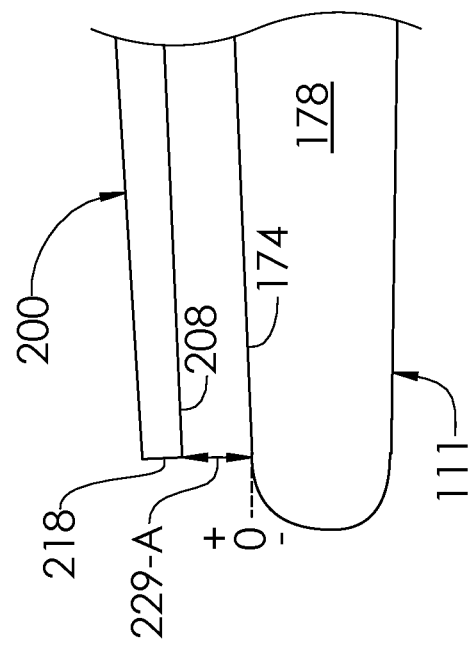
FIG. 13C

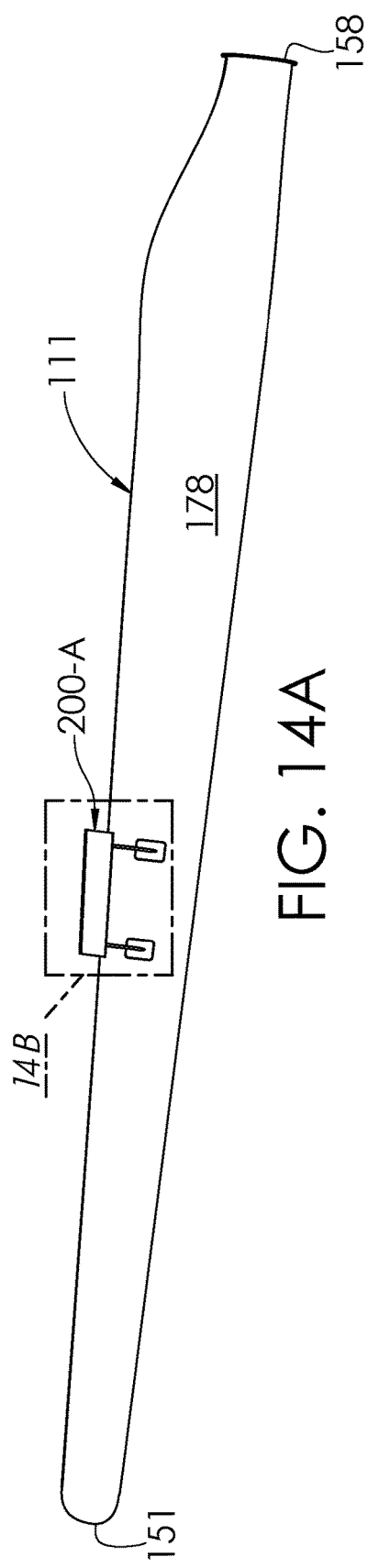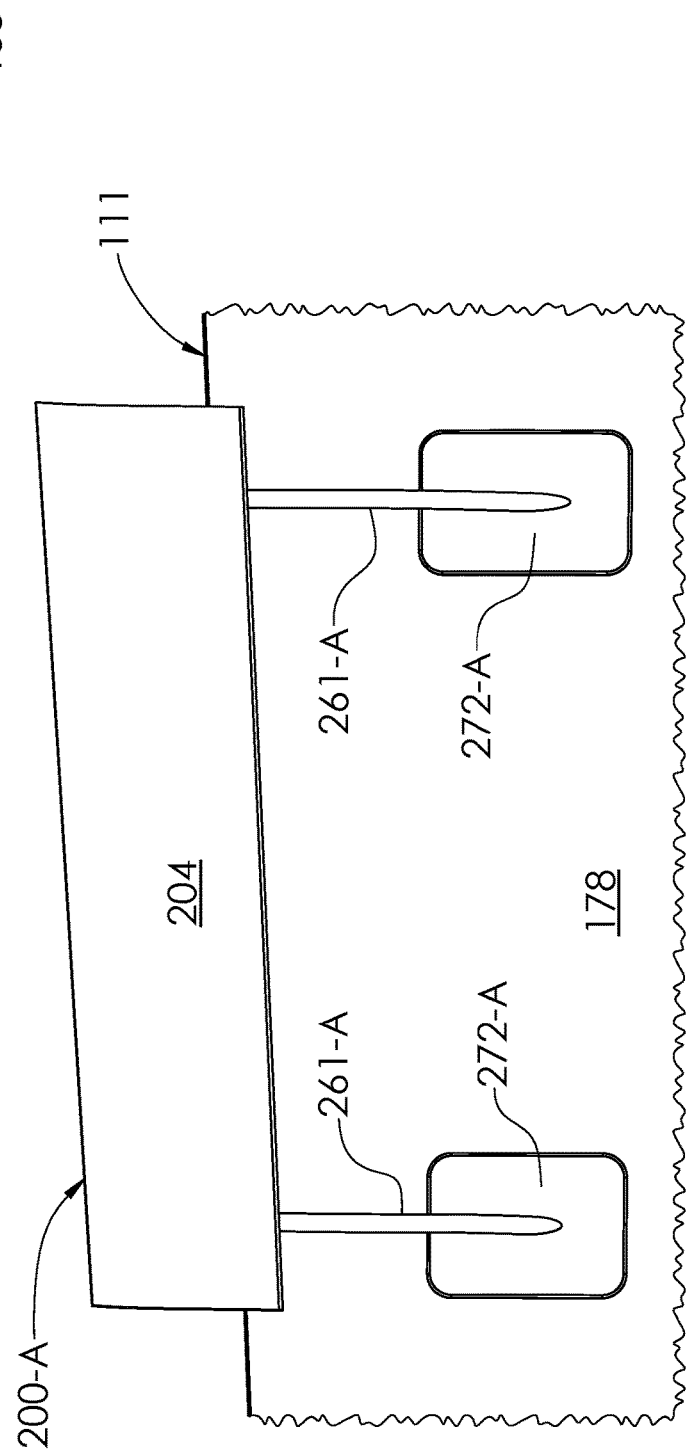

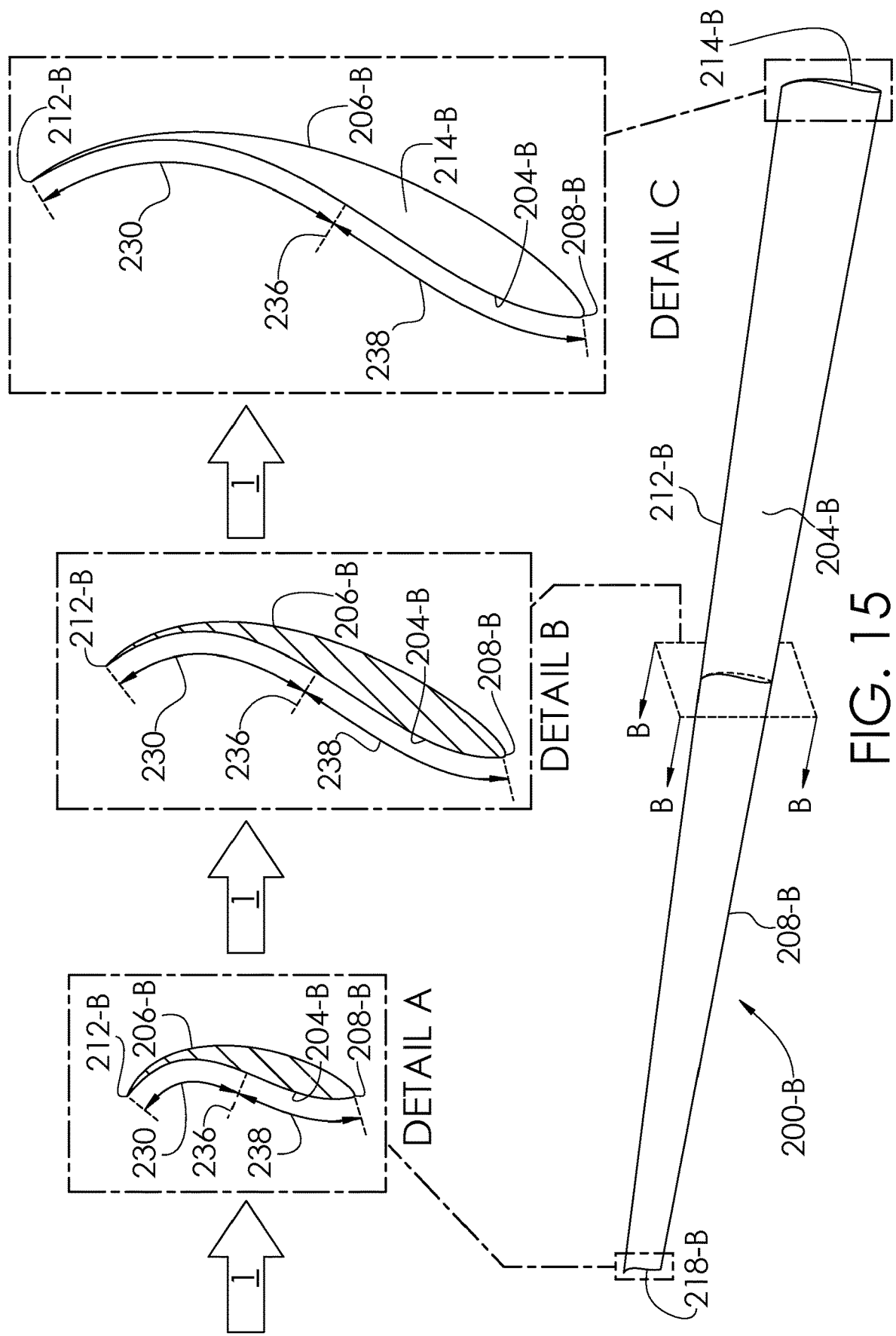

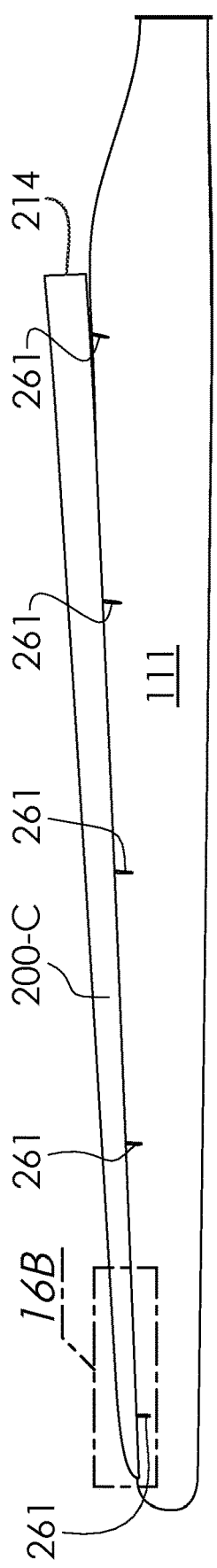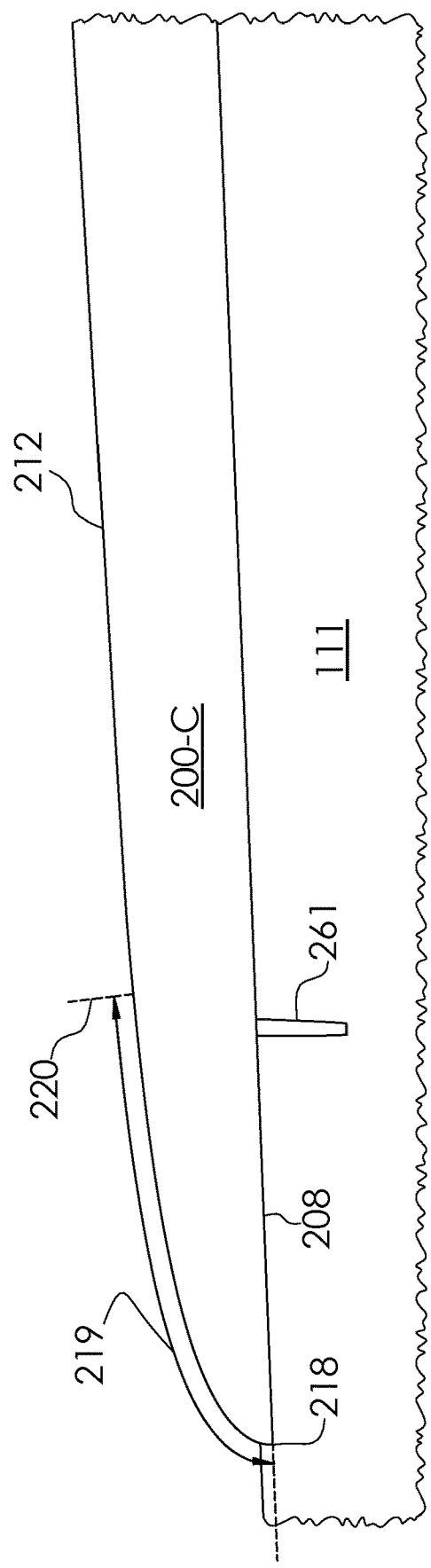
FIG. 16A
FIG. 16B

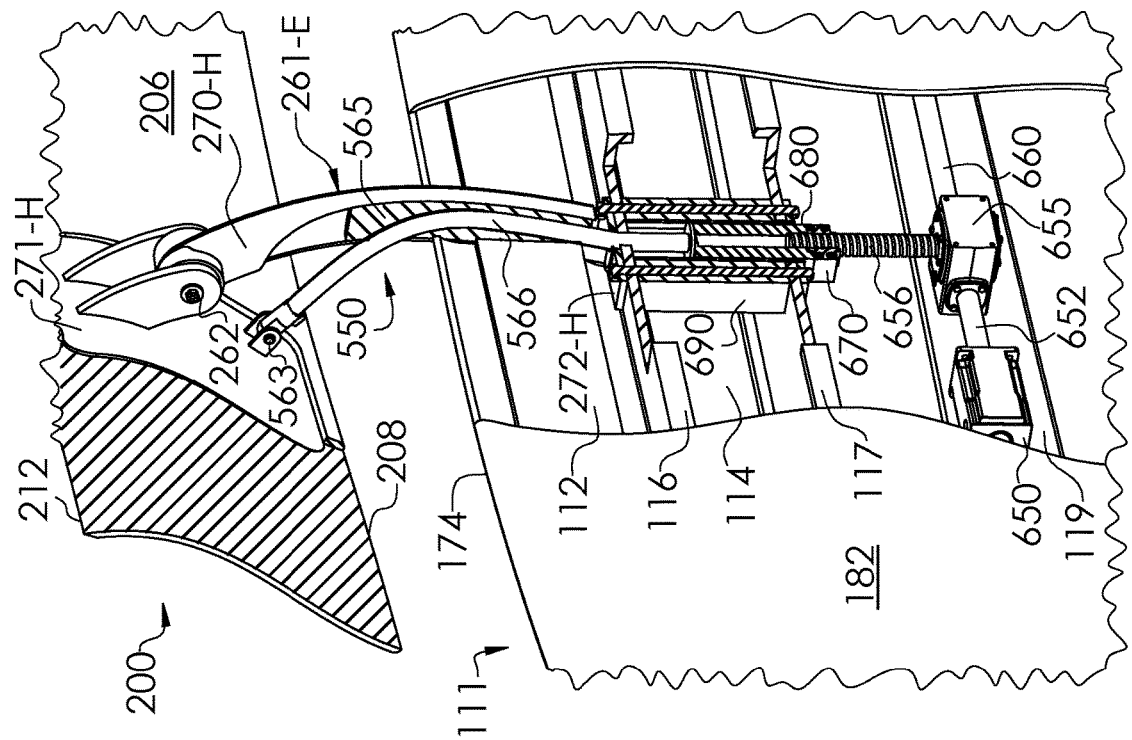
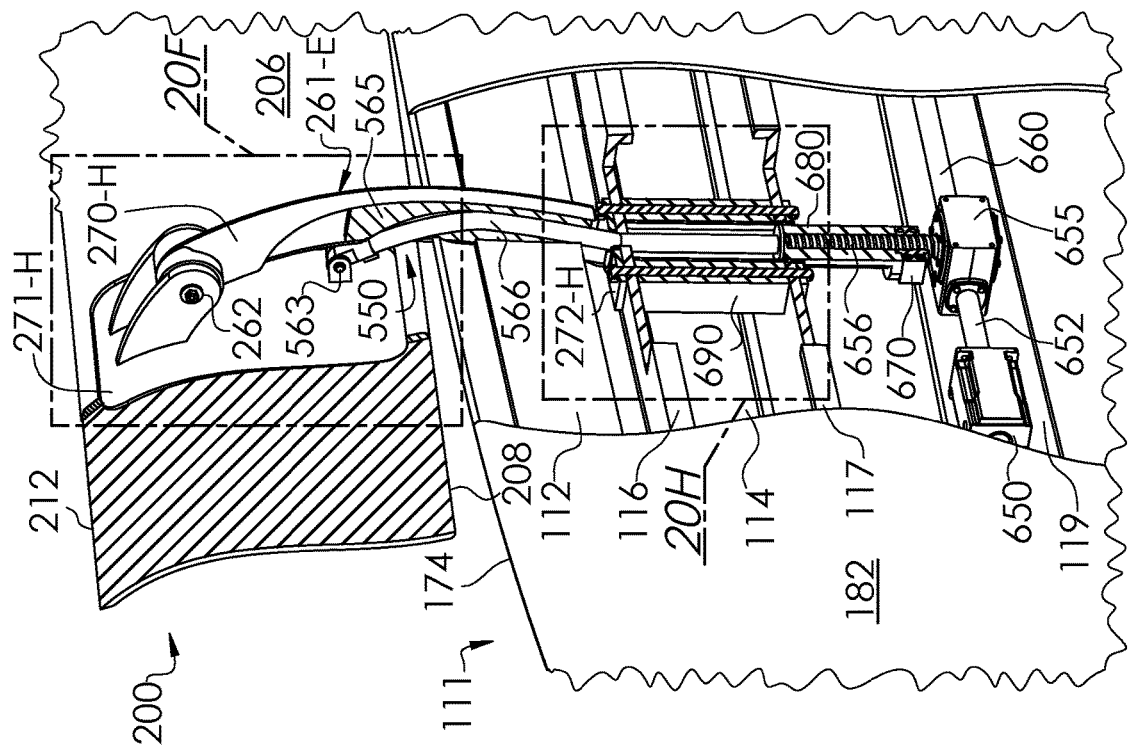

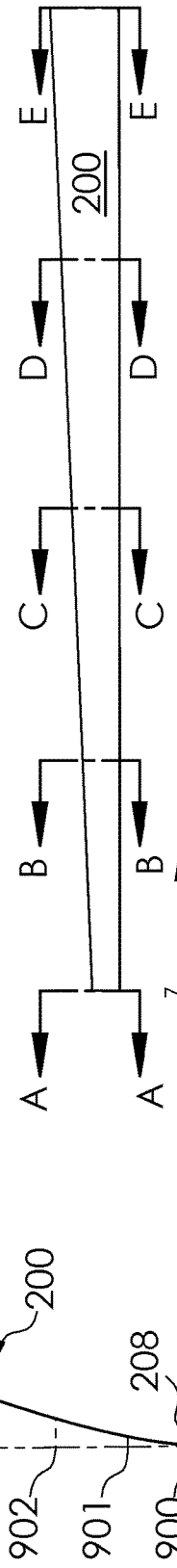
| | A (TIP) | | B | | C | | D | | E (HUB) | |
|---|---|---|---|---|---|---|---|---|---|---|
| PART NO. | X (m) | Y (m) | X (m) | Y (m) | X (m) | Y (m) | X (m) | Y (m) | X (m) | Y (m) |
| 900 | 0.000 | 0.000 | 0.000 | 0.000 | 0.000 | 0.000 | 0.000 | 0.000 | 0.000 | 0.000 |
| 901 | 0.005 | 0.104 | 0.008 | 0.142 | 0.010 | 0.180 | 0.012 | 0.218 | 0.014 | 0.257 |
| 902 | 0.032 | 0.208 | 0.040 | 0.284 | 0.048 | 0.361 | 0.056 | 0.437 | 0.064 | 0.513 |
| 903 | 0.070 | 0.312 | 0.086 | 0.427 | 0.102 | 0.541 | 0.118 | 0.655 | 0.134 | 0.770 |
| 904 | 0.113 | 0.417 | 0.137 | 0.569 | 0.162 | 0.721 | 0.185 | 0.873 | 0.210 | 1.026 |
| 905 | 0.152 | 0.521 | 0.184 | 0.711 | 0.215 | 0.901 | 0.246 | 1.092 | 0.277 | 1.283 |
| 906 | 0.179 | 0.625 | 0.215 | 0.853 | 0.251 | 1.082 | 0.287 | 1.310 | 0.323 | 1.539 |
| 907 | 0.186 | 0.729 | 0.222 | 0.995 | 0.258 | 1.262 | 0.295 | 1.528 | 0.331 | 1.796 |
| 908 | 0.163 | 0.833 | 0.195 | 1.138 | 0.226 | 1.442 | 0.257 | 1.746 | 0.289 | 2.052 |
| 909 | 0.104 | 0.937 | 0.124 | 1.280 | 0.143 | 1.622 | 0.163 | 1.965 | 0.183 | 2.309 |
| 910 | 0.000 | 1.041 | 0.000 | 1.422 | 0.000 | 1.803 | 0.000 | 2.183 | 0.000 | 2.565 |
FIG. 21B
FIG. 21C
| SECTION: | A | B | C | D | E |
|---|---|---|---|---|---|
| Z (m): | 0.000 | 9.113 | 18.225 | 27.337 | 36.449 |
FIG. 21D
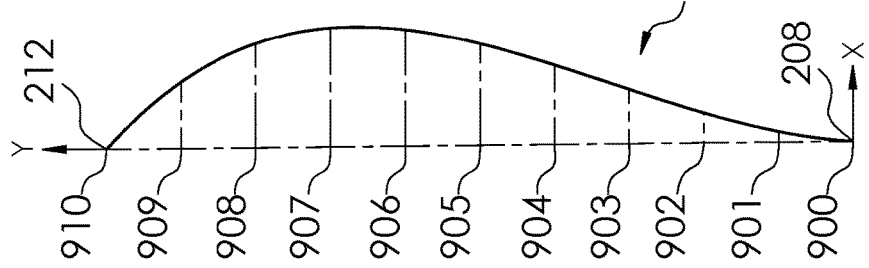
FIG. 21A

TURBINE BLADE WITH AUXILIARY DEFLECTOR

CROSS REFERENCE TO RELATED APPLICATION

This application claims the benefit under 35 U.S.C. § 119(e) of the filing date of U.S. provisional patent application Ser. No. 63/409,479 filed Sep. 23, 2022, the disclosure of which is incorporated herein by reference.

FIELD OF DISCLOSURE

This disclosure relates to improvements in performance in turbine blades for wind turbines and water turbines. In particular, this disclosure relates to turbine blade assemblies including one or more deflectors, which may be arranged as a single or multi-deflector assembly, either fixedly linked or operably (adjustably) coupled to an associated turbine blade and configured to increase the volume of fluid that passes over pressure and suction sides of the associated turbine blade and/or alter the fluid flow and resulting pressure distributions adjacent to the surfaces. An upstream, or pressure, surface of the deflector includes a concavity beginning at a trailing edge of the deflector and transitions to a convexity or straight section ending at a leading edge of the deflector. The deflector may be of a uniform thickness or variable thickness between its leading and trailing edges. Each deflector is arranged with its leading edge aft of the leading edge of the associated turbine blade relative to a direction of movement of the blade, and the trailing edge of at least a portion of the deflector may be positioned closer to the oncoming fluid flow (wind or water) than the trailing edge of the blade. One or more deflectors may be arranged on the pressure side, suction side, or both sides of each blade. One or more deflectors may span the entire length of the associated blade, or any portion thereof.

BACKGROUND

Wind and water turbine blade designs are relatively unchanged over the recent past, with only fractional performance improvements over the past several decades. Consequently, the industry has resorted to making turbine blades larger to increase output. This causes manufacturing, shipping and installation problems with wind turbine blades weighing upwards of 40 tons each, and, in many cases, the blades require months to transport from their place of manufacture to their installation site. Up to a year of logistical planning for the transport of a single 32-ton blade is not uncommon. Moreover, the logistical complexities of transporting such blades from the point of manufacture to installation may in some cases result in wind turbine projects becoming economically unviable. In addition, despite enormous research and design efforts, the turbine industry has made only fractional improvements in blade performance over decades. Consequently, manufacturers have resorted to designing and producing ever larger rotor diameters with taller towers, thus exacerbating transportation, assembly, and public resistance to industrial scale wind turbine installation. Water turbine blade design has also been hampered by the lack of substantive performance improvements, thus limiting the locations for economically viable projects that could otherwise be reliably powered via continuous water flow.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure are embodied in a rotor that may be part of a wind driven or water driven turbine and include a deflector that is located nearer the oncoming flow than the turbine blade to which it is attached, and which deflects additional fluid flow over such turbine blade.

According to other aspects, the deflector may be configured with wind turbines, water turbines, including without limitation, hydrokinetic axial flow turbines, of differing axial arrangements, including without limitation, horizontal axis, inclined axis and vertical axis.

According to other aspects, the deflector may be configured to span the entire length of an associated rotor blade, including the blade root.

According to other aspects, the deflector may be configured to affect the entire airfoil or hydrofoil portion of an associated wind or water rotor blade.

According to other aspects, the deflector may be configured to affect a portion of the airfoil or hydrofoil portion of a wind or water rotor blade.

According to other aspects, the deflector may be fixedly linked to a wind or water rotor blade.

According to other aspects, the deflector may be adjustably connected to a wind or water turbine blade whereby the deflector's angle of attack may be varied.

According to other aspects, the deflector may include leading edges, trailing edges, tip-end edges, and root-end edges, each of the edges having differing geometries or similar geometries.

According to other aspects, the shape of the deflector's perimeter around its leading edge, tip end, trailing edge, and hub end may be generally quadrilateral or trapezoidal.

According to other aspects, the deflector's thickness may be generally uniform.

According to other aspects, the deflector may have a varying thickness.

According to other aspects, the deflector may include an integral airfoil portion.

According to other aspects, the deflector may include an integral hydrofoil portion.

According to other aspects, the deflector may twist along its spanwise length.

According to other aspects, the deflector may have a trailing concavity, on the pressure surface, and may have a corresponding convexity on the suction surface, near its trailing edge.

According to other aspects, the geometry, such as the radius of curvature and/or arc-length, of the trailing concavity may vary from the tip-end of the deflector to the hub-end of the deflector.

According to other aspects, the deflector may have a leading convexity, on the pressure surface, and may have a corresponding concavity on the suction surface, near its leading edge.

According to other aspects, the deflector may have a leading convexity near its leading edge.

According to other aspects, the deflector may have a reflexed mean camber line.

According to other aspects, the geometry, such as the radius of curvature and/or arc-length, of the leading convexity may vary from the tip-end of the deflector to the hub-end of the deflector.

According to other aspects, the deflector leading edge may have a geometry that generally follows the trailing edge of the respective blade.

According to other aspects, the deflector may have a chord that lies external to a profile of the deflector.

According to other aspects, the deflector may have a curved tip-end.

According to other aspects, the deflector may be positioned in the wake of the associated blade.

According to other aspects, the deflector may be positioned with its leading edge aft of the leading edge of the associated blade.

According to other aspects, the deflector may be skewed whereby the tip-end of the deflector is nearer the respective blade and the hub-end of the deflector is further from the respective blade.

According to other aspects, more than one deflector may be positioned nearer the flow than the respective blade.

According to other aspects, a deflector may be positioned further from the flow than the respective blade.

According to other aspects, a deflector may have fluid walls projecting from its pressure or suction surfaces.

According to other aspects, a deflector may be comprised of multiple sections that when assembled mirror a deflector that is manufactured as a monolithic structure.

According to other aspects, a deflector may be connected by a multi-part connector.

According to other aspects, a deflector may have a fixed angle of attack.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIG. 2E is a profile view of a section of a typical wind turbine blade near the tip end showing beneficial areas on pressure and suction sides of the blade.

FIG. 2F is a profile view of a section of a typical wind turbine blade near the hub end showing the beneficial areas on the pressure and suction sides of the blade, with a magnified detail view of the trailing edge with a greater angle of attack that has created an additional beneficial area.

FIG. 9F is a side view of deflector and blade profiles, at the deflector tip end, that shows deflector angle of attack and position relative to the blade.

FIG. 9G is a side view of deflector and blade profiles, at twenty-five percent of the distance from the deflector tip end, that shows deflector angle of attack and position relative to the blade.

FIG. 9K is a rear view of an embodiment of a deflector/blade assembly with fixedly linked connector assemblies and related rotational paths of travel about a rotor axis of rotation.

FIG. 9L is a rear cropped magnified view of deflector/blade assembly and a single fixedly linked connector assembly with a magnified detail rear isometric view of connector assembly curved leading and trailing edges that work with rotational flow.

FIG. 9M is a side view of a fixed deflector connector assembly including a deflector-end flange, connector tube, blade end flange with a (i) cross-sectional detail view of connector tube leading and trailing edges with respect to rotational flow, and (ii) magnified top cross-sectional detail view of the connector tube leading and trailing edges with respect to the deflector/blade assembly in a static position.

FIG. 9N is a cropped hub-end side view of a deflector/blade assembly with a cross-sectional view which reveals an embodiment of a connector assembly fixedly linked within a deflector and blade.

FIG. 12C is a front view showing an upstream surface of a blade, without the benefit of a deflector, with pressure regions and associated fluid pressures shown in a 13 m/s wind, with a magnified detail profile view of the blade near the tip end.

FIG. 12D is a front view showing an upstream surface of the blade of a deflector/blade assembly including a deflector (but with the deflector not shown in the figure), with pressure regions and associated fluid pressures, shown in a 13 m/s wind.

FIG. 13C is a broken front view of a deflector/blade assembly, excluding any structure(s) connecting the deflector to the blade, and highlighting the skew in the chordwise gap between the deflector leading edge at the tip and hub ends relative to the blade trailing edge. To increase clarity of the chordwise gap, this figure is not drawn to scale.

FIG. 14A is a front view of a partial-span deflector and blade assembly with an embodiment of fixed connector assemblies for retrofitting the partial-span deflector to a blade.

FIG. 14B is a front cropped magnified view of a partial span deflector and blade assembly with an embodiment of fixed connector assemblies for retrofitting the partial-span deflector to a blade.

FIG. 15 is front isometric view of a non-uniform thickness deflector, excluding any structure(s) connecting the deflector to the blade, with magnified detail (i) cross-sectional side view of the tip and center sections, and (ii) side view of the hub end.

FIG. 16A is a front view of an embodiment of a deflector/blade assembly with a curved deflector tip end.

FIG. 16B is a front cropped magnified view of an embodiment of a deflector/blade assembly with a curved deflector tip end.

FIG. 20C is a cropped rear isometric view of a deflector/blade assembly with a variable angle connector assembly, with the deflector in the fully retracted position (with its trailing edge furthest from the oncoming fluid flow), with a broken-out sections revealing motorized components and deflector to connector assembly connection.

FIG. 20D is a cropped rear isometric view of the deflector/blade assembly with the variable angle connector assembly, with the deflector in the fully extended position (with its trailing edge furthest from the oncoming fluid flow), with a broken-out sections revealing motorized components and deflector to connector assembly connection.

FIG. 21A is the side profile schematic showing the 10 points along the deflector chord illustrating exemplary X and Y dimensions for an embodiment of the deflector.

FIG. 21B is a table of dimensions that corresponds to FIG. 21A.

FIG. 21C is a side view of the deflector with cut lines that correspond to FIG. 21B.

FIG. 21D is a table of deflector spanwise dimensions, measured from the deflector tip, that corresponds to tables in FIG. 21B and FIG. 21C.

DETAILED DESCRIPTION

Figures 1A, 1B:
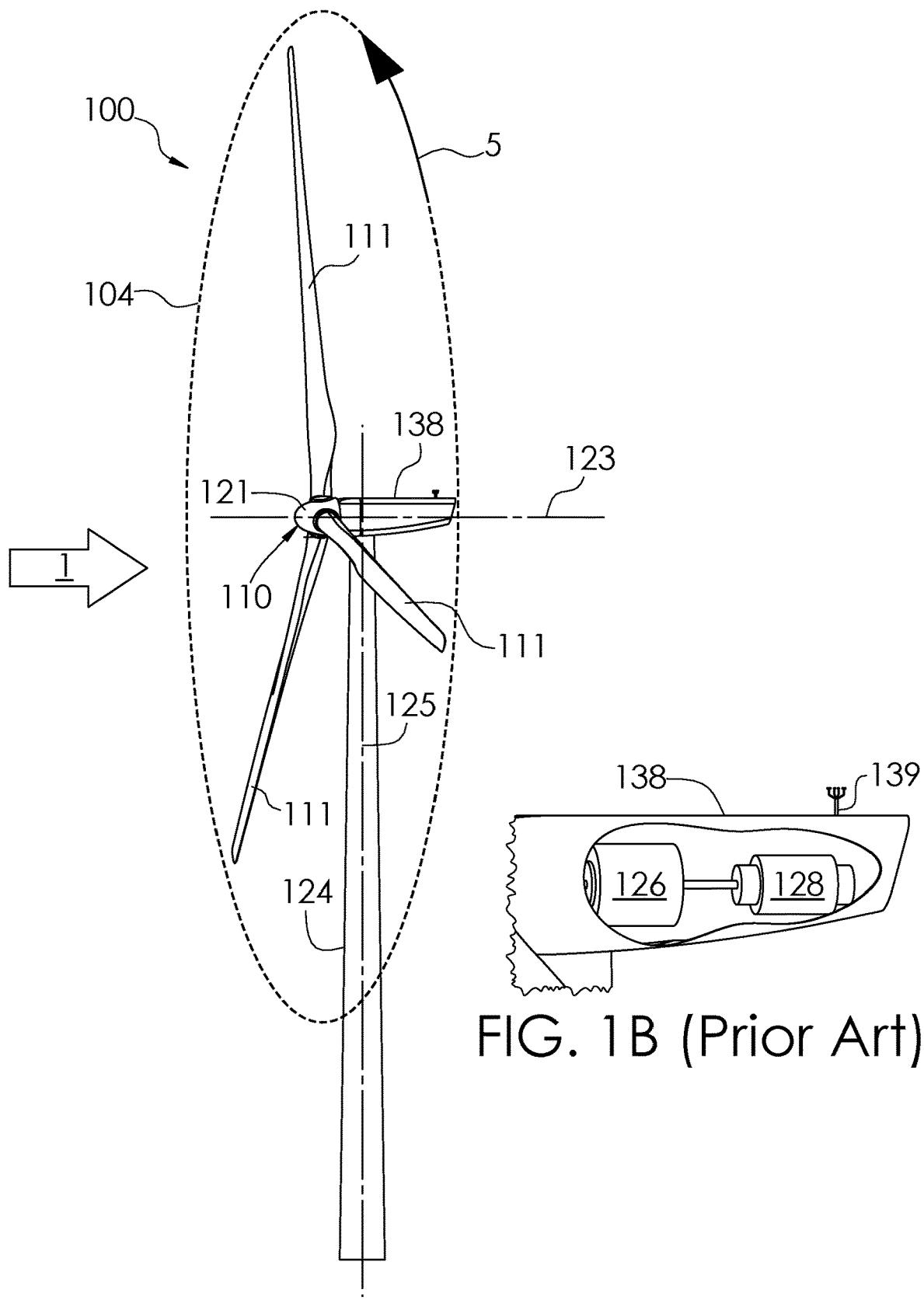
FIG. 1A is an isometric view of a three bladed wind turbine.
FIG. 1B is a cropped side isometric view of a wind turbine nacelle, with a broken-out section revealing a gearbox and a generator.

Unless defined otherwise, all terms of art, notations and other technical terms or terminology used herein have the same meaning as is commonly understood by one of ordinary skill in the art to which this disclosure belongs. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

References in the specification to "one embodiment," "an embodiment," a "further embodiment," "an exemplary embodiment," "some aspects," "a further aspect," "aspects," etc., indicate that the embodiment described may include a particular feature, structure, or characteristic, but every embodiment encompassed by this disclosure may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments, whether or not explicitly described.

Unless otherwise indicated or the context suggests otherwise, as used herein, "a" or "an" means "at least one" or "one or more."

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left, right, in front of, behind, beneath, next to, adjacent, between, horizontal, vertical, diagonal, longitudinal, transverse, radial, axial, clockwise, counter-clockwise, etc., are used for convenience in referring to such component, apparatus, location, feature, or a portion thereof or movement, force, or other dynamic action represented in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

Furthermore, unless otherwise stated, any specific dimensions mentioned in this description are merely representative of an exemplary implementation of a device embodying aspects of the disclosure and are not intended to be limiting.

To the extent used herein, the terms "first" and "second" preceding the name of an element (e.g., a component, apparatus, location, feature, or a portion thereof or a direction of movement, force, or other dynamic action) are used for identification purposes to distinguish between similar elements, and are not intended to necessarily imply order, nor are the terms "first" and "second" intended to preclude the inclusion of additional similar elements. Furthermore, use of the term "first" preceding the name of an element (e.g., a component, apparatus, location, feature, or a portion thereof or a direction of movement, force, or other dynamic action) does not necessarily imply or require that there be additional, e.g., "second," "third," etc., such element(s).

As used herein, the term "fixedly linked" as used to refer to a physical arrangement between two or more items means that one item is attached or connected to another item in a manner precluding relative movement between the first item and the second item.

As used herein, the term "operably coupled" as used to refer to a physical arrangement between two or more items means that one item is attached or otherwise coupled to another item via structure(s) and/or mechanism(s) that enable and/or effect relative movement between the first item and the second item so that the position and/or the orientation of the first item with respect to the second item may be selectively (including automatically) altered.

As used herein, the terms "optional" and "optionally" or the term "may" (e.g., as in the phrase "may include," "may comprise," "may produce," "may provide," or similar phrases) mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as stated as well as instances in which the event, circumstance, characteristic, or property occurs to a close approximation, such as accounting for typical tolerance levels or variability of the embodiments described herein.

As used herein, the term "airfoil section" means a portion of a blade having a shape that generates differential pressures between opposed surfaces (lift) due to relative movement of air with respect to the airfoil section.

As used herein, "apparent velocity" or "apparent flow" (or, alternatively, ("effective velocity" or "effective flow")) is the fluid flow, e.g., airflow, water flow, liquid-flow or gas flow, to which a rotor blade is exposed and is the vector sum of oncoming fluid flow and rotational flow induced by the rotation of a blade about a rotor axis of rotation.

As used herein, the term "bearing" refers to a component used to support and/or guide a rotating, oscillating, articulating or sliding shaft, pivot, wheel or assembly. Irrespective of the bearing described or shown, it may take on numerous forms, including, without limitation, sealed, unsealed, roller, ball, angular, needle, and thrust. However, unless otherwise specifically stated, when such term is used, the term indicates that the actual linkage or coupling take a variety of forms, which will be readily apparent to a person of ordinary skill.

As used herein, the terms "blade," "rotor blade," and "turbine blade" refer to any embodiment of a blade used on a fluid powered turbine, including without limitation, wind turbines and hydro turbines.

As used herein, the term "blade angle of attack" refers to the angle of the blade chord or blade chord line relative to a rotor plane of rotation at a given point along a blade span.

As used herein, the term "bushing" refers to a component used to serve as a guide for a rotating, sliding, articulating or otherwise moving component within it, and may take on numerous forms, includes without limitation, self-lubricating, metal-polymer composite, bronze wrapped, filament wound, and injection molded. However, unless otherwise specifically stated, when such term is used, the term indicates that the actual linkage or coupling take a variety of forms, which in certain instances will be readily apparent to a person of ordinary skill.

As used herein, the term "CAD model" refers to a virtual model of a part, or assemblage of parts, including without limitation, a rotor, blade, deflector or blade/deflector assembly, which was created using Computer-Aided Design (CAD).

As used herein, the term "chord line" refers to a line that passes through, the leading edge and trailing edge of a deflector or blade, is colinear to the chord and may extend beyond it. This term may be used as a reference position relative to a rotor plane of rotation at a given point along a blade or deflector span when describing a blade or deflector angle of attack.

As used herein, the term "chord" refers to the distance between the trailing edge and a point where the chord intersects the leading edge, sometimes shown as a line and/or used as a reference position relative to a rotor plane of rotation at a given point along a blade or deflector span. This term may be used when describing such distance in a deflector or a blade, or its angle of attack.

As used herein, the terms "computer," "computer-controlled," and like terms refer computing and control modules (e.g., system controller(s)), such as microprocessors, programmable logic controllers, embedded controllers, application specific integrated circuits (ASICS), and computers, configured to effect computational and/or control steps by receiving one or more input values, executing one or more algorithms stored on non-transitory machine-readable media (e.g., software) that provide instruction for manipulating or otherwise acting on or in response to the input values, and output one or more output values. Such outputs may be displayed or otherwise indicated to a user for providing information to the user, for example information as to the status of the instrument or of a process being performed thereby, or such outputs may comprise inputs to other processes and/or control algorithms and/or computers. Data input components comprise elements by which data is input for use by the control and computing hardware components. Such data inputs may comprise signals generated by computers, sensors or scanners, such as, position sensors, speed sensors, accelerometers, environmental (e.g., temperature and barometric pressure) sensors, motor encoders, barcode scanners, or RFID scanners, pressure sensors, as well as manual input elements, such as keyboards, stylus-based input devices, touch screens, microphones, switches, manually-operated scanners, etc. Data inputs may further include data retrieved from memory. Data output components may comprise hard drives or other storage media, data transmission components (e.g. LAN, WiFi), monitors, printers, indicator lights, or audible signal elements (e.g., chime, buzzer, horn, bell, etc.). A computer may include one or more uninterruptible power supplies.

As used herein, the term "connector assembly" refers to a structure that connects a deflector to a turbine blade.

As used herein, the term "concavity" refers to a portion of a surface that is concave when shown as part of a profile.

As used herein, the term "convexity" refers to a portion of a surface that is convex when shown as part of a profile.

As used herein, the term "deflector" means a structure configured so as to define a pressure surface and a suction surface when exposed to relative fluid flow and which is positioned and oriented with respect to an associated rotor or turbine blade so as to affect fluid flow impacting the associated blade irrespective of the orientation of the longitudinal axis (axis of rotation) of the rotor or rotor direction of rotation.

As used herein, the term "deflector angle of attack" refers to the angle of the deflector chord or deflector chord line relative to a rotor plane of rotation at a given point along a deflector span.

As used herein, the term "deflector/blade assembly" or "turbine blade assembly" refers to any assemblage of a rotor or turbine blade and one or more deflectors including all embodiments as described herein.

As used herein, the term "edge" means any intersection of the pressure and suction sides of a deflector that meet, and include, but are not limited to, arcs, decreasing and increasing radii, and decreasing and increasing curvatures.

As used herein, the term "flexible shaft" refers to a component configured to transmit a force or rotary motion through a path that is not straight, that is capable of withstanding axial compressive or tensile loads lengthwise and is flexibly compliant transversely across its cross-section. Unless otherwise specifically stated, when such a term is used, the term indicates that the device may take a variety of forms. Construction may include a core consisting of wire, strands or fibers wound in layers in opposing directions around a center wire or wire-like structure, and a casing comprised of one or more layers of similar of dissimilar materials including metal, composites, cloth, plastics, and rubber. Layers may include reinforcing braids. Some flexible shafts may have all of these components while others may have one or more. In certain instances, a suitable construction will be readily apparent to a person of ordinary skill.

As used herein, the term "flow simulation" means computational fluid dynamic (CFD) simulation, also referred to herein as "flow analysis."

As used herein, the term "flow straightener" with respect to fluid flow refers to a device that reduces swirl and non-symmetry in a fluid flow.

As used herein, the term "global torque" refers to the combination of positive and/or negative torque from all deflector and blade surfaces within a deflector/blade assembly on the turbine of which the deflector/blade assembly is a part and is always a positive number in the desired direction of rotation about the hub axis.

As used herein, the term "hub end" refers to the portion of a blade and/or deflector nearest the hub of an associated rotor as defined herein.

As used herein, the term "hydrofoil section" means a portion of a blade having a shape that generates differential pressures between opposed surfaces (lift) due to relative movement of water or other liquid with respect to the hydrofoil section.

As used herein, the term "hydro turbine" refers to a system that is intended to convert kinetic fluid energy from a moving liquid, or liquid mixture, including without limitation, water, to mechanical energy, also referred to as a "water turbine."

As used herein, the term "motor" refers to a machine that converts electricity, or pressure, including without limitation hydraulic and pneumatic, into mechanical energy, e.g. rotational energy.

As used herein, the term "negative torque" refers to a torque component acting on deflector and/or blade surfaces in the opposite direction of the desired rotation about the rotor axis of rotation.

As used herein, the term "positive torque" refers to a torque component acting on deflector and/or blade surfaces in the direction of the desired rotation about the rotor axis of rotation.

As used herein, the term "profile" when referring to a blade or deflector refers to a chordwise slice of a blade or deflector (i.e., from leading edge to trailing edge) showing a shape of the blade or deflector between opposed upstream (pressure) and downstream (suction) surfaces.

As used herein, the term "pressure side" means the surfaces, or area adjacent to the surfaces, of a deflector or blade that is nearer to the oncoming fluid flow, also referred to as the "upstream," "windward" or "upwind" side.

As used herein, the term "pressure" with respect to fluid pressure is relative to atmospheric pressure. It is expressed as a positive number when greater than atmospheric pressure and expressed as a negative number when less than atmospheric pressure. Positive pressure values are commonly referred to as pressure, or positive pressure, and negative pressure values are commonly referred to as suction.

As used herein, the term "pressure surface" means the surfaces of a deflector or blade that is nearer to the oncoming fluid flow also referred to as the "upstream," "windward" or "upwind" side.

As used herein, the term "reflexed camber line" or "reflexed mean camber line" refers to a mean camber line that has a reverse in curvature from its first direction which results in it curving upward toward the chord at the deflector trailing edge. A center of curvature of the reflexed mean camber line is located on a downstream, or suction, side of the deflector or blade for one part of the mean camber line and is located on an upstream (or pressure) side of the deflector or blade for another part of the mean camber line.

As used herein, the term "right angle drive" means a mechanism with a gear train that can transmit an input torque and rotary motion transversely (e.g., 90 degrees). A right angle drive may be configured with (i) an input shaft that when powered rotates an output shaft at a 90° angle, and (ii) an optional additional output shaft that is colinear with the input shaft and rotated and powered by it (commonly known as a three-way right angle drive or three-way right angle gearbox).

As used herein, the term "rotational flow" means fluid flow induced by the rotation of a blade about a rotor axis of rotation and which is a component of apparent velocity.

As used herein, the term "rotor" means an assemblage of wind or hydro blades.

As used herein, the term "rotor blade" is synonymous with the term "turbine blade" and means a wind or hydro turbine blade that is part of a rotor.

As used herein, the term "seal" refers to a device or substance used to serve as a fluid barrier preventing the exchange of fluids in static, low/high pressure, or vacuum environments. Irrespective of how it is shown, its applications can take many forms including, without limitation, media/environmental physical seals, coatings to prevent exchange of media or fluids through porous surface, gaskets, o-rings, packings, shaft seals, coatings, and adhesives. However, unless otherwise specifically stated, when such terms are used, the terms indicate that the actual seal may take a variety of forms, which in certain instances will be readily apparent to a person of ordinary skill.

As used herein, the term "swept volume" means the three-dimensional space through which deflector or blades travel about the rotor axis of rotation.

As used herein, the term "suction" with respect to fluid pressure is relative to atmospheric pressure and is expressed as a negative number. It is also commonly known as a negative pressure.

As used herein, the term "suction side" means the surfaces, or area near the surfaces, of a deflector or blade that are opposite or generally opposite from the pressure side surfaces and further from the oncoming flow, also known as the "downwind" or "downstream" side.

As used herein, the term "suction surface" means the surfaces of a deflector or blade that are opposite or generally opposite from the pressure side surfaces and further from the oncoming flow, also known as the "downstream" or "downwind" side.

As used herein, the term "tip end" refers to the portion of a blade and/or deflector nearest its respective tip end.

As used herein, the term "VAC assembly" refers to a variable angle connector assembly that connects a deflector to a turbine blade and enables changing of an orientation of the deflector with respect to the turbine blade.

As used herein, the term "wind turbine" refers to a system that is intended to convert kinetic fluid energy from a moving gas or gaseous mixture, including, without limitation, air, to mechanical energy.

As used herein, the term "working section" refers to a portion of a blade having a shape that generates differential pressures between opposed surfaces (lift) due to relative movement of fluid, e.g. air, water, or other liquid or gas. The working section may be referred to as the airfoil section on a wind turbine blade and may be referred to as a hydrofoil section on a hydro turbine blade.

All possible combinations of elements and components described in the specification or recited in the claims are contemplated and considered to be part of this disclosure. It should be appreciated that all combinations of the concepts discussed in greater detail below (provided such concepts are not mutually inconsistent) are contemplated as being part of the subject matter disclosed herein.

The preferred embodiments will now be described with reference to the accompanying figures, wherein like numerals, including those followed by letter or hyphen and letter e.g. "-A" refer to like elements throughout. The terminology used in the descriptions below, including without limitation, the words "upper" and "lower," are not to be interpreted in any limited or restrictive manner simply because it is used in conjunction with detailed descriptions of certain specific embodiments. Furthermore, many components described herein and shown within the drawings, and which are drawn as solid components, are done so for ease of understanding the drawings. Notwithstanding the crosshatch of such components, all such components may be manufactured using conventional (i) assembly techniques whereby a single component may be split into multiple parts and, when reassembled, embody the characteristics of the component described herein and/or shown in the drawings, and (ii) weight saving methods, including without limitation, designing all such components, in multiple sub-assemblies, which can be assembled with conventional assembly techniques, into the particular component as shown. All components, at the designer's choice, may also have an interior lattice-like, or other non-solid interior design with strengthened and/or thickened areas where required, for example at areas in contact with bearings or supports, and an external skin whereby such components may appear to be solid when in fact they need not be to achieve their desired functionality.

Provided herein and shown on accompanying figures are configurations of deflectors capable of being fixedly linked and/or operably coupled to one or more wind or hydro turbine blades.

Embodiments disclosed herein permit multiple configurations of size and shape of deflectors, including without limitation, (i) differing aspect ratios (ratio of chordwise width to spanwise length) of deflectors, and (ii) positions relative to the pressure side and suction side of the respective blade to which the deflector(s) is fixedly linked or operably coupled. Moreover, the descriptions and drawings are not intended to be limiting with respect to a deflector's physical shape, size, installation location or fluid type in which the deflector is operating.

1. Prior Art—Wind Turbine FIG. 1A-FIG. 2D

Referring now to FIG. 1A, a fluid flow turbine 100 is exemplary of an embodiment disclosed herein. Fluid flow turbine 100 may comprise a horizontal axis wind turbine ("HAWT"). Fluid flow turbine 100 includes a rotor 110 comprising a plurality of rotor blades 111 (e.g., three) mounted to and extending radially from a hub 121 defining the rotor axis or rotor axis of rotation 123 (also referred to herein as the hub axis or hub axis of rotation) about which the rotor 110 rotates in direction 5 (counterclockwise in the illustrated embodiment). In an alternative embodiment, rotor 110 includes more or less than three rotor blades 111 and/or rotates clockwise.

Referring now to FIG. 1B while still referring to FIG. 1A, a typical fluid flow turbine 100 may include rotor-driven components, such as a gearbox 126 and generator 128 located within a nacelle 138, operatively coupled with or defining the axis of rotation 123 of the rotor 110, which converts the kinetic energy of oncoming fluid flow (wind stream) 1 via the rotor blades 111 into a rotational energy harnessed within the gearbox 126. The gearbox 126 is rotated by the rotor 110 and may be coupled to a device that converts the rotational energy such, as electrical generator 128 or a fluid pump (not shown). It should be noted that some wind turbines may use a direct-drive generator coupled directly to the rotor 110 and eliminates the need for a gearbox 126.

Turbine 100, i.e., rotor 110 and nacelle 138, may be mounted atop a tower 124 defining a tower axis 125. A wind speed and wind direction sensor 139 may be mounted on the nacelle 138 and connected to a computer (not shown) for monitoring wind turbine operation, e.g., orienting the rotor 110 perpendicular to the oncoming fluid flow 1, and pitching the rotor blades 111.

Figure 2A:
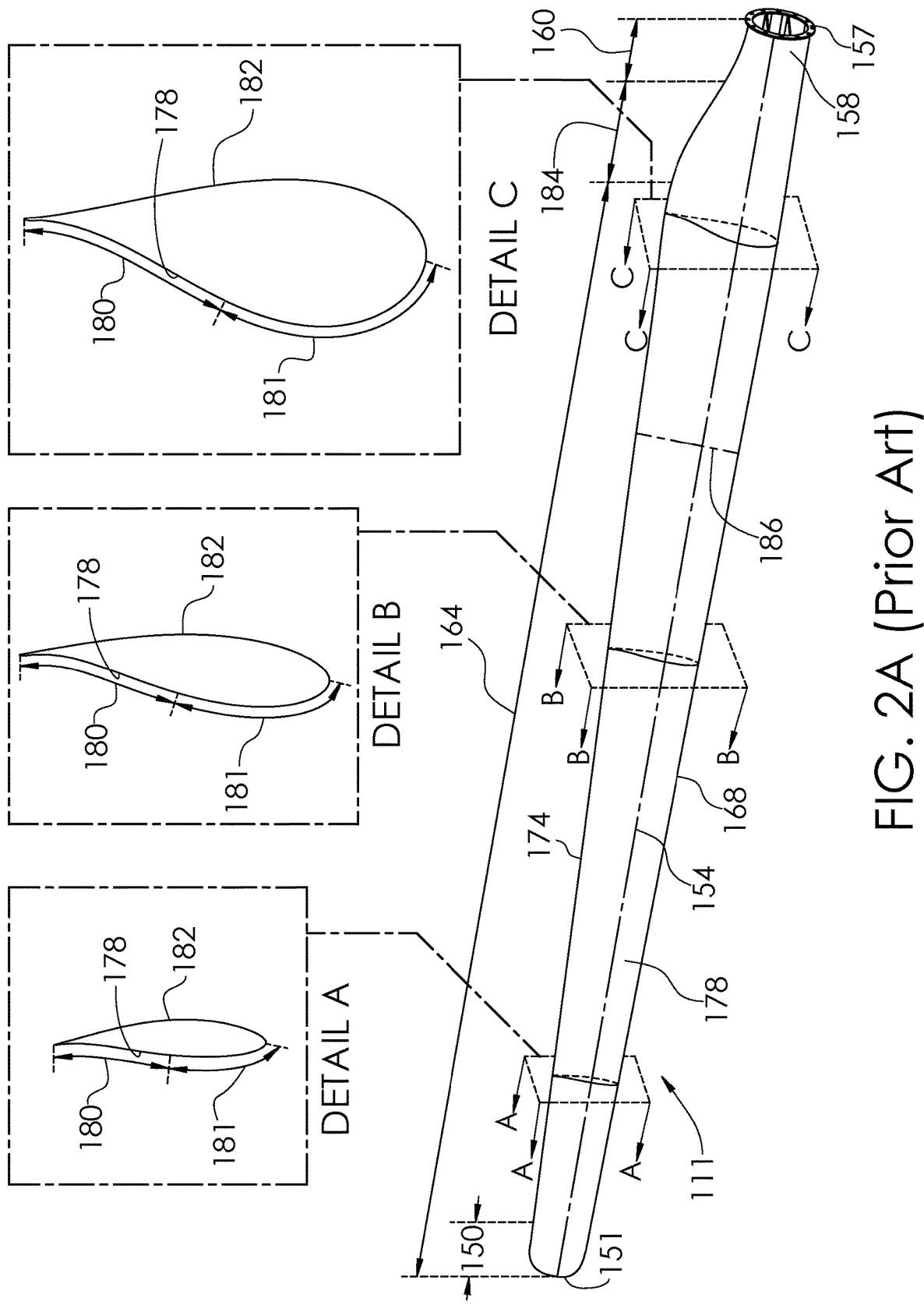
FIG. 2A is a front isometric view of a wind turbine blade with detail views of the blade profile near the tip, center, and hub end of the blade.
Figure 2B:
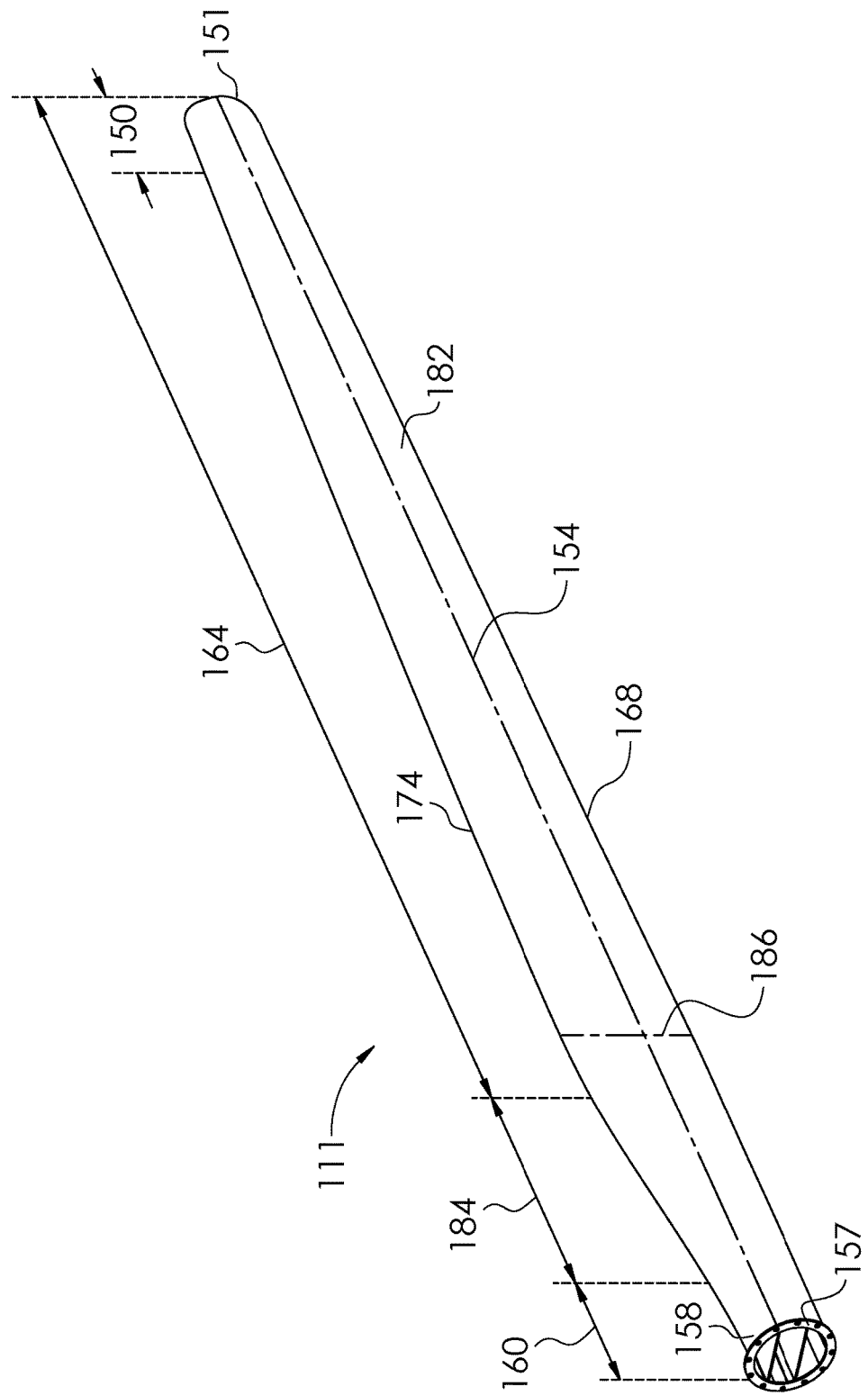
FIG. 2B is a rear isometric view of a wind turbine blade.

Referring now to FIG. 2A and FIG. 2B, each rotor blade 111 includes a blade root 158 at an inboard end with respect to the hub 121 (see FIG. 1A), and may include connecting structure 157 (e.g., an annular mounting flange) for securing the rotor blade 111 with respect to the hub 121, and a blade tip 151 at a radially outboard end of the rotor blade 111 with respect to the hub 121 and defining a span 154 from the blade root 158 to the blade tip 151. Rotor blade 111 may include, progressing from the blade root end 158, a root section 160 that may be generally circular, elliptical, oval, or egg-shaped in cross-sectional profile at the far root end 158 of the blade and an airfoil section 164 having a leading edge 168 and a trailing edge 174, which is the working section of the rotor blade 111 and which defines an airfoil profile between the leading edge 168 and blade trailing edge 174 that forms a pressure surface (or upstream surface) 178 generally facing the oncoming fluid flow 1 (see FIG. 1A) and a suction surface (or downstream surface) 182 (see FIG. 2B).

Each rotor blade 111 also includes a tip section 150 that overlaps a portion of the airfoil section 164 and a leading edge 168 and blade trailing edge 174 which defines the boundaries of the pressure surface 178 and the suction surface 182. Referring to Details A, B, and C of FIG. 2A, pressure surface 178 may include a leading convexity 181 and a trailing concavity 180. Blade 111 may include a transition section 184 at which the cross-sectional shape of the rotor blade 111 transitions from the circular, elliptical, or other shape of the blade root 158 and root section 160 to the shape of the airfoil section 164. In an alternate environment, a transition section is omitted and the blade 111 includes an abrupt, generally instantaneous transition between the profile of the root section 160 and the profile of the airfoil section 164.

Airfoil section 164 is defined by a chord 186 between the blade leading edge 168 and the blade trailing edge 174. Chord 186 may be variable along the span 154 of the blade 111 (e.g., with the chord decreasing with increasing span distance from the blade root 158, as shown), or the chord 186 maybe constant along some or all of the span 154 within the airfoil section 164.

Figure 2C:
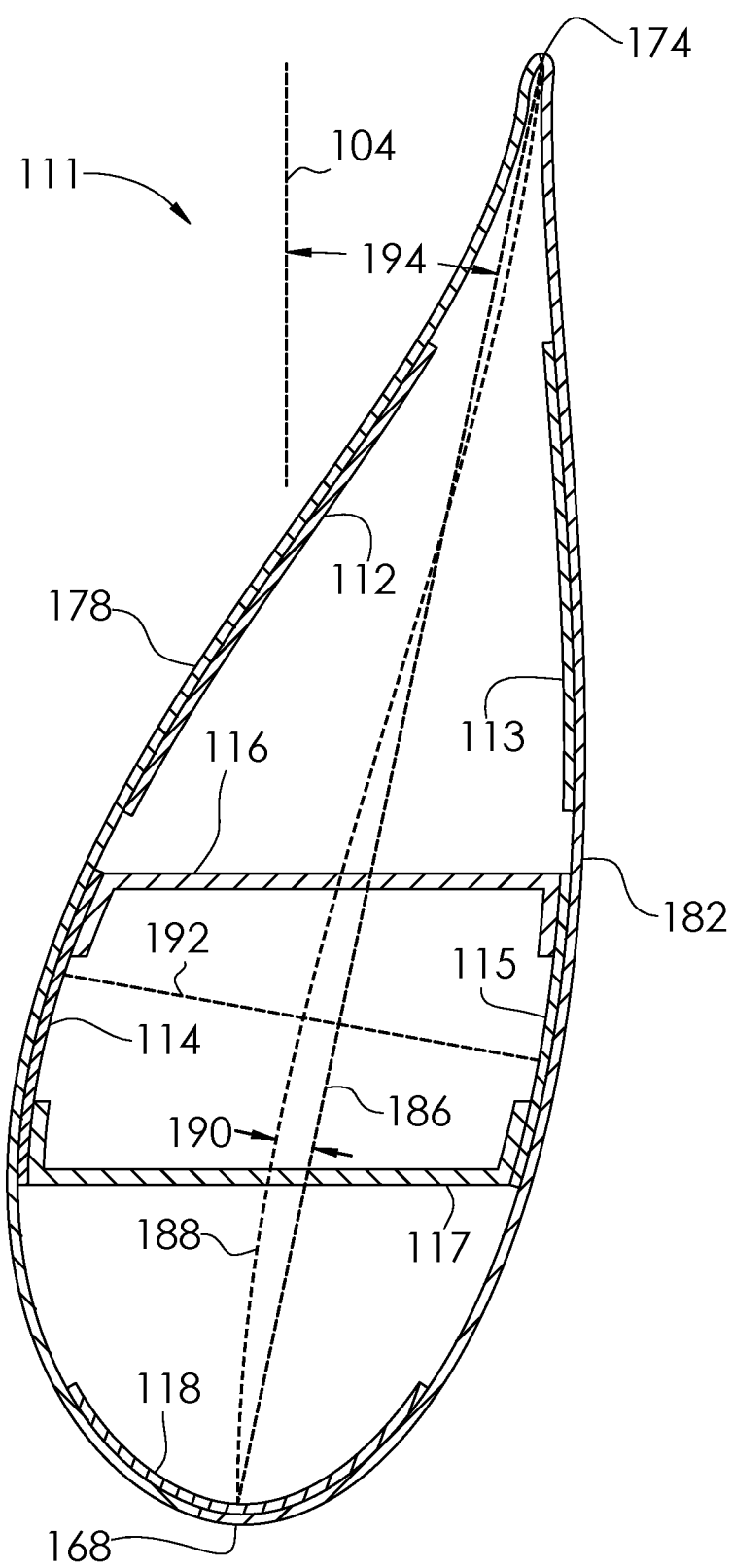
FIG. 2C is a cross-sectional view of a typical wind turbine blade, near the hub end, revealing internal components.

Referring now to FIG. 2C while still referring to FIG. 2A, the airfoil section 164 may have an aerodynamic profile defined by the pressure surface 178 and the suction surface 182 defining a mean camber line 188 having a maximum camber 190 and a maximum thickness 192. The maximum thickness 192, the maximum camber 190, and the mean camber line 188 may vary with spanwise distance from the hub 121 (see FIG. 1A and DETAILS A, B, C of FIG. 2A). Chord 186 may be arranged at a blade chord angle (or angle of attack) 194 relative to the plane of rotation 104 of the rotor 110 (see FIG. 1A), and the blade chord angle 194 may also vary with spanwise distance from the hub 121.

Referring now to FIG. 2C, the blade 111 may have internal support structures including, (i) on the pressure side 178 a spar 114 and reinforcement 112, (ii) on the suction side 182 a spar 115 and reinforcement 113, and (iii) at and near the leading edge 168 reinforcement 118 (collectively "blade reinforcements").

Blade 111 may also have a u-shaped shear web 116 near the center of the blade 111 and u-shaped shear web 117 near the blade leading edge 168 (collectively "shear webs"). The reinforcements and shear webs provide additional structural support to blade 111.

1.1 Apparent Velocity

Figure 2D:
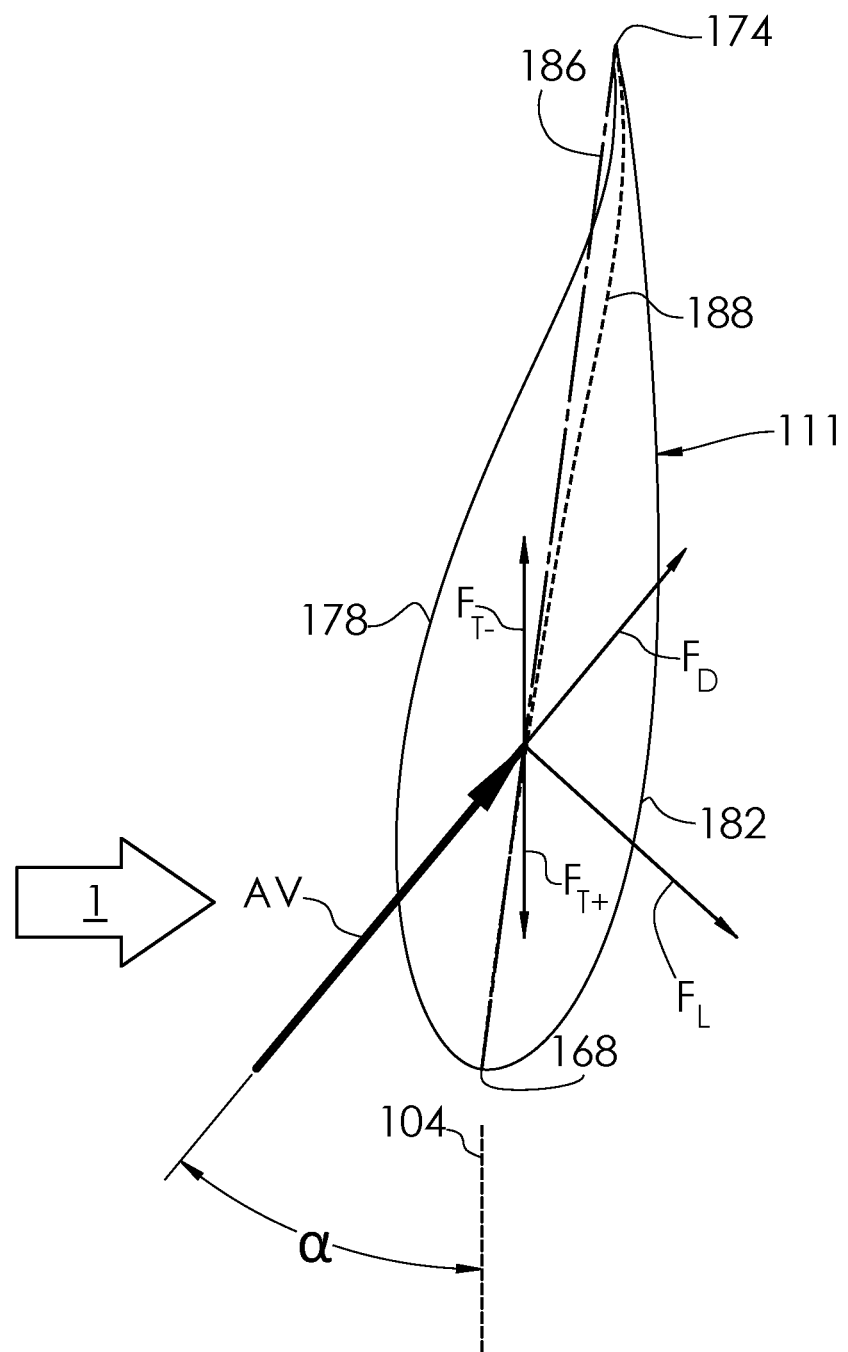
FIG. 2D is a schematic profile view of a typical wind turbine blade showing relative air flows and lift and drag forces on the blade.

Referring to FIG. 2D, when rotor 110 is static, i.e., not rotating, each rotor blade 111 is only exposed to oncoming fluid flow 1 impinging on the pressure surface 178 of blade 111. When the flow passes by the blade trailing edge 174, and blade leading edge 168, the passage of such flow causes a pressure drop on the suction side 182. The passing flow moving in a downwind direction generates recirculation and a vacuum in the area adjacent to the suction side 182 (i.e., pressure that is relatively lower than pressure on the pressure side 178). If the suction on the suction surface 182 is lower between the leading edge 168 and the thickest part of the blade, than it is between the thickest part of the blade 111 and the blade trailing edge 174, positive rotor torque occurs.

As the rotor 110 rotates, each rotor blade 111 is exposed to flow due to movement of the rotor blade 111 in rotational direction 5 (see FIG. 1A) within the rotor plane 104, as well as the oncoming fluid flow 1. The resultant of the flow due to rotational direction 5 and the oncoming fluid flow 1 is the apparent velocity ("AV"), or apparent fluid flow. A portion of the apparent velocity AV flows over the pressure side 178 of the blade 111, and a portion of the apparent velocity AV flows over the suction side 182 of the blade 111. Due to the differential curvatures of the pressure side 178 and suction side 182 and/or the angle of attack of the blade 111 (i.e., the angle between apparent velocity AV and the rotor plane 104), fluid flows more quickly over the suction side 182 than over the pressure side 178, thereby creating a pressure differential between the suction side 182 and pressure side 178 resulting in a lift force $F_L$ acting generally perpendicular to the direction of the apparent velocity AV. In addition, flow over the blade 111 generates a drag force $F_D$ acting in a direction parallel to the apparent velocity AV. A component of the lift force $F_L$ produces a positive torque $F_{T+}$ acting on the blade 111 and a component of the drag force $F_D$ results in a negative torque $F_{T-}$ acting on the blade 111. An $F_{T+}$ that is greater than $F_{T-}$ causes the rotor to rotate.

1.2 Beneficial Area FIG. 2E-FIG. 2F

Referring now to FIGS. 2E and 2F, blade 111 has areas on its pressure surface 178 and suction surface 182, whereby, depending on the curvature of the respective surface, both pressure and suction can result in positive or negative torque acting on the blade 111. This Subsection describes the blade 111 geometry and its related angle of attack that causes a positive pressure or negative pressure (suction) to result in positive torque. These areas are defined herein as "beneficial areas."

A beneficial area, under theoretically ideal conditions ("ideal conditions"), and depending on the blade geometry and angle of attack as described below, can have a positive or negative pressure that contributes positive torque to blade 111.

The pressure surface 178 includes an area 10 that, under ideal conditions, would have (i) positive pressure located between transition point 9 (which, in the illustration, corresponds to blade trailing edge 174) and transition point 11, and (ii) negative pressure (suction) in area 12, located between transition point 11 and transition point 13 (which, in the illustration, corresponds to leading edge 168).

The suction surface 182 includes an area that, under ideal conditions, would have a (i) negative pressure (suction) in area 14, located between transition point 13 and transition point 15, and (ii) positive pressure in area 16 between transition point 15 and transition point 17 (which, in the illustration, corresponds to blade trailing edge 174).

Figure 2G:
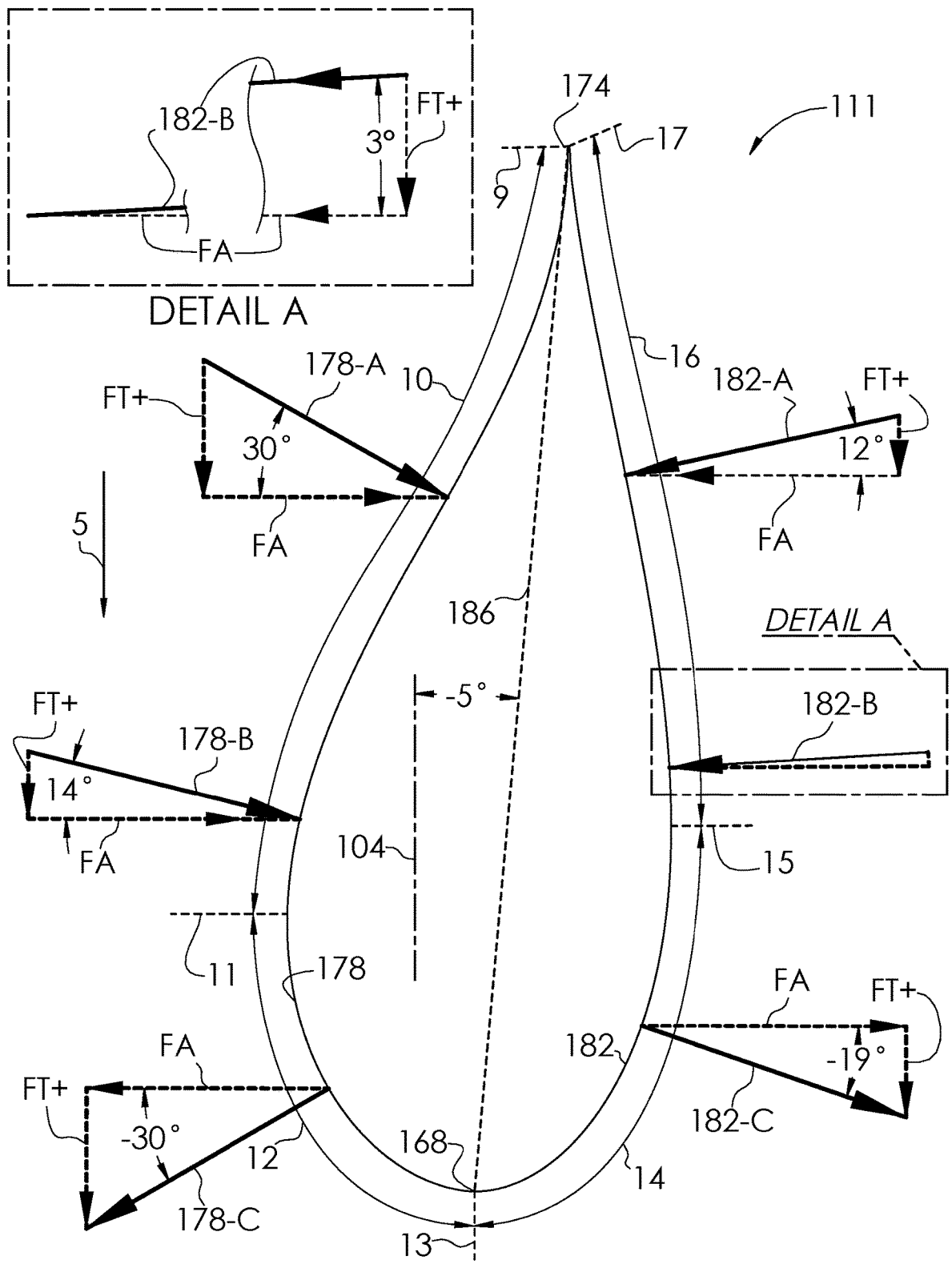
FIG. 2G is a schematic profile view of a section of a typical wind turbine blade showing the slope angles and types of forces on the beneficial areas on the pressure and suction sides of the blade, with a magnified detail view of a suction side slope angle.

1.3 Beneficial Areas-how they Work FIG. 2G

Referring now to FIG. 2G while still referring to FIGS. 2E and 2F, any pressure or suction on the blade 111 can be described as a series of forces acting normal (locally perpendicular) to the blade pressure surface 178 or suction surface 182. Any force applied to blade 111 can be broken into an axial component (i.e., in a direction that is parallel to the rotor axis of rotation 123 (see FIG. 1A)) and a tangential component (i.e., in a direction that is perpendicular to the rotor axis of rotation 123). Axial forces do not directly affect rotation of blade 111. Tangential components of forces in the intended direction of rotation 5 increase positive torque, and thus are beneficial. Tangential components of forces opposite the direction of rotation 5 result in negative torque, and thus are detrimental.

The greater the slope of the blade pressure surface 178 relative to the rotor plane of rotation 104, e.g. 178-A, 178-B, and 178-C, and the greater the slope of the blade suction surface 182 relative to the rotor plane of rotation 104, e.g., 182-A, 182-B, and 182-C, the greater the tangential component of the force becomes, since the force is applied normal to the surface.

For example, since the angle of slope 178-A is 30 degrees, and greater than slope 178-B (14 degrees), the same pressure at both slopes will create a greater force in the direction of rotation at slope 178-A than at slope 178-B. If the tangential component is in the direction of rotation 5, then such force is beneficial. Area 10 produces a beneficial torque when the collection of forces that result from the pressure all have tangential force components that are in the direction of rotation 5.

The greatest beneficial forces are experienced where normal forces create a greater slope angle with the rotor axis of rotation 123 (see FIG. 1A), e.g. 178-A, 178-C and 182-C because the tangential component of the forces in direction 5 is greater than elsewhere in the examples shown. The theoretically ideal pressure and suction locations are as follows:

| Pressure Surface—Beneficial Area 10 | Suction Surface—Beneficial Area 16 |
|---|---|
| Greater positive slope and pressure = Greater positive torque | Greater positive slope and pressure = Greater positive torque |
| Pressure Surface—Beneficial Area 12 | Suction Surface—Beneficial Area 14 |
| Greater negative slope, and suction = Greater positive torque | Greater negative slope, and suction = Greater positive torque |

1.4 Angle of Attack Effect Upon Beneficial Areas—FIG. 2F and FIG. 2F Detail A

Referring now to FIG. 2F, as the blade 111 angle of attack changes, beneficial areas can move along the blade chord 186. For example, with a −5-degree angle of attack as shown, blade 111 has beneficial area 12, where ideally suction would occur, and area 10 where ideally pressure would occur. However, as blade trailing edge 174 is pitched toward oncoming flow 1, for example at a 12-degree angle of attack, (i) transition point 9 moves toward oncoming flow 1, and downward toward leading edge 168 thus reducing the area of beneficial area 10, and (ii) a third beneficial pressure surface area 10-A, located between transition point 9 and transition point 9-A is created (see FIG. 2F Detail A). Ideally, area 10-A would be most benefited by suction and practically benefited by a decreased pressure to contribute positive torque in the desired direction of rotation 5 of the blade 111.

2. Prior Art—Hydro Turbine FIG. 3

Figure 3:
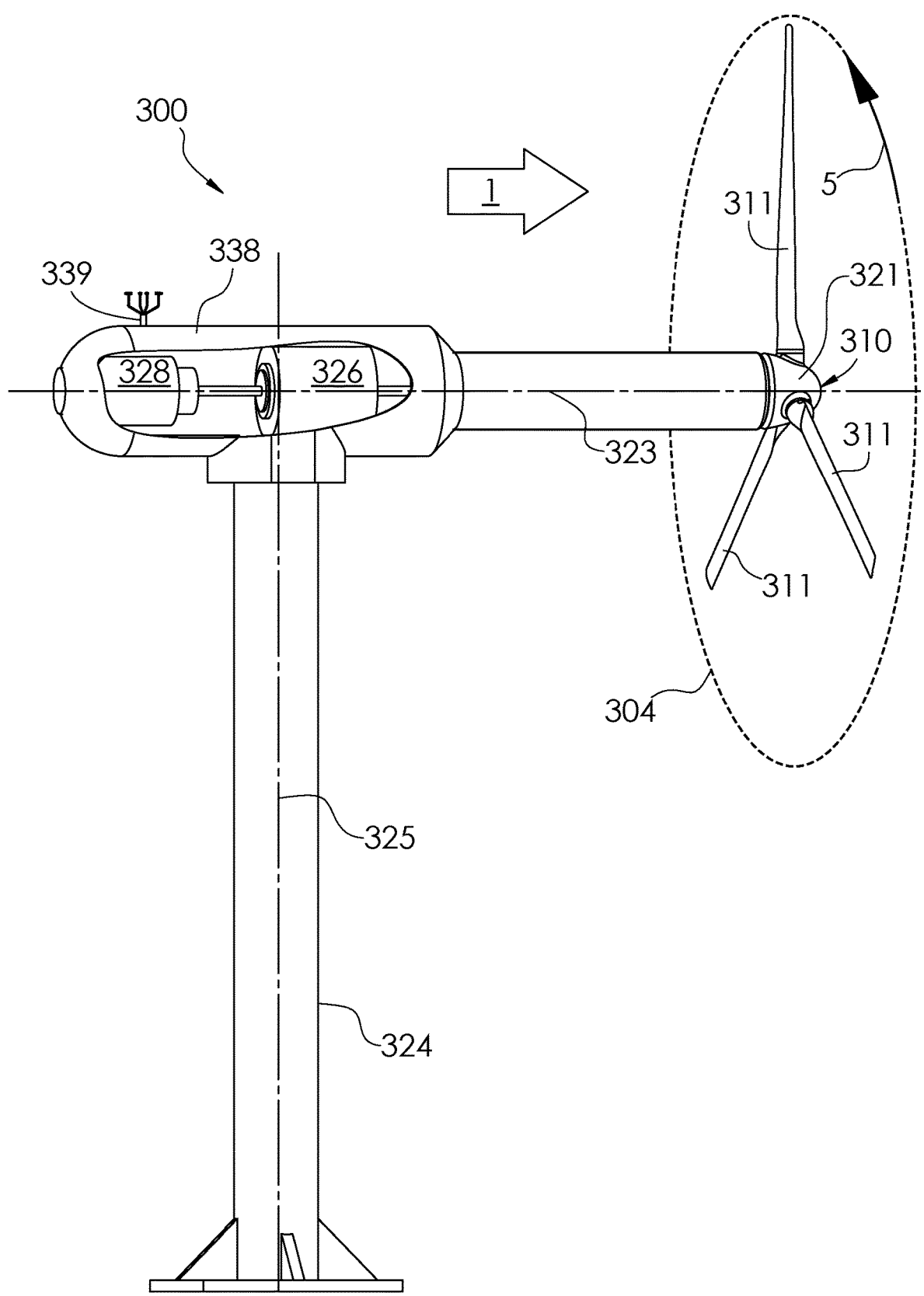
FIG. 3 is an isometric view of three bladed water turbine with a broken-out section of the nacelle revealing a gearbox and generator assembly.

Referring now to FIG. 3, a fluid flow hydro turbine 300 is exemplary of an embodiment disclosed herein. Fluid flow turbine 300 may comprise a horizontal axis water turbine. Fluid flow turbine 300 includes a rotor 310 comprising a plurality (e.g., three) of rotor blades 311 mounted to and extending radially from a hub 321 defining a rotor axis 323 about which the rotor 310 rotates in direction 5 (counterclockwise in the illustrated embodiment). In an alternative embodiment, rotor 310 includes more or less than three rotor blades 311 and/or rotates clockwise.

Fluid flow turbine 300 may include rotor-driven components, such as a gearbox 326 and generator 328 located within a nacelle 338, operatively coupled with or defining rotor axis 323 of the rotor 310, which converts the kinetic energy of oncoming fluid flow (water stream) 1 via the rotor blades 311 into a rotational energy harnessed within the gearbox 326. The gearbox 326 is rotated by the rotor 310 and may be coupled to a device that converts the rotational energy such, as electrical generator 328 or a fluid pump (not shown). It should be noted that some fluid flow turbines may use a direct-drive generator coupled directly to the rotor 310 and eliminates the need for a gearbox 326.

Turbine 300, i.e., rotor 310 and nacelle 338, may be mounted to a tower 324 defining a tower axis 325. A fluid speed and fluid direction sensor 339 may be mounted on the nacelle 338 and connected to a computer (not shown) for monitoring hydro turbine operation, e.g., orienting the rotor 310 perpendicular to the oncoming fluid flow 1, and pitching the rotor blades 311.

Figure 4A:
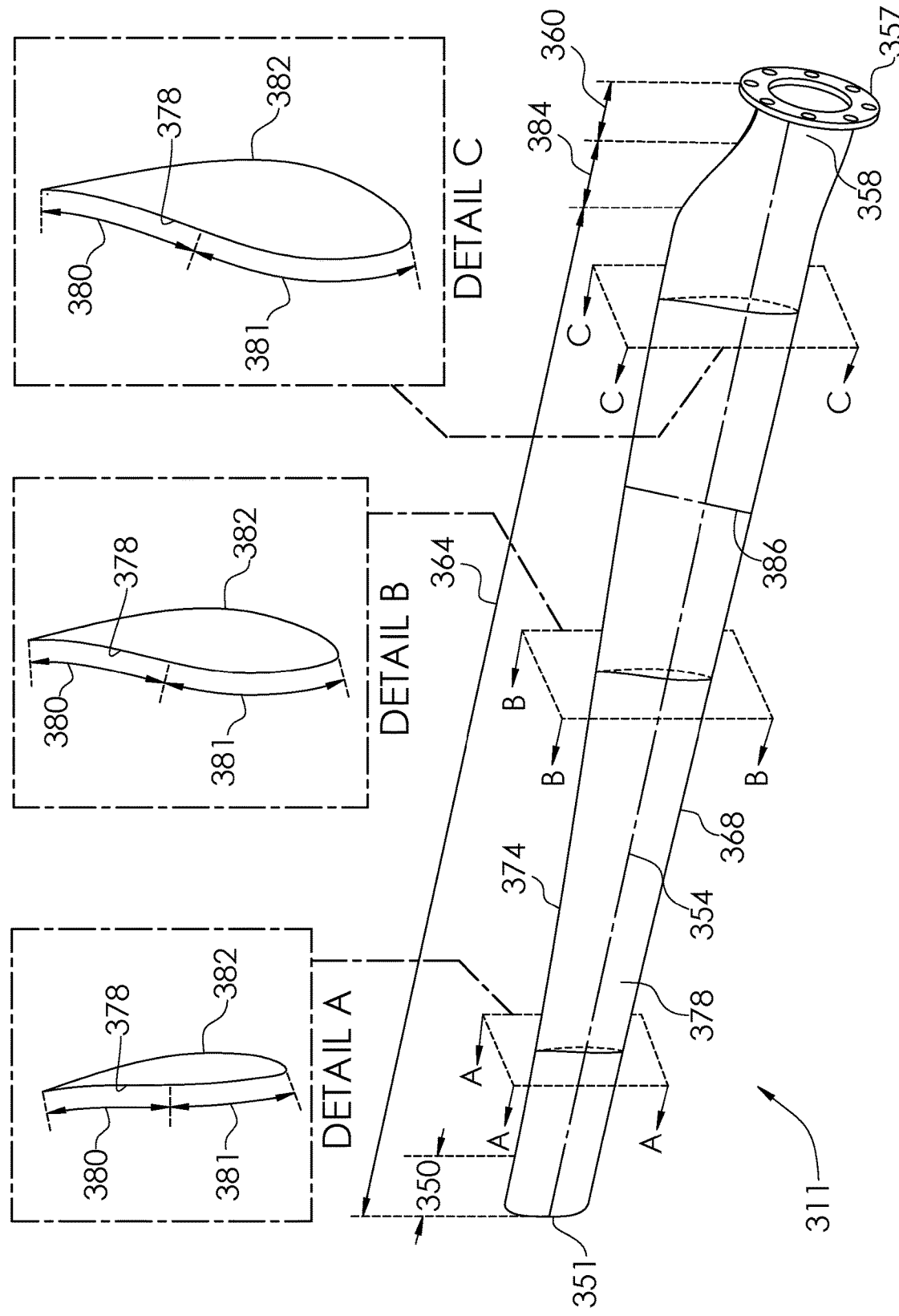
FIG. 4A is a front isometric view of a typical water turbine blade with detail views of the blade profile near the tip, center, and hub end of the blade.
Figure 4B:
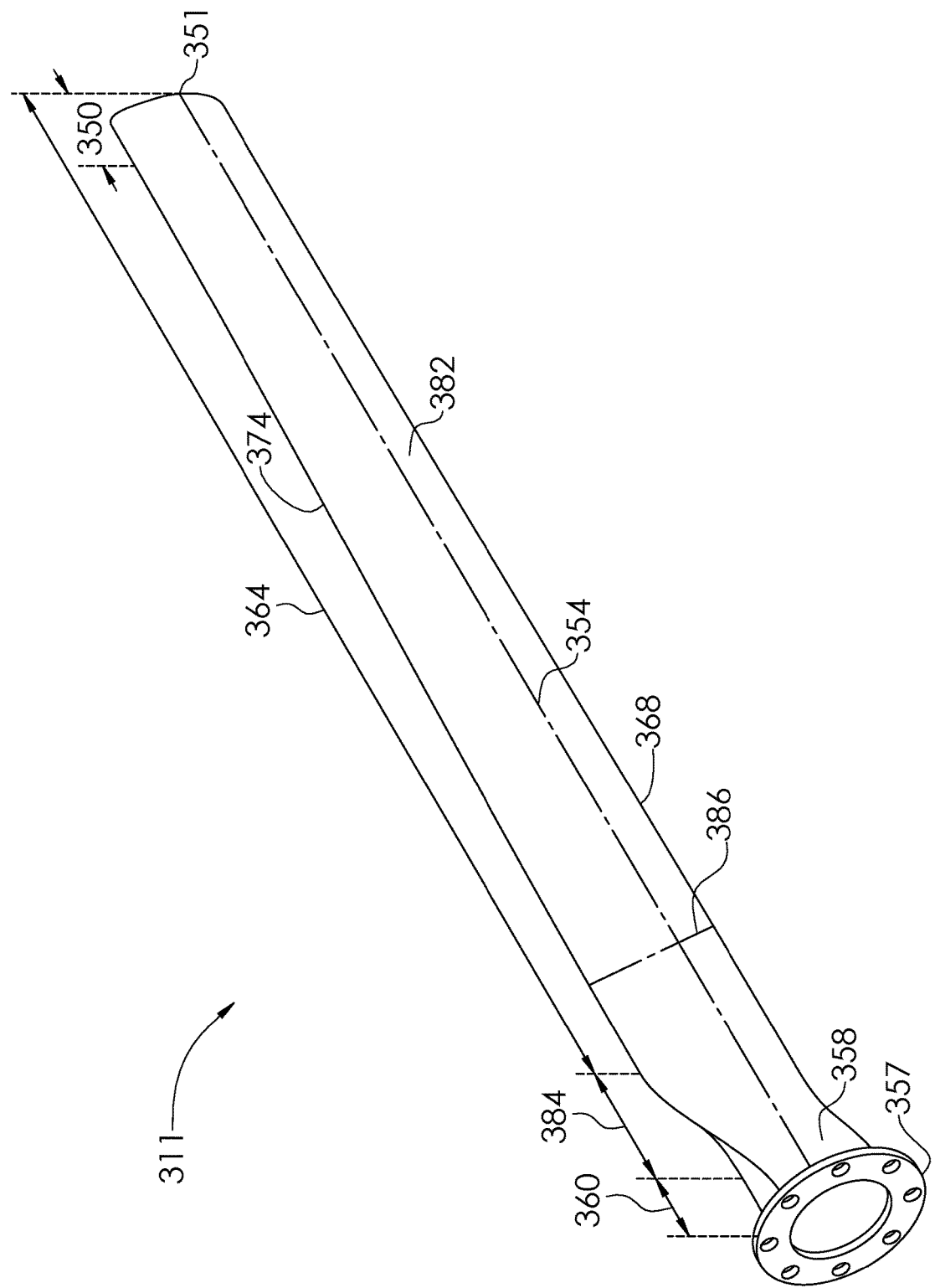
FIG. 4B is a rear isometric view of a water turbine blade.

Referring now to FIG. 4A and FIG. 4B, each rotor blade 311 includes a blade root 358 at an inboard end with respect to the hub 321 (see FIG. 3A), and may include connecting structure 357 (e.g., an annular mounting flange) for securing the rotor blade 311 with respect to the hub 321 (see FIG. 3A), and a blade tip 351 at a radially outboard end of the rotor blade 311 with respect to the hub 321 and defining a span 354 from the blade root 358 to the blade tip 351. Rotor blade 311 may include, progressing from the blade root end 358, a root section 360 that may be generally circular, elliptical, oval, or egg-shaped in cross-sectional profile at the far root end 358 of the blade and a hydrofoil section 364 having a leading edge 368 and a trailing edge 374, which is the working section of the rotor blade 311 and which defines a hydrofoil profile between the leading edge 368 and trailing edge 374 that forms a pressure surface (or upstream surface) 378 generally facing the oncoming fluid flow 1 (see FIG. 3) and a suction surface (or downstream surface) 382 (see FIG. 4B).

Each rotor blade 311 also includes a tip section 350 that overlaps hydrofoil section 164 and a pressure surface 378 may include a leading convexity 381 and a trailing concavity 380. Blade 311 may include a transition section 384 at which the cross-sectional shape of the rotor blade 311 transitions from the circular, elliptical, or other shape of the blade root 358 and root section 360 to the shape of the hydrofoil section 364. In an alternate environment, a transition section is omitted, and the blade 311 includes an abrupt, generally instantaneous transition between the profile of the root section 360 and the profile of the hydrofoil section 364.

Hydrofoil section 364 is defined by a chord 386 between the blade leading edge 368 and the blade trailing edge 374. Chord 386 may be variable along the span 354 of the blade 311 (e.g., with the chord decreasing with increasing span distance from the blade root 358, as shown), or the chord 386 maybe constant along the portion of the span 354 within the hydrofoil section 364.

The fluid dynamics interact with blade 311 similarly as described in Subsection 1.1 above.

3. Deflector Location, Length, and Orientation Relative to the Blade—FIG. 5A-FIG. 8

A deflector/blade assembly (or turbine blade assembly) as described herein includes a rotor blade (of a wind flow turbine, water flow turbine, or other fluid flow turbine) with a deflector fixed or otherwise coupled to the associated rotor blade. Deflectors described herein may be configured to work with rotor blades that rotate in either a clockwise or counterclockwise rotation.

Referring now to FIG. 5-FIG. 8, the deflectors, including without limitation, partial-span deflectors described herein, may be configured with a wind turbine 100 (see FIG. 5 and FIG. 6), water turbine 300 (see FIGS. 7 and 8), or other fluid powered turbine. The deflectors similarly affect the fluid flow adjacent to and/or near deflector/blade assemblies in all fluid types. As the interactions between a deflector and associated rotor blade and the relative impact on the performance of a rotor as described herein are generally agnostic to the type of fluid in which the rotor is operating—e.g., air, water, liquid or gas—the following descriptions will be with reference to a wind turbine, it being understood that the descriptions are generally equally applicable to other fluid turbines, such as water turbines.

A deflector 200, or partial-span deflector 200-A (see FIG. 5 and FIG. 6 respectively), when positioned adjacent to the pressure side 178, and nearer the oncoming flow than the blade, or positioned adjacent to the suction side 182, and further from the oncoming flow than the blade 111 (see FIG. 2A and FIG. 2B), of the blade 111 to which the deflector is coupled causes the fluid pressure to rise on the pressure side 178 of the blade 111 and/or drop on the suction side 182 of the blade 111, as compared to a blade 111 without one or more deflectors, in such a manner as to generate greater global torque in the rotor having blades with deflectors as compared to a rotor having the same blades, but no deflectors. In this context, a deflector coupled to an associated blade means the deflector is fixedly linked to the associated blade (attached or connected in a manner precluding relative movement between the deflector and associated blade) or operably coupled to the associated blade (attached or otherwise coupled via structure(s) and/or mechanism(s) that enable and/or effect relative movement between the deflector and the associated blade so that the position and/or the orientation of the deflector with respect to the associated blade may be selectively (including automatically) altered.

Figure 5A:
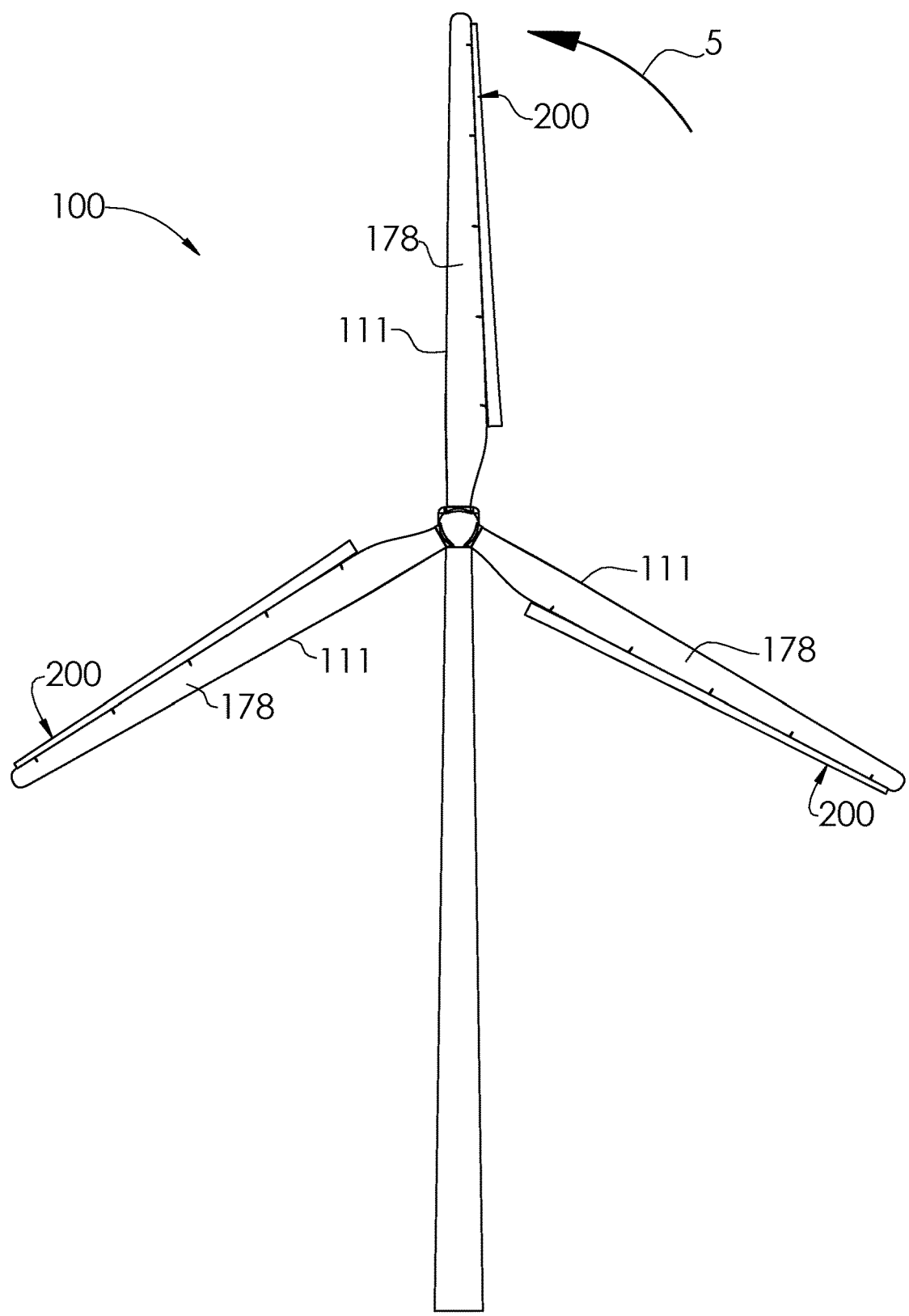
FIG. 5A is a front view of a wind turbine with deflectors coupled to the turbine blades and positioned to affect an entire airfoil section of each blade.

Referring now to FIG. 5A and FIG. 2A, each deflector 200 is configured to affect the entire airfoil section 164 of the associated blade 111 to which it is coupled (i.e., the deflector 200 extends spanwise over all or substantially all of the airfoil section 164), and each deflector 200 is positioned, with respect to the direction of rotation 5, behind the associated blade's leading edge 168, on the pressure side 178 of the associated blade 111. One or more additional deflector(s) 200 may also be configured on the pressure side 178 or suction side 182 of each blade 111.

3.1 Deflector and Blade Swept Volumes

Figure 5B:
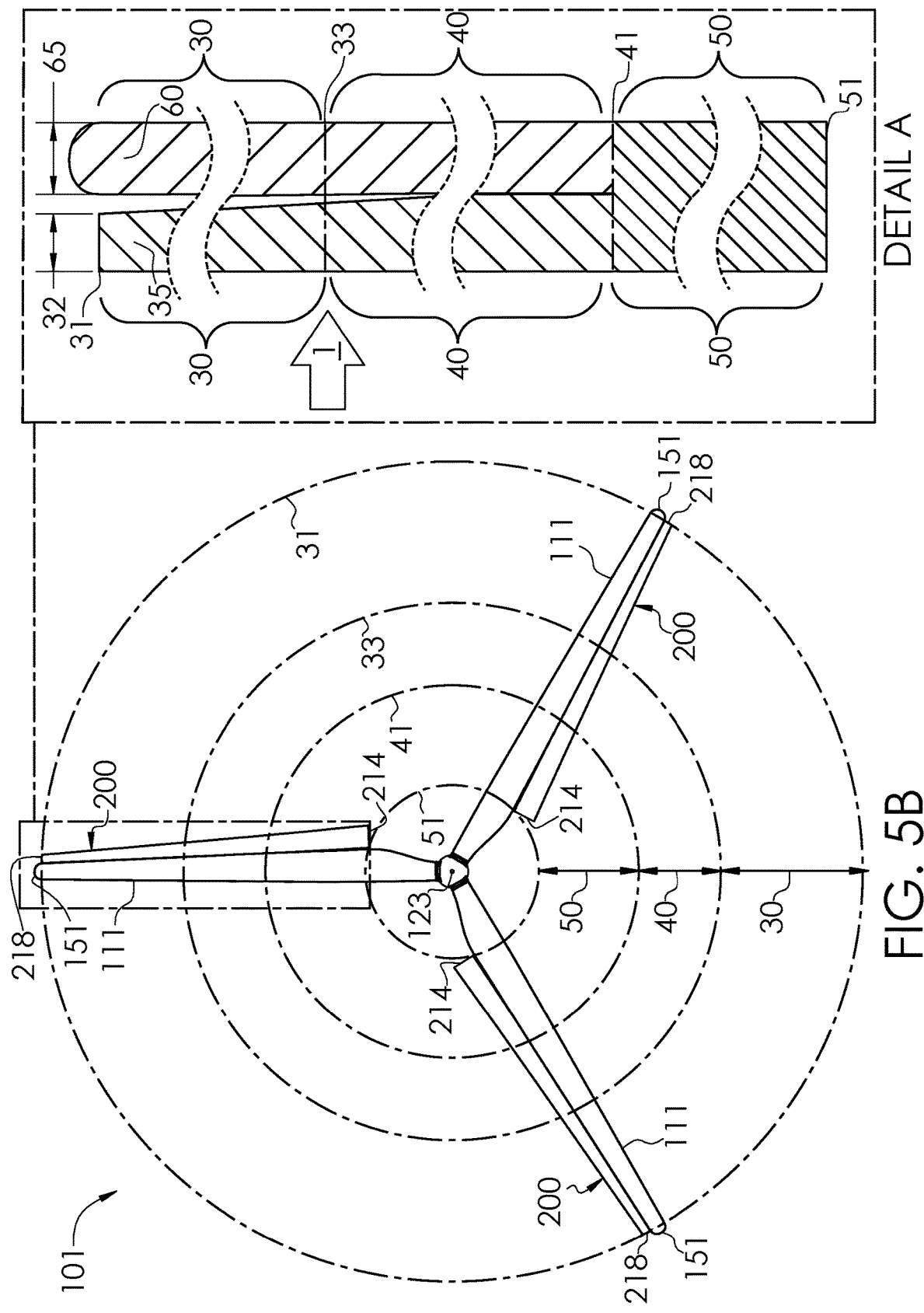
FIG. 5B is a front view of a rotor comprised of deflector/blade assemblies with dashed lines depicting the boundaries of an outer swept volume, a transitional swept volume, and a common swept volume, with a magnified side detail schematic broken view depicting the volumes relative to the oncoming fluid flow, and space between the areas. For clarity, the detail view is not drawn to scale and the blade and deflector are not shown within their respective 3-dimensional spaces.

Referring now to FIG. 5B, in an embodiment, deflector 200 operates in areas nearer the oncoming fluid flow 1, in separate and distinct swept volumes, than does the blade 111. For example, deflector swept volume 35 is nearer the oncoming flow 1 than is blade swept volume 60.

A rotor 101 is shown comprised of three deflector/blade assemblies, each comprised of a deflector 200 and blade 111. In this embodiment, a portion of each deflector 200 is positioned within an outer deflector swept volume 30 that is bounded by (i) the deflector tip 218 circumferential path of travel 31 about the hub axis of rotation 123 at or near the deflector tip 218, and (ii) an inner circumference 33 located nearer to the hub axis of rotation 123.

Deflector swept volume depth (i.e., axial extent relative to the hub axis of rotation 123) 32 contains the deflector chord over its spanwise distance from its tip 218, to circumference 33.

A smaller diameter transitional swept volume 40 is shared by a portion of deflector 200 and a portion of blade 111, whereby deflector 200 geometry begins to transition closer to blade 111 as the deflector 200 distance to the hub axis of rotation 123 decreases. Transitional swept volume 40 is bounded outer circumference 33 and inner circumference 41.

The smallest diameter area, common swept volume 50, is completely shared by a portion of deflector 200 and a portion of blade 111. Common swept volume 50 is bounded by its outer circumference 41, and by the deflector hub end 214 circumferential path of travel 51 about the hub axis of rotation 123 at or near the deflector hub end 214.

Deflectors 200 and rotor blades 111 share the entire common swept volume 50 where the deflector 200 distance away from oncoming fluid flow 1 increases as its spanwise distance toward the hub axis of rotation 123 decreases. That is, progressing from the tip end 218 to the hub end 214, the distance by which the deflector 200 is advanced toward the oncoming flow 1 as compared to the blade 111 decreases.

Blade 111 has a separate swept volume 60 that is bounded at its tip end 151 circumferential path of travel about the hub axis of rotation 123 (slightly beyond circumference 31 of deflector 200) and inner circumference 33. Blade swept volume depth 65 contains the blade 111 chord over its spanwise distance from its tip 218, to circumference 33.

Deflector 200 as described herein has forty-eight percent (48%) of its span within its outer swept volume 30, twenty-five percent (25%) of its span in the transitional swept volume 40, and twenty-seven percent (27%) of its span in the common swept volume 50. The virtual and physical performance for this embodiment is described in Section 7.

3.2 Partial-Span and Hydro Turbine Blades

Figure 6:
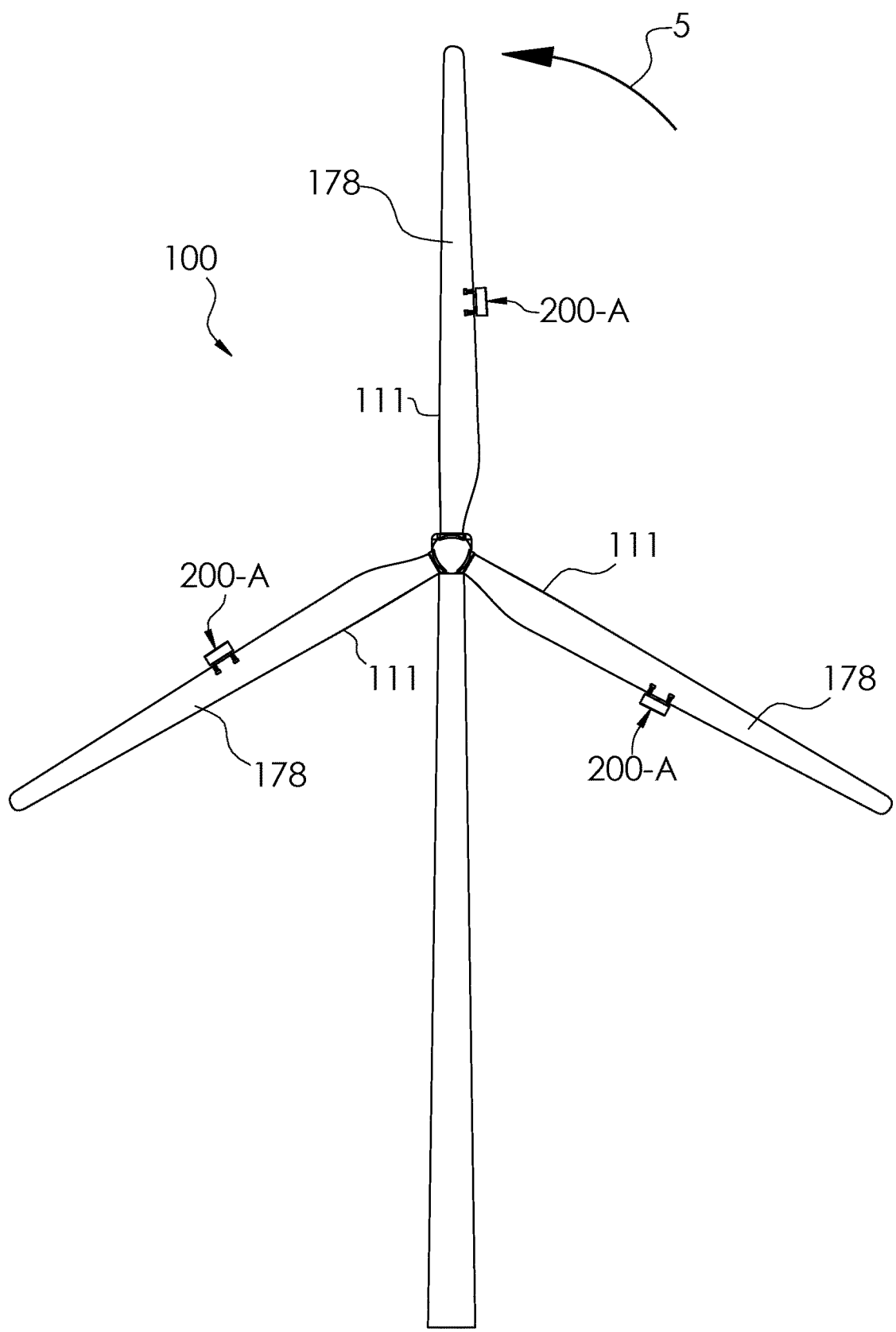
FIG. 6 is a front view of a wind turbine with partial-span deflectors coupled to the turbine blades and positioned to affect a portion of the airfoil section of each blade.

Referring now to FIG. 6, and still referring to FIG. 2A, each partial-span deflector 200-A is configured to affect a portion of the airfoil section 164 of the associated blade 111 to which it is coupled (i.e., the partial-span deflector 200-A extends spanwise over less than all of the airfoil section 164), and each partial-span deflector 200-A is positioned, with respect to direction of rotation 5, behind the associated blade's leading edge 168, on the pressure side 178 of the associated blade 111. One or more additional partial-span deflector(s) 200-A may also be configured on the pressure side 178 or suction side 182 anywhere along the blade span 154.

Figure 7:
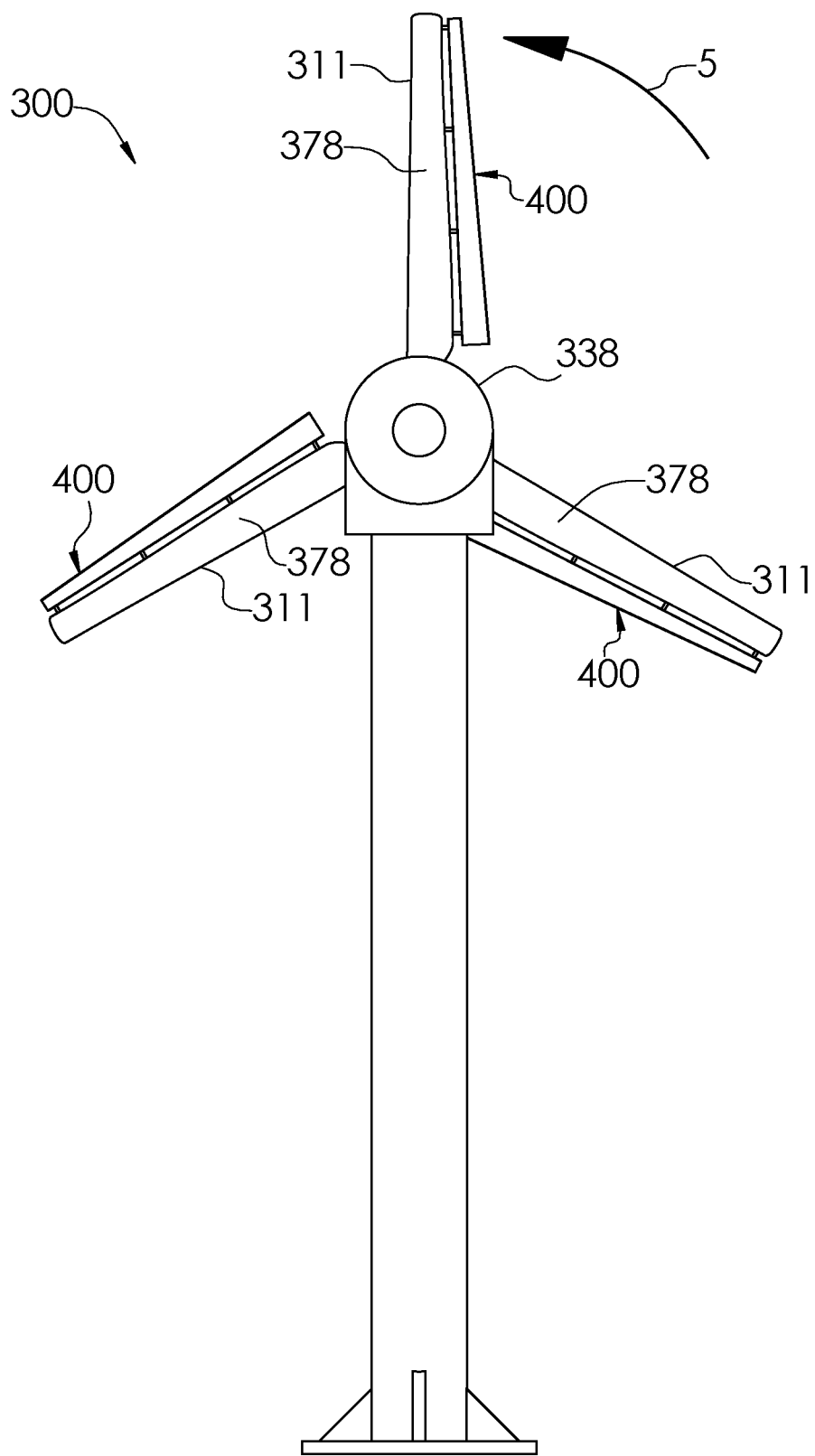
FIG. 7 is a front view of a water turbine with deflectors coupled to the turbine blades and positioned to affect an entire hydrofoil section of each blade.

Referring now to FIG. 7 and FIG. 4A, each deflector 400 is configured to affect the entire hydrofoil section 364 and tip 351 of the associated blade 300 to which it is coupled (see FIG. 4A) (i.e., the deflector 400 extends spanwise over all or substantially all of the hydrofoil section 364), and each deflector 400 is positioned, with respect to the direction of rotation 5, behind the leading edge 368 of the pressure side 378 of the associated blade 311. One or more additional deflector(s) 400 may also be configured on the pressure side 378 or suction side 382 of each blade 311.

Figure 8:
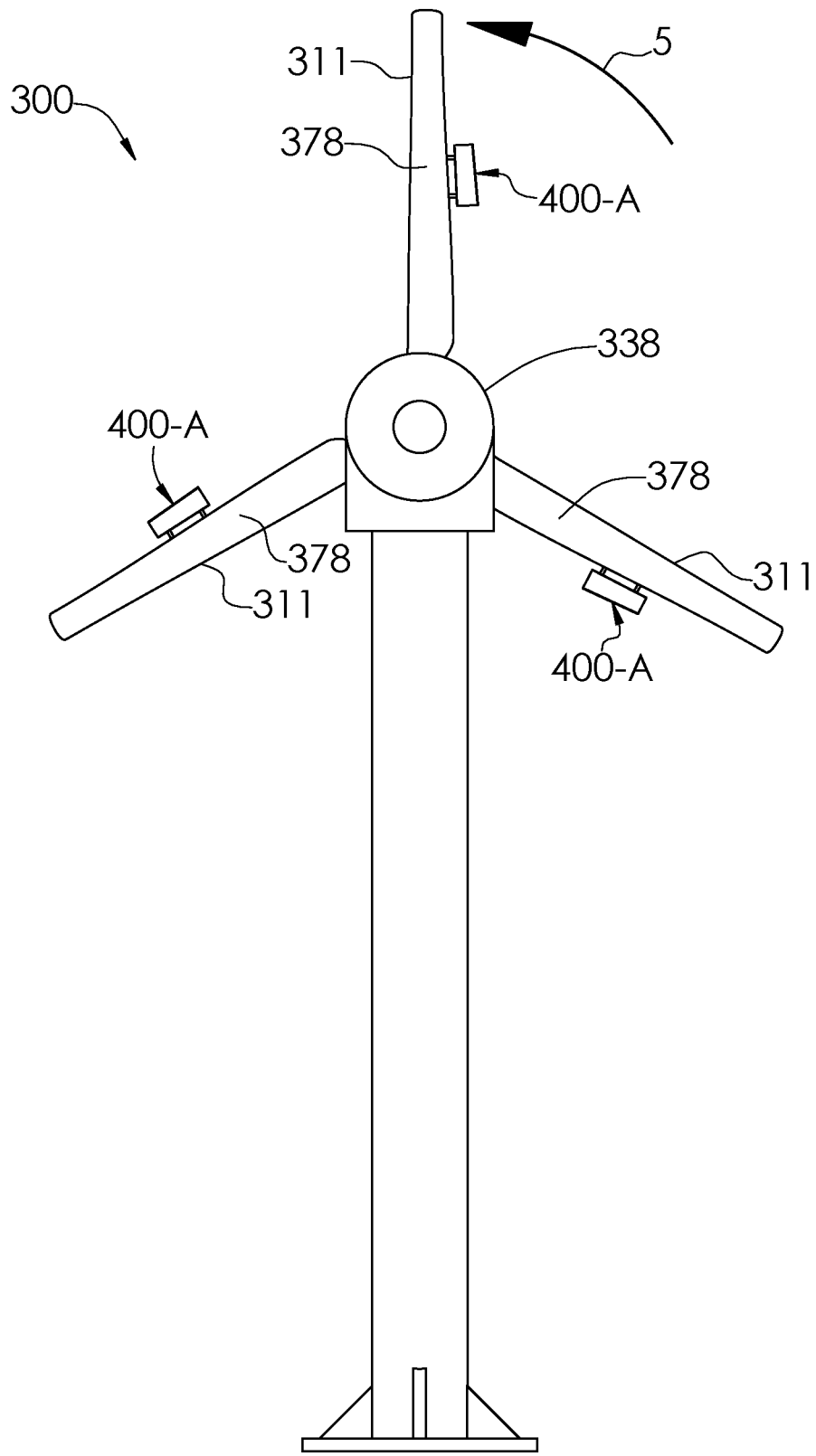
FIG. 8 is a front view of a water turbine with partial-span deflectors coupled to the turbine blades and positioned to affect a portion of the hydrofoil section of each blade.

Referring now to FIG. 8, each partial-span deflector 400-A is configured to affect a portion of the hydrofoil section 364 of the associated blade 311 to which it is coupled (see FIG. 4A) (i.e., the partial-span deflector 400-A extends spanwise over less than all of the hydrofoil section 364), and the partial-span deflector 400-A is positioned, with respect to the direction of rotation 5, behind the associated blade's leading edge 368, on the pressure side 378 of the associated blade 311. One or more additional partial-span deflector(s) 400-A may also be configured on the pressure side 378 or suction side 382 of each hydro turbine blade 311 anywhere along the blade span 354.

Partial span deflectors are designed for retrofitting existing turbines which are located where the fluid flows in which they operate are less than required to reach the rated capacities.

Any deflector type e.g. 200, 200-B, 201, may be configured as a partial span deflector for turbines operating in any fluid type.

Deflectors described herein may be fixedly linked or operably coupled to an associated blade as described in Section 6 and Subsection 9.7 respectively.

4. Deflector General Shape and Orientation to the Oncoming Flow—FIG. 9A-9B

Figure 9A:
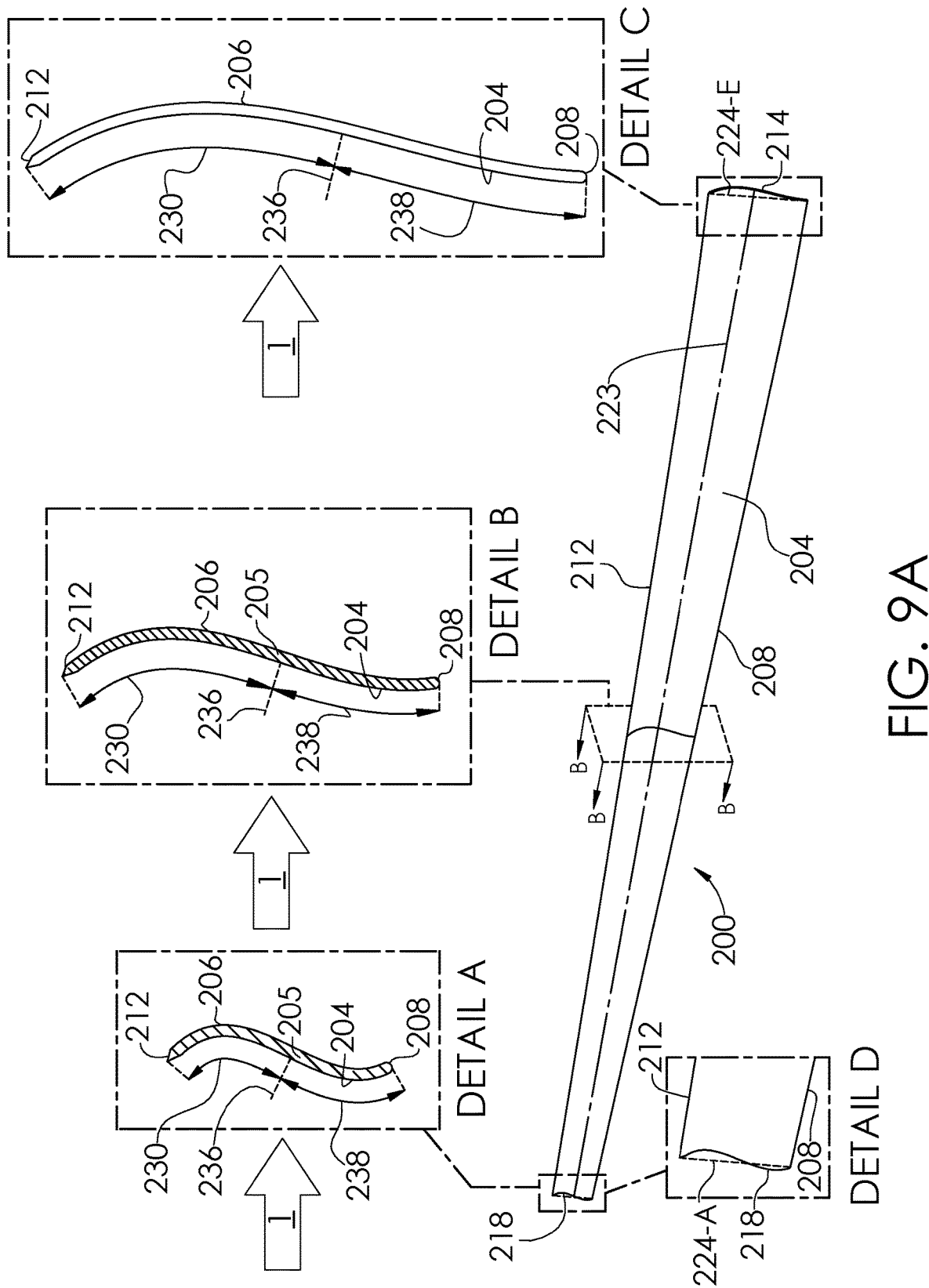
FIG. 9A is front isometric view of a deflector, excluding any structure(s) connecting the deflector to the blade, with magnified (i) cross-sectional views of the tip end and center section, (ii) end view of the hub end, and (iii) front cropped detail view of tip end.

Referring now to FIG. 9A, showing a front isometric view of a deflector 200, the deflector is bounded by a leading edge 208, a hub end 214, a trailing edge 212, and a tip end 218. In the illustrated embodiment, the general shape of a perimeter of the deflector 200 is trapezoidal, where the perimeter is defined by leading edge 208, hub end 214, trailing edge 212, and tip end 218. However, in other embodiments, the shape of the perimeter may not be generally trapezoidal and may, for example, be quadrilateral.

Deflector 200 has a length defined by a deflector span 223 extending from the deflector tip end 218 to the deflector hub end 214 and may be greater, less than, or equal to blade span 154 (see FIG. 2A). Each deflector 200 is positioned and oriented with respect to its associated blade 111 (see FIG. 5) so as to have a pressure surface (or upstream surface) 204 that is impacted by oncoming fluid flow 1 and a suction surface (or downstream surface) 206 opposite the pressure surface 204.

Deflector 200, at any position along the span 223, is characterized by a chord extending from the leading edge 208 to the trailing edge 212, such as tip end chord 224-A and hub end chord 224-E. The tip end chord 224-A and hub end chord 224-E may differ, including without limitation, such that (i) when unequal as shown, the shape of the perimeter of deflector 200 pressure surface 204 is generally trapezoidal, and (ii) when equal, the shape of the perimeter of deflector 200 pressure surface 204 is generally quadrilateral.

Figure 9B:
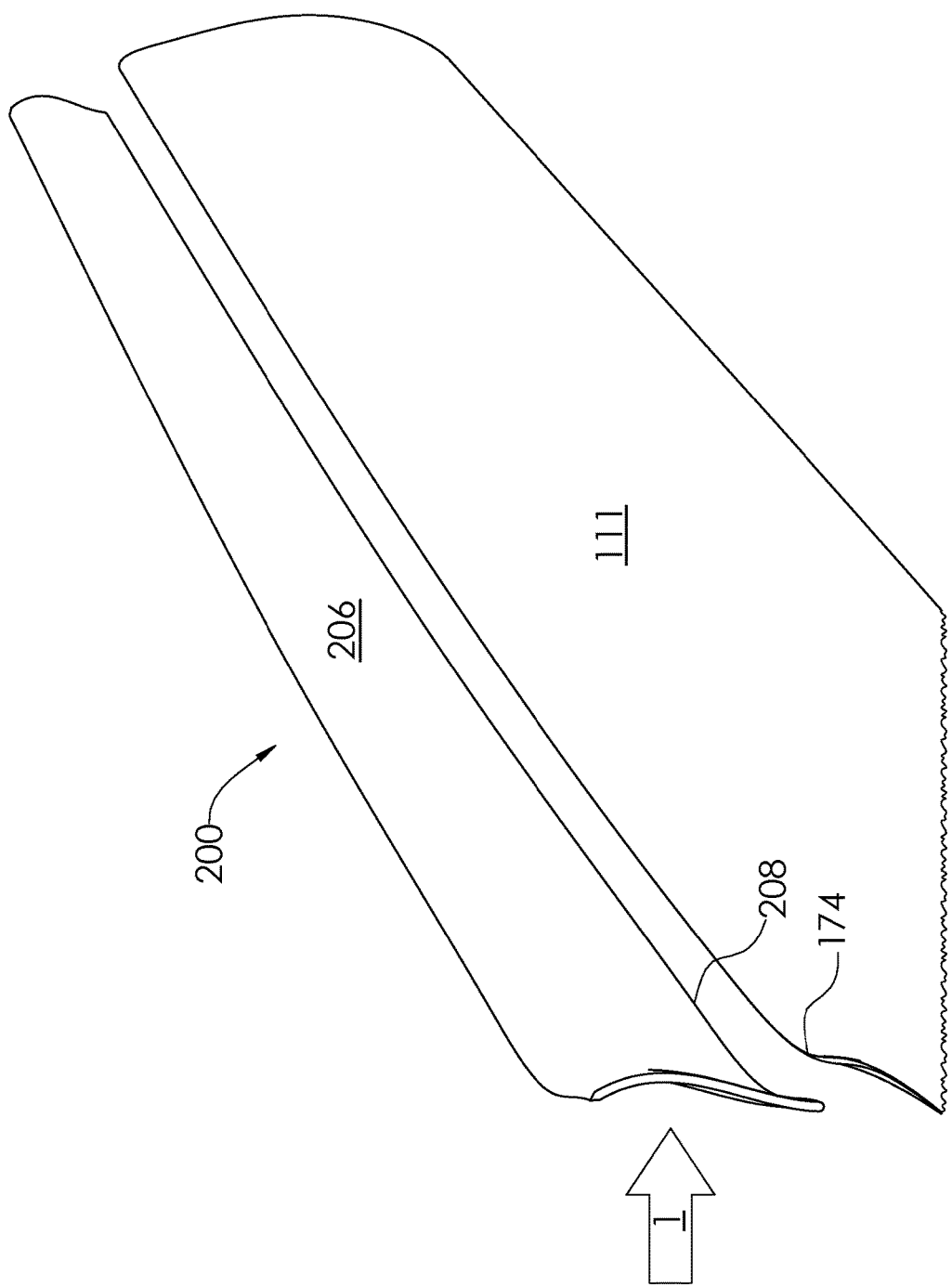
FIG. 9B is a rear view of a deflector/blade assembly, showing the deflector leading edge curvature matching the blade trailing edge curvature, excluding any structure(s) connecting the deflector to the blade.

In an embodiment, the spanwise curvature of the deflector 200 leading edge 208 follows the curvature of the blade trailing edge 174 (see FIG. 9B). In other embodiments the deflector 200 leading edge 208 may be straight or have a curvature that does not follow the curvature or other geometry of blade 111.

Deflector 200 may twist along span 223 similar to a blade twist and the twist may be (i) linear or non-linear, and/or (ii) may or may not match the twist of the blade to which it is fixedly linked or operably coupled. Flow analysis indicates that matching the deflector twist with the blade twist will increase blade/deflector assembly performance by increasing the global torque generated by the blade/deflector assembly in the rotation direction.

Referring now to FIG. 9A Detail A-Detail C, while still referring to FIG. 9A, pressure surface 204 has a trailing concavity 230 that begins at trailing edge 212 and ends at transition point 236 and a leading convexity 238 that begins at transition point 236 and ends at leading edge 208.

Deflector 200, deflector 400 (see FIG. 7), and all deflector embodiments described herein, may be constructed of a single material or combination of two or more materials (e.g., laminates), including but not limited to composites, plastics, or metal, each with integral supports, including without limitation, structural mounting flanges, and/or a combination of materials and internal support structures common to turbine blade and/or wing construction methods, including without limitation, foam, ribs, spars, or other reinforcements.

5. Concavity and Convexity—General—FIG. 9C-FIG. 9D

Figure 9C:
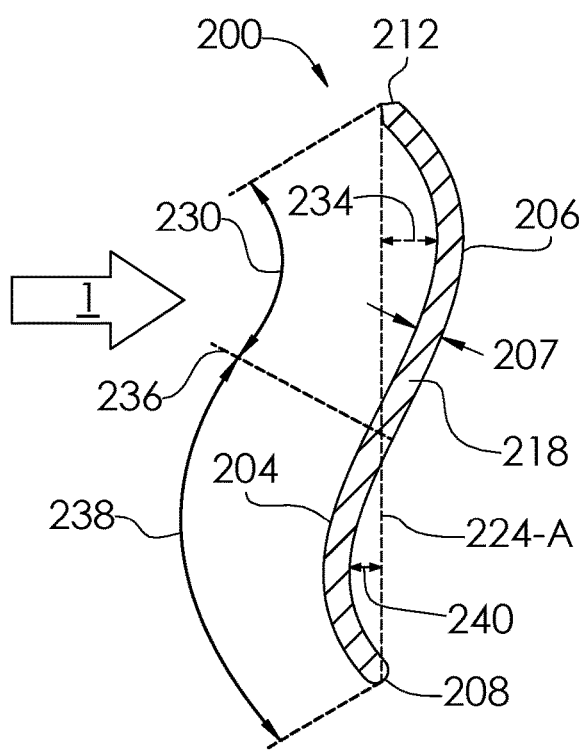
FIG. 9C is a cross-sectional view of the tip end of an alternate embodiment of a deflector, with an exaggerated convexity to more easily show the convexed geometry.
Figure 9D:
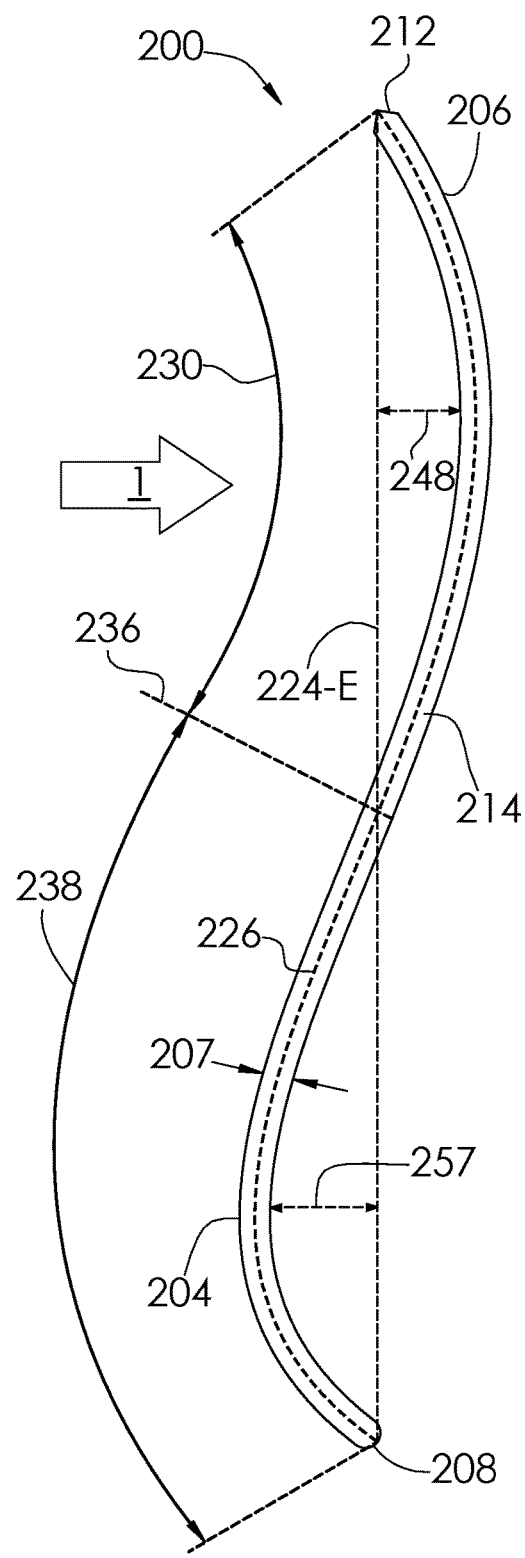
FIG. 9D is a hub end view of an alternate embodiment of a deflector with an exaggerated convexity to more easily show the convexed geometry.

Referring now to FIGS. 9C and 9D, in the embodiment shown, the trailing concavity 230 and leading convexity 238 curvatures may vary uniformly or non-uniformly over the span 223 (see FIG. 9A) of the deflector 200 with the trailing concavity 230 and leading convexity 238 at the tip end (FIG. 9C) having a greater curvature (smaller radius of curvature) than trailing concavity 230 and leading convexity 238 at the hub end (FIG. 9D).

In other embodiments the trailing concavity 230 and leading convexity 238 could remain constant over at least portions of the span of the blade and/or change non-uniformly (increasing or decreasing curvature) over the span 223 (see FIG. 9A).

5.1 Concavity and Convexity Relationship to Angle of Attack—FIG. 9C-FIG. 9D

Each of the trailing concavity 230 and leading convexity 238 may be characterized at any position along the span 223 (see FIG. 9A) of the deflector 200 by its respective depth, which is the maximum distance from a chord at that span position to the pressure surface 204 within the trailing concavity 230 or leading convexity 238, respectively, and which is a function of the curvature (radius of curvature) and the arc length (or span) of the concavity 230 or convexity 238.

The convexities 238 shown in FIGS. 9C and 9D are exaggerated to more easily show their depth measurement.

Referring now to FIG. 9C, at the tip end 218 of the deflector 200, the depth of trailing concavity 230 is length 234 when measured from the tip end chord 224-A to pressure surface 204, and the depth of leading convexity 238 is length 240 when measured from the tip end chord 224-A to suction surface 206.

Referring now to FIG. 9D, at the hub end 214 of the deflector 200, the depth of trailing concavity 230 is length 248 when measured from the hub end chord 224-E to pressure surface 204, and the depth of leading convexity 238 is length 257 when measured from the hub end chord 224-E to suction surface 206. In the embodiments shown, the combination and arrangement of trailing concavity 230, and reverse in curvature occurring at leading convexity 238, results in a reflexed camber line 226 across the span 223 (see FIG. 9A) of deflector 200. A center of curvature of the reflexed mean camber line 226 is located on a downstream, or suction, side (i.e., outside downstream surface 206) of the deflector 200 for one part of the mean camber line 226 corresponding to the convexity 238 and is located on an upstream (or pressure) side of the deflector (i.e., outside upstream surface 204) for another part of the mean camber line 226 corresponding to the concavity 230. Either the concavity 230 or convexity 238 may not be circles, and either portion may have multiple centers of curvature on the downstream or upstream sides of the deflector. Other embodiments could be configured without a lower convexity and thus not have a reflexed camber.

Note that due to the concavity 230 and the convexity 238 (the extent of which may be exaggerated in the drawings to enhance visualization of these concepts) at least a portion of the line representing chord 224-A (FIG. 9C) and at least a portion of the line representing the chord 224-E (FIG. 9D) may lie external to the deflector 200 (i.e., outside the space between upstream surface 204 and downstream surface 206). In some embodiments, the majority of the deflector chord 224 across span 223 (see FIG. 9A) is external to deflector 200. In some embodiments the amount of the deflector chord external to the defector profile, which may vary along the span of the deflector, is 25-80% of the chord at the tip end of the deflector and 65-90% of the chord at the hub end of the deflector and may vary continuously—e.g., linearly, from the tip end to the hub end.

The concavity depths 234, 248 and convexity depths 240, 257 (i) correspond to a curvature, whereby as the respective depth increases, the corresponding curvature increases (radius of curvature decreases), and (ii) may change between the deflector tip end 218 and hub end 214 (See FIG. 9A).

In an embodiment, a relationship exists between the (i) depth of convexity 230 over the length of the span 223 (See FIG. 9A), and (ii) the deflector 200 angle of attack as described below.

Figure 9E:
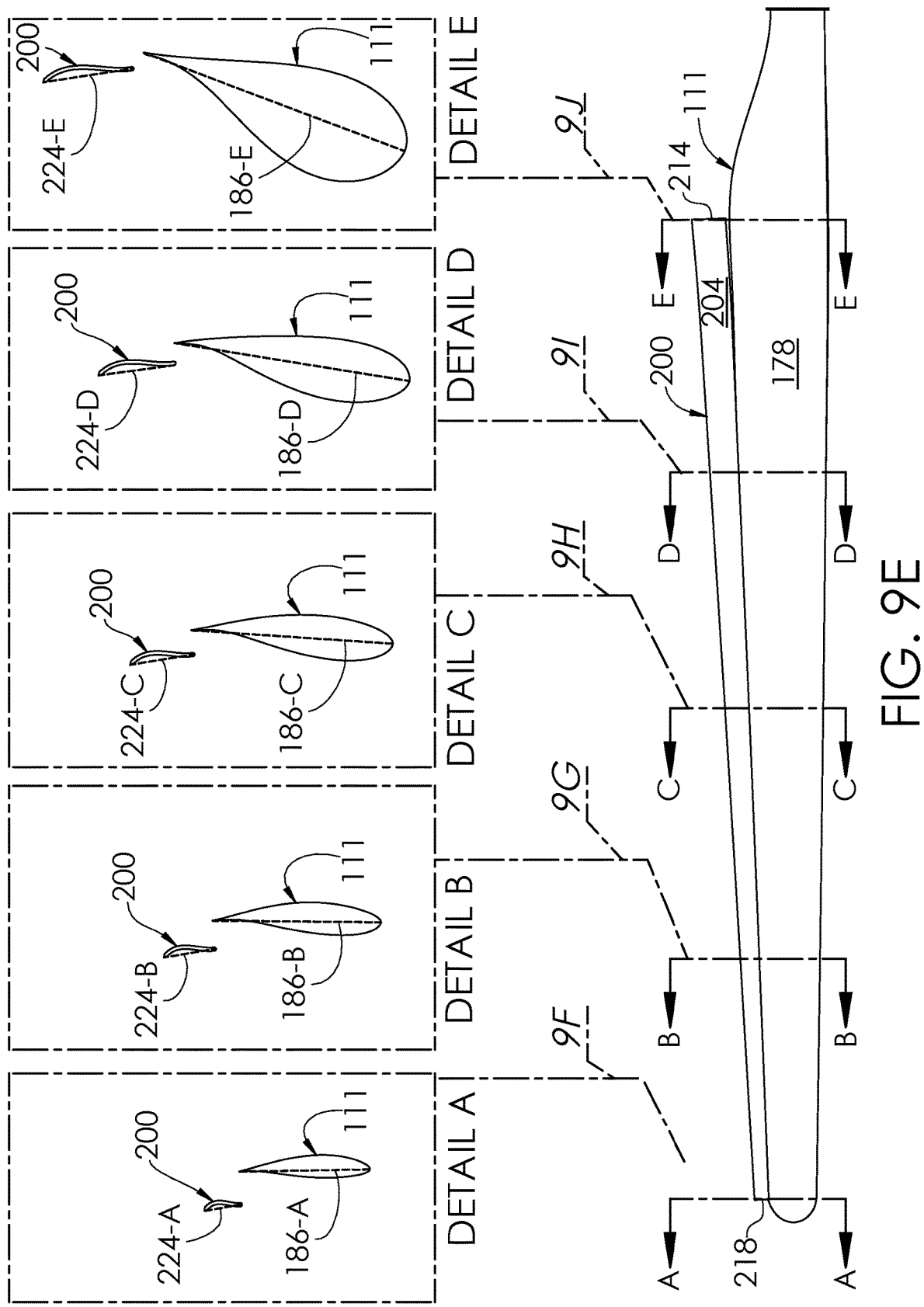
FIG. 9E is a front view of a deflector/blade assembly with five detail profile views starting at the deflector tip end and ending at the deflector hub end.

Flow simulations indicate that in an embodiment with deflector/blade relative positions as shown in FIG. 9E, a ratio of a (i) concavity depth 234 and 248 of five to twenty percent (5-20%) of the respective chord 224-A through 224-E, (ii) convexity depths 240 and 257 of zero to fifteen percent (0-15%) of respective chord 224-A through 224-E, and (iii) angle of attack of 0-15 degrees (with the angle of attack equal to 0 degrees when coplanar with the plane of rotation and positive degrees increasing as the deflector trailing edge is advanced toward the oncoming flow) increases global torque depending upon the relationship between the amount of convexity and concavity and the deflector angle of attack relative to rotor plane of rotation, as further described below. However, due to the large number of optimization variables, and alternate embodiments that can be combined, it is possible that improvements in global torque can be obtained with an expanded deflector angle of attack range and expanded upper concavity to chord ratio.

Flow simulations also indicate that similar increases in global torque to the deflector/blade assembly, i.e., increased performance, may be achieved with (i) a lesser concavity in the pressure (upstream) surface of the deflector and greater angle of attack between the deflector and blade, and (ii) a greater concavity in the pressure (upstream) surface of the deflector and lessor angle of attack between the deflector and blade. Flow simulations further show that either increased concavity (i.e., greater curvature or greater concavity depth 234, 248) or increased angle of attack between the deflector and the blade results in increased performance of the deflector/blade assembly.

The operating range of the lower convexity 238 is less than the operating range for the upper concavity 230. The lower convexity 238 influences flow passing between deflector 200 leading edge 208 and blade trailing edge 174 from the blade pressure surface side 178 toward the deflector suction surface side 206, in other words, from the upstream side of the blade 111 to the downstream side of the deflector 200. Flow simulation shows that the flow passing through the opening between the deflector 200 and blade 111 is an important variable in balancing the global torque and the type of torque attributed solely to deflector 200, i.e., positive, negative, or neutral.

Flow simulations also show that varying the concavity/angle of attack ("AoA") relationship may also result in the deflector 200 contributing positive torque or negative torque to the deflector/blade assembly. This is illustrated in the table below comparing representative blade torque, deflector torque, and global torque for a rotor blade without a deflector and a blade/deflector assembly, where, for purposes of comparison, the torque values are normalized by the torque value obtained by the rotor blade alone. Comparisons are made for three representative deflector configurations: (i) high deflector angle of attack (e.g., 13°-15°) and low concavity (e.g., 5%-7% of chord), (ii) medium deflector angle of attack (e.g., 6°-12°) and medium concavity (e.g., 8%-12% of chord), and (iii) low deflector angle of attack (e.g., 0°-5°) and high concavity (e.g., 13%-20% of chord).

| Torque Type | Blade Only Without Deflector | Blade with Deflector High AoA/ Low Concavity | Blade with Deflector Medium AoA and Concavity | Blade with Deflector Low AoA/ High Concavity |
| --- | --- | --- | --- | --- |
| Blade Torque | 1.0 | 2.0 | 1.8 | 1.65 |
| Deflector Torque | N/A | −0.2 | −0.05 | 0.05 |
| Global Torque | 1.0 | 1.80 | 1.75 | 1.70 |

As illustrated in the table above, in this embodiment, adding a deflector increases the blade torque contribution to global torque, provided the angle of attack and concavity depth to chord ratio are as described above. In addition, as the angle of attack changes from high to low and the concavity of the deflector changes from low to high, the blade torque contribution to global torque decreases but the deflector torque contribution to global torque increases. Stated another way, deflector configurations that result in low—or even negative—torque contributions from the deflector result in higher torque contributions from the blade, thereby offsetting the low or negative deflector torque contributions to provide increased global torque as compared to a blade without a deflector.

As shown in FIGS. 9C and 9D, deflector 200 has a deflector thickness 207 between the upstream surface 204 and downstream surface 206 that may be constant from the deflector leading edge 208 to the deflector trailing edge 212. In one embodiment, the upstream surface 204 and the downstream surface 206 are flat and parallel. In other embodiments, the upstream surface 204 and the downstream surface 206 are curved and parallel (i.e., the upstream surface 204 and downstream surface 206 are equidistant from a midline of the deflector thickness), and in other embodiments, the surfaces 204 and 206 are not parallel. Where the upstream surface 204 and the downstream surface 206 are curved and parallel, the trailing concavity 230 on the upstream surface 204 has a corresponding trailing convexity on the downstream surface 206, and the leading convexity 238 on the upstream surface 204 has a corresponding leading concavity on the downstream surface 206. In various embodiments, such as shown in FIGS. 9C and 9D, where the thickness of the deflector 200 is relatively small relative to the chord (e.g., tip end chord 224-A and hub end chord 224-E), the chord is at least partially outside the profile defined between upstream surface 204 and downstream surface 206, for example, wherein the chord spans the trailing concavity 230 and/or the leading convexity 238.

5.2 Deflector/Blade Assembly Chord Detail—FIG. 9E-9J

Referring now to FIG. 9E, a plan view of an exemplary embodiment of a blade/deflector assembly is shown, including blade 111 and deflector 200 and showing the pressure surface 178 of the blade 111 and the pressure surface 204 of the deflector 200. Details A, B, C, D, and E are transverse profile views of the blade/deflector assembly at sections A-A, B-B, C-C, D-D, and E-E, respectively.

The angles of blade chords 186-A-186-E (relative to the rotor plane of rotation 104 (see FIG. 1A)) may change along the blade span 154 (see FIG. 2A) as further described below.

The angles of deflector chords 224-A-224-E (relative to the rotor plane of rotation 104 (see FIG. 1A)) may change along the deflector span 223 (see FIG. 9A) as further described below.

FIG. 9F is an enlarged view of detail A of FIG. 9E and shows a tip end profile of the blade/deflector assembly. The blade 111 profile of FIG. 9F has a chord line 196 extending from the blade leading edge 168 through the blade trailing edge 174 and a mean camber line 188 representing a line that is equidistant from pressure surface 178 and suction surface 182. The deflector 200 profile of FIG. 9F has a chord line 258 extending from leading edge 208 through trailing edge 212, and the deflector 200 profile includes a trailing concavity 230.

The blade 111 profile of FIG. 9F is oriented at a blade angle of attack 194-A and the deflector 200 profile of FIG. 9F is oriented at a deflector angle of attack 259-A.

Still referring to FIG. 9F, the leading edge 208 of the deflector 200 profile is spaced from the blade trailing edge 174 of the blade 111 profile by a distance of 228-A in the direction toward the oncoming fluid flow 1 (upstream).

FIG. 9G is an enlarged view of detail B of FIG. 9E and shows a profile of the blade/deflector assembly at a distance from the tip end that is twenty percent (20%) of the length of the span 154 of blade 111 (see FIG. 2A). The blade 111 profile of FIG. 9G has a chord line 196 extending from the leading edge 168 through the blade trailing edge 174 and a mean camber line 188 representing a line that is equidistant from pressure surface 178 and suction surface 182. The blade chord 186-B (see FIG. 9E Detail B) of the blade 111 profile of FIG. 9G may be different (e.g., longer) than the blade chord 186-A (see FIG. 9E Detail A) of the blade 111 profile of FIG. 9F. In addition, mean camber line 188 of the blade 111 profile of FIG. 9G may differ from mean camber line 188 of the blade 111 profile of FIG. 9F.

The deflector 200 profile of FIG. 9G has a chord line 258 extending from leading edge 208 through trailing edge 212 and includes a trailing concavity 230. The deflector chord 224-B (see FIG. 9E Detail B) of the deflector 200 profile of FIG. 9G may be different (e.g., longer) than deflector chord 224-A (see FIG. 9E Detail A) of the deflector 200 profile of FIG. 9F. The curvature of trailing concavity 230 of the deflector 200 profile of FIG. 9G may be different from the curvature of trailing concavity 230 of the deflector 200 profile of FIG. 9F.

The blade 111 profile of FIG. 9G is oriented at a blade angle of attack 194-B and may be different from angle of attack 194-A of FIG. 9F due to blade twist.

The deflector 200 profile of FIG. 9G is oriented at a deflector angle of attack 259-B. The angle of attack 259-B of the deflector 200 profile of FIG. 9G may be different than the angle of attack 259-A of the deflector 200 profile of FIG. 9F.

The leading edge 208 of the deflector 200 profile of FIG. 9G is spaced from the blade trailing edge 174 of the blade 111 profile of FIG. 9G by a distance of 228-B in the direction toward the oncoming fluid flow 1 (upstream). Distance 228-B of FIG. 9G may be different than distance 228-A of FIG. 9F due to variations in vertical and/or horizontal skew (described below).

Figure 9H:
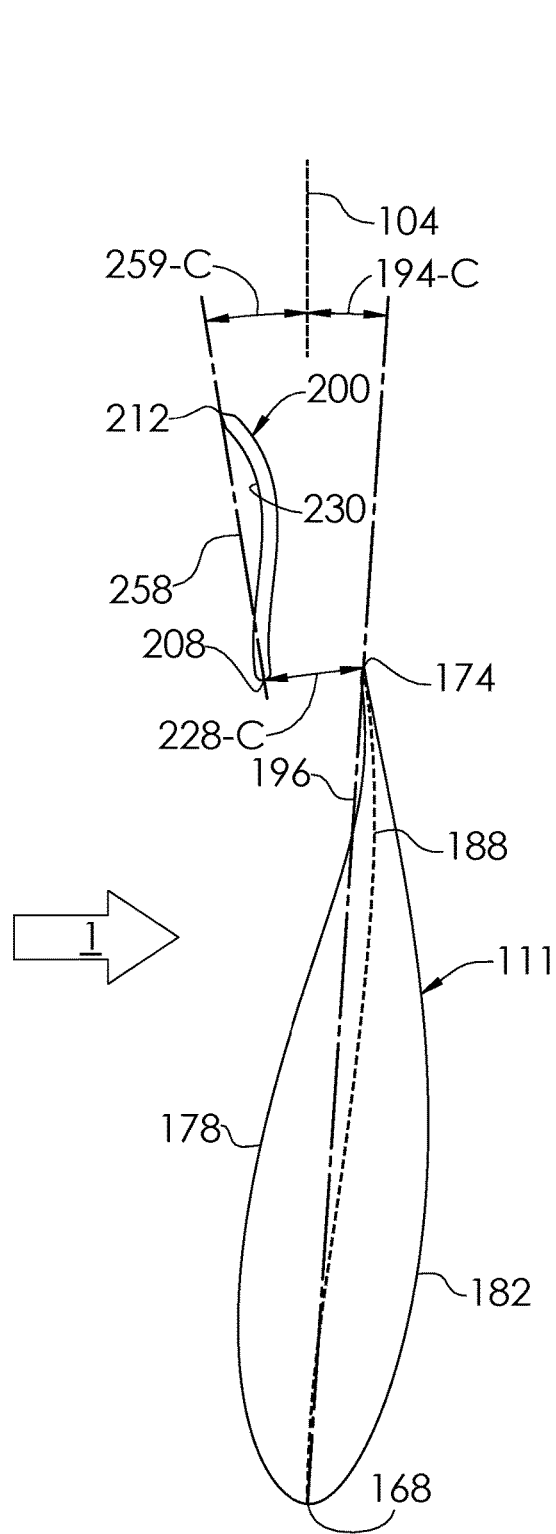
FIG. 9H is a side view of deflector and blade profiles, at the midway point between the deflector tip end and hub end, that shows deflector angle of attack and position relative to the blade.

FIG. 9H is an enlarged view of detail C of FIG. 9E. The blade 111 profile of FIG. 9H has a chord line 196 extending from the leading edge 168 through the trailing edge 174 and a mean camber line 188 representing a line that is equidistant from pressure surface 178 and suction surface 182. The chord 186-C (see FIG. 9E Detail C) of the blade 111 profile of FIG. 9H may be different (e.g., longer) than the blade chord 186-A and 186-B (see FIG. 9E Detail A and Detail B, respectively) of the blade 111 profiles of FIGS. 9F and 9G, respectively. In addition, mean camber line 188 of the blade 111 profile of FIG. 9H may differ from mean camber lines 188 of the blade 111 profiles of FIGS. 9F and 9G.

The deflector 200 profile of FIG. 9H has a chord line 258 extending from leading edge 208 through trailing edge 212, and includes a trailing concavity 230. The chord 224-C (see FIG. 9E Detail C) of the deflector 200 profile of FIG. 9H may be different (e.g., longer) than the deflector chords 224-A and 224-B (see FIG. 9E Detail A and Detail B, respectively) of the deflector 200 profiles of FIGS. 9F and 9G, respectively. The curvature of trailing concavity 230 of the deflector 200 profile of FIG. 9H may be different from the curvatures of trailing concavities 230 of the deflector 200 profiles of FIGS. 9F and 9G.

The blade 111 profile of FIG. 9H is oriented at a blade angle of attack 194-C and may be different from blade angles of attack 194-A of FIG. 9F and 194-B of FIG. 9G due to blade twist.

The deflector 200 profile of FIG. 9H is oriented at deflector angle of attack 259-C and may be different than the angles of attack 259-A and 259-B of the deflector 200 profiles of FIGS. 9F and 9G, respectively.

The leading edge 208 of the deflector 200 profile of FIG. 9H is spaced from the trailing edge 174 of the blade 111 profile of FIG. 9H by a distance of 228-C in the direction toward the oncoming fluid flow 1 (upstream). Distance 228-C of FIG. 9H may be different than distance 228-A of FIG. 9F and distance 228-B of FIG. 9G due to variations in vertical and/or horizontal skew (described below).

Figure 9I:
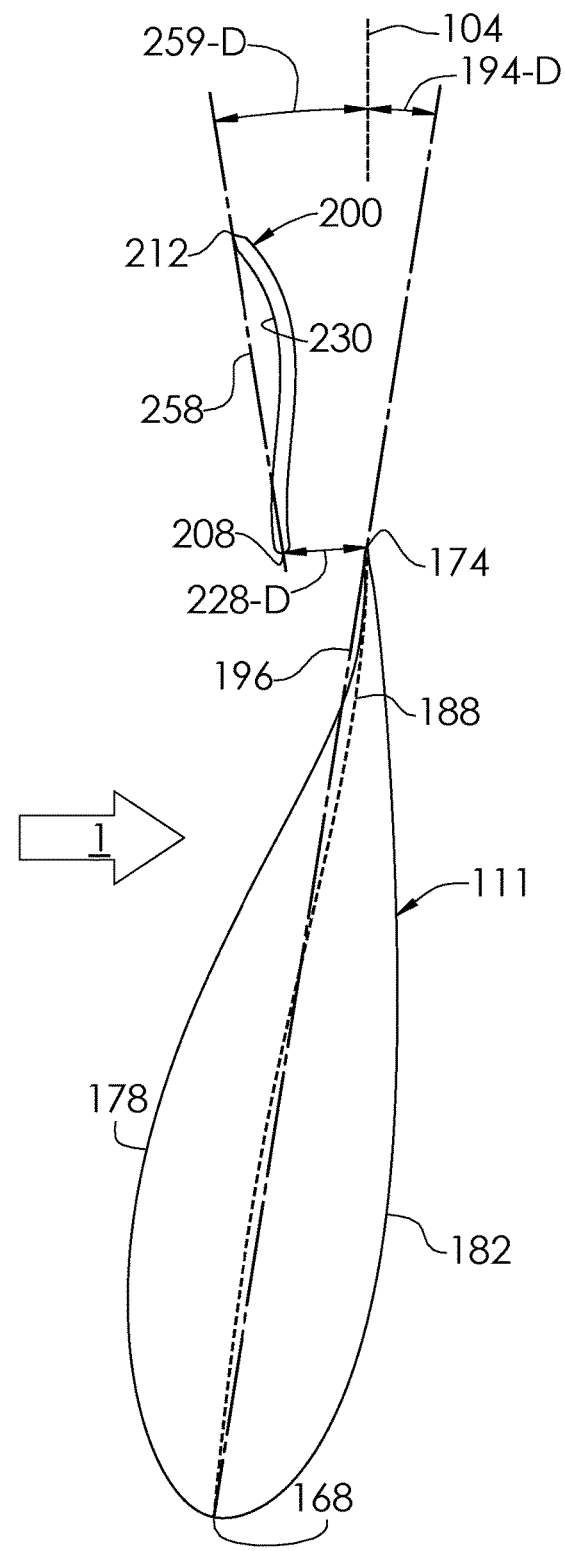
FIG. 9I is a side view of deflector and blade profiles, at twenty-five percent of the distance from the deflector hub end, that shows deflector angle of attack and position relative to the blade.

FIG. 9I is an enlarged view of detail D of FIG. 9E. The blade 111 profile of FIG. 9I has a chord line 196 extending from the leading edge 168 through the trailing edge 174 and a mean camber line 188 representing a line that is equidistant from pressure surface 178 and suction surface 182. The blade chord 186-D (see FIG. 9E Detail D) of the blade 111 profile of FIG. 9I may be different (e.g., longer) than the blade chords 186-A, 186-B, 186-C (see FIG. 9E Detail A, Detail B, and Detail C, respectively) of the blade 111 profiles of FIGS. 9F, 9G, and 9H, respectively. In addition, mean camber line 188 of the blade 111 profile of FIG. 9I may differ from mean camber lines 188 of the blade 111 profiles of FIGS. 9F, 9G and 9H.

The deflector 200 profile of FIG. 9I has a chord line 258 extending from leading edge 208 through trailing edge 212, and includes a trailing concavity 230. The deflector chord 224-D (see FIG. 9E Detail D) of the deflector 200 profile of FIG. 9I may be different (e.g., longer) than the deflector chords 224-A, 224-B, 224-C (see FIG. 9E Detail A, Detail B, and Detail C, respectively) of the deflector 200 profiles of FIGS. 9F, 9G, and 9H, respectively. The curvature of trailing concavity 230 of the deflector 200 profile of FIG. 9I may be different from the curvatures of trailing concavities 230 of the deflector 200 profiles of FIGS. 9F, 9G and 9H.

The blade 111 profile of FIG. 9I is oriented at a blade angle of attack 194-D and may be different from blade angles of attack 194-A of FIG. 9F, 194-B of FIG. 9G, and 194-C of FIG. 9H due to blade twist.

The deflector 200 profile of FIG. 9I is oriented at a deflector angle of attack 259-D and may be different than the angles of attack 259-A, 259-B and 259-C of the deflector 200 profiles of FIGS. 9F, 9G and 9H, respectively.

The leading edge 208 of the deflector 200 profile of FIG. 9I is spaced from the trailing edge 174 of the blade 111 profile of FIG. 9I by a distance of 228-D in the direction toward the oncoming fluid flow 1 (upstream). Distance 228-D of FIG. 9I may be different than distance 228-A of FIG. 9F, distance 228-B of FIG. 9G, and distance 228-C of FIG. 9H due to variations in vertical and/or horizontal skew (described below).

Figure 9J:
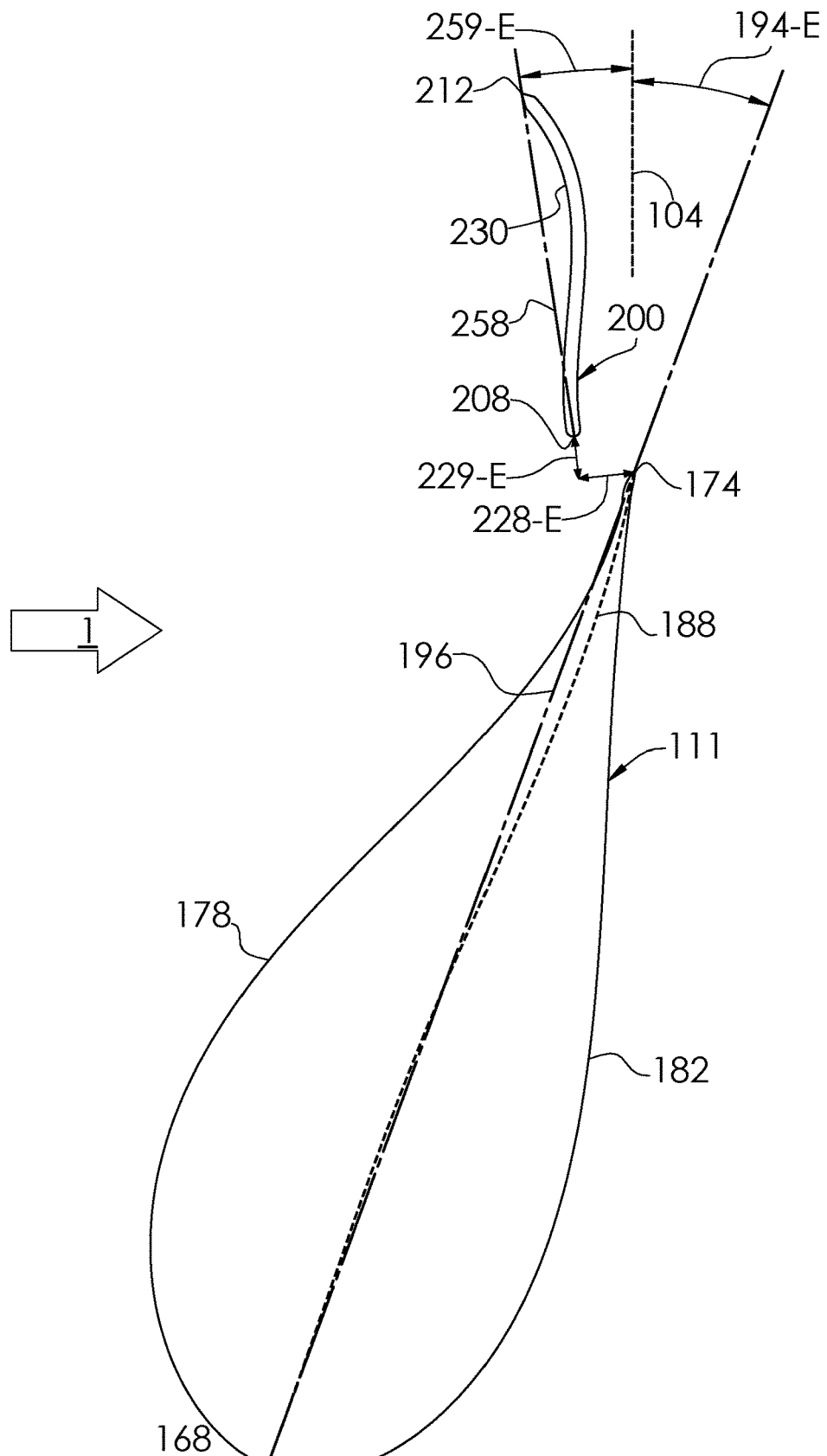
FIG. 9J is a side view of deflector and blade profiles at the deflector hub end, that shows deflector angle of attack and position relative to the blade.

FIG. 9J is an enlarged view of Detail E of FIG. 9E and shows a hub end profile of the blade/deflector assembly. The blade 111 profile of FIG. 9J has a chord line 196 extending from the leading edge 168 through the trailing edge 174 and a mean camber line 188 representing a line that is equidistant from pressure surface 178 and suction surface 182. The blade chord 186-E (see FIG. 9E Detail E) of the blade 111 profile of FIG. 9J may be different (e.g., longer) than the blade chords 186-A, 186-B, 186-C, and 186-D (see FIG. 9E Detail A, Detail B, Detail C, and Detail D, respectively) of the blade 111 profiles of FIGS. 9F, 9G, 9H, and 9I, respectively. In addition, mean camber line 188 of the blade 111 profile of FIG. 9J may differ from mean camber lines 188 of the blade 111 profiles of FIGS. 9F, 9G, 9H, and 9I.

The deflector 200 profile of FIG. 9J has a chord line 258 extending from leading edge 208 through trailing edge 212, and includes a trailing concavity 230. The deflector chord 224-E (see FIG. 9E Detail E) of the deflector 200 profile of FIG. 9J may be different (e.g., longer) than the deflector chords 224-A, 224-B, 224-C, and 224-D (see FIG. 9E Detail A, Detail B, Detail C, and Detail D, respectively) of the deflector 200 profiles of FIGS. 9F, 9G, 9H, and 9I, respectively. The curvature of trailing concavity 230 of the deflector 200 profile of FIG. 9J may be different from the curvatures of trailing concavities 230 of the deflector 200 profiles of FIGS. 9F, 9G, 9H, and 9I.

The blade 111 profile of FIG. 9J is oriented at a blade angle of attack 194-E and may be different from angles of attack 194-A of FIG. 9F, 194-B of FIG. 9G, 194-C of FIG. 9H, and 194-D of FIG. 9I due to blade twist.

The deflector 200 profile of FIG. 9J is oriented at a deflector angle of attack 259-E and may be different than the angles of attack 259-A, 259-B, 259-C and 259-D of the deflector 200 profiles of FIGS. 9F, 9G, 9H, and 9I, respectively.

The leading edge 208 of the deflector 200 profile of FIG. 9J is spaced from the trailing edge 174 of the blade 111 profile of FIG. 9J by a distance of 228-E in the direction toward the oncoming fluid flow 1 (upstream). Distance 228-E of FIG. 9J may be different than distance 228-A of FIG. 9F, distance 228-B of FIG. 9G, distance 228-C of FIG. 9H, and distance 228-D of FIG. 9I due to variations in vertical and/or horizontal skew (described below).

6. Fixed Connectors and Related Structures—FIG. 9K-FIG. 9N

Referring now to FIG. 9K, an embodiment of deflector 200 is fixedly linked to the blade 111 suction side 182 via one or more connector assemblies (or connector brackets) 261. As shown in FIG. 9M, in an embodiment, connector assembly 261 includes a deflector-end flange 271 at which the connector assembly 261 is attached to deflector 200, a blade-end flange 272 at which the connector assembly 261 is attached to rotor blade 111, and a connector tube 270 extending between and connecting blade-end flange 272 and deflector-end flange 271. Flange 272 may have one or more holes 286 for fasteners used to fixedly link assembly 261 to structural members within a blade 111 as described below.

In an embodiment, as shown in FIGS. 9K and 9L, connector assemblies 261 have longitudinal shapes between the rotor blade 111 and the deflector 200 that follow their respective paths of travel 275 of rotation 5 about the rotor axis of rotation 123 (see FIG. 1A) (i.e., each connector assembly 261 conforms to an arc centered on the rotor axis of rotation 123 (see FIG. 1A) and having a radius corresponding to the spanwise position of the connector assembly)). In the illustrated embodiment, as shown in FIG. 9L, connector tube 270 is shaped to conform to path of travel 275 between connecting blade-end flange 272 and deflector-end flange 271 (see FIG. 9M). Other embodiments of deflector connector assemblies may have different longitudinal shapes.

Connector assemblies 261 embody two sets of leading and trailing edges; one set of leading and trailing edges minimizes drag induced by oncoming fluid flow, and a second set of leading and trailing edges minimizes drag induced by rotational fluid flow and apparent velocity 6. Both sets of edges as further described below.

FIG. 9L is a cropped magnified rear view of deflector/blade assembly showing a portion (i.e., tube 270) of single connector assembly 261 extending between blade 111 and deflector 200.

Referring now to FIGS. 9L and 9L Detail A and FIGS. 9M and 9M Detail A, connector assembly 261 includes rotational flow leading edge 276 and rotational flow trailing edge 278, which are oriented to align with the rotational flow and can be oriented at the designer's choice for any particular RPM. That is, tube 270, where shown, extends from the deflector 200 and from blade 111 substantially into the apparent velocity fluid flow 6 passing over the downstream surface 206 and downstream surface 182. Due to a curvature of an outer edge of the tube 270 (i.e., the edge furthest away from downstream surface 206 and downstream surface 182), apparent velocity fluid flow 6 first contacts portion 276 of an outer edge of the tube 270, flows around the tube 270, and then flows past portion 278 of the outer edge of the tube 270. Leading edge 276 begins at the point nearest the oncoming rotational flow, and apparent velocity fluid flow 6, and ends at an apex 277 of the curvature of tube 270 (see FIG. 9M and FIG. 9L Detail A). The rotational flow trailing edge 278 begins at apex 277 and ends at the point of connector assembly 261 nearest the deflector trailing edge 212.

Referring now to FIG. 9M Detail A, which is a cross-section along line A-A in FIG. 9M, while still referring to FIG. 9L, a longitudinal cutaway of connector assembly 261 reveals the elliptical shape of an embodiment of tube 270. Section A-A of tube 270 may have an aerodynamic shape with tapered ends to the leading edge 276 and to trailing edge 278 and may be laterally symmetric about a line bisecting the section between leading edge 276 and trailing edge 278. Exemplary shapes may include elliptical, an ogive, a spherically blunted ogive, or parabolic, among other similar shapes.

Referring now FIG. 9L Detail A, the longitudinal shape of connector assembly 261 follows the arc of rotational path of travel 275 from the leading edge 276 to trailing edge 278.

Referring now to FIG. 9M Detail B, which is a cross-section along line B-B in FIG. 9M, while still referring to FIG. 9M, tube 270 has a leading edge 273, oriented toward the oncoming fluid flow 1, and an opposite trailing edge 274. Tube 270 is oriented with respect to blade 111 and deflector 200 so that, when the blade/deflector assembly is in a static, non-rotating, state, oncoming fluid flow 1, flows around the tube 270 from leading edge 273 to trailing edge 274. Section B-B of tube 270 may have an aerodynamic shape with tapered ends to the leading edge 273 and to the trailing edge 274 and may be laterally symmetric about a line bisecting the section between leading edge 273 and trailing edge 274. Exemplary shapes may include elliptical, an ogive, a spherically blunted ogive, or parabolic, among other similar shapes.

Accordingly, tube 270 defines two sets of leading and trailing edges, leading edge 273 and trailing edge 274 with respect to oncoming fluid flow impinging on a static blade deflector assembly, and leading edge 276 and trailing edge 278 with respect to apparent fluid flow impinging on a rotating blade deflector assembly. The connector tube 270 leading edge 273, trailing edge 274, leading edge 276 and trailing edge 278 (collectively "connector tube edges") reduce drag, e.g. by reducing the drag coefficient, i.e., a tapered edge has a lower drag coefficient than does a square edge. Note that trailing edge 274 encompasses both leading edge 276 and trailing edge 278. The geometry of tube 270 can be altered such that its cross-section more benefits low speed—whereby leading and trailing edges 273 and 247 are more tapered, or benefits high speed, where leading and trailing edges 276 and 278 are more tapered.

Referring now to FIG. 9N, in an embodiment, the leading edge 208 of deflector 200 is positioned near the blade trailing edge 174. The deflector-end flange 271 is connected to deflector 200 (e.g., by mechanical fasteners (screws, bolts, rivets), adhesive, welding, co-molding, inter-laminating, or some combination(s) thereof) so that the flange 271 is preferably embedded within the thickness of deflector 200 between the upstream surface 204 and the downstream surface 206. The blade-end flange 272 is fixedly linked to the u-shaped webs 116 and 117 within blade 111 via fasteners 287. In another embodiment, deflector to blade connectors may be externally fixedly linked to deflector 200 and/or blade 111. Reinforcements 114 and 115 are fixedly linked within blade 111 and strengthen it where it is fixedly linked to the webs 116 and 117. Webs 116 and 117 and reinforcements 114 and 115 may run along any length of the blade span 154 (see FIG. 2A.)

Connector assemblies 261 conform to the twist of the deflector/blade assembly and the concavity and convexity of deflector 200 thus the (i) twist and/or, (ii) length or angle of connector assemblies 261 may vary over the deflector span 223 (see FIG. 9A).

7. Working Principles, Flow Simulation Results and Physical Test Results

The units of pressure in the plots referenced in this Section are expressed in Pascals (Pa).

The deflector 200 increases and decreases pressure and/or velocity where desired on the blade 111 (see FIGS. 2A and 2B) resulting in positive torque increases on blade 111 with the benefit of a deflector 200 as compared to a similar blade 111 without the benefit of a deflector 200. Consequently, a blade 111 benefited by a deflector 200 has a global torque at a given fluid speed that is higher than a similar blade operating under the same conditions without a deflector, e.g., a blade with a deflector running in an 8-mph wind speed performs similarly to a similar blade without a deflector running in an 11-mph wind speed.

The figures containing profiles and isometric views of blades and deflector/blade assemblies referred to in this Section, and plots contained in the referenced figures, are as obtained from flow simulation and correlate with performance data observed during physical testing of scaled physical models. The CAD model of the rotor used in the Section is 93 meters in diameter. Pressures and suctions recorded in all profile and isometric views in this Section were measured at a distance of 41.66 meters from the rotor axis of rotation 123 (see FIG. 1).

7.1 Fluid Flow and Pressures Prior to Rotation—FIG. 10A-FIG. 10F

Figure 10B:
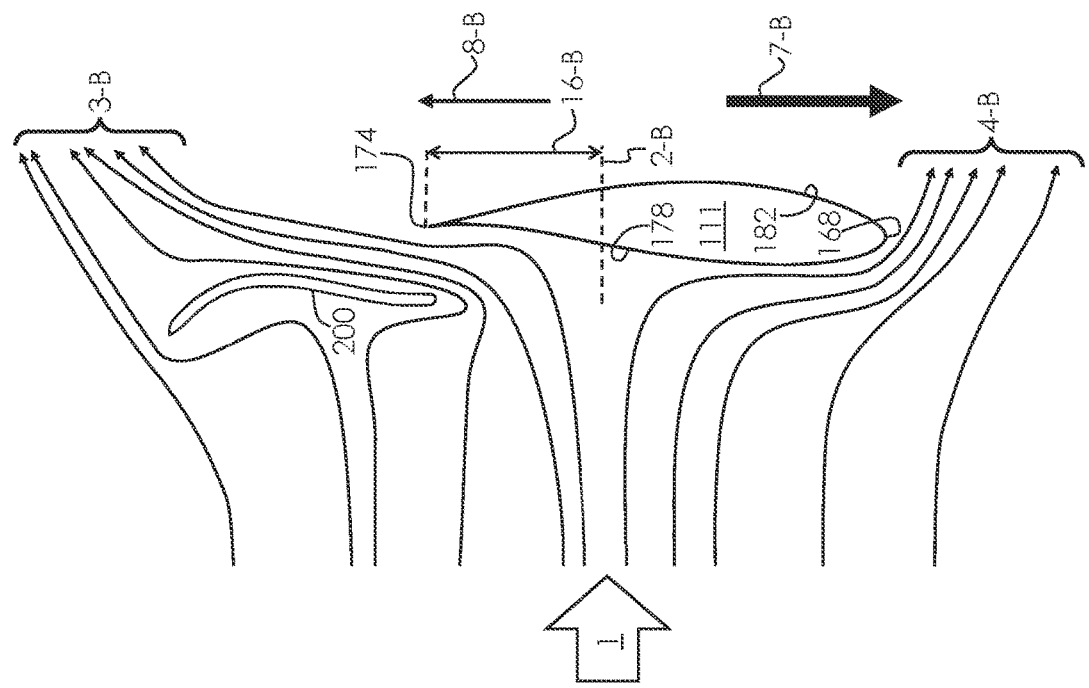
FIG. 10B is a side view of flow trajectory lines impacting a blade pressure surface and a deflector of a deflector/blade assembly, while the deflector/blade assembly is in a static position and exposed to in a 2.0 m/s wind.
Figure 10A:
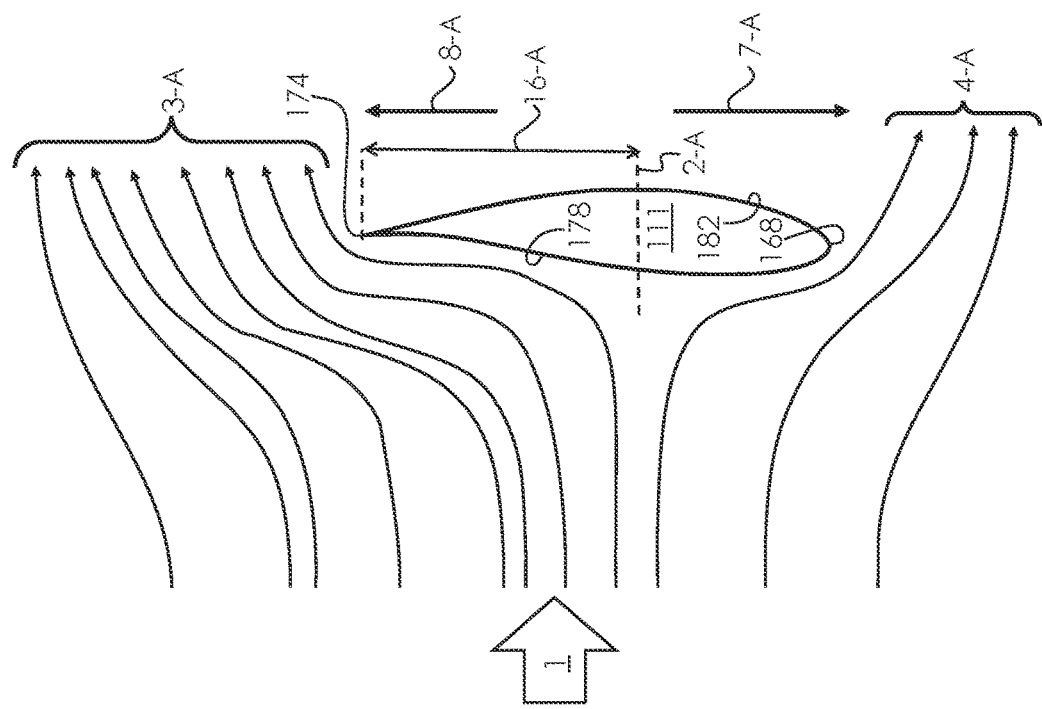
FIG. 10A is a side view of flow trajectory lines impacting a blade pressure surface, without a deflector, while the blade is in a static position and exposed to a 2.0 m/s wind.

FIG. 10A is a side view of a section of a static, non-rotating blade 111 without a deflector 200 and shows flow trajectory lines around the blade 111. FIG. 10B is a side view of a section of a static, non-rotating deflector/blade assembly, including the blade 111 and associated deflector 200, and shows flow trajectory lines around the deflector/blade assembly. The velocity of fluid flow 1 in FIGS. 10A and 10B is so low (e.g., 2.0 m/s) that blade 111 has not begun to rotate due to mechanical resistance, e.g., due to the generator 128 (see FIG. 1B) and/or due to overcoming the inertia of rotor 110 (See FIG. 1A).

Referring now to FIG. 10A, fluid flow 1 impacting the pressure surface 178 of the blade 111 exhibits a pressure side transition point 2-A at a distance 16-A from the blade trailing edge 174. The transition point 2-A is where the oncoming fluid flow 1 separates, with (i) a portion of the fluid flow 3-A being pushed toward and accelerating around blade trailing edge 174 (up in the illustration) of the blade 111, and a portion of the fluid flow 4-A being pushed toward and accelerating around leading edge 168 of the blade 111 (downward in the illustration). Fluid flow 4-A that moves windward past leading edge 168 results in a suction side 182 low pressure and desirable positive torque 7-A. Fluid flow 3-A that moves windward over blade trailing edge 174 results in a suction side 182 low pressure and undesirable negative torque 8-A.

Referring now to FIG. 10B while still referring to FIG. 10A, deflector 200 deflects a portion of the oncoming fluid flow 1 that would otherwise pass behind (above in the illustration) the blade's trailing edge 174 without impacting the blade 111, and causes a portion of the oncoming fluid flow 1 that would impact the blade near its trailing edge 174, irrespective of the deflector 200, to flow toward (downward in the illustration) and around the blade's leading edge 168. The deflected flow results in (i) more fluid volume passing over the blade pressure surface 178, including toward and past the leading edge 168, and consequently across the suction surface 182, and consequently (ii) increasing and decreasing pressures as desired on the pressure surface 178 beneficial areas (see Subsections 1.2 and 1.3), and (iii) increasing and decreasing suction as desired in beneficial areas (see Subsections 1.2 and 1.3) on the suction surface 182.

The increased flow volume flowing around the leading edge 168 of blade 111 increases the pressure as desired between a transition point 2-B and blade trailing edge 174 (see beneficial area 16—see FIG. 2G). The increased volume and pressure causes: (i) the pressure side transition point 2-B of the deflector/blade assembly to move closer to the blade trailing edge 174 as compared to transition point 2-A, thus reducing distance 16-B between the transition point 2-B and the blade trailing edge 174 as compared to distance 16-A in FIG. 10A, (ii) a lessor fluid flow 3-B of the oncoming fluid flow 1 to be pushed toward and around the blade trailing edge 174 thus reducing the detrimental suction and negative torque in beneficial area 16 (see FIG. 2G), and (iii) a greater fluid flow 4B to be pushed toward and around the blade leading edge 168 as compared to fluid flow 4A in FIG. 10A, thus increasing the suction in beneficial area 14 (see FIG. 2G) on the blade suction side 178.

The additional fluid flow 4-B on the pressure side 178 of the blade 111 of the deflector/blade assembly of FIG. 10B is compounded and pushed by the oncoming fluid flow 1 past the blade leading edge 168, thereby reducing pressure on the suction side 182 of the blade 111 between the transition point 2-B and the blade leading edge 168 as compared to a blade 111 without the benefit of a deflector 200 (see FIG. 10A, i.e., as compared to a blade having less fluid flow 4-A around the blade leading edge 168).

Consequently, the additional flow volume from deflector 200 results in (i) reduced detrimental suction and negative torque 8-B as compared to 8-A, (ii) increased desirable suction and greater positive torque 7-B as compared to 7-A, and (iii) increased global torque on the blade 111 with the benefit of deflector 200 (FIG. 10B) as compared to the blade 111 without the benefit of the deflector 200 (FIG. 10A).

Figure 10D:
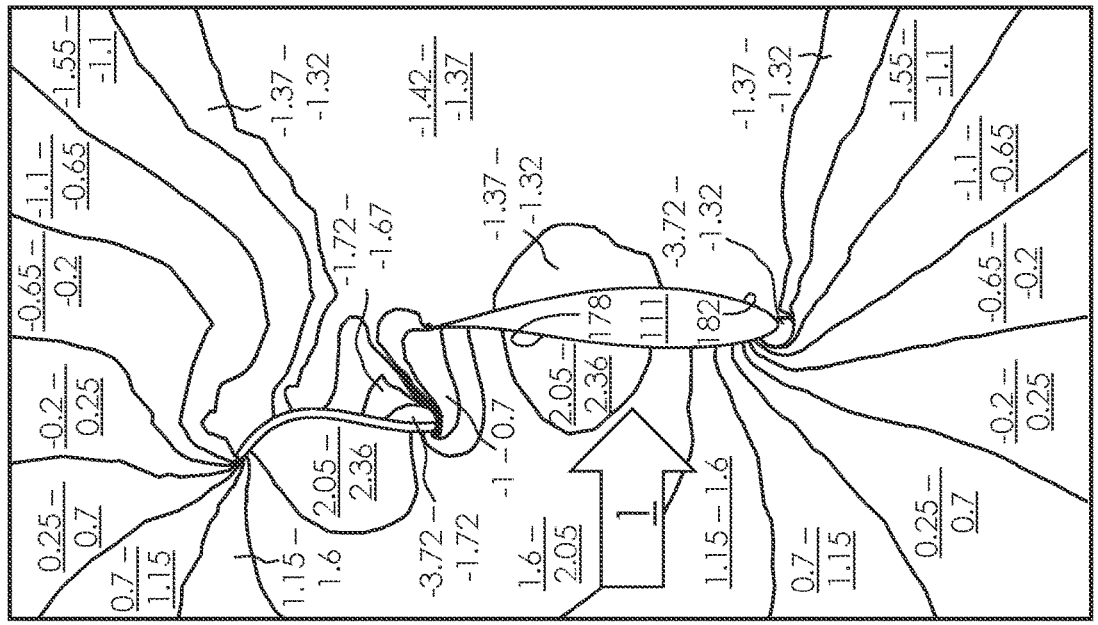
FIG. 10D is a side view of a pressure plot around upstream and downstream surfaces of the deflector/blade assembly of FIG. 10B.
Figure 10C:
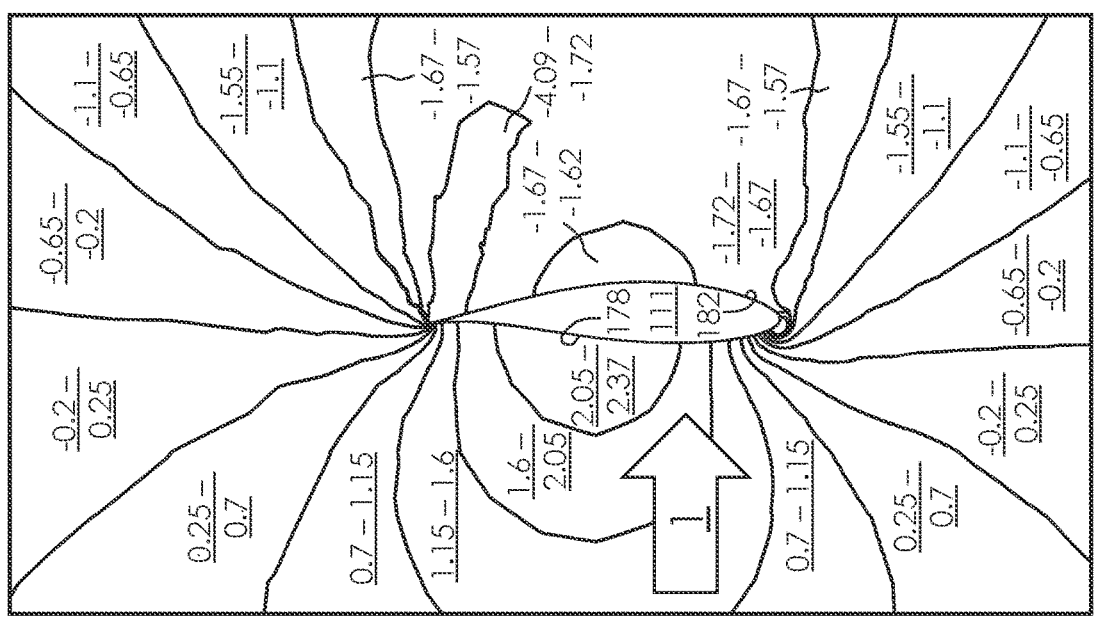
FIG. 10C is a side view of a pressure plot around upstream and downstream surfaces of the blade of FIG. 10A.

FIG. 10C is a side view of a pressure plot around the blade surfaces of the blade of FIG. 10A, and FIG. 10D is a side view of a pressure plot around the blade and deflector surfaces of the deflector/blade assembly of FIG. 10B. Referring now to FIG. 10C and FIG. 10D, performance improvements seen in pressures are visible when comparing the two pressure plots, and are very significant near the blade trailing edge 174 (see FIGS. 10C and 10D) of the blade suction side 182 where the minimum pressure of −4.09 Pa on the blade 111 without the benefit of a deflector 200 in FIG. 10C (pressure region −4.09--1.72 Pa) has dropped more than 2.5 times to −1.42 Pa in FIG. 10D in the same area on the suction side of the blade 111 that is benefited by deflector 200 (pressure region −1.42--1.37 Pa). It is important to note that the performance improvements shown in the plots (FIGS. 10C and 10D) are occurring near the blade tip end 151 (see FIG. 9E Detail A) where the moment arm is the longest, thus contributing to the blade benefited by the deflector beginning to rotate sooner, and in a lower fluid speed, than the blade not benefited by the deflector.

The 93 meter CAD model described above, and which flow analysis results follow, was scaled down by 146.4 times and its chord was truncated by three percent (3%) to accommodate 3D print technology. The physical diameter is 25 inches. Its performance was measured with redundant sensors, all with the same results, and recorded with a programmable logic controller. Sample physical test performance data comparing scaled model rotors having blades with and without deflectors, with both rotors under the identical load (resistance), from 0-15.5 m/s. The results from the 0-2.68 m/s are included in the table below. As demonstrated by the test data, rotor rotation was initiated at a lower wind speed for the rotor having blades with deflectors, and rotor rotation at the same wind speed is higher for the rotor having blades with deflectors.

| Wind speed (m/s) | Blade without deflector RPM | Blade with deflector RPM |
|---|---|---|
| 1.16 | 0 | 8 |
| 1.88 | 0 | 86 |
| 2.68 | 62 | 148 |

Figure 10E:
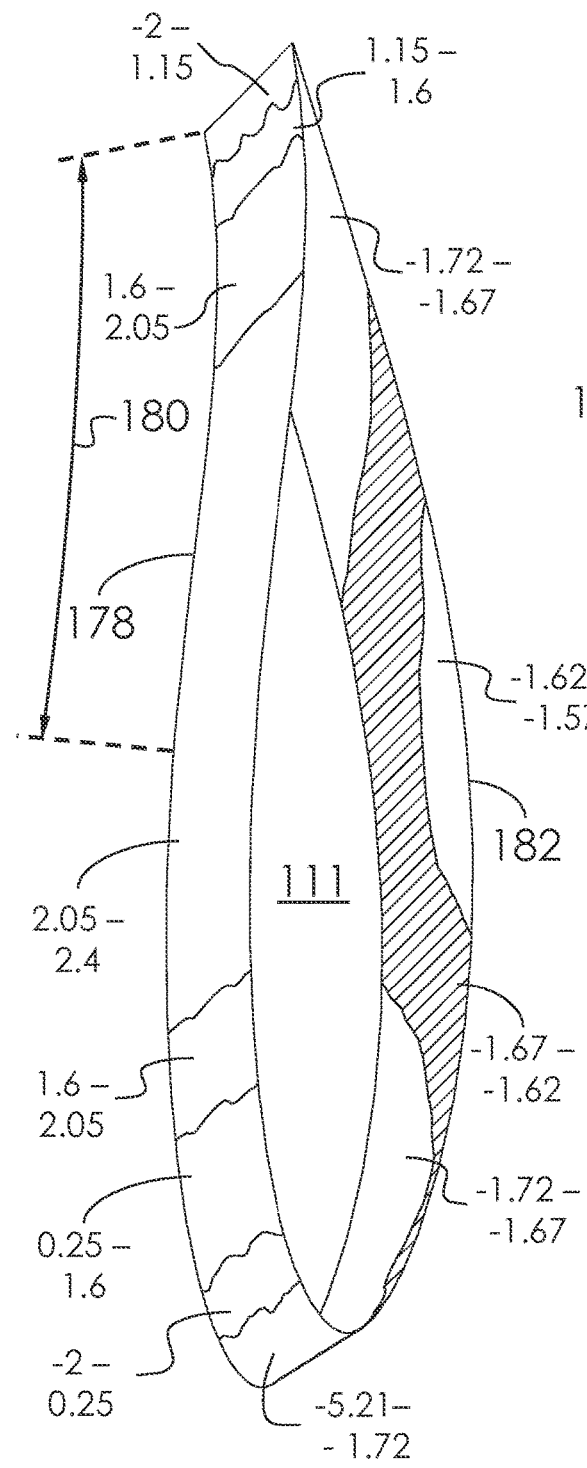
FIG. 10E is a magnified side isometric view of a section of the blade of FIG. 10A showing surface pressures on the upstream and downstream surfaces of the section and in which pressure regions are displayed on the outside of the upstream surface and on the inside of the downstream surface.
Figure 10F:
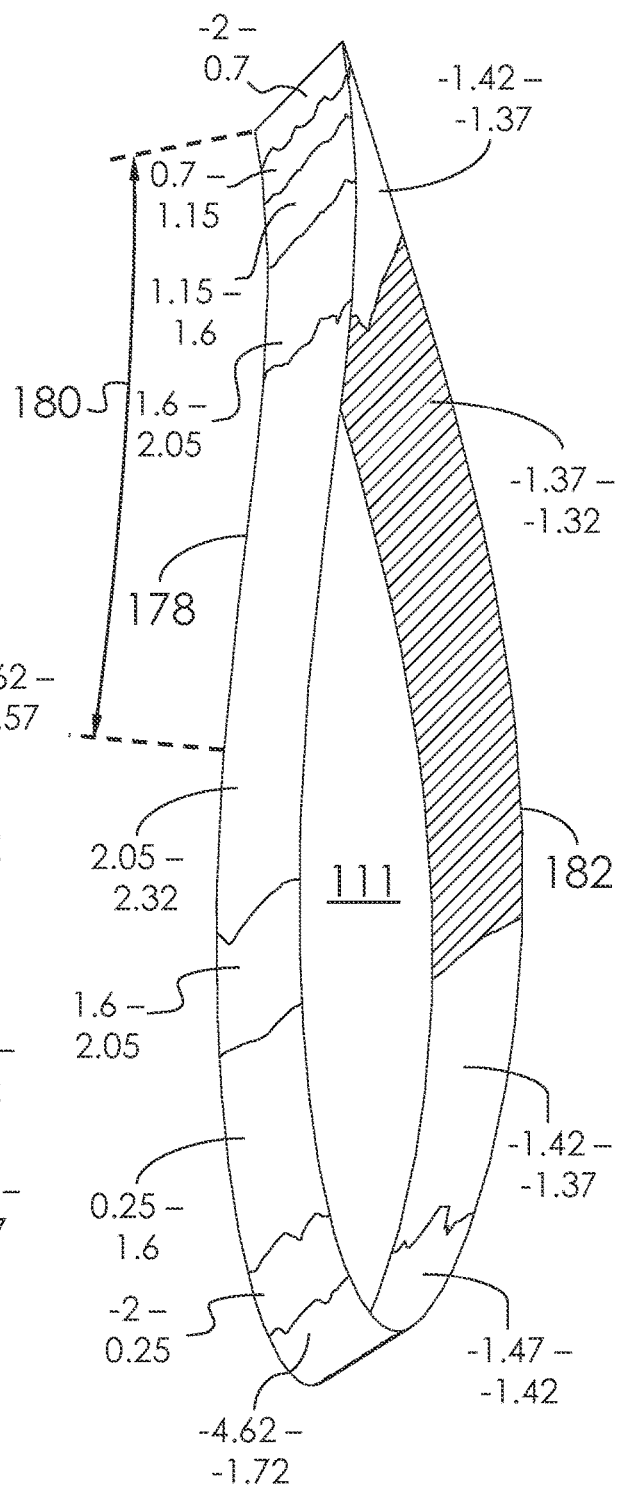
FIG. 10F is a magnified side isometric view of a section of the blade of FIG. 10B (the deflector is not shown in the figure) showing surface pressures on the pressure and suction surfaces of the section.

Referring now to FIGS. 10E and 10F, both of which are magnified side isometric views of FIGS. 10A and 10B respectively, showing surface pressures on the upstream and downstream surfaces of the section and in which pressure regions are displayed on the outside of the upstream surface and on the inside of the downstream surface. Significant performance improvements can be seen over suction surface 182 of the blade 111. For example, the narrow-crosshatched portion of the suction surface of blade 111 benefited by a deflector 200 (see FIG. 10F) has a lower pressure magnitude of −1.37-1.32 Pa than does the suction surface of a blade without the benefit of a deflector 200 with a pressure magnitude of −1.67-1.62 Pa (see FIG. 10E) and in beneficial area 16 (see FIG. 2G) where a lower pressure has a performance benefit as this is an area at which negative torque is generated.

7.2 Fluid Flow and Pressures During Rotation at 3.5 m/s—FIGS. 11A-J

The figures in this Subsection depict flow simulation results from a 93 meter diameter rotor, studied in an oncoming fluid flow 1 speed of 3.5 m/s, rotating at 4.3 RPM in the desired counterclockwise rotation 5 (down in the illustration) about the rotor axis of rotation 123 of the rotor 110 (see FIG. 1A). The profile views and center of the isometric views show results obtained at a distance of 41.66 meters from the rotor axis of rotation 123 (see FIG. 1A). At such distance from the hub axis, the profile views and center of the isometric views in this Subsection are rotating at a circumferential speed of 18.8 m/s.

Figure 11B:
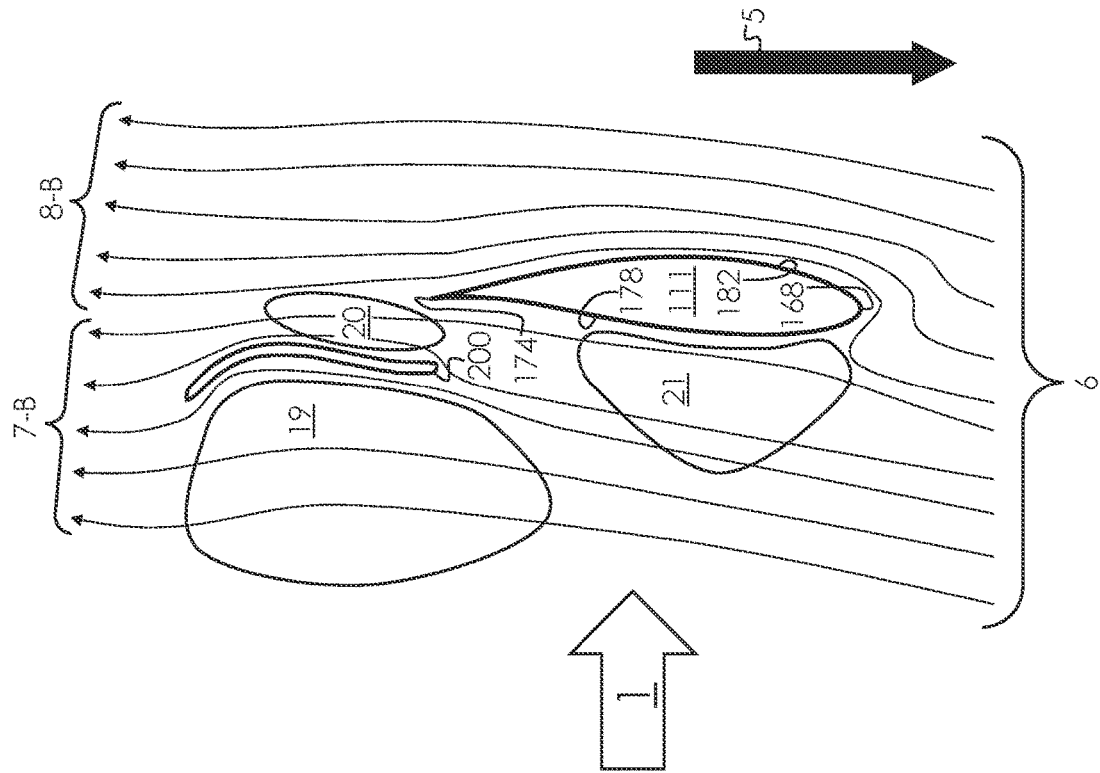
FIG. 11B is a side view of apparent velocity flow trajectory lines around sections of blade and deflector surfaces near the tip of a deflector/blade assembly rotating in a 3.5 m/s wind, with the benefit of a deflector, including illustrative high and low pressure regions.
Figure 11A:
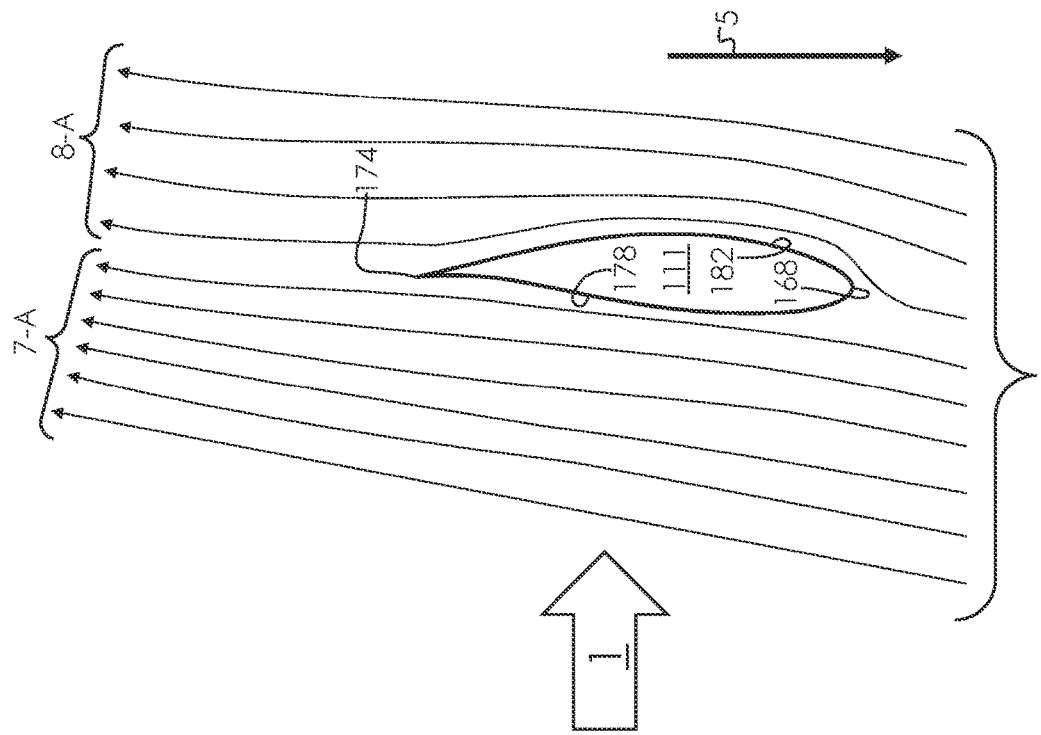
FIG. 11A is a side view of apparent velocity flow trajectory lines around a section of blade surfaces near the tip of a blade rotating in a 3.5 m/s wind, without the benefit of a deflector.

FIG. 11A is a side view of a section of a rotating blade 111, without a deflector, which shows apparent velocity flow trajectory lines around the pressure (upstream) surface 178 and suction (downstream) surface 182 of the blade. FIG. 11B is a side view of a section of a rotating deflector/blade assembly, including a blade 111 and a deflector 200, near the tip of the blade as described above, which shows apparent velocity flow trajectory lines around the pressure (upstream) surface 178 and suction (downstream) surface 182 of the deflector/blade assembly and representative pressure regions. Although it is expected the blade in FIG. 11B would rotate faster than the blade in FIG. 11A due to improved blade pressure conditions caused by the deflector, which physical testing confirms, the flow analysis did not include a feedback loop for determining RPM based on blade pressure. Thus, for purposes of the flow analysis, the RPM was artificially set at the same level for both blades, with and without a deflector. Accordingly, it is expected that the performance results observed in the flow analysis and reported herein are actually understated for the blade with a deflector.

Referring now to FIG. 11A, the fluid flow from apparent velocity 6 separates as it nears the blade leading edge 168, with fluid flow 7-A passing adjacent to the pressure side 178 of blade 111, and fluid flow 8-A accelerating adjacent to the suction side 182 of blade 111. The pressure differential between the pressure side 178 and the suction side 182 and its interaction with the geometry of blade 111 causes blade 111 to rotate in the desired counterclockwise rotation 5.

Referring now to FIG. 11B, while still referring to FIG. 11A, as the apparent velocity 6 nears the blade leading edge 168, it separates differently than it would without the benefit of a deflector 200, with a greater amount of apparent velocity 8-B passing adjacent to blade suction side 182. The difference is caused by the deflector 200 creating a high-pressure area 19 on the upstream side of the deflector 200 and a high-velocity-low-pressure area 20 on the downstream side of the deflector 200, which offsets drag resulting from high pressure area 19, as further described below.

The high-pressure area 19: (i) increases in size and magnitude by the oncoming fluid flow 1 impinging on the deflector 200 and which would otherwise not affect the performance of blade 111 if it was not benefited by a deflector 200, (ii) appreciably increases the pressure in area 21 (increase in size and magnitude) adjacent to blade pressure surface 178 in beneficial area 10 (see FIG. 2G) and consequently by diverting more apparent velocity fluid flow 6 over the blade suction surface 182, thus increasing fluid flow 8-B and positive torque on the blade suction surface 182 as compared to 8-A in FIG. 11A, (iii) slows the apparent velocity of fluid flow 7-B as it nears and passes the blade pressure side 178, and (iv) reduces the volume and velocity of fluid flow 7-B adjacent to the blade concavity 180 (see also FIG. 2A Detail A-C), which collectively results in a positive torque on the pressure surface 178 and increasing global torque on blade 111 as compared to a blade 111 without the benefit of deflector 200 in FIG. 11B which has a negative torque on its pressure surface 178A negative torque on the pressure surface in FIG. 11B without the benefit of deflector 200.

The high-pressure area 21 on pressure surface 178 of blade 111 results in a greater portion of the apparent velocity 6 that is approaching the blade leading edge 168 to change direction and flow over the suction surface 182 rather than the pressure surface 178 (which would normally cause additional drag on the pressure surface 178 in beneficial area 11 (see FIG. 2G)), thereby converting an undesirable pressure side 178 drag force into a desirable suction surface 182 force near the blade leading edge 168 where it benefits performance by increasing positive torque. High pressure area 21 also results in the apparent velocity fluid flow 6 accelerating at a higher velocity adjacent to the suction surface 182. The increased flow at higher velocity over suction surface 182 results in a greater suction from the leading edge 182 through beneficial area 15 (see FIG. 2G), and consequently greater positive torque on the suction side 182 of the blade 111 than occurs on a blade 111 without the benefit of deflector 200.

Figure 11D:
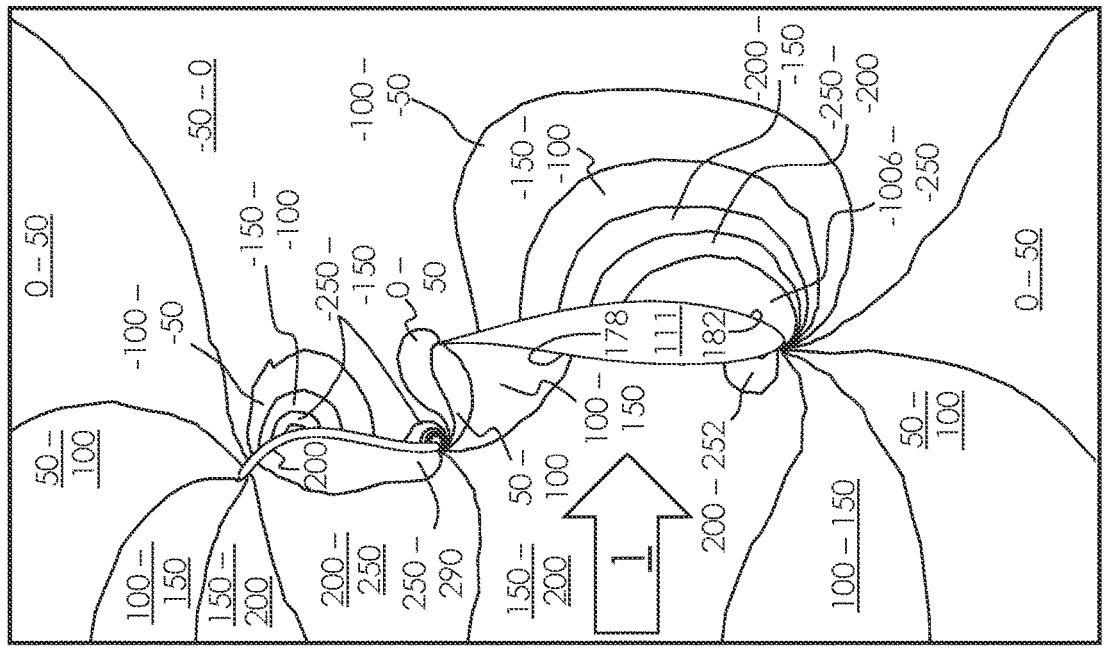
FIG. 11D is a side view of a pressure plot around upstream and downstream surfaces of the deflector/blade assembly of FIG. 11B.
Figure 11C:
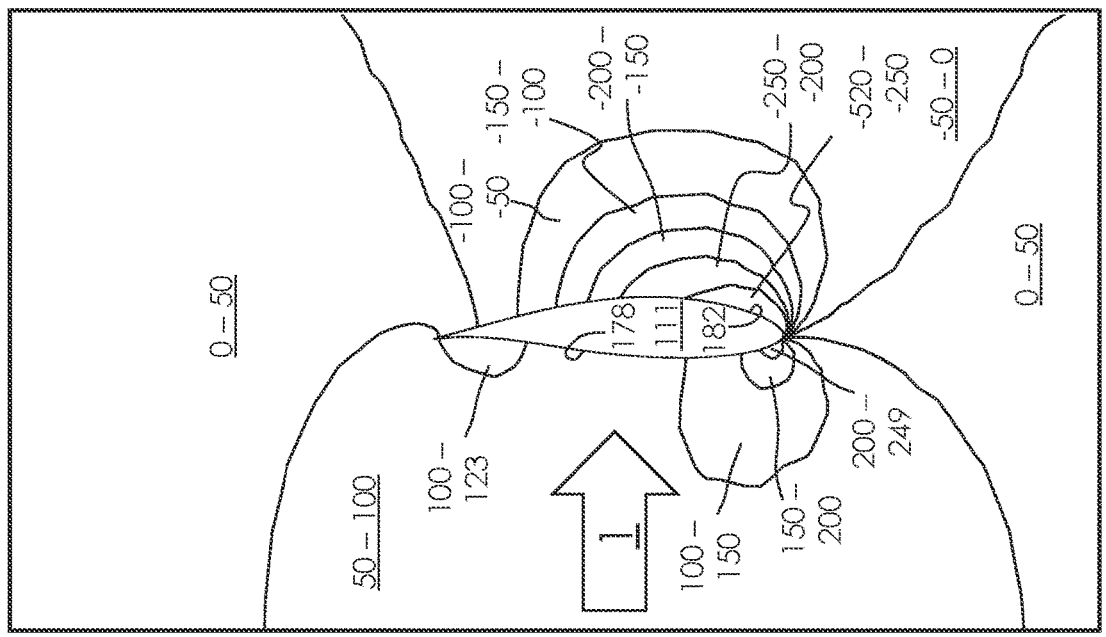
FIG. 11C is a side view of a pressure plot around upstream and downstream surfaces of the blade of FIG. 11A.

Referring now to FIG. 11C and FIG. 11D, performance improvements are exemplary of beneficial pressure changes along the blade span 154 (see FIG. 2A). For example, referring now to FIG. 11C, the (i) pressure on the blade pressure side 178 beneficial area 10 (see FIG. 2G) is 100-123 Pa on the blade 111 without the benefit of deflector 200 as compared to 100-150 Pa on blade 111 with the benefit of deflector 200 covering more than 1.5 times the surface of the beneficial area 10 (see FIG. 2G), and (ii) suction on the suction side 182 near the leading edge on a blade 111, in beneficial area 14 (see FIG. 2G) without the benefit of a deflector 200 is −520-−250 Pa as compared to −1006-−250 on a blade 111 with the benefit of a deflector 200 (see FIG. 11D). Consequently, both the blade pressure side 178 and suction side 182 generate greater positive torque due to the deflector 200.

Figure 11E:
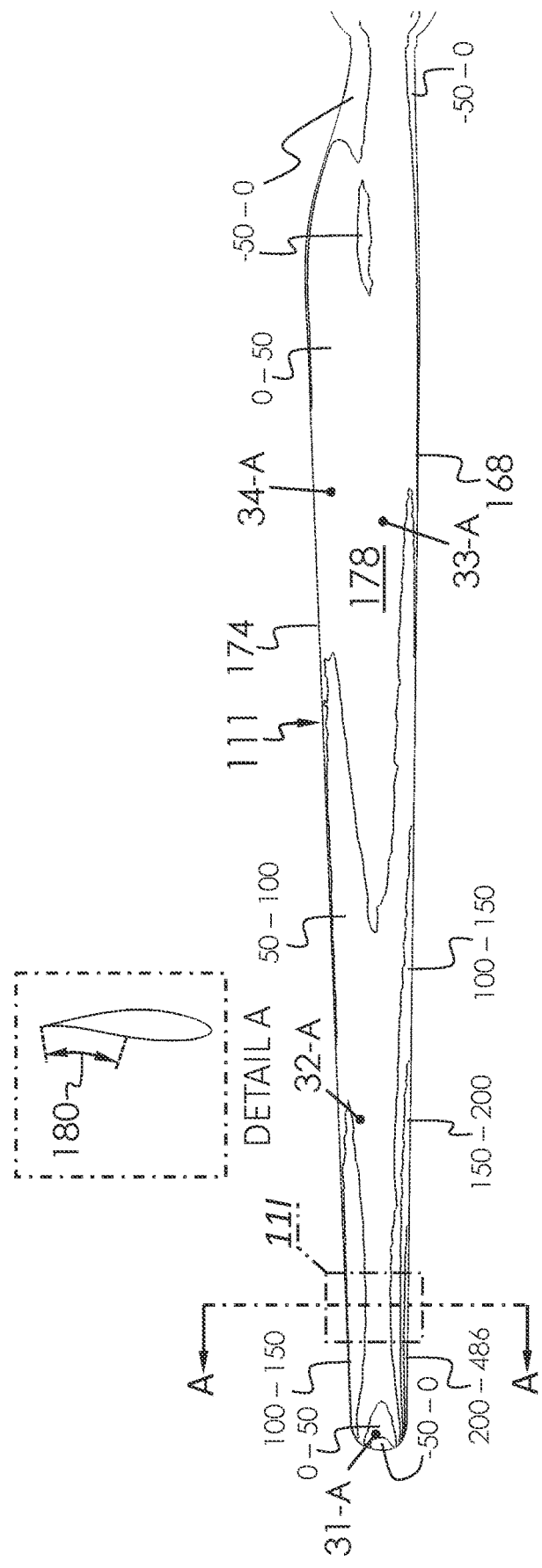
FIG. 11E is a front view showing an upstream surface of a blade, without the benefit of a deflector, with pressure regions and associated fluid pressures, shown in a 3.5 m/s wind, with a magnified detail-profile view of the blade near the tip end.
Figure 11F:
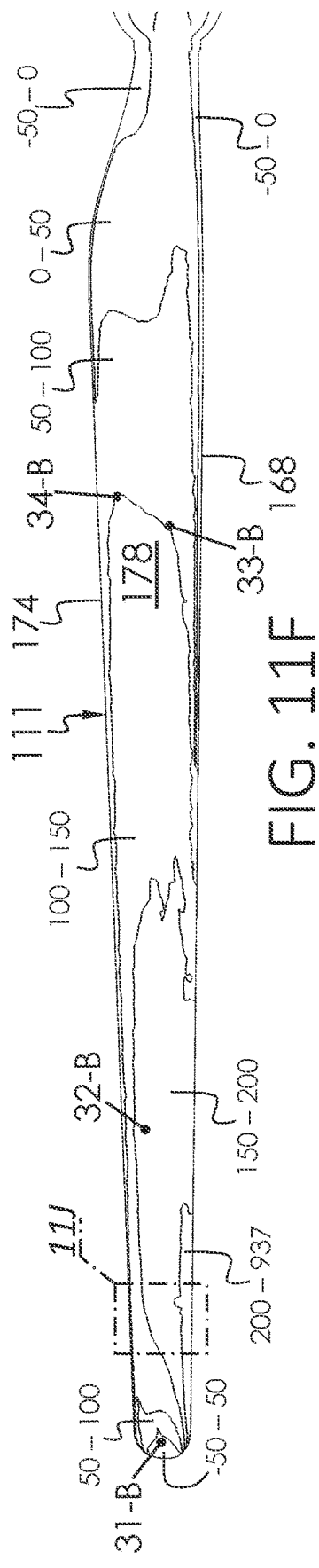
FIG. 11F is a front view showing an upstream surface of the blade of a deflector/blade assembly (but with the deflector not shown in the figure), with pressure regions and associated fluid pressures, shown in a 3.5 m/s wind.

Referring now to FIG. 11E and FIG. 11F, the benefits of the deflector 200 in a 3.5 m/s wind on the pressure surface 178 are apparent along the blade span 154 (see FIG. 2A). For example, the pressure on the trailing concavity 180 is 100-150 Pa over about twenty-eight percent (28%) of the blade 111 span 154 (see FIG. 2A), without the benefit of deflector 200 (see FIG. 11E), as compared to 100-150 Pa over at least seventy-nine percent (79%) of the blade 111 span 154 (see FIG. 2A) with the benefit of deflector 200 (see FIG. 11F). Also, the higher pressures shown in FIG. 11F are in a more beneficial area due to their increased slope angles (see Subsection 1.2) on the blade, i.e., an area of the blade geometry for which the pressure difference benefits blade (rotor) performance. The deflector 200 (see FIG. 9A) is not shown in the pressure plots shown in FIGS. 11F, 11H and 11J.

Figure 11G:
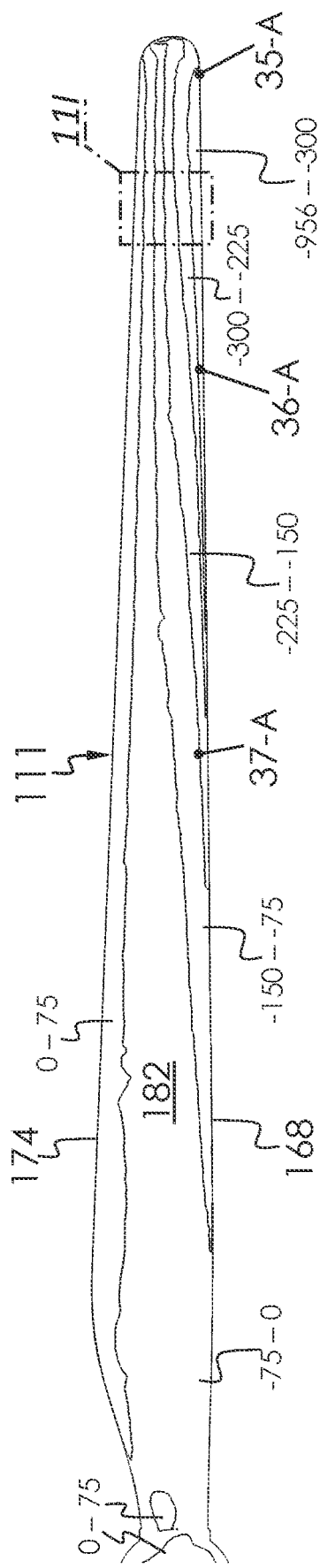
FIG. 11G is a rear view showing a downstream surface of a blade, without the benefit of a deflector, with pressure regions and associated fluid pressures, shown in a 3.5 m/s wind.
Figure 11H:
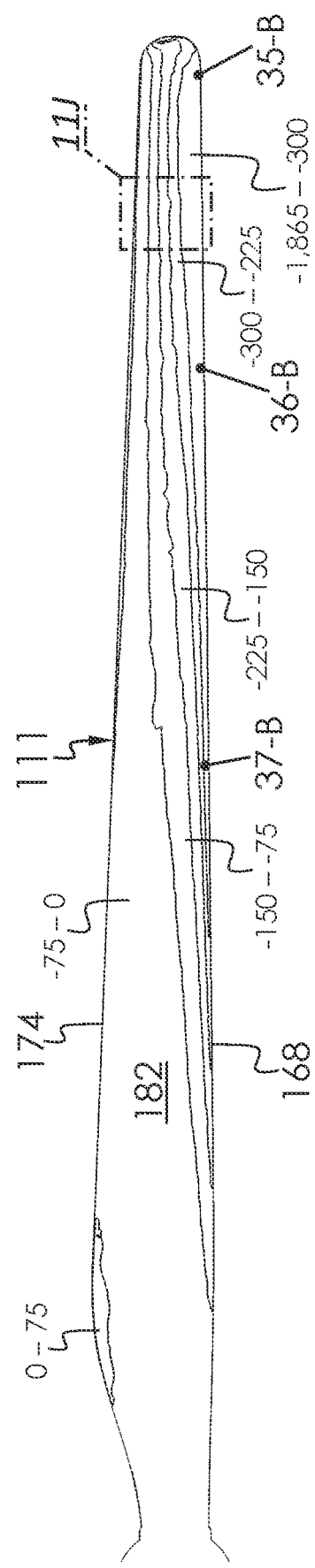
FIG. 11H is a rear view of showing a downstream surface of the blade of a deflector/blade assembly (but with the deflector not shown in the figure), with pressure regions and associated fluid pressures, shown in a 3.5 m/s wind.

Referring now to FIG. 11G and FIG. 11H, the benefits of the deflector 200 in a 3.5 m/s wind on the suction (downstream) surface 182 occur along the blade span 154 (see FIG. 2A). For example, the suction on the suction side 182 near the tip on a blade 111 and near the leading edge 168 without the benefit of a deflector 200 is −956-−300 Pa (see FIG. 11G) as compared to −1865-−300 on a blade near the tip and near the leading edge with the benefit of a deflector 200 (see FIG. 11H)—nearly double the maximum suction. Also, as can be seen by comparing FIG. 11G and FIG. 11H, the area over which the pressure on the suction surface is −1865-−300 Pa with a deflector (FIG. 11H) is more than 3 times the size the area over which the pressure on the suction surface is −956-−300 Pa without a deflector (FIG. 11G).

Figures 11I, 11J:
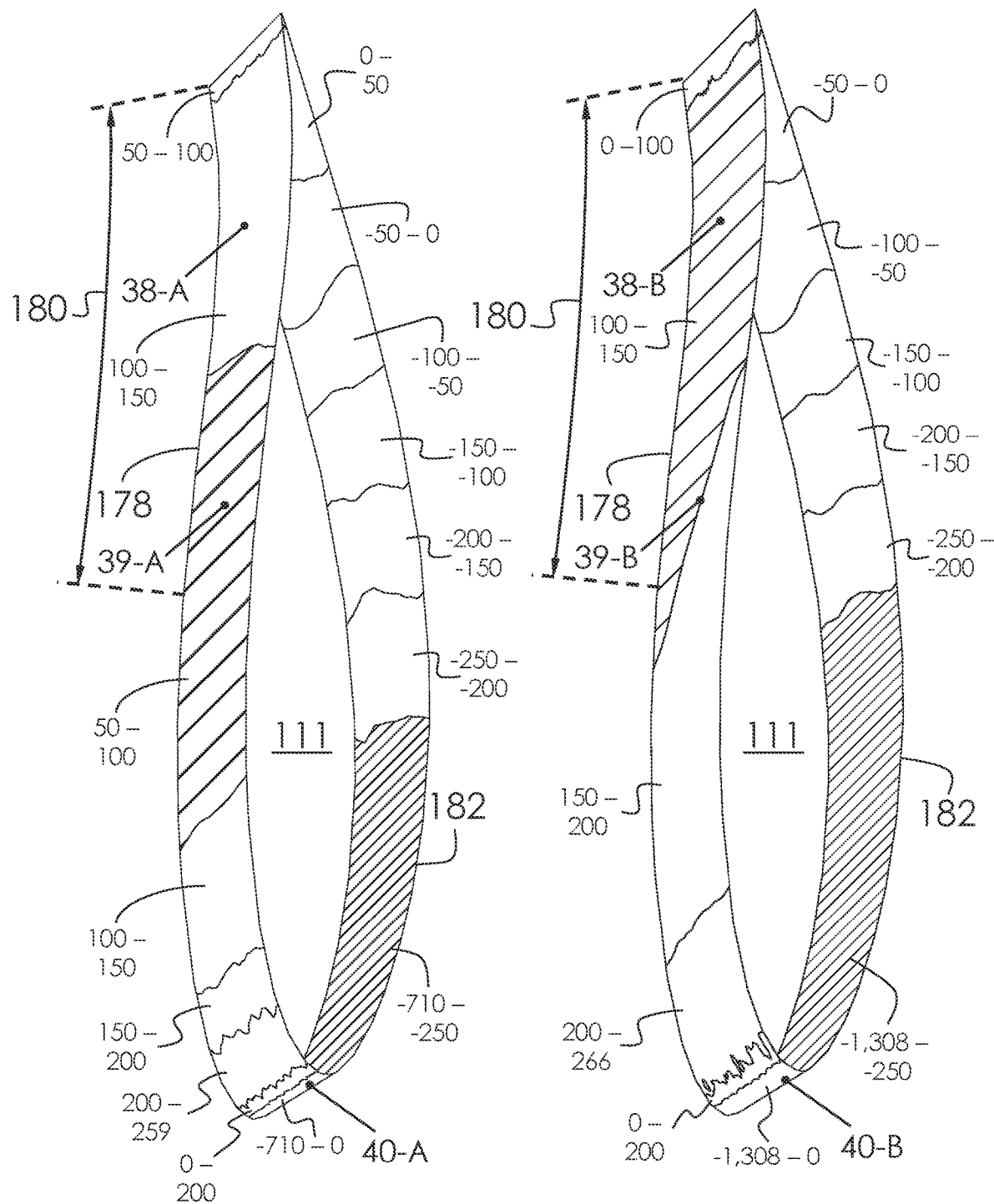
FIG. 11I is a magnified side isometric view of section "11I" of the blade of FIGS. 11E and 11G showing surface pressures on the upstream and downstream surfaces of the section.
FIG. 11J is a magnified side isometric view of section "11J" of the blade of FIGS. 11F and 11H (the deflector is not shown in the figure) showing surface pressures on the pressure and suction surfaces of the section.

Referring now to FIGS. 11I and 11J, both of which are magnified side isometric views of section 111 of FIGS. 11E and 11G, and section 11J of FIGS. 11F and 11G, respectively, surface pressures are shown on the respective pressure surfaces and suction surfaces.

The benefit of deflector 200 in a 3.5 m/s wind on the upstream and downstream surfaces of a section of blade 111 (see FIG. 11J) is shown on a section of blade 111 in the same wind speed without the benefit of a deflector 200 (see FIG. 11I). For example, on blade 111 without the benefit of a deflector 200 (see FIG. 11I), the pressure on a large portion of pressure surface 178, with wide crosshatching, is 50 Pa-100 Pa in an area with a small slope angle thus less beneficial part of area 10 (see Subsections 1.2-1.3) as compared to 100 Pa-150 Pa shown in the wide crosshatched area on pressure surface 178 on a blade 111 with the benefit of deflector 200 (see FIG. 11J), and entirely in beneficial area and with a greater slope angle (see Subsections 1.2-1.3). Also on blade 111 without the benefit of a deflector 200 (FIG. 11I), the suction on the suction side 182 shown in narrow crosshatching is −710-−250 Pa as compared to −1308-−250 Pa shown in the narrow crosshatched area on the suction surface 182 on a blade 111 with the benefit of a deflector 200 (FIG. 11J), and in a greater beneficial area (see Subsections 1.2-1.3). The increased negative pressure on the suction side 182 near the leading edge 168 due to the deflector 200 generates higher positive torque further adding to the performance improvement seen on the blade with the benefit of the deflector 200.

Additional examples of performance improvements via comparisons of common points on the pressure surface 178 and suction surface 182 on blade 111 between the blade without the benefit of the deflector and the blade with the deflector, are shown in the table below. However, it is important to note that the pressure side 182 of blade 111 has areas that ideally benefit from pressure, and other areas that ideally benefit from suction. Likewise, the suction side 182 of blade 111 has areas that ideally benefit from suction, and other areas that ideally benefit from pressure (see Subsections 1.2 and 1.3). The following chart includes the desired pressure type, low pressure (suction), or high pressure for the points measured.

| Desired Pressure Type | Blade without deflector | | Blade with deflector | |
|---|---|---|---|---|
| | Reference Number | Pressure [Pa] | Reference Number | Pressure [Pa] |
| | FIG. 11E | | FIG. 11F | |
| Low | 31-A | 7.1 | 31-B | −34 |
| High | 32-A | 85 | 32-B | 167 |
| High | 33-A | 24 | 33-B | 100 |
| High | 34-A | 28.3 | 34-B | 100 |
| | FIG. 11G | | FIG. 11H | |
| Low | 35-A | −306 | 35-B | −400 |
| Low | 36-A | −643 | 36-B | −1265 |
| Low | 37-A | −175 | 37-B | −324 |
| | FIG. 11I | | FIG. 11J | |
| High | 38-A | 114 | 38-B | 129 |
| High | 39-A | 86 | 39-B | 150 |
| Low | 40-A | −630 | 40-B | −1239 |

Physical test results for at 3.5 m/s were:

| Wind speed (m/s) | Blade without deflector RPM | Blade with deflector RPM |
|---|---|---|
| 3.5 | 101 | 256 |

The deflector performs similarly but improvements are even more pronounced as the fluid speed increases as further described below.

7.3 Fluid Flow and Pressures During Rotation at 13 m/s—FIGS. 12A-H

The deflector affects flow similarly while rotating in all fluid speeds. Consequently, the explanation in the previous subsection with respect to how the deflector works applies to this subsection. Moreover, as a result of kinetic fluid energy being proportional to the square of the fluid velocity, the deflector performance improves exponentially as the velocity increases. In addition, the flow trajectories and pressure plots are similar when the deflector/blade assembly is rotating irrespective of the fluid speed, however the pressures, suctions, and global torque performance figures are significantly higher the greater the fluid speed.

The figures in this Subsection depict flow simulation results from a 93 meter diameter rotor, studied in an oncoming fluid flow 1 speed of 13 m/s, rotating at 16 RPM in the desired counterclockwise rotation 5 (down in the illustration) about the rotor axis of rotation 123 (see FIG. 1A). The profile views and center of the isometric views show results obtained at a distance of 41.66 meters from the rotor axis of rotation 123 (see FIG. 1A). At such distance from the rotor axis of rotation 123, the profile views and center of the isometric views in this Subsection are rotating at a circumferential speed of 69.8 m/s. Again, for purposes of flow analysis, the blades with and without a deflector are rotating at the same speed, and thus, physical testing indicates that the results reported herein for the blade/deflector combination are understated.

Figure 12B:
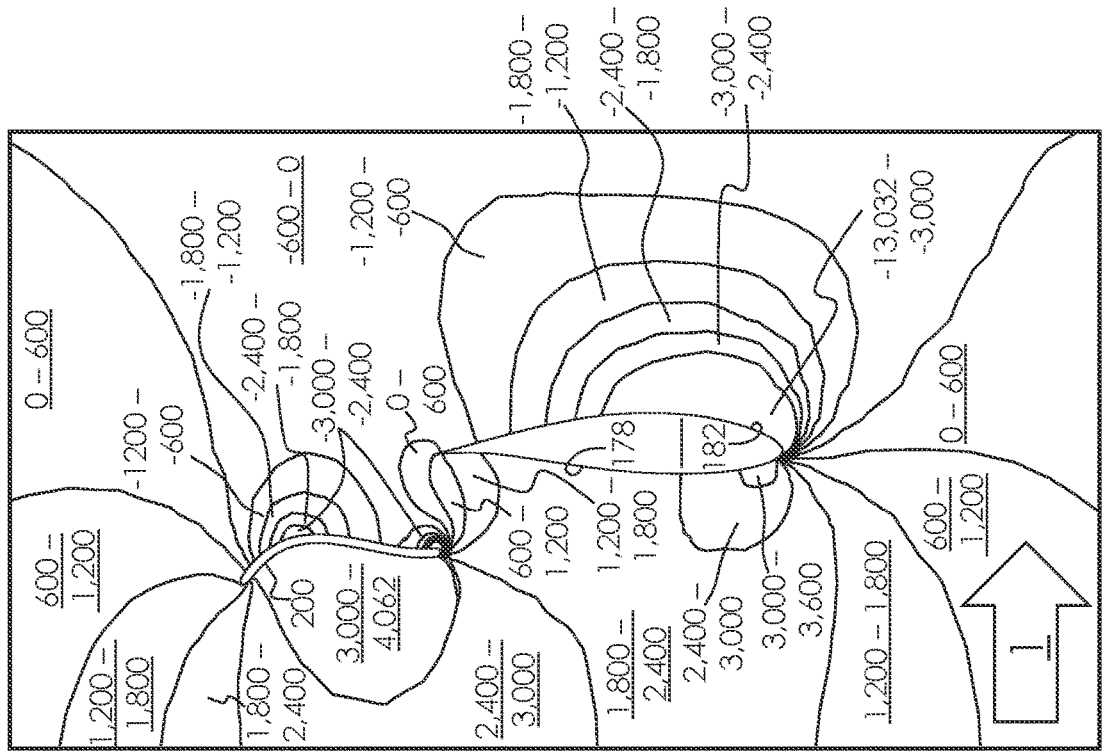
FIG. 12B is a side view of a pressure plot around sections of blade and deflector surfaces near the tip of a deflector/blade assembly rotating in a 13 m/s wind, with the benefit of a deflector.
Figure 12A:
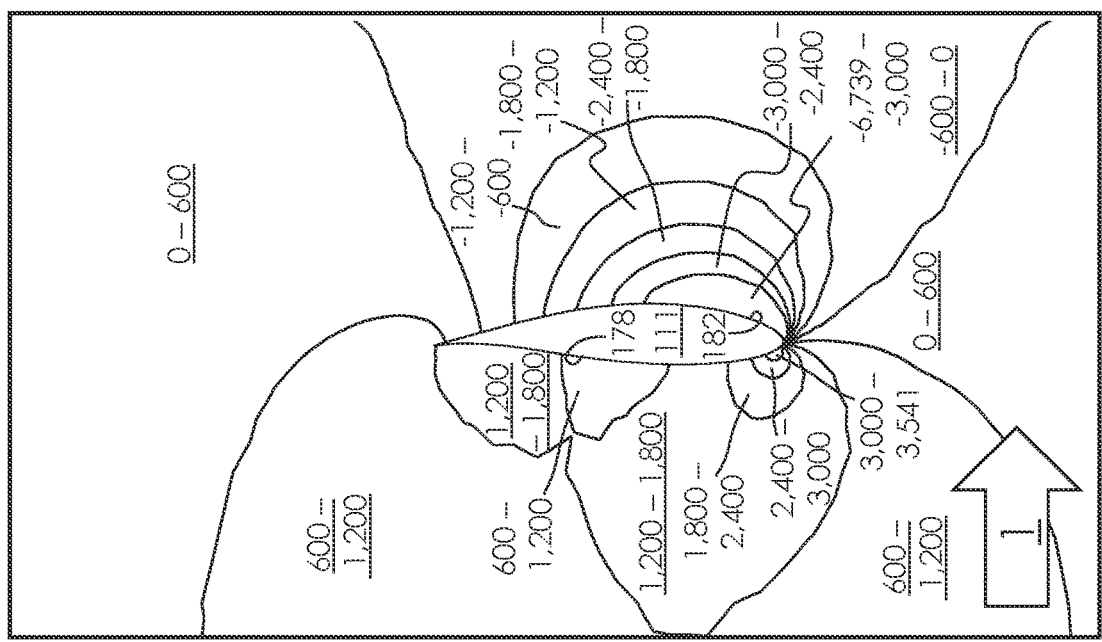
FIG. 12A is a side view of a pressure plot around a section of blade surfaces near the tip of a blade rotating in a 13 m/s wind, without the benefit of a deflector.

Referring now to FIGS. 12A and 12B, the oncoming fluid flow 1 is 13 m/s, and blade 111 is rotating in the desired counterclockwise rotation (down in the figure) about the rotor axis of rotation 123 (see FIG. 1A).

Performance improvements at a distance of 41.66 meters from the hub axis as described in the preceding paragraph are exemplary of beneficial pressure changes along the span 154 (see FIG. 2A). For example, (i) the pressure on trailing concavity 180 (see FIG. 12C Detail A) is 1200-1800 Pa on the blade 111 without the benefit of deflector 200 (see FIG. 12A) as compared to blade 111 with the benefit of deflector 200 (see FIG. 12B) for which the pressure over a significant portion of the concavity is 1800-2400 Pa, and (ii) the maximum suction on the suction side 182 near the leading edge on a blade 111 without the benefit of a deflector 200 is −6739 Pa as compared to −13,032 on a blade with the benefit of a deflector (see FIG. 12B), and the increased suction on the suction side 182 of the blade in FIG. 12B is over an area more than two times the size, and near the blade tip 151 (see FIG. 2A) as described above where the moment arm is the greatest.

Referring now to FIG. 12C and FIG. 12D, the benefits of the deflector 200 in a 13 m/s wind on the pressure surface 178 are apparent along the blade span 154 (see FIG. 2A). For example, the pressure on the trailing concavity 180 is 0-1200 Pa over more than 58 percent of the blade 111 span 154 (see FIG. 2A), without the benefit of deflector 200 (see FIG. 12C), as compared to 1200-2400 Pa over more than 87 percent of the blade 111 span 154 (see FIG. 2A) with the benefit of deflector 200 (see FIG. 12D). Also, the higher pressures shown in FIG. 12D are in a more beneficial area due to their increased slope angles (see Subsection 1.2) on the blade, i.e., an area of the blade geometry for which the pressure difference benefits blade (rotor) performance. The deflector 200 (see FIG. 9A) is not shown in the pressure plots shown in FIGS. 12D, 12F, 12H.

Figure 12E:
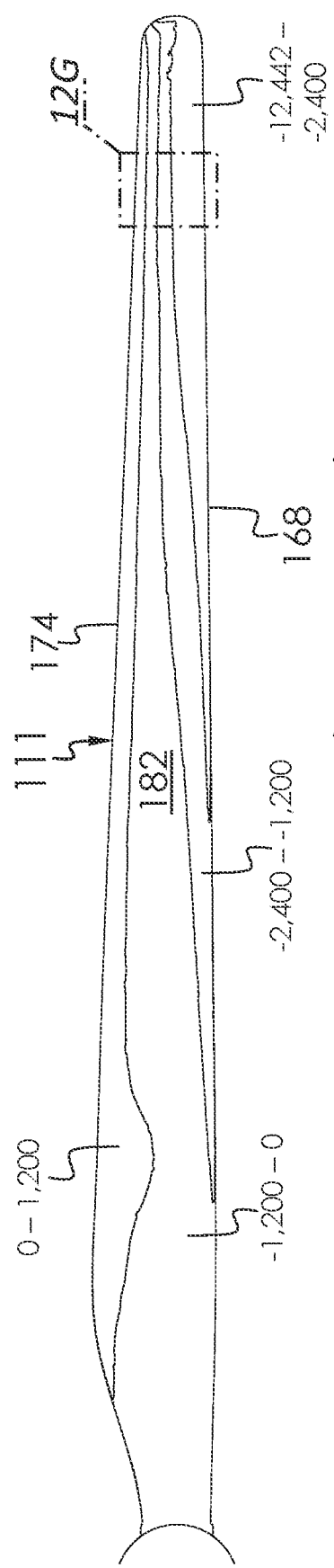
FIG. 12E is a rear view showing a downstream surface of a blade, without the benefit of a deflector, with pressure regions and related fluid pressures shown in a 13 m/s wind.
Figure 12F:
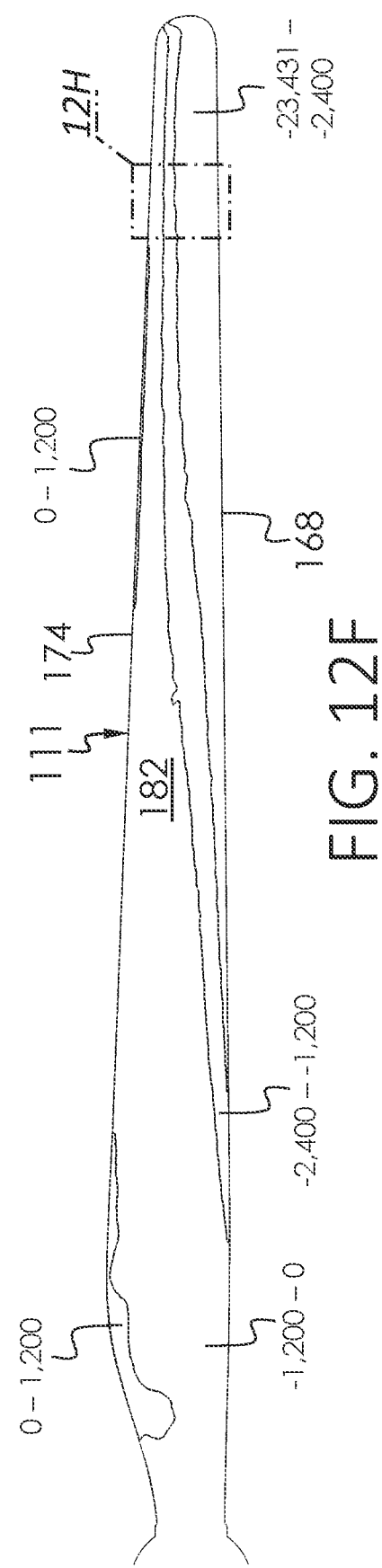
FIG. 12F is a rear view showing a downstream surface of the blade of a deflector/blade assembly including a deflector (but with the deflector not shown in the figure), with pressure regions and associated fluid pressures, shown in a 13 m/s wind.

Referring now to FIG. 12E and FIG. 12F, the benefits of the deflector 200 in a 13 m/s wind on the suction surface 182 are apparent along the along the span 154 (see FIG. 2A). For example, the suction on the suction side 182 near the tip and near the leading edge on a blade 111 without the benefit of a deflector 200 is −12,442--2400 Pa (see FIG. 12E) as compared to −23,431--2400 on a blade with the benefit of a deflector 200 (see FIG. 12F)—nearly double the suction over an area more than 3 times the size.

Figure 12G:
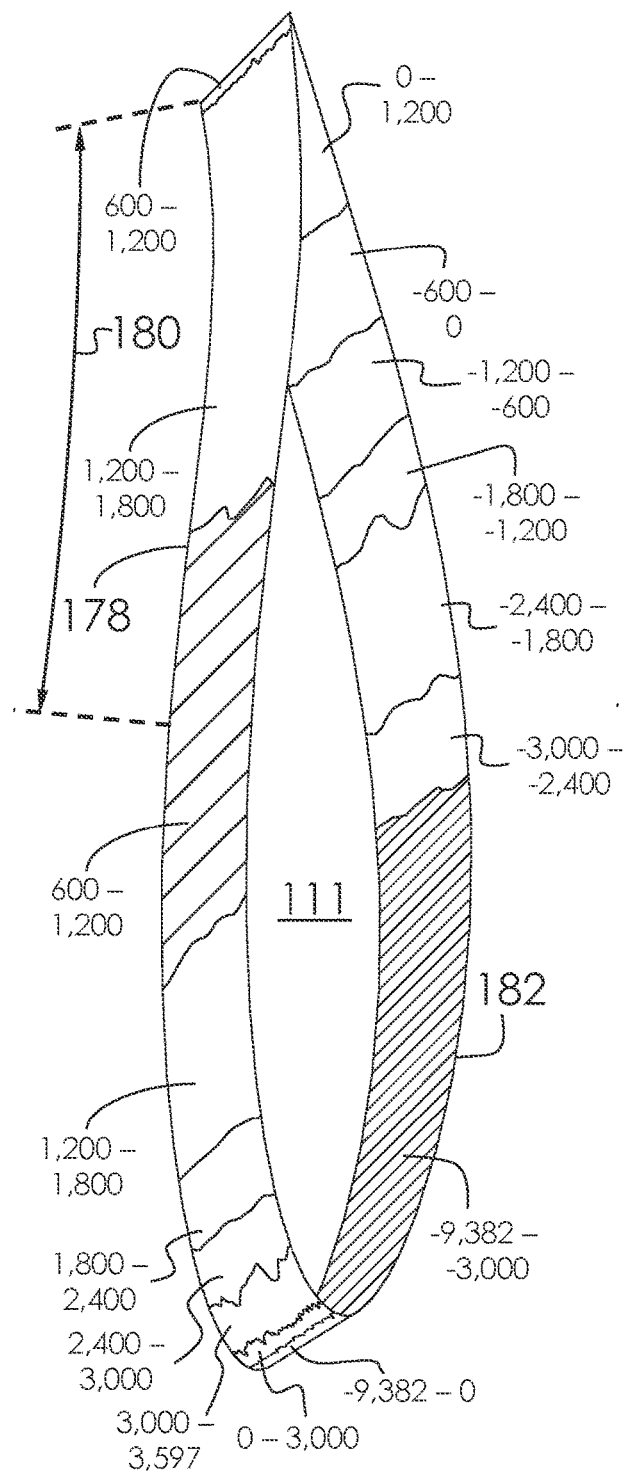
FIG. 12G is a magnified side isometric view of section "12G" of the blade of FIGS. 12C and 12E showing surface pressures on the pressure (upstream) and suction (downstream) surfaces of the section.
Figure 12H:
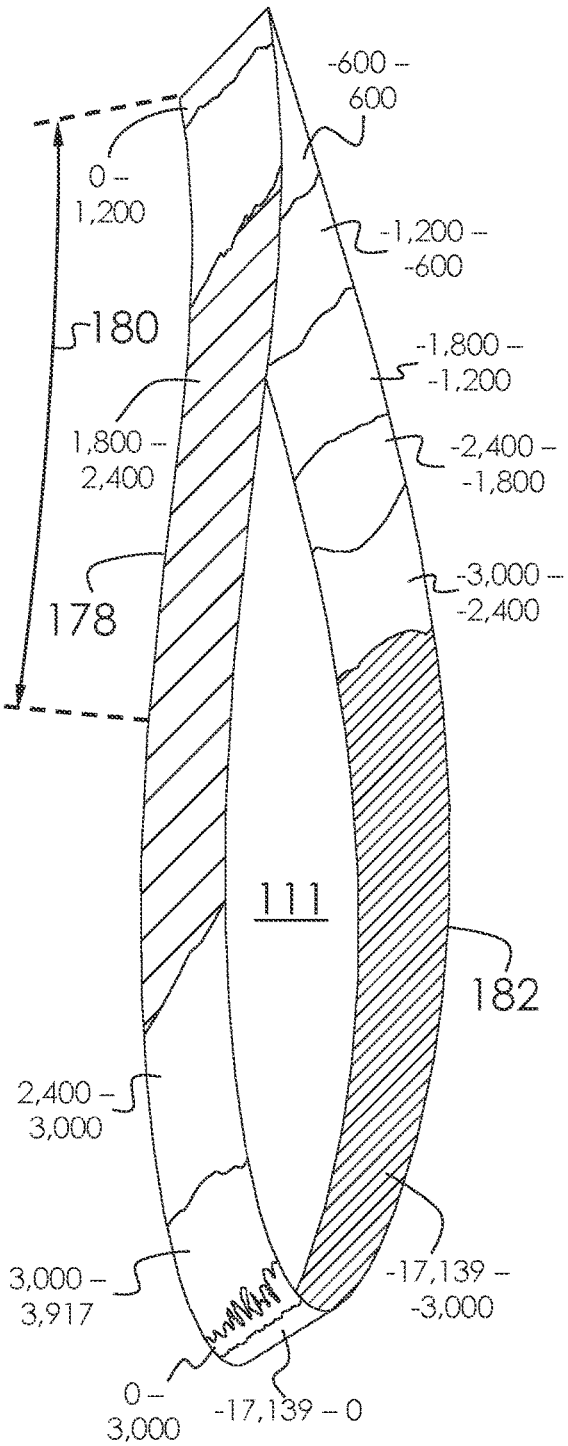
FIG. 12H is a magnified side isometric view of section "12H" of the blade of FIGS. 12D and 12F (the deflector is not shown in the figure) showing surface pressures on the pressure and suction surfaces of the section.

Referring now to FIGS. 12G and 12H, both of which are magnified side isometric views of section 12G of FIGS. 12C and 12E and section 12H of FIGS. 12D and 12F, respectively, surface pressures are shown on the respective pressure surfaces and suction surfaces. The benefit of deflector in a 13 m/s wind on the upstream and downstream surfaces of a section of blade 111 is apparent on a section of blade 111 in the same wind speed. For example, (i) on blade 111 without the benefit of a deflector 200 (see FIG. 12G) the pressure on a large portion of pressure surface 178, with wide crosshatching, is 600 Pa-1200 Pa as compared to 1800 Pa-2400 Pa shown in the wide crosshatched area on pressure surface 178 on a blade 111 with the benefit of deflector 200 (see FIG. 12H), and (ii) on blade 111 without the benefit of a deflector 200 the suction on the suction side 182 shown in narrow crosshatching is −9382--3000 Pa (FIG. 12G) as compared to −17,139--3000 Pa shown in the narrow crosshatched area on the suction surface 182 on a blade 111 with the benefit of a deflector 200 (FIG. 12H).

Physical test results for at 3.5 m/s were:

| Wind speed (m/s) | Blade without deflector RPM | Blade with deflector RPM |
| --- | --- | --- |
| 13.0 | 754 | 2822 |

In the embodiment shown, the global torque of a deflector/blade assembly is significantly greater than a blade 111 without the benefit of a deflector 200. The additional positive or negative torque attributed to deflector 200, irrespective of blade 111 torque, can be positive, negative, or neutral as described in Section 8.

8. Optimization Parameters—FIG. 13A-FIG. 13E

The deflector/blade performance is affected by the interrelationship of numerous deflector parameters, including (i) overall shape and size, (ii) angle of attack, (iii) position relative to the blade, (iv) trailing concavity length and depth, leading convexity length and depth, and (v) vertical and horizontal skew (collectively, "optimization parameters"). Alternate embodiment features of the deflector include, but are not limited to, a suction-side deflector, a non-uniform thickness deflector profile (e.g., a common airfoil shape), leading edge curved tip, leading edge arced tip, fluid walls, and number of deflectors (collectively "alternate embodiment features").

Flow simulations, and physical tests in each case where they have performed, show that optimization parameters can be adjusted to obtain increased blade performance over (i) a given fluid speed range, and (ii) a particular fluid speed, both of which while also increasing blade performance over the entire operating speed range. Because the deflector changes the environment in which the blade is operating, and blades for different rotor sizes and manufacturers have different geometry, the optimization parameters may be used to increase performance for the unique blade design for which the deflector may be customized and attached.

Optimization parameters may also be used when adding one or more of the alternative embodiments to the deflector, e.g., the arced tip (see Subsection 9.4), and fluid walls (see Subsection 9.5). As any one or more alternate embodiments are added to a given deflector embodiment, due to the interrelationships between the deflector and the blade, the optimization parameters may be used to change peak performance of a given blade/deflector assembly, e.g. customized for a specific fluid speed.

The increase of global torque can be achieved in numerous ways based upon the combination of the optimization parameters, and with differing results. For example, many flow simulation show the largest global torque improvement can be achieved if the deflector has a large negative torque. However, a lessor negative deflector torque, positive deflector torque or neutral deflector torque may be more desirable at the expense of a lessor, yet significant increase in global torque as shown in Section 7.

In this Section, all illustrations of deflector 200 and related features, when deflector 200 is located on the suction side of the blade, share the same numeric portion of the part number, however, are appended with "-S."

Figure 13B:
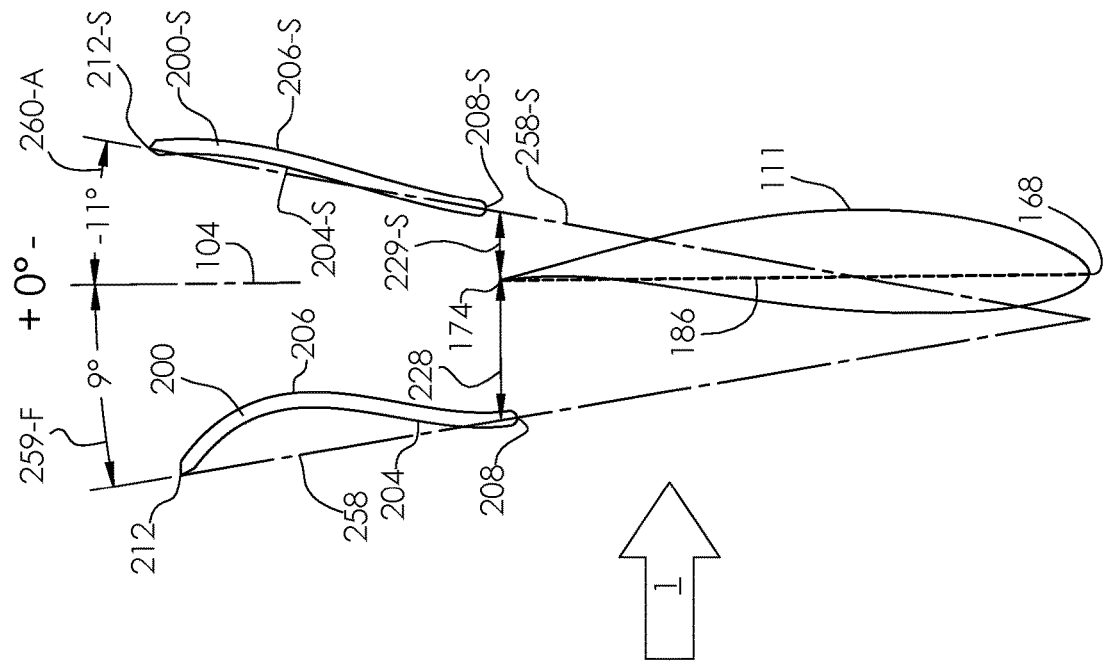
FIG. 13B is a profile view of a deflector/blade assembly showing the (i) angle of attack of two deflector profiles, relative to a blade profile, with one deflector profile nearer the oncoming fluid flow than the blade profile on the pressure side of the blade and one deflector profile further from the oncoming fluid flow than the blade profile on the suction side of the blade, and (ii) relative difference seen when maintaining the deflector angle of attack but moving both deflector profiles nearer to the oncoming fluid flow than as shown in FIG. 13A.
Figure 13A:
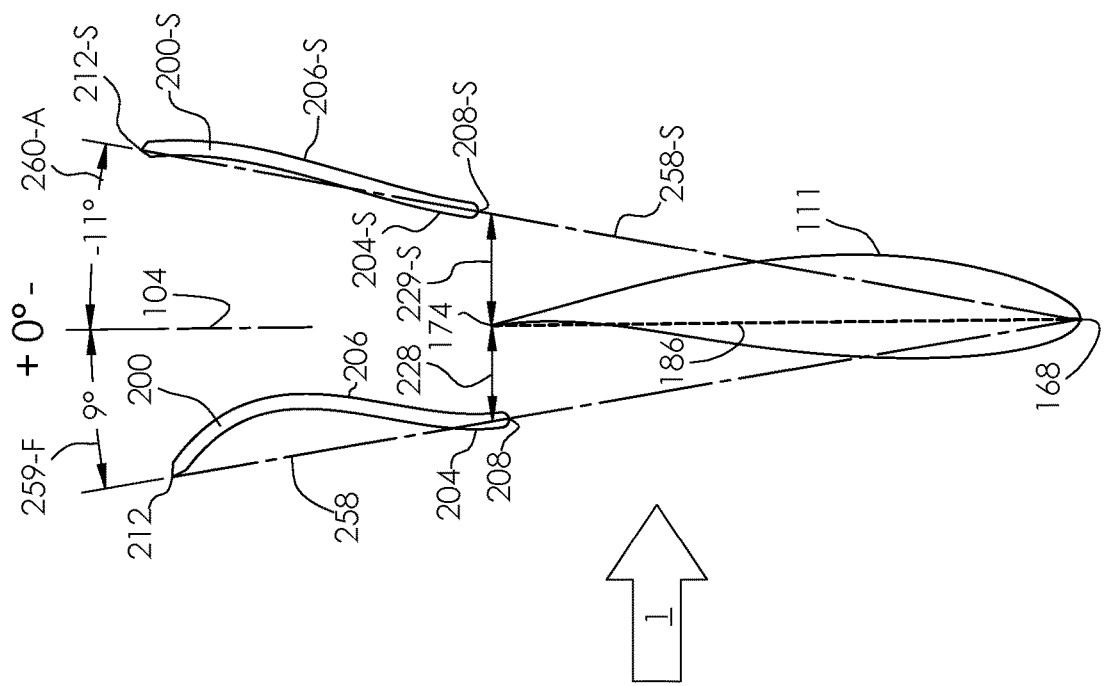
FIG. 13A is a profile view of a deflector/blade assembly showing the angle of attack of two deflector profiles, relative to a blade profile, with one deflector profile nearer the oncoming fluid flow than the blade profile on the pressure side of the blade and one deflector profile further from the oncoming fluid flow than the blade profile on the suction side of the blade.

8.1 Angle of Attack and Position Relative to the Fluid Flow—FIGS. 13A-13B

For ease in understanding the matter described in this Subsection, the (i) rotor plane of rotation 104 and blade chord 186 are collinear, and (ii) the angle of attack of the deflector 200-S is exaggerated to aid in presenting the subject matter. FIG. 13A and FIG. 13B each show two deflectors, each deflector being the same relative distance above the blade (i.e., aft of the blade relative to the rotational direction), and each deflector being oriented at the same relative angles of attack. The deflectors in FIG. 13A are both further from the oncoming flow 1 than the deflectors shown in FIG. 13B.

FIG. 13A and FIG. 13B are used in describing details regarding the (i) position of the deflector 200, when its leading edge is nearer the oncoming fluid flow 1 than the blade trailing edge 174 relative to the oncoming flow 1, (ii) distance of the deflector 200-S leading edge 208-S aft of the blade trailing edge 174, (iii) ability to have both a deflector 200 and deflector 200-S in an embodiment, and (iv) properties of advancing a deflector toward the oncoming flow while maintaining its angle of attack. The pressure side of the deflector and blade in all figures referenced in this Subsection are located nearest the oncoming flow.

Referring now to FIG. 13A, an embodiment is shown with profiles of a deflector 200 nearer the oncoming fluid flow 1 than the profile of the blade 111 (i.e., the deflector 200 is upstream of the blade 111, so the fluid flow 1 impinges on the deflector 200 before it impinges on the blade 111), and a second deflector profile 200-S further from the oncoming fluid flow 1 than blade profile 111 (i.e., the deflector 200-S is downstream of the blade 111, so the fluid flow 1 impinges on the blade 111 before it impinges on deflector 200-S as further described in Subsection 8.4.

The deflector angle of attack is shown as a (i) positive number of degrees 259-F when the leading edge 208 of the deflector 200 chord line 258 is nearer the oncoming fluid flow 1 than the trailing edge 212, and (ii) negative number of degrees 260-A when the leading edge 208-S of deflector 200-S chord line 258-S is further from the oncoming fluid flow 1 than the trailing edge 212-S. It is important to note that deflector 200 and deflector 200S can be positioned or configured with their respective angle of attack position at either a positive or negative degree angle.

The deflector profile 200 has a chord line 258 at a distance 228 into the fluid flow 1 from the blade chord 186 along at least a portion of the span of the blade 111 as measured from the blade trailing edge 174 to the deflector leading edge 208 and is shown at an angle of attack 259-F of 9 degrees. The second deflector profile 200-S has a chord line 258-S at a distance 229-S downstream from the blade chord 186 along at least a portion of the span of the blade 111 as measured from blade trailing edge 174 to the deflector leading edge 208-S and is shown at an angle of attack 260-A of −11 degrees.

Referring now to FIG. 13B, while still referring to FIG. 13A, similarly to the embodiment shown in FIG. 13A, an embodiment is shown with profiles of a (i) deflector 200 with its chord line 258 nearer the oncoming fluid flow 1 than the profile of the blade 111 chord 186, and (ii) second deflector profile 200-S with its chord line 258-S further from the oncoming fluid flow 1 than the blade 111 chord 186.

However, deflectors 200 and 200-S and their respective chord lines 258 and 258-S in FIG. 13B, as compared to deflectors 200 and 200-S shown in FIG. 13A, are nearer the oncoming fluid flow 1 than are configured in FIG. 13A. In all cases in FIG. 13A and FIG. 13B, the respective deflector angle of attack for each deflector chord line 258 and 258-S remains constant, e.g., at 9° and −11° respectively. The respective angles of attack remain constant in these examples due to the distances 228-S and 229-S of the respective chord planes in FIG. 13B being different than the distances 228 and 229 in FIG. 13A.

As deflector chord line 258 and/or 258-S are advanced toward the oncoming fluid flow 1, angles of attack 259-F and 260-A may be maintained as shown or may also be altered. If the angle of attack is maintained while advancing the chord line 258 toward the oncoming fluid flow 1, distance 228 in FIG. 13B will increase as compared to distance 228 in FIG. 13A, and distance 229-S in FIG. 13B will decrease as compared to distance 229-S in FIG. 13A with respect to blade chord 186. Conversely, if the angle of attack is maintained while moving the deflector chord lines away from the oncoming fluid flow 1, distance 228 in FIG. 13A will decrease as compared to distance 228 in FIG. 13B with respect to blade chord 186.

Although positioning the deflector forward of the rotor plane relative to the oncoming flow 1 (deflector 200) or behind the rotor plane relative to the oncoming flow 1 (deflector 200-S) will result in improved performance (e.g., increased global torque) of the blade-deflector assembly as compared to a blade without a deflector, flow analysis indicates that positioning the deflector forward of the rotor plane relative to the oncoming flow 1 (deflector 200) results in greater improved performance as compared to positioning the deflector behind the rotor plane relative to the oncoming flow 1 (deflector 200-S). Flow simulation studies show that continuing to advance the deflector chord line 258 toward the fluid flow 1, when the deflector 200 is located nearer the oncoming flow 1 than the blade 111, and provided the optimization parameters remain constant or reasonably constant, increases global torque.

8.2 Vertical Skew—FIG. 13C

Referring now to FIG. 13C, deflector leading edge 208 may be behind, even with, or in front of the blade trailing edge 174 or shifted in a direction toward or away from the oncoming flow 1 (see FIG. 13A). The deflector leading edge 208 may be skewed relative to the blade trailing edge 174 such that the distance between the blade trailing edge 174 and deflector leading edge 208 is not uniform along the deflector span 223 (see FIG. 9A). The deflector 200 is skewed when a chord-wise spacing 229-A between the deflector leading edge 208 and the blade trailing edge 174 at the tip-end 218 of the deflector differs from a chord-wise spacing 229-E between deflector leading edge 208 and the blade trailing edge 174 at the hub-end 214 of the deflector.

The chord-wise spacing between the deflector leading edge 208 and the blade trailing edge 174 may be expressed as a (i) positive value when the deflector leading edge 208 is aft of the blade trailing edge 174 (i.e., the deflector leading edge 208 trails the blade trailing edge 174 relative to the direction of travel of the deflector/blade assembly), and (ii) as a negative value when the deflector leading edge 208 is forward of the blade trailing edge 174 (i.e., the deflector leading edge 208 leads the blade trailing edge 174 relative to the direction of travel of the deflector/blade assembly), with a distance of zero equating to no chord-wise spacing between the deflector leading edge 208 and the blade trailing edge 174 (i.e., the deflector leading edge 208 neither leads nor trails the blade trailing edge 174 relative to the direction of travel of the deflector/blade assembly). It should be noted that neither deflector leading edge 208 nor blade trailing edge 174 are necessarily straight lines, but, in one embodiment, the shape of the deflector leading edge 208 conforms to any curvature or non-straight portion of the blade trailing edge.

Depending upon where a deflector 200 is positioned relative to a blade 111, vertical skew may increase or decrease global torque to tune the output performance of the wind turbine as desired, e.g., at the designer's choice.

Figure 13D:
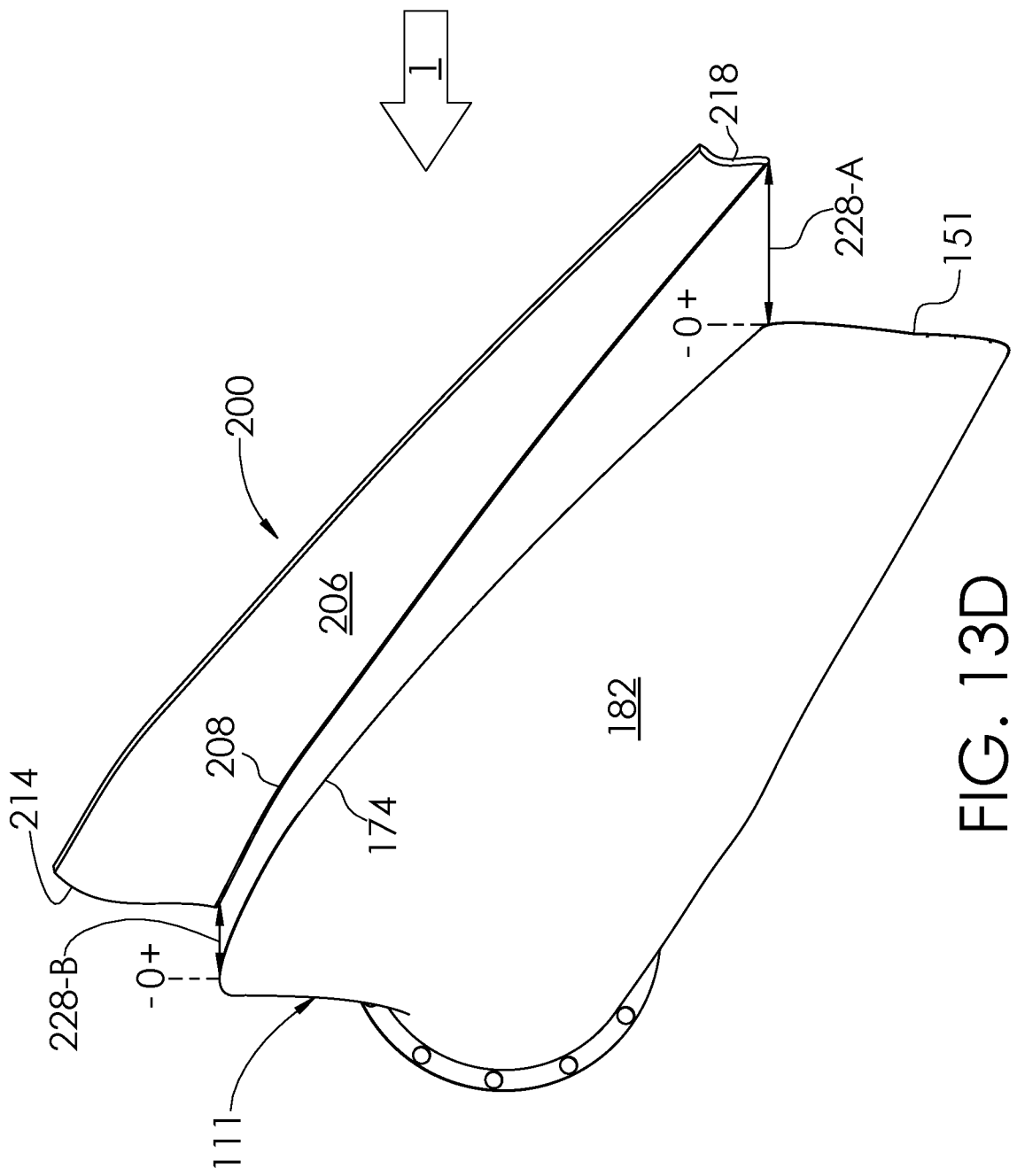
FIG. 13D is a rear isometric view of a deflector/blade assembly, excluding any structure(s) connecting the deflector to the blade, and highlighting the horizontal skew in the gap between the deflector leading edge at the tip and hub ends relative to the blade trailing edge. To increase clarity of the horizontal skew, this figure is not drawn to scale.

8.3 Horizontal Skew—FIG. 13D

Referring now to FIG. 13D, the deflector 200 leading edge 208 position relative to the blade 111 trailing edge 174 may be (i) nearer the oncoming fluid flow 1 than blade 111 as shown and expressed as a positive distance (horizontal spacing) or, (ii) further from the oncoming fluid flow 1 than the blade 111 and expressed as a negative distance (horizontal spacing). A distance of zero between the deflector 200 leading edge 208 and the blade trailing edge 174 means there is no horizontal spacing between the deflector leading edge 208 and the blade trailing edge 174.

A horizontal distance 228-A between the deflector leading edge 208 and the blade trailing edge 174 at the deflector tip end 218 may be greater than, equal to, or less than a horizontal distance 228-B between the deflector leading edge 208 and the blade trailing edge 174 at the deflector hub end 214. Flow simulation shows that the greater the horizontal distance 228-A at the deflector tip end 218 relative to the horizontal distance 228-B at the deflector hub end 214 increases global torque. Flow analysis indicates this is due to the much greater volume of fluid flowing between the deflector leading edge 208 and the blade trailing edge 174 (collectively "edges") near their respective tip ends 151 and 218 versus the much less volume of fluid flowing between the edges near the deflector hub end 214, as a result of their respective circumferential speeds.

Flow simulation also shows that moving deflector 200 nearer to the oncoming fluid flow 1, than is shown in Section 7, increases global torque. The further deflector 200 is advanced, when located on the pressure side of the blade 111, toward the oncoming fluid flow 1 and in a direction out of the blade 111 wake, the larger the volume of fluid flow 1 is available to increase blade 111 performance.

Deflector 200 when located on the pressure 178 side of blade 111 creates a phenomenon analogous to changing the environment in which blade 111 is operating in a higher fluid flow 1 speed, e.g. wind speed. This phenomenon increases as the deflector 200 is moved nearer to the oncoming fluid flow 1 as described above due to the increased fluid flow rate benefiting blade 111.

Figure 13E:
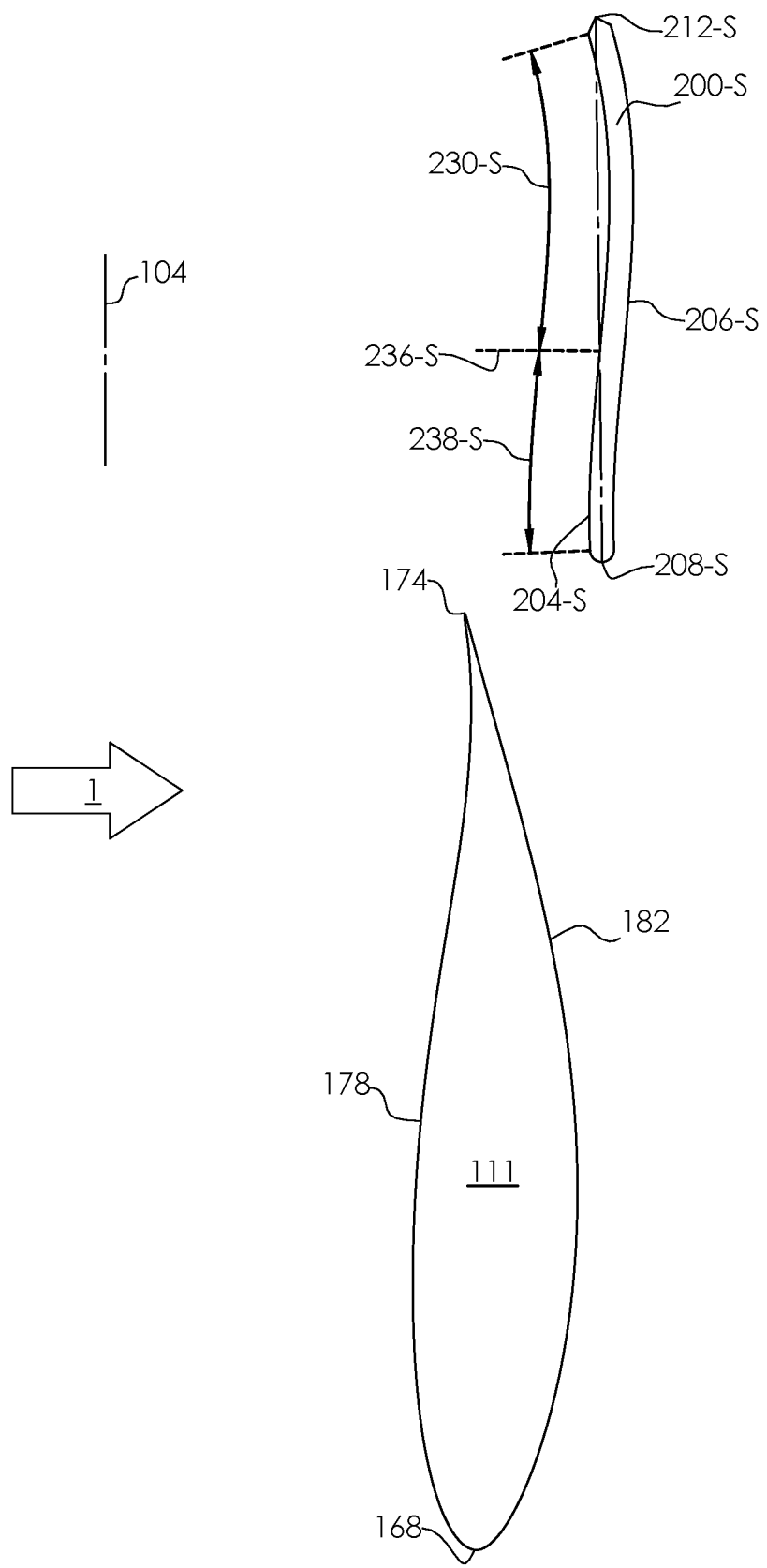
FIG. 13E is a profile view of a deflector/blade assembly showing the deflector located on the suction side of the blade.

8.4—Suction Side Deflector Position—FIG. 13E

Referring now to FIG. 13E, flow simulation shows that when a deflector 200-S is located on the suction side 182 of blade 111, global torque improvements can be gained when concavity 230-S and convexity 238-S are less than when deflector 200 is positioned on the pressure side 178 of blade 111. This is due to deflector 200, when configured on the suction side 182 of the blade 111 as shown, and when used in conjunction with a deflector 200 located on the pressure side of the blade 111 (configuration not shown), acts similar to a flow straightener rather than a deflector, thus reducing the turbulence and suction near the suction surface 182 trailing edge beneficial area 16 (see FIG. 2G).

9. Alternate Embodiments

Alternate embodiments described herein may be used in any (i) fluid type, i.e., air and water, and (ii) combination with any deflector/blade assembly or alternate embodiments thereof, i.e., a deflector with a curved tip (see Subsection 9.3), and fluid walls (see Subsection 9.5) may be combined irrespective of the drawing or text that describes such alternate embodiment.

9.1 Partial-span Deflector—FIG. 14A-FIG. 14E

Partial-span deflectors 200-A may embody all of the features and attributes of a deflector 200, including, without limitation, the connector tube 270 and leading and trailing edge features as described in Section 6 and shown in FIGS. 9K, 9L, 9M, 9N.

Partial-span deflectors 200-A may be retrofitted anywhere along the span of existing turbine blades at the designer's choice, e.g., to increase turbine performance if a turbine is performing under its rated capacity. Flow simulations and physical tests show that partial-span deflectors increase global torque per square area of pressure and suction surfaces of the deflector 200-A similar to, but less than, deflector 200 extending substantially the full span of the blade. Flow simulations also show that partial-span deflectors with longer spans produce more global torque per square area than do partial-span deflectors with shorter spans. Thus, flow simulations suggest that a longer deflector with twice the area of a shorter deflector will more than double the global torque as compared to the shorter deflector.

Referring now to FIG. 14A, partial-span deflector 200-A is configured on the pressure side 178 of blade 111 approximately midway between the blade tip 151 and the root end 158.

Referring now to FIG. 14B, while still referring to FIG. 14A, partial-span deflector 200-A is fixedly linked to blade 111 via connector assemblies 261-A that include fixedly linked external blade-end flanges 272-A. Connector assembly 261-A embodies the same aerodynamic features as connector assembly 261 as described in Section 6 and shown in FIGS. 9K, 9L, 9M, 9N, including, without limitation, whereby it (i) embodies two sets of leading and trailing edges; one set of leading and trailing edges is affected by and minimizes drag for oncoming fluid flow as described above, and a second set of leading and trailing edges is affected by and minimizes drag for fluid flow (apparent velocity), and (ii) has elliptical and/or oval profiles that are oriented in alignment with the rotational flow.

Figure 14D:
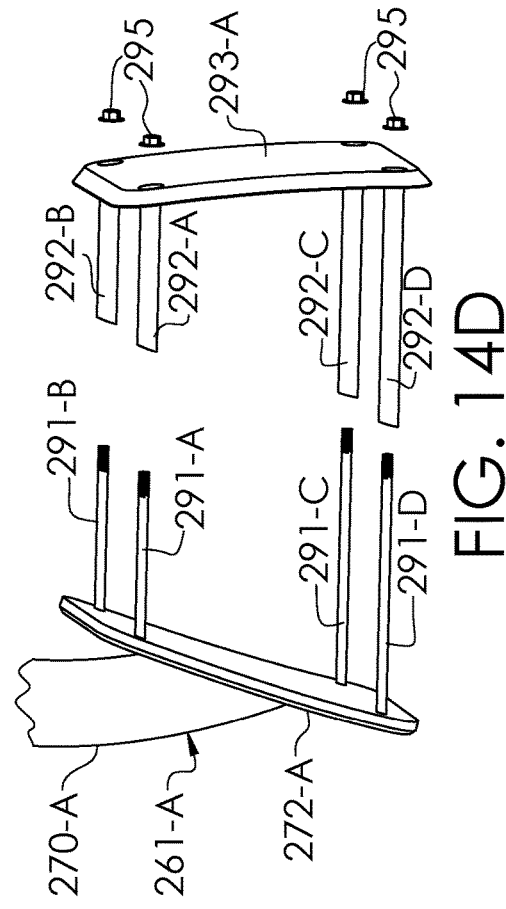
FIG. 14D is a cropped side exploded isometric view of an embodiment of partial-span deflector to blade connector assembly, with the blade and deflector not shown.
Figure 14E:
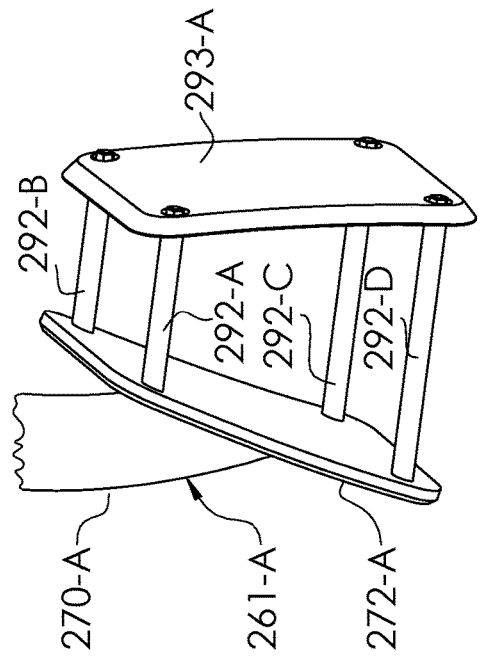
FIG. 14E is a cropped side isometric view of an embodiment of partial-span deflector to blade connector assembly, with the blade and deflector not shown.
Figure 14C:
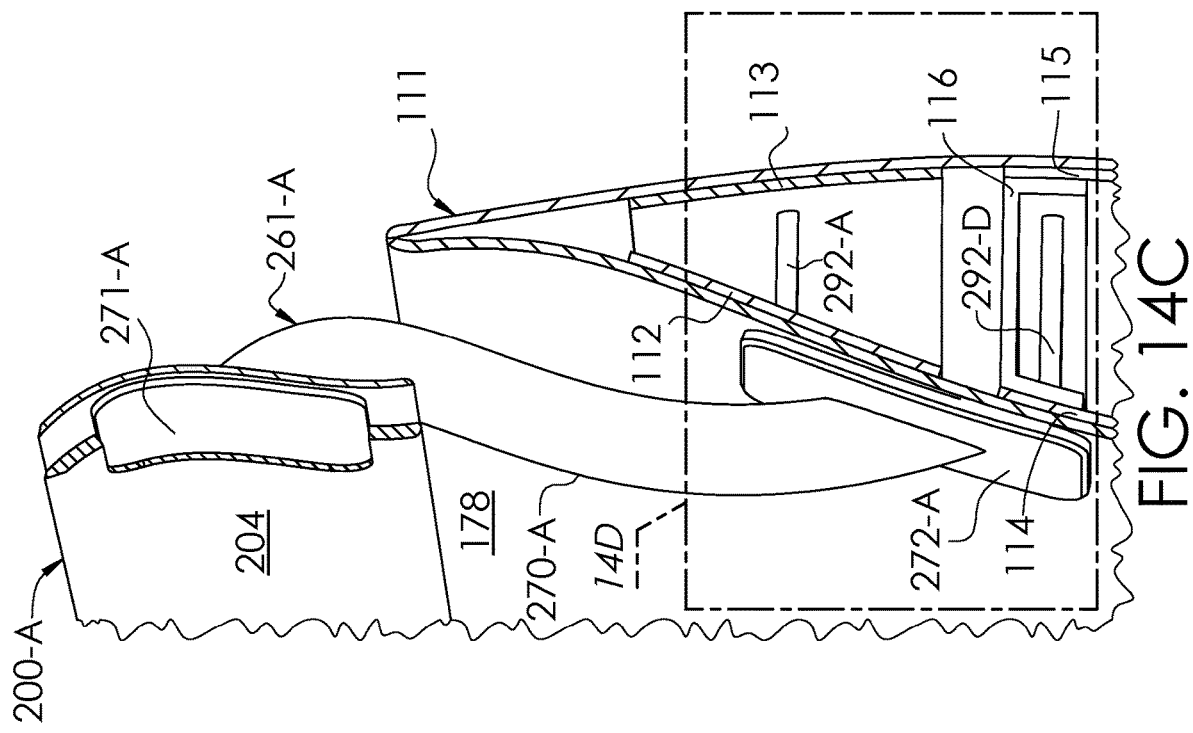
FIG. 14C is a cropped side cross-sectional view of a partial-span deflector and blade assembly with an embodiment of fixed connector assemblies for retrofitting the partial-span deflector to a blade.

Referring now to FIG. 14C and FIG. 14D, in an embodiment, connector assembly 261-A comprises a tube 270-A, with a fixedly linked deflector-end flange 271-A and fixedly linked blade-end (pressure side) flange 272-A and one or more studs 291-A, 291-B, 291-C and 291-D (collectively "flange studs") projecting from and fixedly linked to blade-end flange 272-A.

Referring now to FIG. 14D while still referring to FIG. 14C, connector 261-A includes a suction side flange 293-A and tubes 292-A, 292-B, 292-C, and 292-D (collectively "flange tubes") projecting from and fixedly linked to suction side flange 293-A. The flange studs 291-A, 291-B, 291-C, 291-D (i) penetrate pressure surface 178 of blade 111, (ii)

pass through the flange tubes 292-A, 292-B, 292-C, 292-D (which penetrate suction surface 182 of the blade 111) and suction side flange 293-A, and (iii) are secured with fasteners 295 (e.g., nuts on threaded ends of flange studs 291-A, 291-B, 291-C, 291-D projecting from the suction side flange 293-A) or other suitable means for fixing the ends of the flange studs 291-A, 291-B, 291-C, 291-D with respect to the suction side flange 293-A, e.g., welding or the like.

Referring now to FIG. 14E while still referring to FIG. 14C and FIG. 14D, the geometry (contours) of pressure side blade-end flange 272-A and suction side flange 293-A conform to the respective blade pressure surface 178 and suction surface 182 (see FIG. 2B) to which they mate. Each flange stud length and corresponding flange tube length may differ to accommodate the change in the spacing between the blade pressure surface and suction surface that mates with flange 272-A and 293-A, respectively, i.e., the flanges may taper and/or twist.

The lengths of the flange tubes 292-A, 292-B, 292-C, 292-D may be undersized compared to the spacing between the blade pressure surface 178 and suction surface 182 (see FIG. 2C) to achieve a compression fit between flanges 272-A and 293-A and blade 111 while simultaneously preventing the fasteners 295 from compressing the blade 111 beyond the designer's choice.

In addition, the mechanical attachment of the pressure side blade-end flange 272-A and suction side flange 293-A may be chemically bonded or otherwise adhered to the exterior of blade 111, and the mechanical attachment of the flange tubes may be chemically bonded or otherwise adhered to structures interior to blade 111 through which the flange tubes 292-A, 292-B, 292-C, 292-D pass.

Connector assemblies 261-A conform to the twist of the deflector/blade assembly and the concavity and convexity of deflector 200-A, and thus the twist and/or length or angle of connector assemblies 261-A may vary over the deflector span 223 (see FIG. 9A).

Connector tube 270-A may embody all of the leading and trailing edge benefits and features of connector tube 270 as described in Section 6, including, without limitation, two sets of leading and trailing edges. One set of leading and trailing edges works with respect to oncoming wind flow when the blade/deflector assembly is static, and the other set of leading and trailing edges works with rotational flow while the blade/deflector assembly is rotating.

9.2 Non-Uniform Thickness Deflector—FIG. 15

Referring now to FIG. 15, and FIG. 15 Detail A-Detail C, an embodiment of a deflector 200-B includes a pressure surface 204-B that can essentially mirror the pressure surface 204 of a deflector 200 of a similar overall shape, size and geometry (see FIG. 9A), but deflector 200-B is not of a uniform thickness. Deflector 200-B differs from deflector 200 in that it has a more traditional airfoil shape than does deflector 200, whereby deflector 200-B is thicker between the pressure surface 204-B and suction surface 206-B near the leading edge 208-B and thinner between the pressure surface 204-B and suction surface 206-B near the trailing edge 212-B (the "suction side airfoil"). Deflector 200-B has an airfoil shape profile that generates differential pressures on the upstream (pressure) surface 204-B and downstream (suction) surface 206-B due to relative fluid flow over the upstream and downstream surfaces. Pressure surface 204-B of deflector 200-B may have a concavity 230 and/or a convexity 238 similar to, or essentially the same as, the concavity 230 and/or convexity 238, respectively, on pressure surface 204 of uniform thickness deflector 200 (see FIG. 9A).

The suction side non-uniform thickness may be used to increase global torque by generating differential upstream/downstream pressure (lift) depending upon the (i) relative horizontal and vertical position of deflector 200-B relative to the blade 111 to which it is fixedly linked or operably (adjustably) coupled, (ii) shape and size, (iii) angle of attack of the deflector 200-B, and (iv) depth of convexity and concavity (see Sections 3, 5 and Subsection 8.1).

The thickness between the pressure surface 204-B and suction surface 206-B of a deflector 200-B may vary from the tip end 218-B of the deflector 200-B to the hub end 214-B of the deflector 200-B at any point between the leading edge 208-B and trailing edge 212-B.

Deflector 200-B may be used in lieu of deflector 200, on the pressure side 178 or suction side 182 blade 111 (see FIG. 2A and FIG. 2B respectively), however, due to the thickened profile of deflector 200-B, its suction side 206-B has different flow characteristics than deflector 200.

Deflector 200-B may have an internal construction similar to blade 111 (see Section 1 and FIG. 2C).

9.3 Curved Tip—FIG. 16A

Referring now to FIG. 16A and FIG. 16B, an embodiment of deflector 200-C includes a curved section 219 along a portion of the trailing edge 212 that increases global torque by reducing drag on the deflector 200-C. The end trailing edge corner at tip 218 of the trapezoidal shaped deflector (see FIG. 9A), generates negative torque. By removing this corner in the area of the deflector tip 218, this negative torque may be reduced, resulting in a net gain in global torque even though the area of the deflector is reduced. The corner is removed—or at least reduced in size—by deviating the shape of the trailing edge 212 so that the deflector chord is shorter at the deflector tip end 218 than it would be if the trailing edge shape were not deviated. For example, the trailing edge corner can be removed by providing a curved trailing edge section 219 that begins at or near the deflector leading edge 208 at the deflector tip end 218 and ends at point 220 that may be located up to one third of the distance between the deflector tip end 218 and hub end 214.

The curved section 219 may be optimized to increase global torque by changing the curvature and length of the curved section 219. In addition, rather than a curved trailing edge section 219, a straight trailing edge section can be provided that begins at or near the deflector leading edge 208 at the deflector tip end 218 and ends at point 220.

Figure 17A:
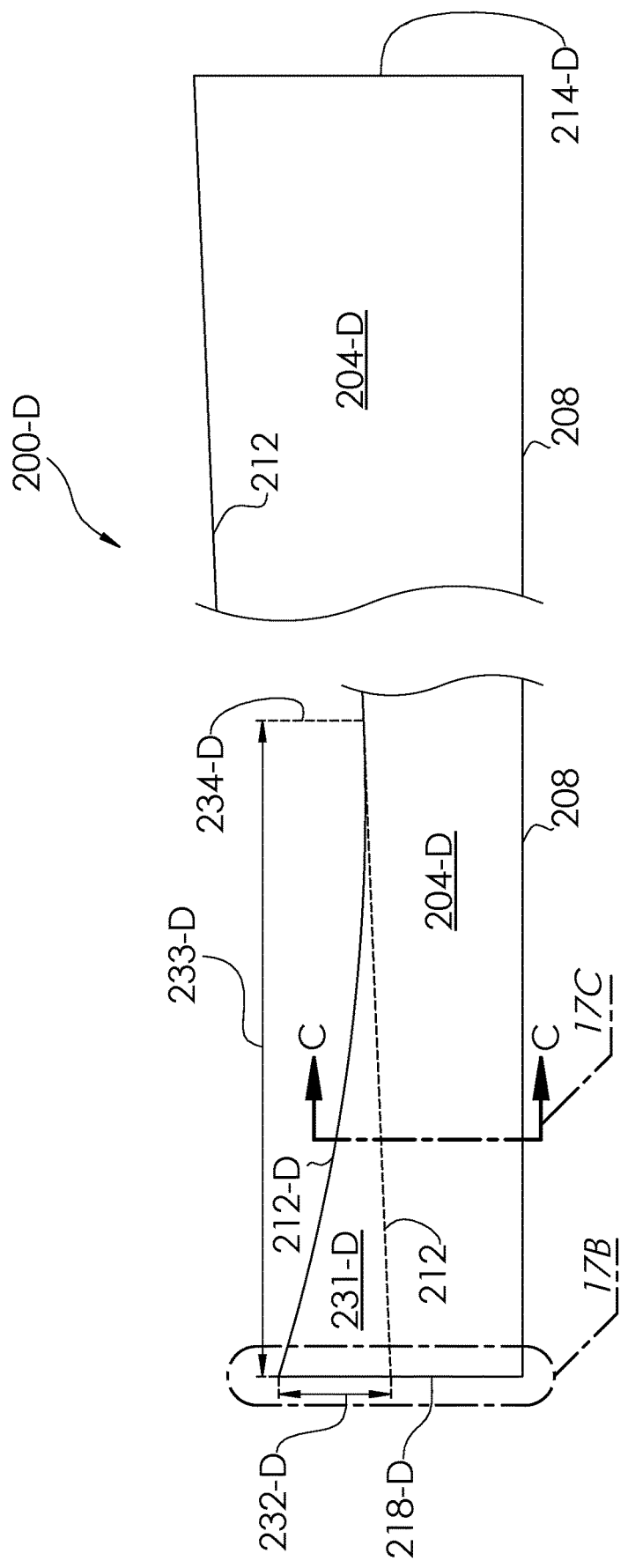
FIG. 17A is a front view of an embodiment of a deflector that includes an arced trailing edge near the tip end, superimposed over a deflector without an arced trailing edge near the tip end.

9.4 Arced Tip—FIG. 17A

Referring now to FIG. 17A, an embodiment of deflector 200-D includes an arced tip section 231-D that increases global torque. Arced tip section 231-D is provided by deviating the shape of the trailing edge 212-D so that the deflector chord is longer at the deflector tip end 218-D than it would be if the trailing edge shape were not deviated. In this subsection, to facilitate readability and understanding, deflector 200-D has been superimposed over a deflector 200 of the same dimensions with the exception of the arced tip section 231-D to show the un-deviated trailing edge 212 in dashed lines. Consequently, in this subsection, any part numbers that are not succeeded by a hyphen and letter refer to deflector 200 for comparison. In addition, for illustrative purposes, the end and cross-sectional detail views (FIG. 17B and FIG. 17C, respectively) have wide crosshatching to depict the extended arced area 231-D, and narrow crosshatching to depict the portion of the deflector 200 that has been included to aid in understanding the extended arced tip area. The change in crosshatching direction has no significance with respect to the construction of deflector 200-D, as the deflector 200-D may comprise a unitary, integral structure, and is not intended to necessarily indicate that deflector 200-D is formed from multiple components and/or different materials in the area of section 231-D.

Arced section 231-D extends from the trailing edge 212 of deflector 200 (see also FIG. 9A) and has an arced (or curved) trailing edge 212-D defining a progressively increasing chord between leading edge 208 and arced trailing edge 212-D from intersection point 234-D to tip end 218-D. Arced tip section 231-D includes a chord extension 232-D from trailing edge 212 to the extended tip trailing edge 212-D, and length 233-D that extends from the deflector tip end 218-D to the intersection point 234-D where the arced section trailing edge 212-D intersects with the trailing edge 212. Intersection 234-D may be located at any point along the span of deflector 200-D up to the hub-end 214-D.

Figure 17B:
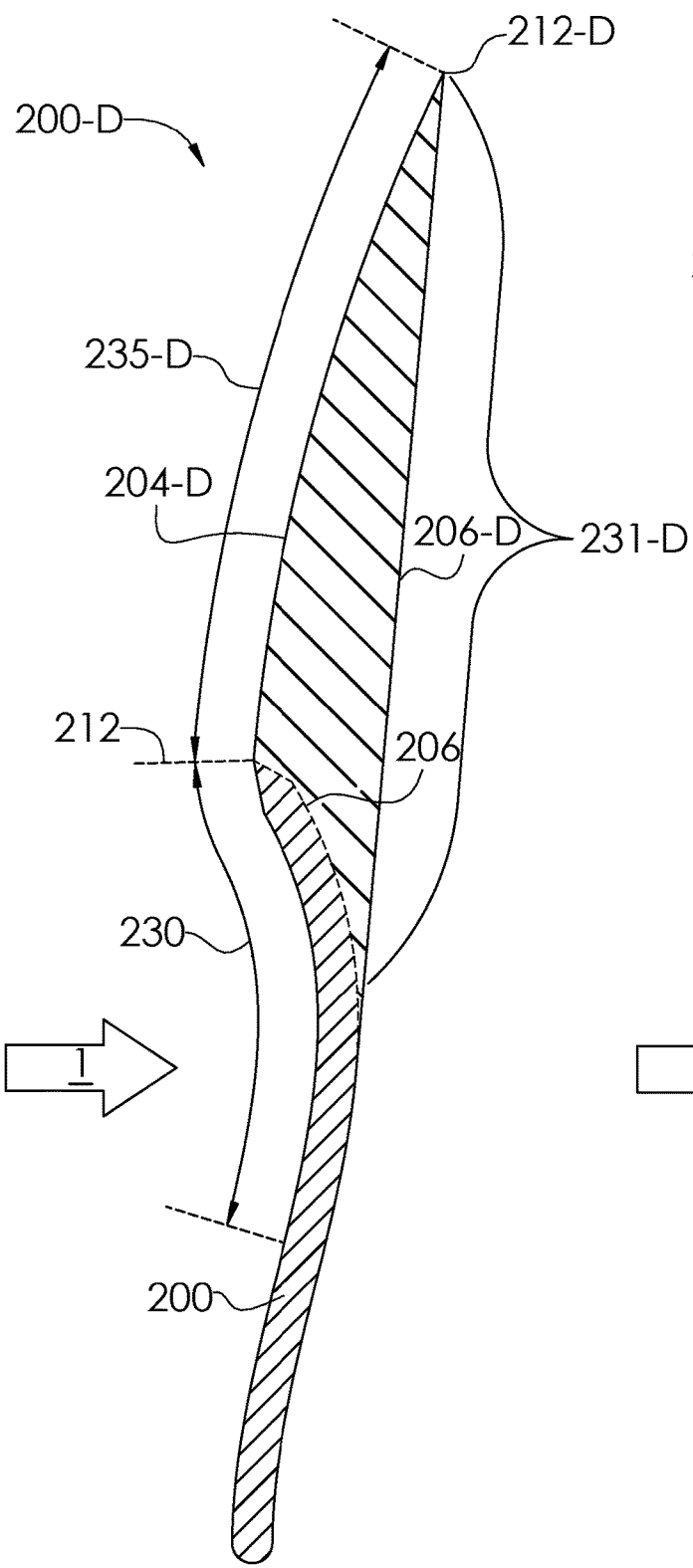
FIG. 17B is a magnified detail tip end view of the arced trailing edge superimposed over a deflector without an arced trailing edge.

Referring now to FIG. 17B while still referring to FIG. 17A, arced tip section 231-D includes a convexity 235-D on pressure side 204-D that extends between the trailing edge 212-D and an extension of trailing edge 212 to 212-D (see dashed line in FIG. 17A).

Figure 17C:
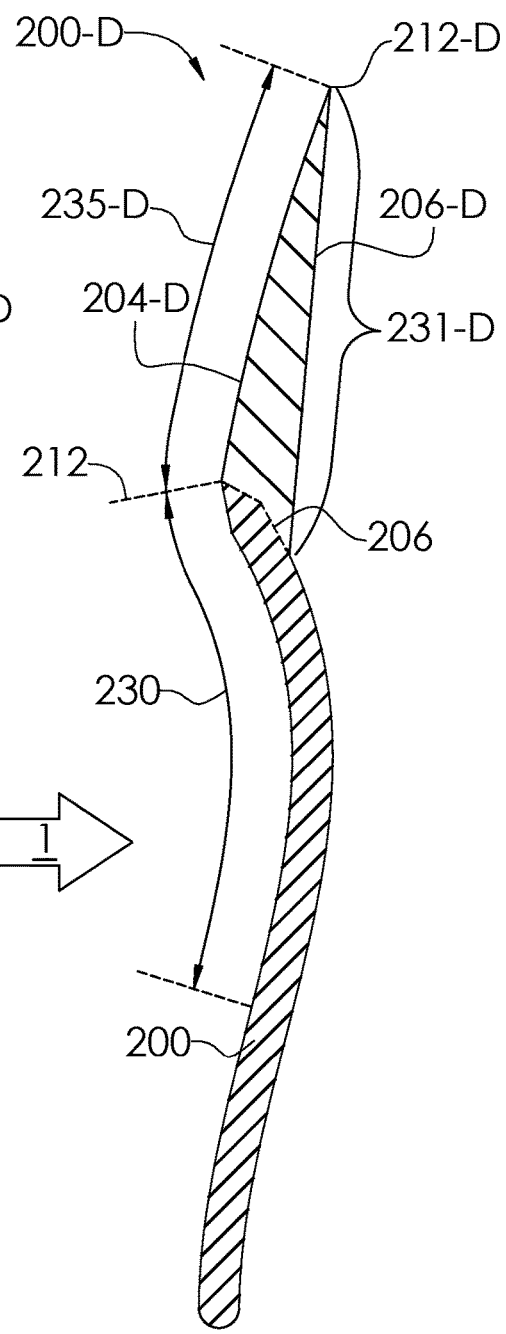
FIG. 17C is a magnified detail cross-sectional view of the arced trailing edge at line C-C in FIG. 17A, superimposed over a deflector without an arced trailing edge.

Referring now to FIG. 17C, while still referring to FIG. 17B and FIG. 17A, beginning at the deflector tip end 218-D, arced tip section 231-D essentially fills a space, depicted with wide crosshatching, that is bounded by an extension of trailing edge 212 (dashed line in FIG. 17A), a portion of suction surface 206 that is proximate to the extension of trailing edge 212, arced tip suction surface 206-D, arced tip pressure surface 204-D, and arced section trailing edge 212-D. The filled space can vary in width and curvature across the span of arced section 231-D—and thus the chord can vary correspondingly. The arced tip section 231-D is depicted as an extension of the superimposed deflector 200, which is shown in narrow crosshatching.

In the embodiment shown, the cross-sectional area (thickness between pressure surface 204-D and suction surface 206-D) of arced tip section 231-D decreases from the deflector tip end 218-D to the intersection 234-D, and follows the deflector twist between the tip end 218-D and hub end 214-D.

The curvature, length, and cross-sectional area of curved section 231-D may be changed at the designer's choice to increase global torque.

Figure 18A:
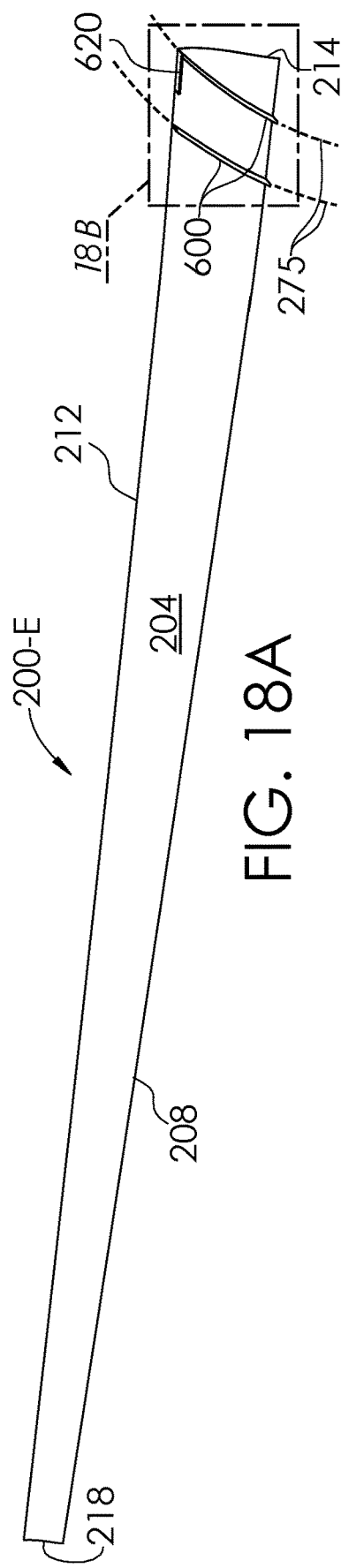
FIG. 18A is a front view of an embodiment of a deflector with walls that project from the upstream surface of the deflector.
Figure 18B:
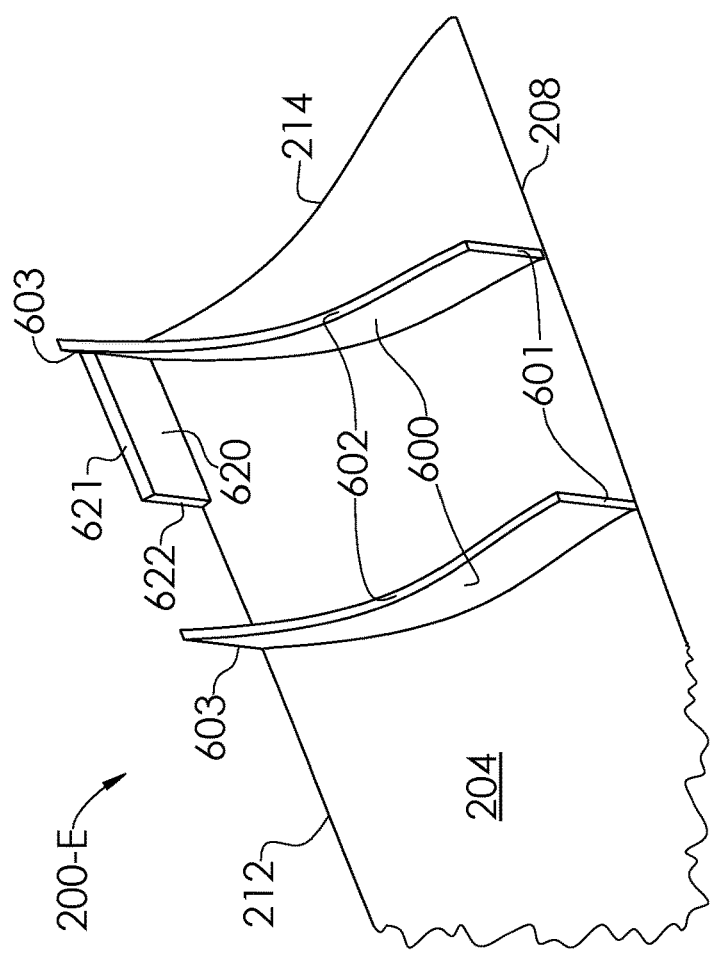
FIG. 18B is a cropped magnified isometric view of the deflector with walls that project from the upstream surface.

9.5 Fluid Walls—FIG. 18A-FIG. 18B

Referring now to FIG. 18A and FIG. 18B, an embodiment of deflector 200-E includes one or more walls 600 projecting from one or both surfaces of the deflector 200-E (shown projecting from pressure surface 204 in FIGS. 18A, 18B). Each wall 600 may extend from the leading edge 208 to the trailing edge 212, or any portion thereof, and may follow the respective rotational path of travel 275 about the rotor axis of rotation 123 (See FIG. 1A) or be straight or curved along an arc other than rotational path of travel 275. Deflector 200-E may further include a transvers wall 620 extending from one or more wall(s) 600 along or near the trailing edge 212. Wall(s) 600 and transverse wall (s) 620 are fixedly linked to deflector 200-E and extend from the pressure surface 204 toward the oncoming fluid flow or from the suction surface 206 (see FIG. 9A Detail A, B and C showing suction surface 206) toward the downwind flow. Wall(s) 600, 620 may be perpendicular or otherwise oriented with respect to pressure surface 204 and/or suction surface 206.

Wall 600 reduces the spillover of fluid moving from the deflector tip end 218 toward the hub end 214 causing the centroid (center of pressure) to move toward the tip end 218 of blade 111 thereby increasing global torque.

Wall 600 may have a uniform or non-uniform height from a leading end of the wall to a trailing end of the wall, and has a rotational flow leading edge 601, oncoming fluid flow leading edge 602 and rotational flow trailing edge 603 (collectively "wall 600 edges"). Wall 600 edges may be straight, tapered, beveled, or curved to reduce drag or otherwise improve performance characteristics, including, without limitation, increasing global torque.

Transverse wall 620 reduces fluid spillover along trailing edge 212, thereby increasing global torque. The height of transverse wall 620 may be the same or different from the height of wall 600. Although, the configuration of transverse wall 620 may contribute to drag of the rotating blade/deflector assembly, flow simulation results show that the performance improvement from transverse wall 620 is greater than the drag it induces.

Transverse wall 620 edges may be straight, tapered, beveled, or curved to reduce drag or otherwise improve performance characteristics.

Two or more walls 600 of varying lengths and heights, may be configured on the pressure side 204 of a deflector 200-E anywhere along the deflector span 223 (see FIG. 9A).

One or more transverse walls 620 of varying lengths and heights may be configured along the deflector span 223 (see FIG. 9A) near the trailing edge 212.

Figure 19A:
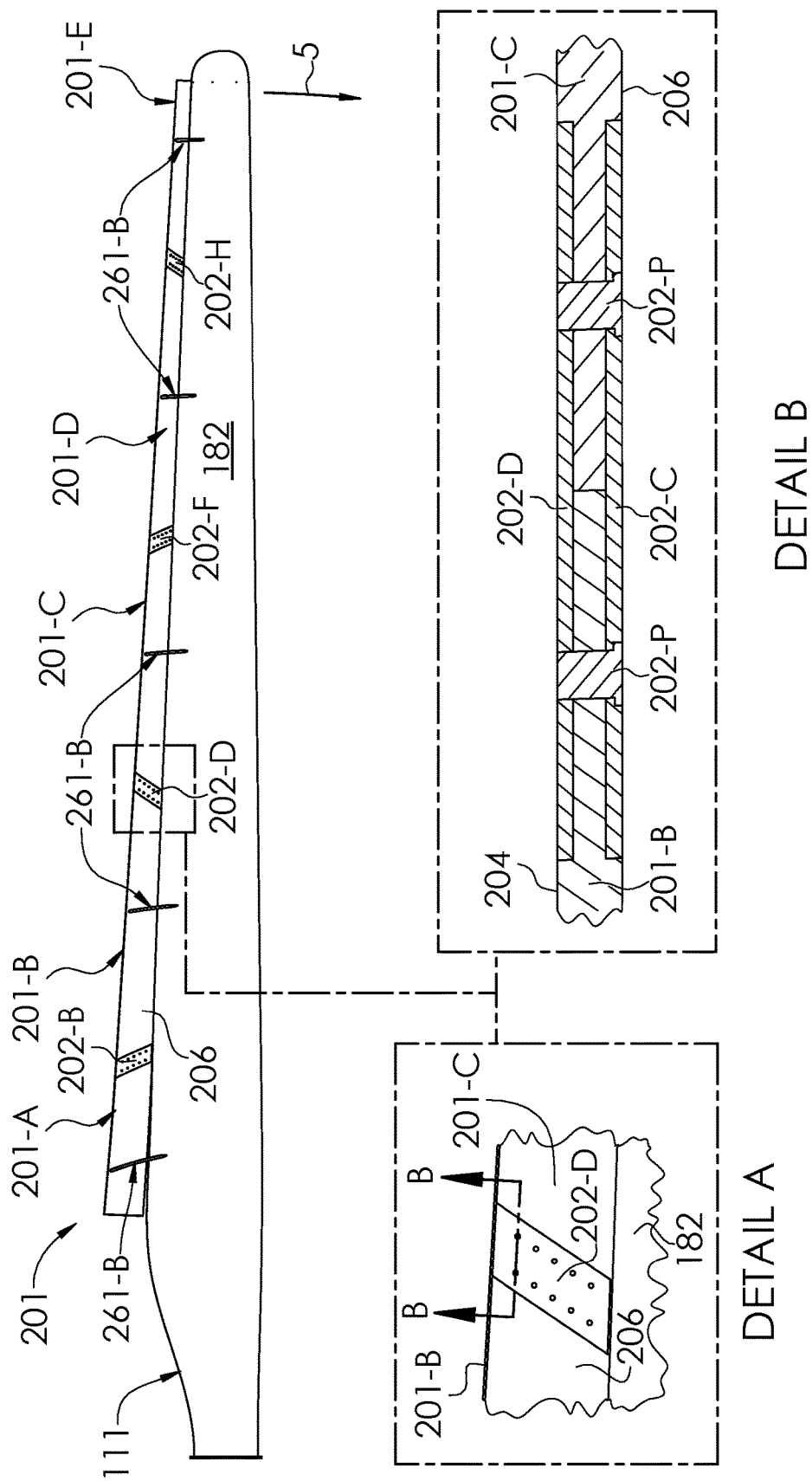
FIG. 19A is a rear view of an embodiment of a multi-part deflector/blade assembly with fixedly linked connector assemblies with a cropped magnified detail rear view of a connection between two deflector sections, and a magnified cropped detail side cross-sectional view of a connection between two deflector sections.
Figure 19B:
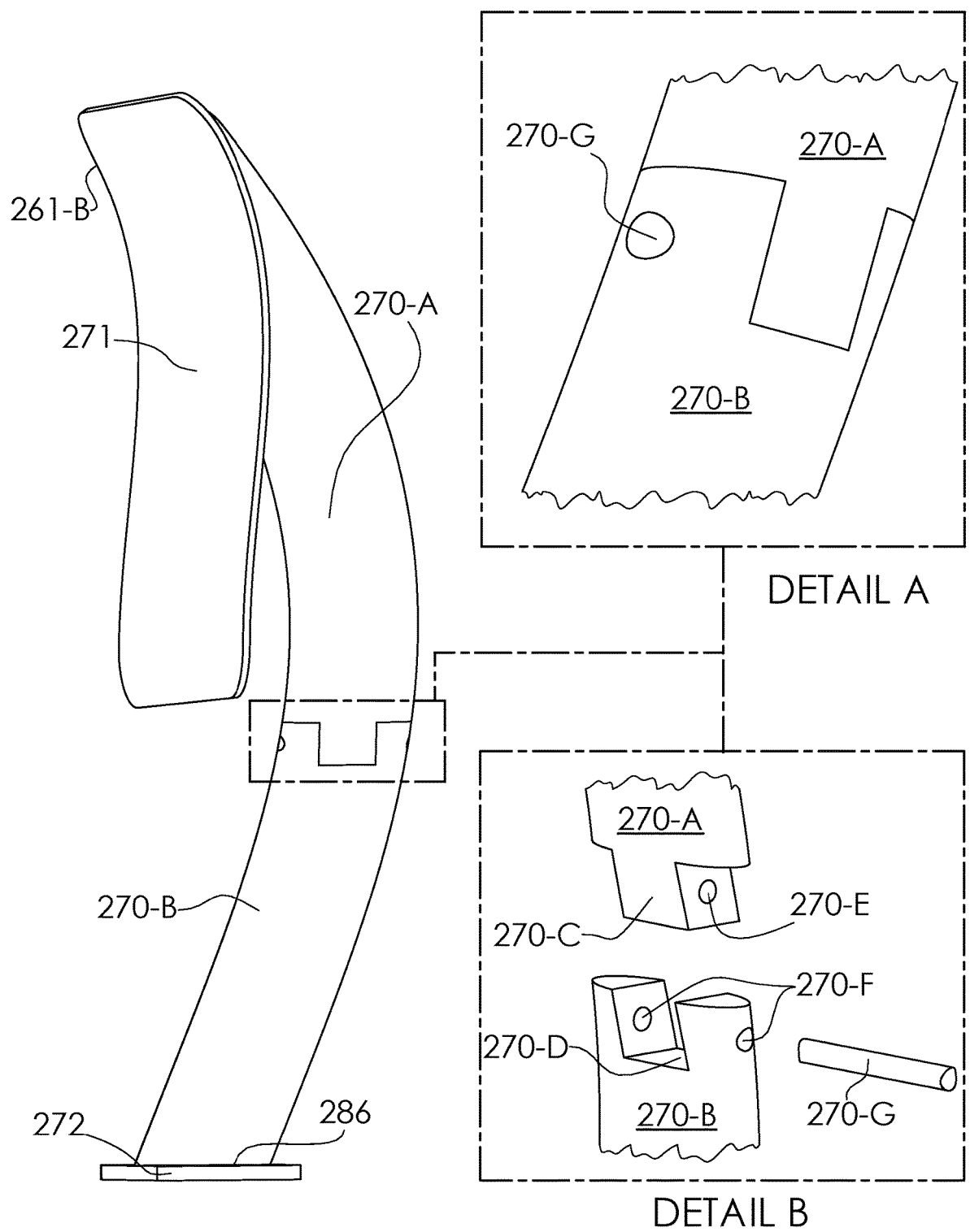
FIG. 19B is a side isometric view of a two-part deflector to blade connector assembly, with cropped magnified (i) detail isometric view of the connection between connector sections, and (ii) detail isometric exploded view the of connection between two connector sections.

9.6 Multi-Part Deflector and Connector Assemblies—FIG. 19A and FIG. 19B

Deflectors and/or connector assemblies may be provided in multi-part arrangements. Multi-part deflector 201 (see FIG. 19A) and multipart connector 261-B (see FIG. 19B), enables combinations that permit (i) installing or replacing an entire deflector by simply removing pins or other similar fasteners from multi-part connector 261-B as further described below, (ii) installing a multipart deflector 201 (see FIG. 19A) in sections as opposed to a monolithic deflector, thus reducing the time, expense and difficulty of transporting blade/deflector assemblies, and (iii) a simple swap out of a damaged deflector section, for example section 201-B (see FIG. 19A), in the event repairs to a portion of a deflector and/or connector assembly is required. This feature is particularly valuable since the connectors for deflectors designed to affect all or a large part of the airfoil section 164 of the blade 111 (see FIG. 2A) may be fixedly linked to the internal structures within the blade at the time of their manufacture. Consequently, absent this feature, repairs to damaged deflectors would be more complicated and expensive. It is important to note that the illustrations in FIG. 19A are of the suction side. Consequently its cropped cross-sectional view appears inverted.

As shown in FIG. 19A, a multi-part deflector 201 includes a plurality of adjoining sections 201-A-201-E. In the illustrated example, each section 201-A, 201-B, 201-C, 201-D, and 201-E is associated with and attached to at least one connector assembly 261-B, though this is not a requirement. The geometry of a particular multi-part deflector 201, when assembled, may be substantially identical in all respects to the geometry of the same design of single-piece deflector 200 (for example, as shown in FIG. 9A).

Adjoining sections of the multi-part deflector 201, e.g., sections 201-A and 201-B, sections 201-B and 201-C, sections 201-C and 201-D, and sections 201-D and section 201-E, may be connected to one another by connectors comprising parallel top and bottom plates connected to one another and between which abutting ends of the adjoining sections are sandwiched and held together. For example, as shown in FIG. 19A Detail B, a connector for connecting sections 201-B and 201-C comprises a top plate 202-C and a bottom plate 202-D, and the ends of sections 201-B and 201-C abut one another and are sandwiched between the bottom plate 202-D and top plate 202-C. It is preferred that a relief is provided in the top and bottom surfaces of the abutting ends of adjoining sections so that the bottom plate and the top plate are substantially flush with the pressure surface 204 and the suction surface 206 of the deflector 201.

FIG. 19A shows the bottom plate 202-B of a connector connecting adjoining sections 201-A and 201-B, the bottom plate 202-D of a connector connecting adjoining sections 201-B and 201-C, the bottom plate 202-F of a connector connecting adjoining sections 201-C and 201-D, and the bottom plate 202-H of a connector connecting adjoining sections 201-D and 201-E. As shown in FIGS. 19A and 19A Detail A, the connectors may be oriented at an angle relative to a line (e.g., a cord line) extending between the leading edge and trailing edge of the deflector 201-E. Benefits of the angular connection include making the section joints (i) self-aligning with a positive stop, thus permitting faster and precise installation and assembly as compared to non-angular joints, and (ii) stronger due to the increased surface area gained by the increased length of each joint.

Also, as shown in FIG. 19A and FIG. 19A Detail A, a plurality of fasteners connect the top and bottom plates to thereby hold the adjoining sections sandwiched between the plates together. For example, as shown in FIG. 19A Detail B, mechanical fasteners 202-P (e.g., screws, bolts, rivets, or the like) connect the top plate 202-C to the bottom plate 202-D. One set of fasteners 202-P connecting the top plate 202-C to the bottom plate 202-D extends through an end of section 201-B, and another set of fasteners 202-P connecting the top plate 202-C to the bottom plate 202-D extends through an end of section 201-C. Adhesives may be used to secure top plate 202-C and bottom plate 202-D to the adjoining deflector sections (with or without fasteners 202-P), although the use of adhesives may mean that the top plate 202-C and bottom plate 202-D cannot be removed from the deflector to replace a damaged deflector section (as described above) merely by removing the fastener 202-P.

9.6.1 Multi-Part Connector

Referring now to FIG. 19B while still referring to FIG. 19A, in some embodiments, the connector tube of connector assembly 261 may be separable in to two or more pieces. For example, as shown in FIG. 19B, multi-part connector assembly 261-B may include a first (or upper) tube section 270-A and a second (or lower) tube section 270-B that is connectable to the first tube section 270-A. In one example, as shown in Details A and B of FIG. 19B, first and second tube sections 270-A, 270-B may be connected by a joint comprising a tongue 270-C that is received within a mating groove 270-D. Tongue 270-C is retained within groove 270-D a retainer pin 270-G extending through holes 270-F formed in end of the lower section 270-B on opposite sides of the groove 270-D and aligned with a hole 270-E formed in the tongue 270-C. In the illustrated embodiment, tongue 270-C is formed on first tube section 270-A and groove 270-D is formed on second tube section 270-B, but the components may be reversed with the tongue 270-C formed on second tube section 270-B and groove 270-D formed on first tube section 270-A.

A multipart deflector can be delivered to an installation site in an unassembled state, and the sections 201-A-201-E can be attached to each other by placing adjoining sections with their ends abutting each other and the top plate 202-C and bottom plate 202-D of an associated connector assembly placed above and below the abutting ends. Holes aligned with the fastener holes formed in the top plate 202-C and bottom plate 202-D may be pre-formed in the abutting deflector sections or may be formed (e.g., drilled) on site, and fasteners 202-P inserted through the aligned holes. A first section 270-A of connector assembly 261-B will be attached to each of at least some of the deflector sections and the mating second section 270-B of each connector assembly 261-B will be attached to the blade to which the deflector 201 is to be attached. The first sections 270-A are connected to the second sections—e.g., by the tongue 270-C, groove 270-D, and retainer pin 270-G described above.

To replace one or more sections of the multi-part deflector 201, the fastener 202-P of the connector assembly holding the section(s) to be replaced are removed and, if any section to be replaced is connected to a connector assembly 261-B, the retainer pin 270-G is removed to permit the upper section 270-A to be separated from the lower section 270-B. The replacement sections are then put in place, with the ends disposed between top plate 202-C and bottom plate 202-D of the connector assembly and abutting the ends of the adjoining section(s) of the deflector and the tongue 270-C is placed into groove 270-D. Fasteners 202-P are placed into the top plate 202-C and bottom plate 202-D through the end of the replacement section and retainer pin 270-G is inserted into aligned holes 270-F and 270-E of the tube sections 270-A and 270-B. Retainer pins are one method of connecting the first section of 270-A connector assembly and the second section 270-B of connector assembly. However, other methods could be used by persons of ordinary skill including clevis pins, detent clevis pins, safety pins, nuts and bolts.

9.7 Variable Angle Connector Assembly—FIG. 20A-FIG. 20I

Figure 20A:
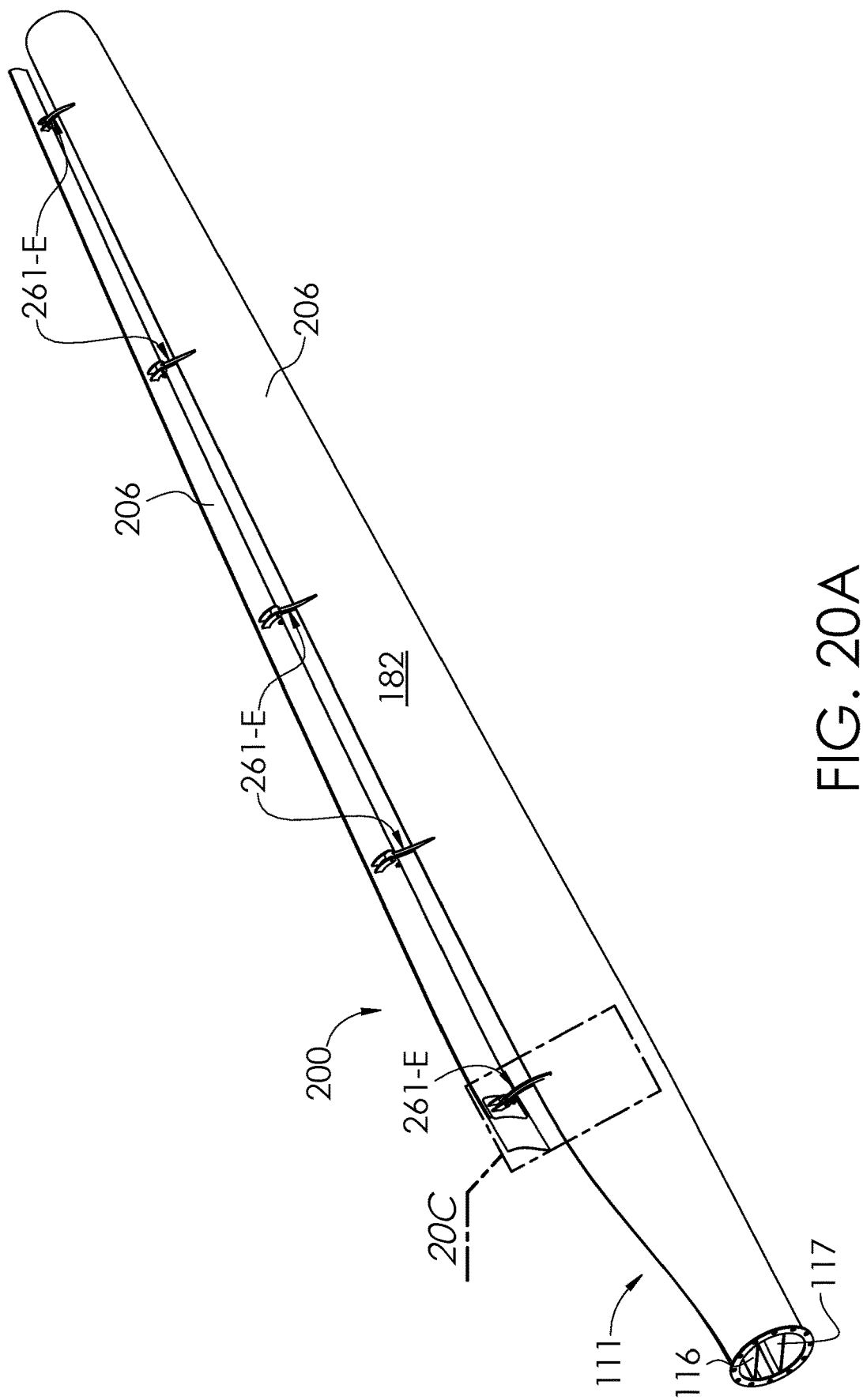
FIG. 20A is a rear isometric view of an embodiment of a deflector/blade assembly with variable angle connector assemblies.

Referring now to FIG. 20A, one deflector embodiment includes powered variable angle connector assemblies (VAC assemblies) capable of changing the deflector angle of attack. This embodiment is capable of (i) controlling and/or improving the deflector/blade assembly performance over the fluid velocity range in which the assembly is operating, (ii) causing the blade benefited by a deflector to begin to rotate and covert kinetic energy even sooner than flow simulations and physical tests show it otherwise does, and (iii) functioning as a braking device.

Still referring FIG. 20A, in an embodiment, VAC assemblies 261-E, visible on suction side 206 of deflector 200 and suction side 182 of blade 111, are fixedly linked within blade 111 and are fixedly linked to deflector 200. Connector assemblies 261-E conform to the twist of the deflector/blade assembly and the concavity and convexity of deflector 200, thus the twist and/or length or angle of connector assemblies 261-E may vary over the deflector span 223 (see FIG. 9A).

VAC assemblies 261-E connect the deflector 200 to the blade 111 and are configured, as will be described, to enable and effect powered adjustment of the deflector angle of attack. Such powered adjustment may be automated and computer-controlled.

As described in Subsection 8.1, changing the angle of attack of the deflector 200 is one variable factor that affects the deflector's impact on the blade 111 and thus the overall performance of the deflector/blade assembly and rotor.

Figure 20B:
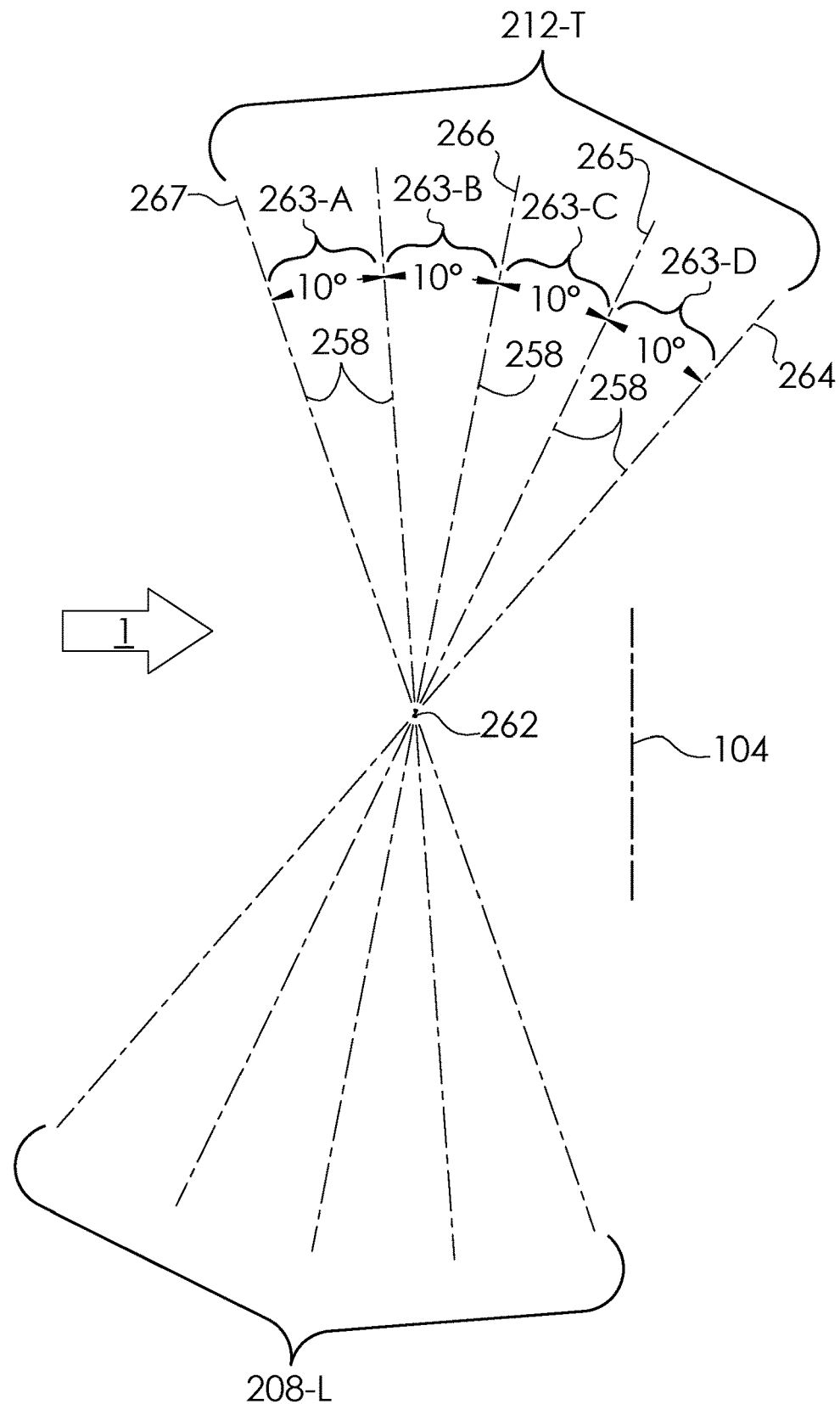
FIG. 20B is a side view of a deflector chord in five positions relative to the rotor plane of rotation and depicting four ranges of angle of attack of the deflector, starting with the deflector leading edge nearest to the oncoming fluid flow, to the deflector leading edge furthest from the oncoming fluid flow. To increase clarity of degrees of articulation, this figure is not drawn to scale and deflector profiles are not shown.

9.7.1 Optimization Positions—FIG. 20B

Referring now to FIG. 20B, while still referring to FIG. 20A, deflector chord line 258 is depicted in five positions relative to the rotor plane of rotation 104 represented as 10° angle ranges 263-A, 263-B, 263-C, and 263-D. To increase clarity of the illustration in FIG. 20B, profiles of deflector 200 are not shown. The deflector trailing edges would be located in the area of 212-T, located near the top of FIG. 20B, and the deflector leading edges would be located in the area of 208-L, located near the lower portion of FIG. 20B. In this embodiment, the deflector 200 articulates about point 262 (see also FIG. 20C) and has performance characteristics associated with deflector angle of attack ("AoA"), and positions as follows:

| AoA Range or Position | Performance Characteristics |
|---|---|
| 263-A | Induces drag; acts as brake |
| 263-B | Increases performance |
| 263-C | Increases performance |
| 263-D | Induces drag, acts as brake |
| 264 | Fully extended position; acts as brake |
| 265 | Optimal position to enable the start of rotation |
| 266 | Optimal position for 13 m/s |
| 267 | Fully retracted position; acts as brake |

In addition to the blade performance improvements detailed in Section 7, additional blade performance improvements may be achieved by changing the deflector angle of attack throughout a speed range. For example, in physical tests, at wind speed that is insufficient to cause a blade without the deflector to begin to rotate, a blade benefited with a deflector begins to rotate sooner in the same wind speed e.g. at less than 1.12 m/s as compared to nearly 2.25 m/s for a blade without the benefit of a deflector, and outperforms the blade without the benefit of the deflector throughout the speed range. However, if the deflector angle of attack is moved to position 265 in conditions where the oncoming fluid flow 1 speed was 0.0-0.9 m/s, the rotor would begin to rotate at 0.67 m/s, and, by adjusting the deflector angle of attack from position 265 to position 266 as the oncoming fluid flow 1 speed increased, additional global torque would be obtained due to the deflector 200 having an optimal angle of attack throughout the blade 111 speed range.

9.7.2 Actuation Detail Overview—FIG. 20C and FIG. 20D

Referring now to FIGS. 20C and 20D, while still referring to FIG. 20B, broken-out sections reveal motorized components and deflector-to-VAC connector connections. FIG. 20C shows the deflector in the fully extended position 264 (representing one end of the deflector angle of attack range), and FIG. 20D shows the deflector in the fully retracted position 267 (representing an opposite end of the deflector angle of attack range). It should be noted that, that the term "fully extended" refers to the position of the deflector relative to the plane of rotation 104 (see FIG. 20B). Consequently, in the embodiment shown, when the deflector 200 is in its fully extended position, the flexible shaft assembly 550 is in its fully retracted position, and likewise, when the deflector 200 is in its fully retracted position, the flexible shaft assembly 550 is in its fully extended position.

Connector assembly 261-E includes a pivot spar 270-H having a flange 272-H at one end that is connected (e.g., by mechanical fasteners or the like) to U-shaped web 116 within blade 111. Pivot spar 270-H projects through an opening in the blade 111 at or near the blade's trailing edge 174 and extends to a location spaced aft of the blade trailing edge 174. A deflector end flange 271-H is attached to deflector 200 and includes a pivoting connection 262 at which an end of spar 270-H is pivotably connected to flange 271-H. Details of this connection are described in Subsection 9.7.4.

In the illustrated embodiment, spar 270-H is connected to the flange 271-H (and thus to the deflector 200) closer to the deflector trailing edge 212 than to the deflector leading edge 208. A flexible shaft assembly 550 is connected to the flange 271-H closer to the deflector leading edge 208 than to the deflector trailing edge 212 and is configured to cause the deflector 200 to pivot about the end of the pivot spar 270-H at pivot connection 262 to thereby selectively alter the angle of attack of the deflector 200.

In the illustrated embodiment, motor 650 rotates a shaft 652 which drives a right-angle drive 655, which causes drive screw 656 to rotate, thereby causing corresponding axial movement of collar 670 along the length of drive screw 656, which causes corresponding axial movement of male guide tube 680 (see also Subsection 9.7.6), which causes flexible shaft assembly 550 to extend and retract to alter the angle of attack of the deflector 200. In this embodiment, motor 650 is located nearest the hub-end of blade 111, however, the motor 650 may alternatively be located anywhere along the blade span 154 (see FIG. 2A) or within the hub 121 (see FIG. 1A).

The VAC connector 40-degree range of motion (see FIG. 20B) may be extended in numerous methods including by (i) moving pivot point 262 closer to pivot point 563, or (ii) lengthening screw 656 and locating motor 650, shaft 652, right angle drive 655, shaft 660, and the balance of related shafts and right angle drives (see FIG. 20E), under support 119, and increasing the curvature of spar 270-H, thus increasing the distance of travel between trailing edge 208 and pivot spar 270-H, or (iii) swapping the locations of pivot points 262 and 563, or (iv) any combination of methods (i)-(iii).

A flexible shaft assembly 550 includes a flexible shaft 566 pivotably connected at one end to the flange 271-H and anchored at an opposite end within the blade 111. Flexible shaft 566 extends through a flexible shaft guide tube 565, which, in the illustrated embodiment, is part of the pivot spar 270-H. The end of flexible shaft 566 anchored within the blade 111 is coupled to a drive screw assembly 665 configured (see FIG. 20H), as will be described, to effect powered (e.g., motorized) axial movement of the flexible shaft 566 to vary the amount by which the flexible shaft 566 extends from the blade 111 to thus cause the deflector 200 to which the flexible shaft 566 is attached to pivot about pivot connection 262 and alter the angle of attack of the deflector 200.

Figure 20E:
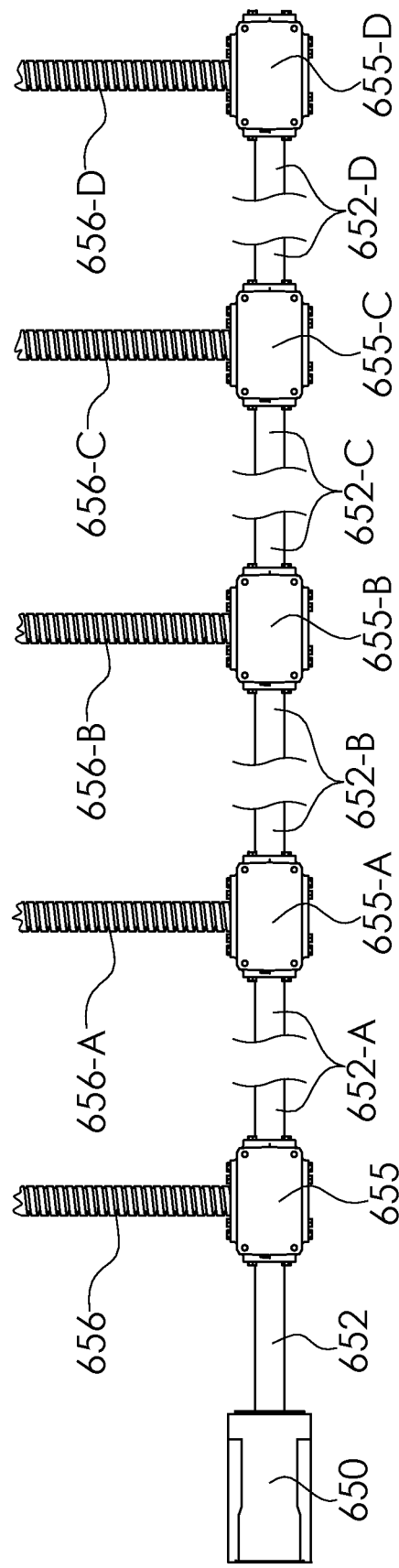
FIG. 20E is a broken rear view of the motor and related major drivetrain components of the variable angle connector assemblies located within a blade. The blade is not shown to reduce the complexity of the illustration.

9.7.3 Major Drivetrain Components—FIG. 20E

Referring now to FIG. 20E while still referring to FIG. 20C, if the deflector/blade assembly includes multiple VAC connector assemblies 261-E, right-angle drive 655 may also rotate shaft 660, which is connected to a subsequent right-angle drive for an adjacent VAC connector assembly 261-E, so that a single motor 650 can simultaneously actuate all VAC connector assemblies 261-E.

The right-angle drive and related drive shaft configuration illustrated may be repeated along the length of the deflector span 223 (see FIG. 9A) and drives each subsequent VAC connector assembly 261-E thereafter. In this embodiment, motor 650 drives shaft 652, which drives right angle drive 655, screw 656, and shaft 652-A which drives right angle drive 655-A, screw 656-A, and shaft 652-B, which drives right angle drive 655-B, screw 656-B, and shaft 652-C, which drives right angle drive 655-C, screw 656-C, and shaft 652-D, which drives right angle drive 655-D and screw 656-D.

Other embodiments of the VAC connectors could include one or more motors similar to motor 650 located anywhere along blade span 154 (see FIG. 2A), e.g., near the middle of the blade span 154, or within hub 121 (see FIG. 1A) not shown. Likewise, a computer that controls motor 650 may be located anywhere within the turbine 100 (see FIG. 1A).

Figure 20F:
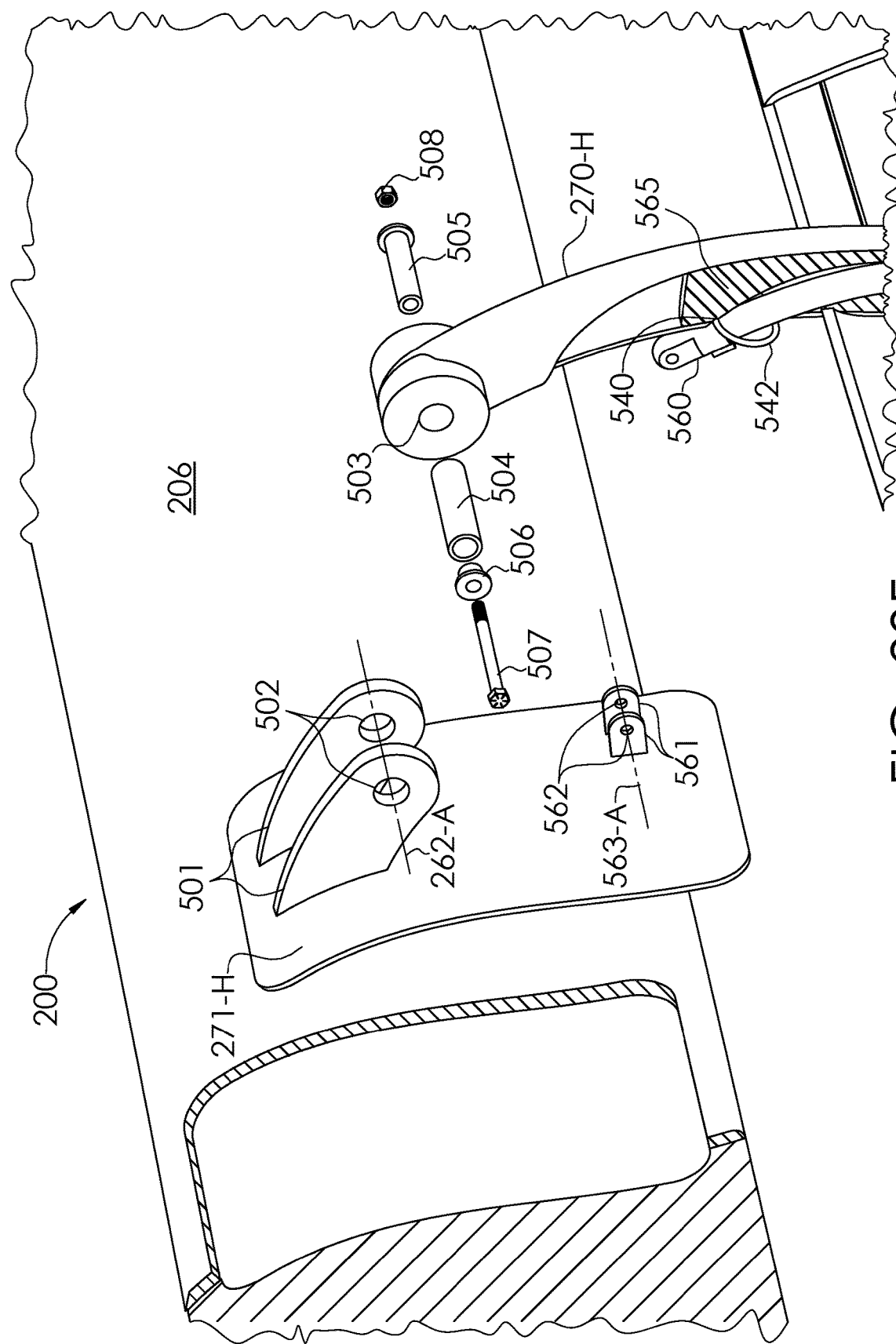
FIG. 20F is an exploded isometric view of a deflector-end of a cropped flexible rod assembly, with broken-out sections revealing (i) a cut-away view of the deflector, and (ii) internal details of a guide tube.

9.7.4 VAC Pivot Point Detail—FIG. 20F

Referring to FIG. 20F, pivot spar 270-H pivots at pivot point 262 about pivot axis 262-A. In one example, pivot point 262 (see FIGS. 20C and 20D), which is colinear with pivot axis 262-A, may comprise spaced-apart spar brackets 501 projecting from flange 271-H. A bushing 504 is press fit into a hole 503 formed in the end of the spar 270-H, and the end of spar 270-H is received between the spar brackets 501 with bushing 504 and hole 503 aligned with holes 502 formed in the spar brackets 501. A bushing 505 (which may be a self-lubricating bushing) is inserted through one hole 502 into one end of bushing 504, and a top hat bushing 506 is inserted through an opposite hole 502 into an opposite end of the bushing 504 and preferably contacts the bushing 505 within the bushing 504. A bolt 507 is inserted through holes 502 and bushings 506 and 505 and is secured at an end by a nut 508. Bolts and nuts are one method of attachment that can be used at pivot points 262 and 563 (see FIG. 20C and FIG. 20D). However, other methods could be used by persons of ordinary skill including clevis pins, detent clevis pins, and safety pins.

Figure 20G:
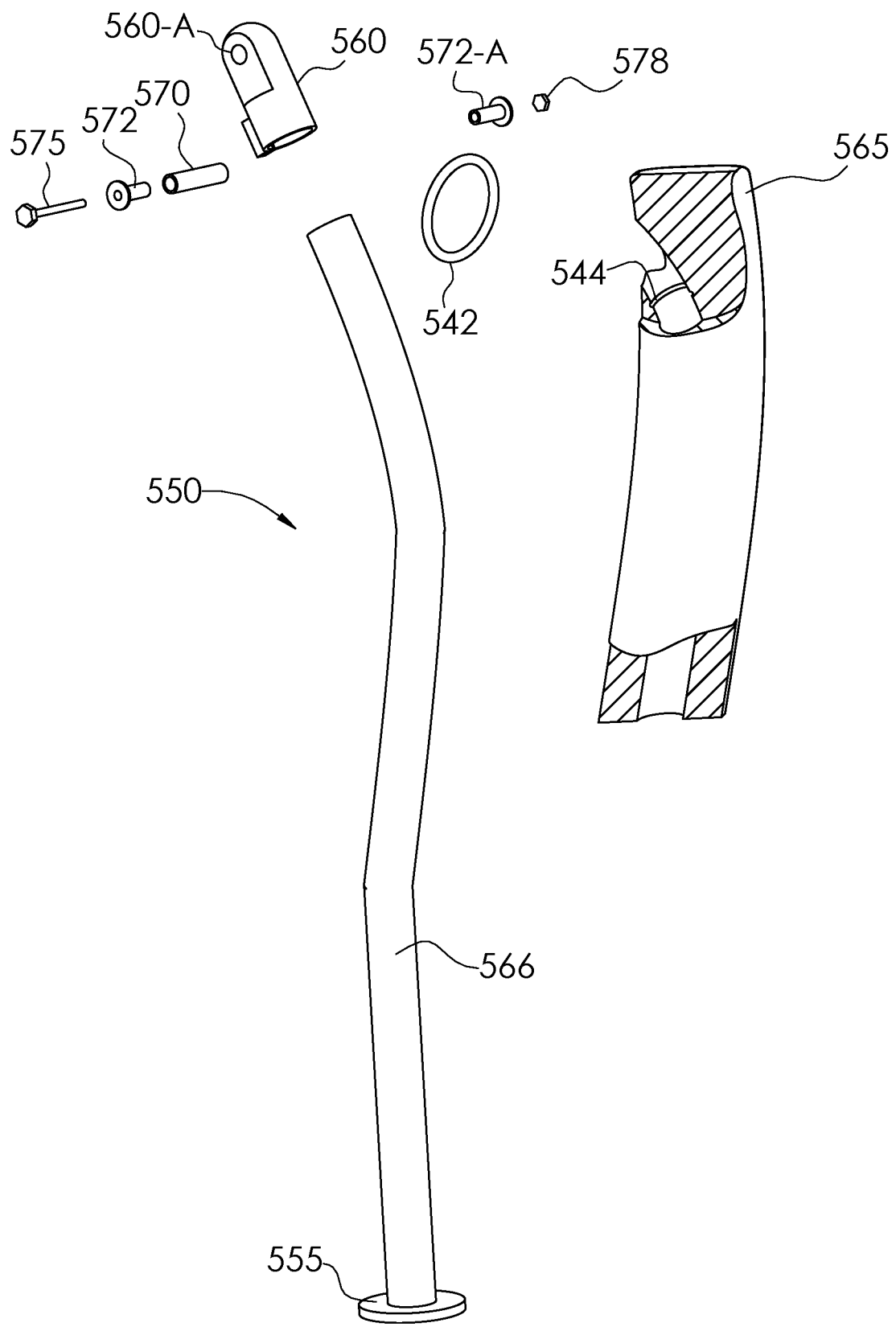
FIG. 20G is an exploded isometric view of the flexible rod assembly used with variable angle connector assemblies with a broken-out section and cross-sectional views of internal details of the guide tube.

9.7.5 Flexible Shaft Pivot Point and Shaft Detail—FIG. 20F-20G

Referring now to FIG. 20G while still referring to FIG. 20F in one example, flexible shaft 566 is pivotably attached to flange 271-H at a pivot point 563 (see FIG. 20C) to pivot about pivot axis 563-A at a pivot connector that is spaced apart in a deflector chordwise direction toward the deflector leading edge 208 from the pivot connector 262 (see FIG. 20C), connecting the spar 270-H to the deflector at pivot point 262 (see FIG. 20C). Pivot point 563 (see FIG. 20C) may comprise spaced-apart flexible shaft brackets 561 projecting from flange 271-H. A bushing 570 is press fit into a hole 560-A formed through a connector cap 560 disposed at an end of flexible shaft 566, and the connector 560 is received between the flexible shaft brackets 561 with bushing 570 and hole 560-A aligned with holes 562 formed in the flexible shaft brackets 561. A first bushing 572 (which may be a self-lubricating bushing) is inserted through one hole 562 into one end of bushing 570, and a second bushing 572-A is inserted through an opposite hole 562 into an opposite end of the bushing 570 and preferably contacts the first bushing 572 within the bushing 570. A bolt 575 is inserted through holes 562 and bushings 572 and 572-A and is secured at an end by a nut 578.

One or more seals or other means may be provided to prevent infiltration of moisture or debris along the flexible shaft 566 into the flexible shaft guide tube 565. As shown in FIGS. 20F and 20G, an O-ring 542 surrounding the flexible shaft 566 and positioned in an O-ring seat 544 may be provided. O-ring 542 is one design to prevent fluid from entering flexible shaft guide tube 565, however, multiple types and numbers of seals could be used for this purpose by anyone of ordinary skill.

Figure 20H:
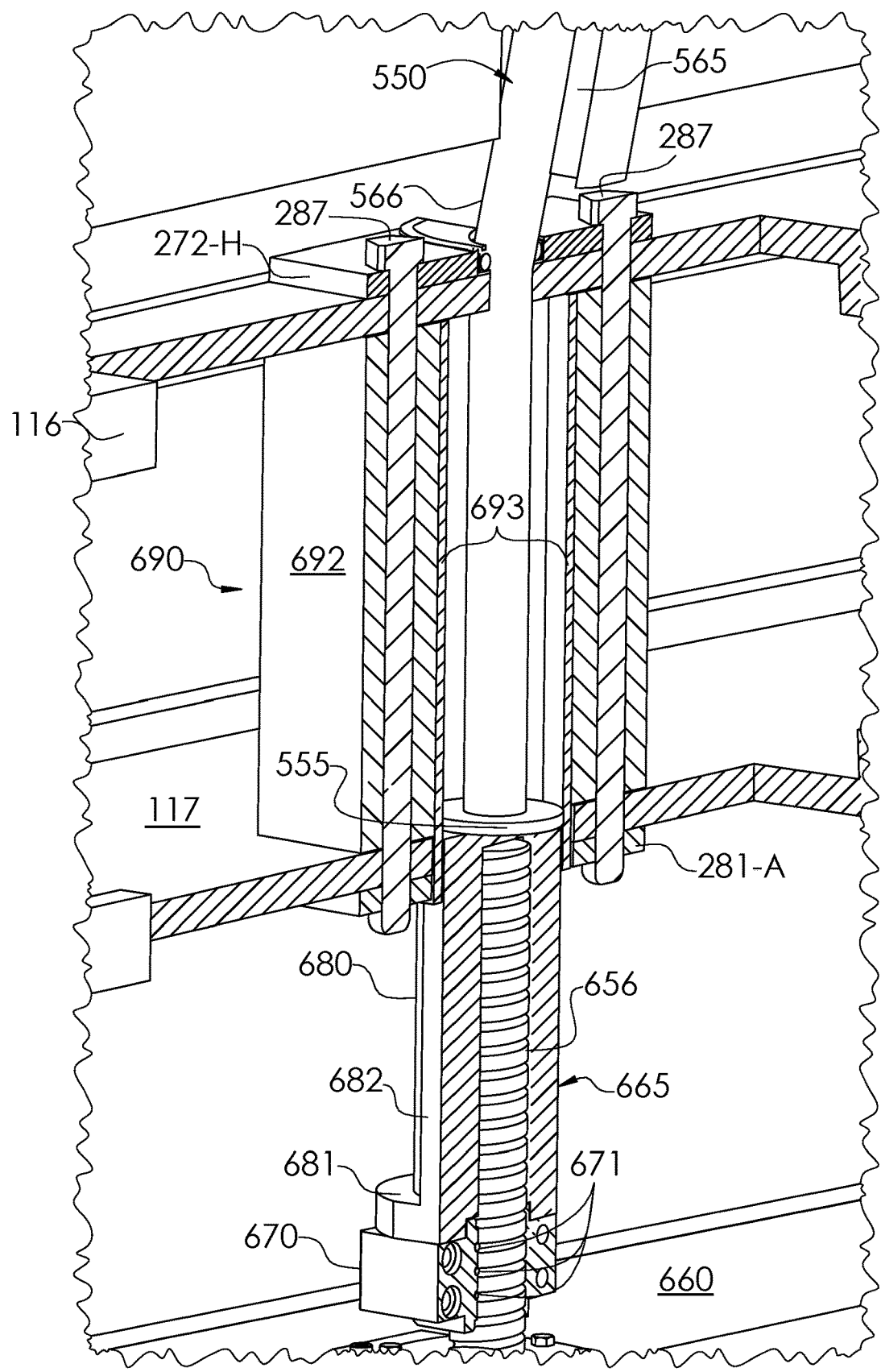
FIG. 20H is a cropped magnified rear isometric view of a portion of the deflector variable angle connector assembly located within a blade, with a broken-out section revealing cross-sectional views of structural and guide tube components.
Figure 20I:
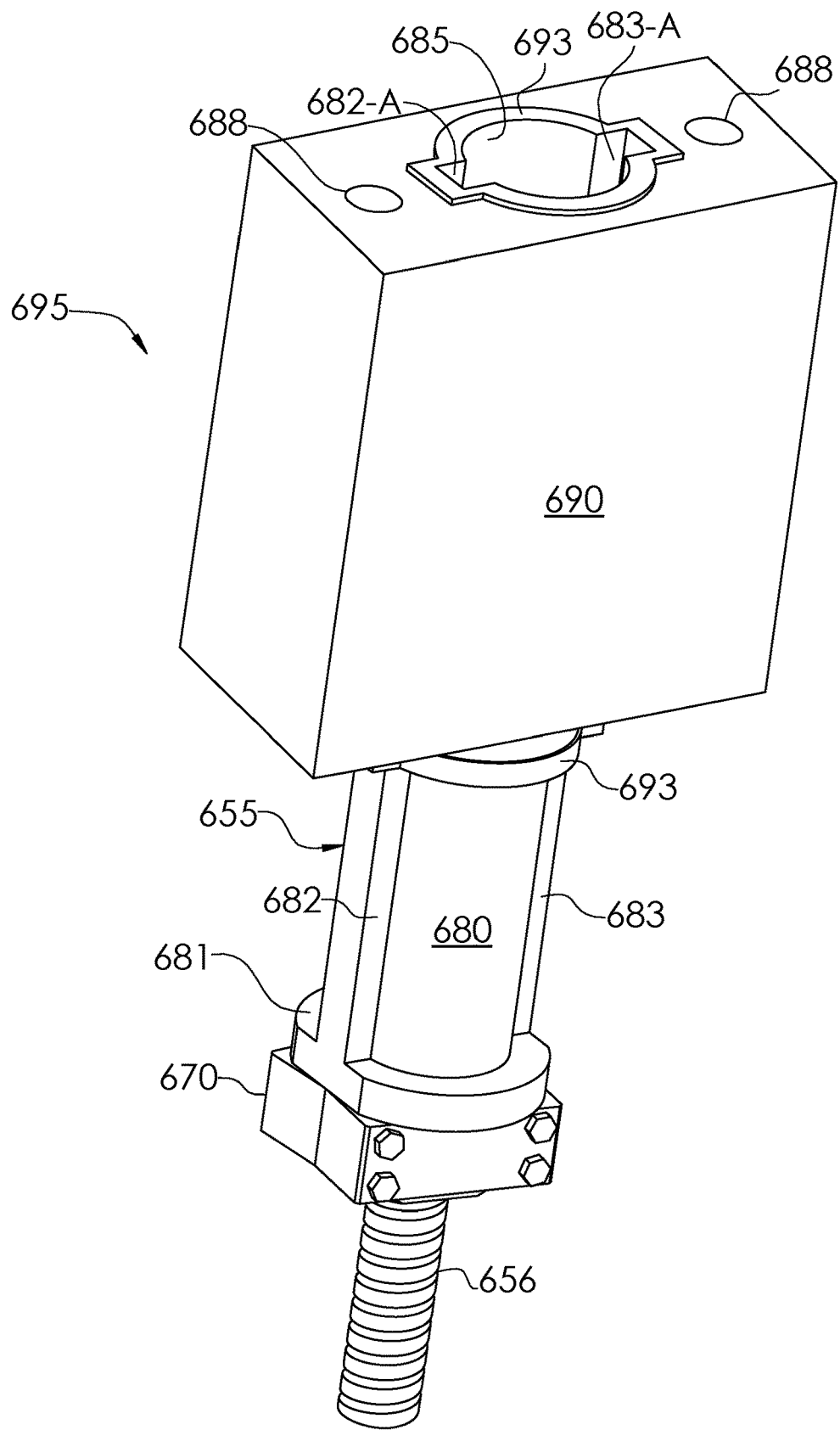
FIG. 20I is a magnified isometric view of a guide tube assembly with a mated male keyed assembly.

9.7.6 Guide Tube Assembly Detail—FIG. 20H-FIG. 20I

Referring to FIG. 20H, an end of flexible shaft assembly 550 is mounted within blade 111 (see FIGS. 20C and 20D) for limited axial movement in the guide tube assembly 690. Guide tube assembly 690, which includes a guide tube housing 692, may be secured between webs 116 and 117 by bolts 287 extending through flange 271-H, web 116, through holes 688 formed in housing 692, web 117, and lower flange 281-A. Bolts 287 may be secured by nuts (not shown) or lower flange 281-A may be threaded.

Flexible shaft 566 is disposed within a guide tube hole 685 (see FIG. 20I) in guide tube housing 692. A stop at 555 fixedly attached at an end of the flexible shaft 566 has a diameter slightly smaller than the diameter of the hole 685 to enable axial movement of the stop 555 and flexible shaft 566 within the hole 685, but larger than the diameter of holes formed in web 116 and flange 272-H (which diameters are slightly larger than the diameter of the flexible shaft 566). Stop 555 contacts web 116 to prevent the flexible shaft 566 from being pulled out of the guide tube housing 692 in tandem with stop 681 described below.

A flexible shaft actuator is coupled to flexible shaft 566 to effect selective, powered (e.g., motorized) axial movement of flexible shaft 566 within the guide hole 685. In the illustrated embodiment, a flexible shaft actuator comprises a drive screw assembly 665. Drive screw assembly 665 comprises a male guide tube 680 disposed for axial movement within the guide tube hole 685.

Drive assembly 665 further comprises a drive screw 656 extended into an axial, blind hole formed in the male guide tube 680. A collar of 670 with ball screw bearing 671 is operably coupled to drive screw 656 so that rotation of the drive screw 656 causes a corresponding axial movement of the collar 670 along the length of the drive screw 656. Collar 670 abuts stop 681 of male guide tube 680 and may be connected thereto so that axial movement of the collar 670 along the drive screw 656 causes corresponding axial movement of the male guide tube 680. An end of the male guide tube 680 opposite the stop 681 abuts with, and may be connected to, stop 555 of the flexible shaft 566 so that axial movement of the male guide tube 680 causes a corresponding axial movement of the flexible shaft 566 within the guide tube hole 685. When flexible shaft 550 is fully extended, stop 681 contacts flange 281-A thus limiting its travel in tandem with stop 555 as described above. Guide tube housing 692 may be split longitudinally and fastened together (not shown) to facilitate assembly of flexible shaft assembly 550 and drive screw assembly 665.

Referring now to FIG. 20I, keys 682, 683 received within key slots 682-A, 683-A, respectively, prevent the male guide tube 680 from rotating within the guide tube hole 685. A stop 681 at a lower end of the male guide tube 680 contacts the bottom of a female guide tube 693 disposed within housing 692 so as to limit the travel of the male guide tube 680 within the hole 685, and consequently, limit the travel of the flexible shaft assembly 550 (see FIG. 20G). Male guide tube 680 and female guide tube 693 may be constructed of or comprise materials at the designer's choice, including low-friction high strength metals and plastics, e.g. oil impregnated sintered bronze and acetal homopolymer such as Delrin®.

10. Blade and Deflector—Geometry as Simulated—FIG. 21A-21D

Deflector 111 CAD dimensional data, and the position of deflector 200 relative to the blade 111, as it underwent flow simulation as described in Section 7, is included in the following Subsections.

10.1 Deflector Dimensional Data—FIG. 21A-21D

Referring now to FIG. 21A, a side profile schematic of an embodiment of deflector 200 showing 11 reference points 900-910 along a chord, beginning with point 900 at the leading edge 208 and point 910 at the trailing edge 212, are shown.

Referring now to FIG. 21B, while still referring to FIG. 21A, this table provides profile dimensional data for a deflector that was modeled for flow analysis in X and Y coordinates for profiles A, B, C, D, and E (where leading edge 208 is the origin (0, 0) of the coordinate system).

Referring now to FIG. 21C while still referring to FIG. 21A and FIG. 21B, a front view of deflector 200 shows the intersections from which the profile measurements in the table in FIG. 21B were taken. Sections A-A, B-B, C-C, D-D, and E-E in FIG. 21C correspond, respectively, to table columns A, B, C, D, and E in FIG. 21B.

FIG. 21D shows a table of offset dimensions in the Z (spanwise) direction from the tip of the blade (profile A corresponding to section A-A in FIG. 21C to profiles B, C, D, and E, corresponding, respectively, to sections B-B, C-C, D-D, and E-E in FIG. 21C.

Referring now to FIG. 21A-FIG. 21D, geometric dimensional data for deflector 200 may be obtained at reference points 900-910 in FIG. 21A at each of profiles A through E corresponding, respectively, to sections A-A, B-B, C-C, D-D, and E-E in FIG. 21C. For example, from FIGS. 21B and 21D, reference point 901 on profile B has (X, Y, Z) coordinates (dimensional data) relative to leading edge 208 at the tip end of deflector 200 (i.e., profile A) of (0.142 m, 0.008 m, 9.113 m).

Figures 22A, 22B:
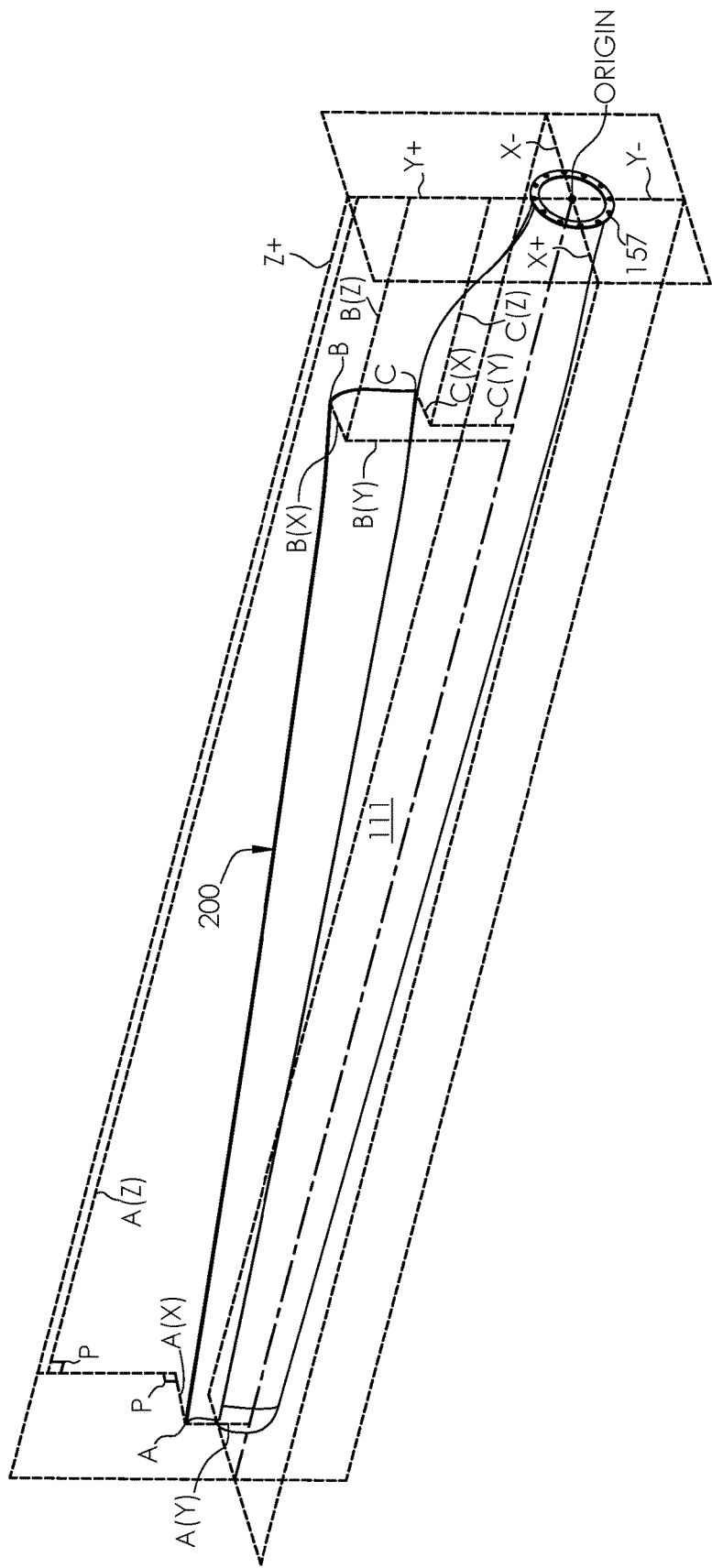
FIG. 22A is an isometric view of a deflector and blade geometry coordinate system that corresponds to dimensional data table in FIG. 22B.
FIG. 22B is a dimensional data table containing the data describing exemplary positioning and angling of the deflector relative to the blade and which corresponds to a simulated deflector/blade assembly described herein.

10.2 Deflector Position Relative to the Blade—FIG. 22A-22B

Referring now to FIG. 22A, blade 111 and deflector 200, the dimensional data for which is obtained from Subsection 10.1, are positioned within planes X, Y and Z originating from the center of connecting structure (hub mounting flange) 157. Deflector 200 is constrained by corner A (trailing edge of deflector 200 at the tip end of the deflector), corner B (trailing edge of deflector 200 at the hub end of the deflector), and corner C (leading edge of deflector 200 at the hub end of the deflector), thus defining each corner in X, Y, Z coordinates and consequently fully defining deflector 200 in 3-dimensional space necessary for obtaining dimensional data.

FIG. 22B provides X, Y, Z coordinates (dimensional data), relative to the coordinate system origin centered at the hub flange 157, for corners A, B, and C. X, Y, Z coordinates (dimensional data) for corner A are (0.66 m, 2.07 m, 44.32 m), for corner B are (−0.43 m, 5.18 m, 7.89 m), and for corner C are (−0.80 m, 2.69 m, 7.80 m).

For positioning profiles A through E of a deflector 200 in three-dimensional space, a geometric path of the blade trailing edge 174 in three-dimensional space can be followed as a guide for the leading edge 208 of deflector 200. Sections A-A, B-B, C-C, D-D, and E-E in FIG. 21C can be spaced along the three-dimensional geometric path at the Z intervals specified in FIG. 21D. Additionally, a profile twist progressively away from the oncoming flow, totaling 1°, occurs between profiles A and E. For example, twist for profile A=0.0°, B=0.25°, C=0.5°, D=0.75°, E=1.0°.

Deflector 200 vertical and horizontal skew distances between the blade trailing edge 174 and the deflector leading edge 208, as described in Subsections 8.2-8.3 and shown in FIGS. 13C and 13D, are 229-A −0.043 m, 229-E 0.151 m, 228-A 0.562 m, and 228-B 0.252 m.

Combinations of Elements and Components

All possible combinations of elements and components described in the specification and/or recited in the claims are contemplated and considered to be part of this disclosure. It should be appreciated that all combinations of the concepts and additional concepts discussed in greater detail herein (provided such concepts are not mutually inconsistent) are contemplated as being part of the inventive subject matter described herein.

Exemplary Embodiments

1 A fluid flow turbine blade assembly comprising: a rotor blade comprising a root section at which the rotor blade is attached to a hub of a fluid flow turbine and a working section, wherein the working section has a leading edge and a trailing edge and wherein the working section is configured and oriented to form a pressure surface facing oncoming fluid flow impinging on the rotor blade and a suction surface; and a deflector coupled to the rotor blade and extending spanwise along at least a portion of the working section of the rotor blade, wherein the deflector has a leading edge, a trailing edge, an upstream surface facing the oncoming fluid flow, and a downstream surface facing away from the oncoming fluid flow, wherein the deflector has a substantially uniform thickness between the upstream surface and the downstream surface, wherein at least a portion of the upstream surface along at least a portion of a span of the deflector has a concave shape in a chordwise direction, and wherein the trailing edge of the deflector is situated aft of the trailing edge of the working section relative to a direction of travel of the turbine blade assembly.

2 The fluid flow turbine blade assembly of embodiment 1, wherein the working section of the blade is an airfoil section or a hydrofoil section.

3 The fluid flow turbine blade assembly of embodiment 1 or 2, wherein at least a portion of the upstream surface has a convex shape in a chordwise direction.

4 The fluid flow turbine blade assembly of any one of embodiments 1 to 3, wherein the portion of the upstream surface having a concave shape extends to the trailing edge of the deflector.

5 The fluid flow turbine blade assembly of embodiment 3, wherein the portion of the upstream surface having a convex shape extends to the leading edge of the deflector.

6 The fluid flow turbine blade assembly of any one of embodiments 1 to 5, wherein along at least a portion of the span of the deflector, the leading edge of the deflector is closer to the oncoming fluid flow than the trailing edge of the rotor blade.

7 The fluid flow turbine blade assembly of embodiment 6, wherein, along at least a portion of the span of the deflector, the trailing edge of the deflector is closer to the oncoming fluid flow than the trailing edge of the rotor blade.

8 The fluid flow turbine blade assembly of any one of embodiments 1 to 5, wherein, along at least a portion of the span of the deflector, the leading edge of the deflector is further from the oncoming fluid flow than the trailing edge of the rotor blade.

9 The fluid flow turbine blade assembly of embodiment 8, wherein, along at least a portion of the span of the deflector, the trailing edge of the deflector is further from the oncoming fluid flow than the trailing edge of the rotor blade.

10 The fluid flow turbine blade assembly of any one of embodiments 1 to 9, wherein the leading edge of the deflector is situated aft of the trailing edge of the working section relative to the direction of travel of the turbine blade assembly.

11 The fluid flow turbine blade assembly of any one of embodiments 1 to 10, further comprising a connector assembly connecting the deflector to the rotor blade.

12 The fluid flow turbine blade assembly of embodiment 11, wherein the connector assembly comprises: a tube a deflector-end flange fixedly linked to one end of the tube and to the deflector; and a blade-end flange fixedly linked to an opposite end of the tube and to the rotor blade.

13 The fluid flow turbine blade assembly of embodiment 12, wherein the turbine blade assembly is attached to a hub of a rotor that is rotatable about a rotor axis of rotation, the turbine blade assembly is oriented radially with respect to the rotor axis of rotation, and at least a portion of the oncoming fluid flow is parallel to the rotor axis of rotation, wherein a first section of the tube defines an aerodynamic shape that is tapered toward a first leading edge of the first section and is tapered toward a first trailing edge of the first section with respect to the oncoming fluid flow and a second section of the tube defines an aerodynamic shape that is tapered toward a second leading edge of the second section and is tapered toward a second trailing edge of the second section with respect to fluid flow resulting from rotation of the rotor.

14 The fluid flow turbine blade assembly of embodiment 13, wherein the first section is symmetrical about a line bisecting the first section between the first leading edge and the first trailing edge, and the second section is symmetrical about a line bisecting the second section between the second leading edge and the second trailing edge.

15 The fluid flow turbine blade assembly of any one of embodiments 12 to 14, comprising two or more connector assemblies, each disposed at a different span-wise position along the turbine blade assembly, and wherein the tube of each connector assembly is shaped between its opposed ends to conform to an arc centered on an axis of rotation of the fluid flow turbine and having a radius corresponding to the spanwise position of the connector assembly.

16 The fluid flow turbine blade assembly of any one of embodiments 1 to 15, wherein a spacing between the deflector and the rotor blade is constant across the span of the deflector.

17 The fluid flow turbine blade assembly of any one of embodiments 1 to 15, wherein a spacing between the deflector and the rotor blade varies across at least a portion of the span of the deflector.

18 The fluid flow turbine blade assembly of any one of embodiments 1 to 17, wherein at least one of a radius of curvature and an arc-length of the portion of the upstream surface having the concave shape varies along at least a portion of the span of the deflector.

19 The fluid flow turbine blade assembly of any one of embodiments 1 to 18, wherein at least a portion of a chord extending between the leading edge of the deflector and the trailing edge of the deflector is disposed outside a profile of the deflector defined between the upstream surface of the deflector and the downstream surface of the deflector.

20 The fluid flow turbine blade assembly of embodiment 19, wherein, at least 25-90% of the chord extending between the leading edge of the deflector and the trailing edge of the deflector is disposed outside the profile of the deflector defined between the upstream surface of the deflector and the downstream surface of the deflector.

21 The fluid flow turbine blade assembly of embodiment 20, wherein, at least 25-80% of the chord extending between the leading edge of the deflector and the trailing edge of the deflector is disposed outside the profile of the deflector defined between the upstream surface of the deflector and the downstream surface of the deflector at a tip end of the deflector, and at least 65-90% of the chord extending between the leading edge of the deflector and the trailing edge of the deflector is disposed outside the profile of the deflector defined between the upstream surface of the deflector and the downstream surface of the deflector at a hub end of the deflector 22 The fluid flow turbine blade assembly of any one of embodiments 1 to 21, wherein a span-wise curvature of the leading edge of the deflector follows a span-wise curvature of the trailing edge of the blade.

23 The fluid flow turbine blade assembly of any one of embodiments 1 to 22, further comprising one or more walls projecting from at least one of the upstream surface and the downstream surface of the deflector, wherein each wall extends at least partially from the leading edge of the deflector to the trailing edge of the deflector.

24 The fluid flow turbine blade assembly of embodiment 23, further comprising a transverse wall extending from at least one of the one or more wall, wherein the transvers wall extends along or near the trailing edge of the deflector.

25 The fluid flow turbine blade assembly of any one of embodiments 1 to 24, wherein the deflector comprises two or more sections, wherein each section is connected to an adjoining section by a connector comprising a top plate and a bottom plate overlapping abutting ends of the section and the adjoining section and fasteners extending through the top and bottom plates and portions of the section and the adjoining section overlapped by the top and bottom plates.

26. The fluid flow turbine blade assembly of any one of embodiments 1 to 25, wherein the deflector has a reflexed mean camber line such that a center of curvature of a first portion of the reflexed mean camber line is located on a downstream side of the deflector and a center of curvature of a second portion of the reflexed mean camber line is located on an upstream side of the deflector.

27 The fluid flow turbine assembly of any one of embodiments 1 to 26, wherein along at least a portion of a span of the deflector extending to tip end of the deflector, both the leading edge of the deflector and the trailing edge of the deflector are closer to the oncoming flow than both the leading edge of the blade and the trailing edge of the blade.

28 The fluid flow turbine assembly of embodiment 27, wherein at a hub end of the deflector at least one of the leading edge of the deflector and the trailing edge of the deflector is not closer to the oncoming flow than at least one of the leading edge of the blade and the trailing edge of the blade.

29 The fluid flow turbine assembly of embodiment 28, wherein a distance by which the deflector is closer to the oncoming flow than the blade increases continuously from the hub end of the deflector to the tip end of the deflector.

30 The fluid flow turbine blade assembly of any one of embodiments 11 to 15, wherein the connector assembly connects the deflector to the rotor blade such that an angle of attack of the deflector with respect to a rotor plane of rotation is fixed or such that the angle of attack of the deflector with respect to the rotor plane of rotation is variable.

31 The fluid flow turbine blade assembly of embodiment 11, wherein the connector assembly comprises a variable angle connector assembly which connects the deflector to the rotor blade such that an angle of attack of the deflector with respect to a rotor plane of rotation is variable, and wherein the variable angle connector assembly comprises: a spar having a first end fixed to an internal structure within the rotor blade and a second end pivotably connected to the deflector; a flexible shaft having a first end supported internally of the rotor blade for axial movement with respect to a longitudinal axis of the flexible shaft and a second end pivotably connected to the deflector at a position that is spaced apart from a position at which the second end of the spar is pivotably connected to the deflector; and a flexible shaft actuator coupled to the first end of the flexible shaft for effecting axial movement of the flexible shaft.

32 The fluid flow turbine assembly of embodiment 31, wherein the flexible shaft actuator comprises: a guide tube assembly disposed within the rotor blade, the guide tube assembly comprising a guide tube housing having a guide hole within which the first end of the flexible shaft is supported and a guide tube that is movable within the guide hole, wherein the first end of the flexible shaft is coupled to an end of the guide tube; a drive screw extending into a hole formed in the guide tube; a threaded collar coupled to the drive screw so that rotation of the drive screw causes a corresponding axial movement of the collar along a length of the drive screw, wherein the collar is coupled to the guide tube so that the axial movement of the collar is transmitted to the guide tube to cause axial movement of the guide tube within the guide hole which causes corresponding axial movement of the flexible shaft; and a motor coupled to the drive screw for effecting powered rotation of the drive screw.

33 The fluid flow turbine assembly of embodiment 32, wherein the motor is coupled to the drive screw by a right angled drive that transmits a shaft rotation generated by the motor in a first direction to rotate the drive screw and in a second direction to rotate a drive shaft to transmit rotation to a flexible shaft actuator of an adjacent variable angle connector assembly.

34 The fluid flow turbine blade assembly of any one of embodiments 1 to 33, wherein the deflector extends spanwise along an entire span of the rotor blade, including the root section and the working section.

35 The fluid flow turbine blade assembly of any one of embodiments 1 to 34, wherein at least a portion of the trailing edge of the deflector includes a curved section of decreasing chord length between the leading edge of the deflector and the trailing edge of the deflector, wherein the curved section extends to a tip of the deflector.

36 The fluid flow turbine blade assembly of any one of embodiments 1 to 34, wherein at least a portion of the trailing edge of the deflector includes an arced section of increasing chord length between the leading edge of the deflector and the trailing edge of the deflector, wherein the arced section extends to a tip of the deflector.

37 A fluid flow turbine blade assembly comprising: a rotor blade comprising a root section at which the rotor blade is attached to a hub of a fluid flow turbine and a working section, wherein the working section has a leading edge and a trailing edge and wherein the working section is configured and oriented to form a pressure surface facing oncoming fluid flow impinging on the rotor blade and a suction surface; and a deflector coupled to the rotor blade and extending spanwise along at least a portion of the working section of the rotor blade, wherein the deflector has a leading edge, a trailing edge, an upstream surface facing the oncoming fluid flow, and a downstream surface facing away from the oncoming fluid flow, wherein at least a portion of a chord extending between the leading edge of the deflector and the trailing edge of the deflector is disposed outside a profile of the deflector defined between the upstream surface of the deflector and the downstream surface of the deflector, wherein at least a portion of the upstream surface along at least a portion of a span of the deflector has a concave shape in a chordwise direction, and wherein the trailing edge of the deflector is situated aft of the trailing edge of the working section relative to a direction of travel of the turbine blade assembly.

38 The fluid flow turbine blade assembly of embodiment 37, wherein the working section of the blade is an airfoil section or a hydrofoil section.

39 The fluid flow turbine blade assembly of embodiment 37 or 38, wherein at least a portion of the upstream surface has a convex shape in a chordwise direction.

40 The fluid flow turbine blade assembly of any one of embodiments 37 to 39, wherein the portion of the upstream surface having a concave shape extends to the trailing edge of the deflector.

41 The fluid flow turbine blade assembly of embodiment 39, wherein the portion of the upstream surface having a convex shape extends to the leading edge of the deflector.

42 The fluid flow turbine blade assembly of any one of embodiments 37 to 41, wherein, along at least a portion of the span of the deflector, the leading edge of the deflector is closer to the oncoming fluid flow than the trailing edge of the rotor blade.

43 The fluid flow turbine blade assembly of embodiment 42, wherein, along at least a portion of the span of the deflector, the trailing edge of the deflector is closer to the oncoming fluid flow than the trailing edge of the rotor blade.

44 The fluid flow turbine blade assembly of any one of embodiments 37 to 41, wherein, along at least a portion of the span of the deflector, the leading edge of the deflector is further from the oncoming fluid flow than the trailing edge of the rotor blade.

45 The fluid flow turbine blade assembly of embodiment 44, wherein, along at least a portion of the span of the deflector, the trailing edge of the deflector is further from the oncoming fluid flow than the trailing edge of the rotor blade.

46 The fluid flow turbine blade assembly of any one of embodiments 37 to 45, wherein the leading edge of the deflector is situated aft of the trailing edge of the working section relative to the direction of travel of the turbine blade assembly.

47 The fluid flow turbine blade assembly of any one of embodiments 37 to 46, wherein, at least 25-90% of the chord extending between the leading edge of the deflector and the trailing edge of the deflector is disposed outside the profile of the deflector defined between the upstream surface of the deflector and the downstream surface of the deflector.

48 The fluid flow turbine blade assembly of embodiment 20, wherein, at least 25-80% of the chord extending between the leading edge of the deflector and the trailing edge of the deflector is disposed outside the profile of the deflector defined between the upstream surface of the deflector and the downstream surface of the deflector at a tip end of the deflector, and at least 65-90% of the chord extending between the leading edge of the deflector and the trailing edge of the deflector is disposed outside the profile of the deflector defined between the upstream surface of the deflector and the downstream surface of the deflector at a hub end of the deflector 49 The fluid flow turbine blade assembly of any one of embodiments 37 to 48, wherein a span-wise curvature of the leading edge of the deflector follows a span-wise curvature of the trailing edge of the blade.

50 The fluid flow turbine blade assembly of any one of embodiments 37 to 49, further comprising one or more walls projecting from at least one of the upstream surface and the downstream surface of the deflector, wherein each wall extends at least partially from the leading edge of the deflector to the trailing edge of the deflector.

51 The fluid flow turbine blade assembly of embodiment 50, further comprising a transverse wall extending from at least one of the one or more wall, wherein the transvers wall extends along or near the trailing edge of the deflector.

52 The fluid flow turbine blade assembly of any one of embodiments 37 to 51, wherein the deflector comprises two or more sections, wherein each section is connected to an adjoining section by a connector comprising a top plate and a bottom plate overlapping abutting ends of the section and the adjoining section and fasteners extending through the top and bottom plates and portions of the section and the adjoining section overlapped by the top and bottom plates.

53. The fluid flow turbine blade assembly of any one of embodiments 37 to 52, wherein the deflector has a reflexed mean camber line such that a center of curvature of a first portion of the reflexed mean camber line is located on a downstream side of the deflector and a center of curvature of a second portion of the reflexed mean camber line is located on an upstream side of the deflector.

54 The fluid flow turbine assembly of any one of embodiments 37 to 53, wherein along at least a portion of a span of the deflector extending to tip end of the deflector, both the leading edge of the deflector and the trailing edge of the deflector are closer to the oncoming flow than both the leading edge of the blade and the trailing edge of the blade.

55 The fluid flow turbine assembly of embodiment 54, wherein at a hub end of the deflector at least one of the leading edge of the deflector and the trailing edge of the deflector is not closer to the oncoming flow than at least one of the leading edge of the blade and the trailing edge of the blade.

56 The fluid flow turbine assembly of embodiment 55, wherein a distance by which the deflector is closer to the oncoming flow than the blade increases continuously from the hub end of the deflector to the tip end of the deflector.

57 The fluid flow turbine blade assembly of any one of embodiments 32 to 56, further comprising a connector assembly connecting the deflector to the rotor blade.

58 The fluid flow turbine blade assembly of embodiment 57, wherein the connector assembly comprises: a tube a deflector-end flange fixedly linked to one end of the tube and to the deflector; and a blade-end flange fixedly linked to an opposite end of the tube and to the rotor blade.

59 The fluid flow turbine blade assembly of embodiment 58, wherein the turbine blade assembly is attached to a hub of a rotor that is rotatable about a rotor axis of rotation, the turbine blade assembly is oriented radially with respect to the rotor axis of rotation, and at least a portion of the oncoming fluid flow is parallel to the rotor axis of rotation, wherein a first section of the tube defines an aerodynamic shape that is tapered toward a first leading edge of the first section and is tapered toward a first trailing edge of the first section with respect to the oncoming fluid flow and a second section of the tube defines an aerodynamic shape that is tapered toward a second leading edge of the second section and is tapered toward a second trailing edge of the second section with respect to fluid flow resulting from rotation of the rotor.

60 The fluid flow turbine blade assembly of embodiment 59, wherein the first section is symmetrical about a line bisecting the first section between the first leading edge and the first trailing edge, and the second section is symmetrical about a line bisecting the second section between the second leading edge and the second trailing edge.

61 The fluid flow turbine blade assembly of any one of embodiments 58 to 60, comprising two or more connector assemblies, each disposed at a different span-wise position along the turbine blade assembly, and wherein the tube of each connector assembly is shaped between its opposed ends to conform to an arc centered on an axis of rotation of the fluid flow turbine and having a radius corresponding to the spanwise position of the connector assembly.

62 The fluid flow turbine blade assembly of any one of embodiments 37 to 61, wherein a spacing between the deflector and the rotor blade is constant across the span of the deflector.

63 The fluid flow turbine blade assembly of any one of embodiments 37 to 61, wherein a spacing between the deflector and the rotor blade varies across at least a portion of the span of the deflector.

64 The fluid flow turbine blade assembly of any one of embodiments 37 to 63, wherein at least one of a radius of curvature and an arc-length of the portion of the upstream surface having the concave shape varies along at least a portion of the span of the deflector.

65 The fluid flow turbine blade assembly of any one of embodiments 57 to 61, wherein the connector assembly connects the deflector to the rotor blade such that an angle of attack of the deflector with respect to a rotor plane of rotation is fixed or such that the angle of attack of the deflector with respect to the rotor plane of rotation is variable.

66 The fluid flow turbine blade assembly of any one of embodiments 57, wherein the connector assembly comprises a variable angle connector assembly which connects the deflector to the rotor blade such that an angle of attack of the deflector with respect to a rotor plane of rotation is variable, and wherein the variable angle connector assembly comprises: a spar having a first end fixed to an internal structure within the rotor blade and a second end pivotably connected to the deflector; a flexible shaft having a first end supported internally of the rotor blade for axial movement with respect to a longitudinal axis of the flexible shaft and a second end pivotably connected to the deflector at a position that is spaced apart from a position at which the second end of the spar is pivotably connected to the deflector; and a flexible shaft actuator coupled to the first end of the flexible shaft for effecting axial movement of the flexible shaft.

67 The fluid flow turbine assembly of embodiment 66, wherein the flexible shaft actuator comprises: a guide tube assembly disposed within the rotor blade, the guide tube assembly comprising a guide tube housing having a guide hole within which the first end of the flexible shaft is supported and a guide tube that is movable within the guide hole, wherein the first end of the flexible shaft is coupled to an end of the guide tube; a drive screw extending into a hole formed in the guide tube; a threaded collar coupled to the drive screw so that rotation of the drive screw causes a corresponding axial movement of the collar along a length of the drive screw, wherein the collar is coupled to the guide tube so that the axial movement of the collar is transmitted to the guide tube to cause axial movement of the guide tube within the guide hole which causes corresponding axial movement of the flexible shaft; and a motor coupled to the drive screw for effecting powered rotation of the drive screw.

68 The fluid flow turbine assembly of embodiment 67, wherein the motor is coupled to the drive screw by a right angled drive that transmits a shaft rotation generated by the motor in a first direction to rotate the drive screw and in a second direction to rotate a drive shaft to transmit rotation to a flexible shaft actuator of an adjacent variable angle connector assembly.

69 The fluid flow turbine blade assembly of any one of embodiments 37 to 68, wherein the deflector extends spanwise along an entire span of the rotor blade, including the root section and the working section.

70 The fluid flow turbine blade assembly of any one of embodiments 37 to 69, wherein, from the leading edge of the deflector to the trailing edge of the deflector, the deflector has a non-uniform thickness between the upstream surface and the downstream surface.

71 The fluid flow turbine blade assembly of any one of embodiments 37 to 70, wherein at least a portion of the trailing edge of the deflector includes a curved section of decreasing chord length between the leading edge of the deflector and the trailing edge of the deflector, wherein the curved section extends to a tip of the deflector.

72 The fluid flow turbine blade assembly of any one of embodiments 37 to 70, wherein at least a portion of the trailing edge of the deflector includes an arced section of increasing chord length between the leading edge of the deflector and the trailing edge of the deflector extending to a tip of the deflector, wherein the arced section extends to a tip of the deflector.

73 A fluid flow turbine comprising: a hub; and a rotor comprising two or more of the turbine blade assembly of any one of embodiments 37 to 72 connected to the hub, wherein the rotor is rotatable about a rotor axis of rotation and each turbine blade assembly extends radially with respect to the rotor axis of rotation.

74 The fluid flow turbine of embodiment 73, wherein the rotor axis of rotation is oriented vertically or horizontally.

75 The fluid flow turbine of embodiment 73 or 74, comprising at least three of the turbine blade assemblies connected to the hub.

76 The fluid flow turbine of any one of embodiments 73 to 75, comprising: a nacelle, wherein the hub is supported by or within the nacelle; and a tower supporting the nacelle.

77 The fluid flow turbine of claim 76, further comprising at least one of a gearbox and a generator within the nacelle and operatively coupled to the rotor.

78 The fluid flow turbine of embodiment 73, wherein at least a portion of the oncoming fluid flow is generally parallel to the rotor axis of rotation.

79 A hydro driven turbine assembly comprising the fluid flow turbine of any one of embodiments 73 to 78.

80 A wind driven turbine assembly comprising the fluid flow turbine of any one of embodiments 73 to 78.

81 A fluid flow turbine comprising: a hub; and a rotor comprising two or more of the turbine blade assembly of any one of embodiments 1 to 26 connected to the hub, wherein the rotor is rotatable about a rotor axis of rotation and each turbine blade assembly extends radially with respect to the rotor axis of rotation.

82 The fluid flow turbine of embodiment 81, wherein the rotor axis of rotation is oriented vertically or horizontally.

83 The fluid flow turbine of embodiment 81 or 82, comprising at least three of the turbine blade assemblies connected to the hub.

84 The fluid flow turbine of any one of embodiments 81 to 83, comprising: a nacelle, wherein the hub is supported by or within the nacelle; and a tower supporting the nacelle.

85 The fluid flow turbine of claim 84, further comprising at least one of a gearbox and a generator within the nacelle and operatively coupled to the rotor.

86 The fluid flow turbine of embodiment 81, wherein at least a portion of the oncoming fluid flow is generally parallel to the rotor axis of rotation.

87 A hydro driven turbine assembly comprising the fluid flow turbine of any one of embodiments 81 to 86.

88 A wind driven turbine assembly comprising the fluid flow turbine of any one of embodiments 81 to 86.

89 A fluid flow turbine blade assembly comprising: a rotor blade comprising a root section at which the rotor blade is attached to a hub of a fluid flow turbine and a working section, wherein the working section has a leading edge and a trailing edge and wherein the working section is configured and oriented to form a pressure surface facing oncoming fluid flow impinging on the rotor blade and a suction surface; and a deflector coupled to the rotor blade and extending spanwise along at least a portion of the working section of the rotor blade, wherein the deflector has a leading edge, a trailing edge, an upstream surface facing the oncoming fluid flow, and a downstream surface facing away from the oncoming fluid flow, wherein the deflector is configured so that when a fluid is flowing over the turbine blade assembly, pressure on an area of the pressure surface of the working section that is nearer to the trailing edge of the blade than to the leading edge of the blade is greater than pressure over a similar area of a rotor blade having no deflector and suction on an area of the suction surface of the working section that is nearer to the leading edge of the blade than to the trailing edge of the blade is greater than suction over a similar area of the rotor blade having no deflector.

90 The fluid flow turbine blade assembly of embodiment 89, wherein the deflector has a substantially uniform thickness between the upstream surface and the downstream surface 91 The fluid flow turbine blade assembly of embodiment 89, wherein, from the leading edge of the deflector to the trailing edge of the deflector, the deflector has a non-uniform thickness between the upstream surface and the downstream surface.

92 The fluid flow turbine blade assembly of any one of embodiments 89-91, wherein at least a portion of the upstream surface along at least a portion of a span of the deflector has a concave shape in a chordwise direction.

93 The fluid flow turbine blade assembly of embodiment 92, wherein the portion of the upstream surface having a concave shape extends to the trailing edge of the deflector.

94 The fluid flow turbine blade assembly of any one of embodiments 89-93, wherein the trailing edge of the deflector is situated aft of the trailing edge of the working section relative to a direction of travel of the turbine blade assembly.

95 The fluid flow turbine blade assembly of any one of embodiments 89-94, wherein at least a portion of a chord extending between the leading edge of the deflector and the trailing edge of the deflector is disposed outside a profile of the deflector defined between the upstream surface of the deflector and the downstream surface of the deflector.

96 The fluid flow turbine blade assembly of any one of embodiments 89-95, wherein the working section of the blade is an airfoil section or a hydrofoil section.

97 The fluid flow turbine blade assembly of any one of embodiments 89-96, wherein at least a portion of the upstream surface has a convex shape in a chordwise direction.

98 The fluid flow turbine blade assembly of embodiment 97, wherein the portion of the upstream surface having a convex shape extends to the leading edge of the deflector.

99 The fluid flow turbine blade assembly of any one of embodiments 89 to 98, wherein along at least a portion of the span of the deflector, the leading edge of the deflector is closer to the oncoming fluid flow than the trailing edge of the rotor blade.

100 The fluid flow turbine blade assembly of embodiment 99, wherein, along at least a portion of the span of the deflector, the trailing edge of the deflector is closer to the oncoming fluid flow than the trailing edge of the rotor blade.

101 The fluid flow turbine blade assembly of any one of embodiments 89 to 100, wherein the leading edge of the deflector is situated aft of the trailing edge of the working section relative to the direction of travel of the turbine blade assembly.

The invention claimed is:

1. A fluid flow turbine blade assembly comprising:
    a rotor blade comprising a root section at which the rotor blade is attached to a hub of a fluid flow turbine and a working section, wherein the working section has a leading edge and a trailing edge and wherein the working section is configured and oriented to form a pressure surface facing oncoming fluid flow impinging on the rotor blade and a suction surface; and
    a deflector coupled to the rotor blade and extending spanwise along at least a portion of the working section of the rotor blade, wherein the deflector has a leading edge, a trailing edge, an upstream surface facing the oncoming fluid flow, and a downstream surface facing away from the oncoming fluid flow, wherein the deflector has a uniform thickness between the upstream surface and the downstream surface over a majority of the deflector between the leading edge of the deflector and the trailing edge of the deflector, wherein at least a portion of the upstream surface along at least a portion of a span of the deflector has a concave shape in a chordwise direction, wherein the deflector is spaced-apart from the rotor blade to form a gap between the deflector and the rotor blade along at least a portion of the span of the deflector to permit fluid flow through the gap, and wherein the trailing edge of the deflector is situated aft of the trailing edge of the working section relative to a direction of travel of the turbine blade assembly.

2. The fluid flow turbine blade assembly of claim 1, wherein the working section of the rotor blade is an airfoil section or a hydrofoil section.

3. The fluid flow turbine blade assembly of claim 1, wherein at least a portion of the upstream surface has a convex shape in a chordwise direction.

4. The fluid flow turbine blade assembly of claim 1, wherein the portion of the upstream surface having the concave shape extends to the trailing edge of the deflector.

5. The fluid flow turbine blade assembly of claim 3, wherein the portion of the upstream surface having the convex shape extends to the leading edge of the deflector.

6. The fluid flow turbine blade assembly of claim 1, wherein along at least a portion of the span of the deflector, the leading edge of the deflector is closer to the oncoming fluid flow than the trailing edge of the rotor blade.

7. The fluid flow turbine blade assembly of claim 6, wherein, along at least a portion of the span of the deflector, the trailing edge of the deflector is closer to the oncoming fluid flow than the trailing edge of the rotor blade.

8. The fluid flow turbine blade assembly of claim 1, wherein, along at least a portion of the span of the deflector, the leading edge of the deflector is further from the oncoming fluid flow than the trailing edge of the rotor blade.

9. The fluid flow turbine blade assembly of claim 8, wherein, along at least a portion of the span of the deflector, the trailing edge of the deflector is further from the oncoming fluid flow than the trailing edge of the rotor blade.

10. The fluid flow turbine blade assembly of claim 1, wherein the leading edge of the deflector is situated aft of the trailing edge of the working section relative to the direction of travel of the turbine blade assembly.

11. The fluid flow turbine blade assembly of claim 1, further comprising a connector assembly connecting the deflector to the rotor blade.

12. The fluid flow turbine blade assembly of claim 11, wherein the connector assembly comprises:
    a connector element;
    a deflector-end flange fixedly linked to one end of the connector element and to the deflector; and
    a blade-end flange fixedly linked to an opposite end of the connector element and to the rotor blade.

13. The fluid flow turbine blade assembly of claim 12, wherein the turbine blade assembly is attached to a hub of a rotor that is rotatable about a rotor axis of rotation, the turbine blade assembly is oriented radially with respect to the rotor axis of rotation, and at least a portion of the oncoming fluid flow is parallel to the rotor axis of rotation, wherein the connector member comprises a connector tube, and a first section of the connector tube defines an aerodynamic shape that is tapered toward a first leading edge of the first section and is tapered toward a first trailing edge of the first section with respect to the oncoming fluid flow and a second section of the connector tube defines an aerodynamic shape that is tapered toward a second leading edge of the second section and is tapered toward a second trailing edge of the second section with respect to fluid flow resulting from rotation of the rotor.

14. The fluid flow turbine blade assembly of claim 13, wherein the first section is symmetrical about a line bisecting the first section between the first leading edge and the first trailing edge, and the second section is symmetrical about a line bisecting the second section between the second leading edge and the second trailing edge.

15. The fluid flow turbine blade assembly of claim 12, comprising two or more connector assemblies, each disposed at a different span-wise position along the turbine blade assembly, and wherein the connector tube of each connector assembly is shaped between its opposed ends to conform to an arc centered on an axis of rotation of the fluid flow turbine and having a radius corresponding to the spanwise position of the connector assembly.

16. The fluid flow turbine blade assembly of claim 11, wherein the connector assembly connects the deflector to the rotor blade such that an angle of attack of the deflector with respect to a rotor plane of rotation is fixed or such that the angle of attack of the deflector with respect to the rotor plane of rotation is variable.

17. The fluid flow turbine blade assembly of claim 11, wherein the connector assembly comprises a variable angle connector assembly which connects the deflector to the rotor blade such that an angle of attack of the deflector with respect to a rotor plane of rotation is variable, and wherein the variable angle connector assembly comprises:
- a spar having a first end fixed to an internal structure within the rotor blade and a second end pivotably connected to the deflector;
- a flexible shaft having a first end supported internally of the rotor blade for axial movement with respect to a longitudinal axis of the flexible shaft and a second end pivotably connected to the deflector at a position that is spaced apart from a position at which the second end of the spar is pivotably connected to the deflector; and
- a flexible shaft actuator coupled to the first end of the flexible shaft for effecting axial movement of the flexible shaft.

18. The fluid flow turbine assembly of claim 17, wherein the flexible shaft actuator comprises:
- a guide tube assembly disposed within the rotor blade, the guide tube assembly comprising a guide tube housing having a guide hole within which the first end of the flexible shaft is supported and a guide tube that is movable within the guide hole, wherein the first end of the flexible shaft is coupled to an end of the guide tube;
- a drive screw extending into a hole formed in the guide tube;
- a threaded collar coupled to the drive screw so that rotation of the drive screw causes a corresponding axial movement of the collar along a length of the drive screw, wherein the collar is coupled to the guide tube so that the axial movement of the collar is transmitted to the guide tube to cause axial movement of the guide tube within the guide hole which causes corresponding axial movement of the flexible shaft; and
- a motor coupled to the drive screw for effecting powered rotation of the drive screw.

19. The fluid flow turbine assembly of claim 18, wherein the motor is coupled to the drive screw by a right angled drive that transmits a shaft rotation generated by the motor in a first direction to rotate the drive screw and in a second direction to rotate a drive shaft to transmit rotation to a flexible shaft actuator of an adjacent variable angle connector assembly.

20. The fluid flow turbine blade assembly of claim 1, wherein the gap between the deflector and the rotor blade is constant across the span of the deflector.

21. The fluid flow turbine blade assembly of claim 1, wherein the gap between the deflector and the rotor blade varies across at least a portion of the span of the deflector.

22. The fluid flow turbine blade assembly of claim 1, wherein at least one of a radius of curvature and an arc-length of the portion of the upstream surface having the concave shape varies along at least a portion of the span of the deflector.

23. The fluid flow turbine blade assembly of claim 1, wherein at least a portion of a chord extending between the leading edge of the deflector and the trailing edge of the deflector is disposed outside a profile of the deflector defined between the upstream surface of the deflector and the downstream surface of the deflector.

24. The fluid flow turbine blade assembly of claim 23, wherein, at least 25% of the chord is disposed outside the profile of the deflector.

25. The fluid flow turbine blade assembly of claim 24, wherein, an amount of the chord that is disposed outside the profile of the deflector is different at a tip end of the deflector than at a hub end of the deflector.

26. The fluid flow turbine blade assembly of claim 1, wherein a span-wise curvature of the leading edge of the deflector follows a span-wise curvature of the trailing edge of the rotor blade.

27. The fluid flow turbine blade assembly of claim 1, further comprising one or more walls projecting from at least one of the upstream surface and the downstream surface of the deflector, wherein each wall extends at least partially from the leading edge of the deflector to the trailing edge of the deflector.

28. The fluid flow turbine blade assembly of claim 27, further comprising a transverse wall extending from at least one of the one or more wall, wherein the transverse wall extends along or near the trailing edge of the deflector.

29. The fluid flow turbine blade assembly of claim 1, wherein the deflector comprises two or more sections, wherein each section is connected to an adjoining section by a connector comprising a top plate and a bottom plate overlapping abutting ends of the section and the adjoining section and fasteners extending through the top and bottom plates and portions of the section and the adjoining section overlapped by the top and bottom plates.

30. The fluid flow turbine blade assembly of claim 1, wherein the deflector has a reflexed mean camber line such that a center of curvature of a first portion of the reflexed mean camber line is located on a downstream side of the deflector and a center of curvature of a second portion of the reflexed mean camber line is located on an upstream side of the deflector.

31. The fluid flow turbine assembly of claim 1, wherein along at least a portion of a span of the deflector extending to a tip end of the deflector, both the leading edge of the deflector and the trailing edge of the deflector are closer to the oncoming flow than both the leading edge of the rotor blade and the trailing edge of the rotor blade.

32. The fluid flow turbine assembly of claim 31, wherein at a hub end of the deflector at least one of the leading edge of the deflector and the trailing edge of the deflector is not closer to the oncoming flow than at least one of the leading edge of the rotor blade and the trailing edge of the rotor blade.

33. The fluid flow turbine assembly of claim 32, wherein a distance by which the deflector is closer to the oncoming flow than the rotor blade increases continuously from the hub end of the deflector to the tip end of the deflector.

34. The fluid flow turbine blade assembly of claim 1, wherein the deflector extends spanwise along an entire span of the rotor blade, including the root section and the working section.

35. The fluid flow turbine blade assembly of claim 1, wherein at least a portion of the trailing edge of the deflector includes a curved section of decreasing chord length between the leading edge of the deflector and the trailing edge of the deflector, wherein the curved section extends to a tip of the deflector.

36. The fluid flow turbine blade assembly of claim 1, wherein at least a portion of the trailing edge of the deflector includes an arced section of increasing chord length between the leading edge of the deflector and the trailing edge of the deflector, wherein the arced section extends to a tip of the deflector.

37. The fluid flow turbine blade assembly of claim 1, wherein, along at least a portion of the span of the deflector, the leading edge of the deflector is further from the oncoming fluid flow than the leading edge of the rotor blade.

38. A fluid flow turbine comprising:
a hub; and
a rotor comprising two or more of the turbine blade assembly of claim 1 connected to the hub, wherein the rotor is rotatable about a rotor axis of rotation and each turbine blade assembly extends radially with respect to the rotor axis of rotation.

39. The fluid flow turbine of claim 38, wherein the rotor axis of rotation is oriented vertically or horizontally.

40. The fluid flow turbine of claim 38, comprising at least three of the turbine blade assemblies connected to the hub.

41. The fluid flow turbine of claim 38, comprising:
a nacelle, wherein the hub is supported by or within the nacelle; and
a tower supporting the nacelle.

42. The fluid flow turbine of claim 41, further comprising at least one of a gearbox and a generator within the nacelle and operatively coupled to the rotor.

43. The fluid flow turbine of claim 38, wherein at least a portion of the oncoming fluid flow is parallel to the rotor axis of rotation.

44. A hydro driven turbine assembly comprising the fluid flow turbine of claim 38.

45. A wind driven turbine assembly comprising the fluid flow turbine of claim 38.

46. A fluid flow turbine blade assembly comprising:
a rotor blade comprising a root section at which the rotor blade is attached to a hub of a fluid flow turbine and a working section, wherein the working section has a leading edge and a trailing edge and wherein the working section is configured and oriented to form a pressure surface facing oncoming fluid flow impinging on the rotor blade and a suction surface; and
a deflector coupled to the rotor blade and extending spanwise along at least a portion of the working section of the rotor blade, wherein the deflector has a leading edge, a trailing edge, an upstream surface facing the oncoming fluid flow, and a downstream surface facing away from the oncoming fluid flow, wherein at least a portion of a chord extending between the leading edge of the deflector and the trailing edge of the deflector is disposed outside a profile of the deflector defined between the upstream surface of the deflector and the downstream surface of the deflector, wherein at least a portion of the upstream surface along at least a portion of a span of the deflector has a concave shape in a chordwise direction, wherein the deflector is spaced-apart from the rotor blade to form a gap between the deflector and the rotor blade along at least a portion of the span of the deflector to permit fluid flow through the gap, wherein the gap between the deflector and the rotor blade varies across at least a portion of the span of the deflector, and wherein the trailing edge of the deflector is situated aft of the trailing edge of the working section relative to a direction of travel of the turbine blade assembly.

47. The fluid flow turbine blade assembly of claim 46, wherein the working section of the rotor blade is an airfoil section or a hydrofoil section.

48. The fluid flow turbine blade assembly of claim 46, wherein at least a portion of the upstream surface has a convex shape in a chordwise direction.

49. The fluid flow turbine blade assembly of claim 46, wherein the portion of the upstream surface having a concave shape extends to the trailing edge of the deflector.

50. The fluid flow turbine blade assembly of claim 48, wherein the portion of the upstream surface having a convex shape extends to the leading edge of the deflector.

51. The fluid flow turbine blade assembly of claim 46, wherein, along at least a portion of the span of the deflector, the leading edge of the deflector is closer to the oncoming fluid flow than the trailing edge of the rotor blade.

52. The fluid flow turbine blade assembly of claim 51, wherein, along at least a portion of the span of the deflector, the trailing edge of the deflector is closer to the oncoming fluid flow than the trailing edge of the rotor blade.

53. The fluid flow turbine blade assembly of claim 46, wherein, along at least a portion of the span of the deflector, the leading edge of the deflector is further from the oncoming fluid flow than the trailing edge of the rotor blade.

54. The fluid flow turbine blade assembly of claim 53, wherein, along at least a portion of the span of the deflector, the trailing edge of the deflector is further from the oncoming fluid flow than the trailing edge of the rotor blade.

55. The fluid flow turbine blade assembly of claim 46, wherein the leading edge of the deflector is situated aft of the trailing edge of the working section relative to the direction of travel of the turbine blade assembly.

56. The fluid flow turbine blade assembly of claim 46, wherein, at least 25% of the chord is disposed outside the profile of the deflector.

57. The fluid flow turbine blade assembly of claim 56, wherein, an amount of the chord that is disposed outside the profile of the deflector is different at a tip end of the deflector than at a hub end of the deflector.

58. The fluid flow turbine blade assembly of claim 46, wherein a span-wise curvature of the leading edge of the deflector follows a span-wise curvature of the trailing edge of the rotor blade.

59. The fluid flow turbine blade assembly of claim 46, further comprising one or more walls projecting from at least one of the upstream surface and the downstream surface of the deflector, wherein each wall extends at least partially from the leading edge of the deflector to the trailing edge of the deflector.

60. The fluid flow turbine blade assembly of claim 59, further comprising a transverse wall extending from at least one of the one or more wall, wherein the transverse wall extends along or near the trailing edge of the deflector.

61. The fluid flow turbine blade assembly of claim 46, wherein the deflector comprises two or more sections, wherein each section is connected to an adjoining section by a connector comprising a top plate and a bottom plate overlapping abutting ends of the section and the adjoining section and fasteners extending through the top and bottom plates and portions of the section and the adjoining section overlapped by the top and bottom plates.

62. The fluid flow turbine blade assembly of claim 46, wherein the deflector has a reflexed mean camber line such that a center of curvature of a first portion of the reflexed mean camber line is located on a downstream side of the deflector and a center of curvature of a second portion of the reflexed mean camber line is located on an upstream side of the deflector.

63. The fluid flow turbine assembly of claim 46, wherein along at least a portion of a span of the deflector extending to a tip end of the deflector, both the leading edge of the deflector and the trailing edge of the deflector are closer to the oncoming flow than both the leading edge of the rotor blade and the trailing edge of the rotor blade.

64. The fluid flow turbine assembly of claim 63, wherein at a hub end of the deflector at least one of the leading edge of the deflector and the trailing edge of the deflector is not closer to the oncoming flow than at least one of the leading edge of the rotor blade and the trailing edge of the rotor blade.

65. The fluid flow turbine assembly of claim 64, wherein a distance by which the deflector is closer to the oncoming flow than the rotor blade increases continuously from the hub end of the deflector to the tip end of the deflector.

66. The fluid flow turbine blade assembly of claim 46, further comprising a connector assembly connecting the deflector to the rotor blade.

67. The fluid flow turbine blade assembly of claim 66, wherein the connector assembly comprises:
a connector element;
a deflector-end flange fixedly linked to one end of the connector element and to the deflector; and
a blade-end flange fixedly linked to an opposite end of the connector element and to the rotor blade.

68. The fluid flow turbine blade assembly of claim 67, wherein the turbine blade assembly is attached to a hub of a rotor that is rotatable about a rotor axis of rotation, the turbine blade assembly is oriented radially with respect to the rotor axis of rotation, and at least a portion of the oncoming fluid flow is parallel to the rotor axis of rotation, wherein the connector member comprises a connector tube, and a first section of the connector tube defines an aerodynamic shape that is tapered toward a first leading edge of the first section and is tapered toward a first trailing edge of the first section with respect to the oncoming fluid flow and a second section of the connector tube defines an aerodynamic shape that is tapered toward a second leading edge of the second section and is tapered toward a second trailing edge of the second section with respect to fluid flow resulting from rotation of the rotor.

69. The fluid flow turbine blade assembly of claim 68, wherein the first section is symmetrical about a line bisecting the first section between the first leading edge and the first trailing edge, and the second section is symmetrical about a line bisecting the second section between the second leading edge and the second trailing edge.

70. The fluid flow turbine blade assembly of claim 67, comprising two or more connector assemblies, each disposed at a different span-wise position along the turbine blade assembly, and wherein the connector tube of each connector assembly is shaped between its opposed ends to conform to an arc centered on an axis of rotation of the fluid flow turbine and having a radius corresponding to the spanwise position of the connector assembly.

71. The fluid flow turbine blade assembly of claim 66, wherein the connector assembly connects the deflector to the rotor blade such that an angle of attack of the deflector with respect to a rotor plane of rotation is fixed or such that the angle of attack of the deflector with respect to the rotor plane of rotation is variable.

72. The fluid flow turbine blade assembly of claim 66, wherein the connector assembly comprises a variable angle connector assembly which connects the deflector to the rotor blade such that an angle of attack of the deflector with respect to a rotor plane of rotation is variable, and wherein the variable angle connector assembly comprises:
a spar having a first end fixed to an internal structure within the rotor blade and a second end pivotably connected to the deflector;
a flexible shaft having a first end supported internally of the rotor blade for axial movement with respect to a longitudinal axis of the flexible shaft and a second end pivotably connected to the deflector at a position that is spaced apart from a position at which the second end of the spar is pivotably connected to the deflector; and
a flexible shaft actuator coupled to the first end of the flexible shaft for effecting axial movement of the flexible shaft.

73. The fluid flow turbine assembly of claim 72, wherein the flexible shaft actuator comprises:
a guide tube assembly disposed within the rotor blade, the guide tube assembly comprising a guide tube housing having a guide hole within which the first end of the flexible shaft is supported and a guide tube that is movable within the guide hole, wherein the first end of the flexible shaft is coupled to an end of the guide tube;
a drive screw extending into a hole formed in the guide tube;
a threaded collar coupled to the drive screw so that rotation of the drive screw causes a corresponding axial movement of the collar along a length of the drive screw, wherein the collar is coupled to the guide tube so that the axial movement of the collar is transmitted to the guide tube to cause axial movement of the guide tube within the guide hole which causes corresponding axial movement of the flexible shaft; and
a motor coupled to the drive screw for effecting powered rotation of the drive screw.

74. The fluid flow turbine assembly of claim 73, wherein the motor is coupled to the drive screw by a right angled drive that transmits a shaft rotation generated by the motor in a first direction to rotate the drive screw and in a second direction to rotate a drive shaft to transmit rotation to a flexible shaft actuator of an adjacent variable angle connector assembly.

75. The fluid flow turbine blade assembly of claim 46, wherein at least one of a radius of curvature and an arc-length of the portion of the upstream surface having the concave shape varies along at least a portion of the span of the deflector.

76. The fluid flow turbine blade assembly of claim 46, wherein the deflector extends spanwise along an entire span of the rotor blade, including the root section and the working section.

77. The fluid flow turbine blade assembly of claim 46, wherein, from the leading edge of the deflector to the trailing edge of the deflector, the deflector has a non-uniform thickness between the upstream surface and the downstream surface.

78. The fluid flow turbine blade assembly of claim 46, wherein at least a portion of the trailing edge of the deflector includes a curved section of decreasing chord length between the leading edge of the deflector and the trailing edge of the deflector, wherein the curved section extends to a tip of the deflector.

79. The fluid flow turbine blade assembly of claim 46, wherein at least a portion of the trailing edge of the deflector includes an arced section of increasing chord length between the leading edge of the deflector and the trailing edge of the deflector extending to a tip of the deflector, wherein the arced section extends to a tip of the deflector.

80. The fluid flow turbine blade assembly of claim 46, wherein, along at least a portion of the span of the deflector, the leading edge of the deflector is further from the oncoming fluid flow than the leading edge of the rotor blade.

81. A fluid flow turbine comprising:
a hub; and
a rotor comprising two or more of the turbine blade assembly of claim 46 connected to the hub, wherein the rotor is rotatable about a rotor axis of rotation and each turbine blade assembly extends radially with respect to the rotor axis of rotation.

82. The fluid flow turbine of claim 81, wherein the rotor axis of rotation is oriented vertically or horizontally.

83. The fluid flow turbine of claim 81, comprising at least three of the turbine blade assemblies connected to the hub.

84. The fluid flow turbine of claim 81, comprising:
a nacelle, wherein the hub is supported by or within the nacelle; and
a tower supporting the nacelle.

85. The fluid flow turbine of claim 84, further comprising at least one of a gearbox and a generator within the nacelle and operatively coupled to the rotor.

86. The fluid flow turbine of claim 81, wherein at least a portion of the oncoming fluid flow is parallel to the rotor axis of rotation.

87. A hydro driven turbine assembly comprising the fluid flow turbine of claim 81.

88. A wind driven turbine assembly comprising the fluid flow turbine of claim 81.

89. A fluid flow turbine blade assembly comprising:
a rotor blade comprising a root section at which the rotor blade is attached to a hub of a fluid flow turbine and a working section, wherein the working section has a leading edge and a trailing edge and wherein the working section is configured and oriented to form a pressure surface facing oncoming fluid flow impinging on the rotor blade and a suction surface; and
a deflector coupled to the rotor blade and extending spanwise along at least a portion of the working section of the rotor blade, wherein the deflector has a leading edge, a trailing edge, an upstream surface facing the oncoming fluid flow, and a downstream surface facing away from the oncoming fluid flow, wherein the deflector is configured so that when a fluid is flowing over the turbine blade assembly, pressure on an area of the pressure surface of the working section that is nearer to the trailing edge of the rotor blade than to the leading edge of the rotor blade is greater than pressure over a similar area of a rotor blade having no deflector and suction on an area of the suction surface of the working section that is nearer to the leading edge of the rotor blade than to the trailing edge of the rotor blade is greater than suction over a similar area of the rotor blade having no deflector.

90. The fluid flow turbine blade assembly of claim 89, wherein the deflector has a uniform thickness between the upstream surface and the downstream surface over a majority of the deflector between the leading edge of the deflector and the trailing edge of the deflector.

91. The fluid flow turbine blade assembly of claim 89, wherein, from the leading edge of the deflector to the trailing edge of the deflector, the deflector has a non-uniform thickness between the upstream surface and the downstream surface.

92. The fluid flow turbine blade assembly of claim 89, wherein at least a portion of the upstream surface along at least a portion of a span of the deflector has a concave shape in a chordwise direction.

93. The fluid flow turbine blade assembly of claim 92, wherein the portion of the upstream surface having a concave shape extends to the trailing edge of the deflector.

94. The fluid flow turbine blade assembly of claim 89, wherein the trailing edge of the deflector is situated aft of the trailing edge of the working section relative to a direction of travel of the turbine blade assembly.

95. The fluid flow turbine blade assembly of claim 89, wherein at least a portion of a chord extending between the leading edge of the deflector and the trailing edge of the deflector is disposed outside a profile of the deflector defined between the upstream surface of the deflector and the downstream surface of the deflector.

96. The fluid flow turbine blade assembly of claim 89, wherein the working section of the rotor blade is an airfoil section or a hydrofoil section.

97. The fluid flow turbine blade assembly of claim 89, wherein at least a portion of the upstream surface has a convex shape in a chordwise direction.

98. The fluid flow turbine blade assembly of claim 97, wherein the portion of the upstream surface having the convex shape extends to the leading edge of the deflector.

99. The fluid flow turbine blade assembly of claim 89, wherein along at least a portion of the span of the deflector, the leading edge of the deflector is closer to the oncoming fluid flow than the trailing edge of the rotor blade.

100. The fluid flow turbine blade assembly of claim 99, wherein, along at least a portion of the span of the deflector, the trailing edge of the deflector is closer to the oncoming fluid flow than the trailing edge of the rotor blade.

101. The fluid flow turbine blade assembly of claim 89, wherein the leading edge of the deflector is situated aft of the trailing edge of the working section relative to the direction of travel of the turbine blade assembly.

102. The fluid flow turbine blade assembly of claim 89, wherein, along at least a portion of the span of the deflector, the trailing edge of the deflector is further from the oncoming fluid flow than the trailing edge of the rotor blade.

103. The fluid flow turbine blade assembly of claim 89, wherein, along at least a portion of the span of the deflector, the leading edge of the deflector is further from the oncoming fluid flow than the leading edge of the rotor blade.

* * * * *